(12) United States Patent
Rathakrishnan

(10) Patent No.: US 12,717,556 B2
(45) Date of Patent: Aug. 25, 2026

(54) AGENTIC ARTIFICIAL INTELLIGENCE BASED SOFTWARE DEVELOPMENT AND MODERNIZATION

(71) Applicant: Presidio, Inc., New York, NY (US)

(72) Inventor: Maharajan Rathakrishnan, Prosper, TX (US)

(73) Assignee: Presidio, Inc., New York, NY (US)

( * ) Notice: Subject to any disclaimer, the term of this patent is extended or adjusted under 35 U.S.C. 154(b) by 0 days.

(21) Appl. No.: 19/387,006

(22) Filed: Nov. 12, 2025

(65) Prior Publication Data

US 2026/0133771 A1 May 14, 2026

Related U.S. Application Data

(60) Provisional application No. 63/719,439, filed on Nov. 12, 2024, provisional application No. 63/726,643, filed on Dec. 1, 2024.

(51) Int. Cl.

| | |
|---|---|
| ***G06F 8/72*** | (2018.01) |
| ***G06F 8/35*** | (2018.01) |
| ***G06F 8/36*** | (2018.01) |
| ***G06F 8/75*** | (2018.01) |
| ***G06F 9/30*** | (2018.01) |
| ***G06F 9/38*** | (2018.01) |
| ***G06F 9/54*** | (2006.01) |
| ***G06F 11/36*** | (2025.01) |
| ***G06F 16/2457*** | (2019.01) |
| *G06F 8/33* | (2018.01) |
| *G06F 8/34* | (2018.01) |
| *G06F 8/70* | (2018.01) |
| *G06F 8/76* | (2018.01) |

(52) U.S. Cl.

CPC .................. *G06F 8/35* (2013.01); *G06F 8/36* (2013.01); *G06F 8/33* (2013.01); *G06F 8/34* (2013.01); *G06F 8/70* (2013.01); *G06F 8/72* (2013.01); *G06F 8/75* (2013.01); *G06F 8/76* (2013.01); *G06F 9/547* (2013.01)

(58) Field of Classification Search

CPC ..... G06F 8/35; G06F 8/36; G06F 8/72; G06F 8/76; G06F 8/70; G06F 8/33; G06F 8/34; G06F 8/75; G06F 9/547

See application file for complete search history.

(56) References Cited

U.S. PATENT DOCUMENTS 11,416,243 B2 * 8/2022 Hwang ............... H04L 41/0803
11,669,332 B1 * 6/2023 Aiyer ...................... G06F 8/447 712/216
11,726,778 B2 * 8/2023 Sridhara ................ G06F 9/547 717/110

(Continued)

*Primary Examiner* — Anibal Riveracruz

(74) *Attorney, Agent, or Firm* — Alston & Bird LLP

(57) ABSTRACT

An agentic-AI-based software modernization system may be configured to receive one or more portions of monolithic legacy code of a legacy software program product, the monolithic legacy code comprising a plurality of code segments, group the monolithic legacy code by functionally related code segments of the plurality of code segments to define a plurality of groups, generate an API for each identified group, generate modern microservice code for each identified group to define a modernized software program product, and validate the modernized software program product.

19 Claims, 34 Drawing Sheets

700

(56) References Cited

U.S. PATENT DOCUMENTS

| | | | | |
|---|---|---|---|---|
| 11,758,010 | B1 * | 9/2023 | Tamilselvam | G06F 40/20 709/203 |
| 12,020,025 | B1 * | 6/2024 | Zhang | G06F 8/433 |
| 12,293,241 | B2 * | 5/2025 | Kanvar | G06F 9/541 |
| 2023/0176831 | A1 * | 6/2023 | Agarwal | G06F 11/3616 717/113 |
| 2024/0061674 | A1 * | 2/2024 | Zolotow | G06F 8/70 |
| 2025/0362906 | A1 * | 11/2025 | Adhikari | G06F 8/76 |
| 2025/0383870 | A1 * | 12/2025 | Done | G06F 8/72 |

* cited by examiner

AGENTIC ARTIFICIAL INTELLIGENCE BASED SOFTWARE DEVELOPMENT AND MODERNIZATION

CROSS-REFERENCE TO RELATED APPLICATIONS

This application claims the benefit of U.S. Provisional Application No. 63/719,439, filed Nov. 12, 2024, and claims the benefit of U.S. Provisional Application No. 63/726,643, filed Dec. 1, 2024, which applications are incorporated by reference herein in their entireties.

TECHNICAL FIELD

The present application relates to agentic artificial intelligence ("AI") systems and methods for software development, modification, augmentation, and modernization.

BACKGROUND

Software development has traditionally been a complex, time-intensive process requiring expertise across multiple disciplines. Conventional software development lifecycles typically involve distinct phases including requirements gathering, system design, coding, testing, and deployment, with each phase often requiring significant manual effort and coordination between different teams and stakeholders. Moreover, legacy software does not easily lend itself to improvement and modification with modern software development lifecycles, and such legacy software may be monolithic or otherwise antiquated.

In traditional development environments, extensive preparation and specification drafting is needed to avoid miscommunication, incomplete requirement capture, and lengthy revision cycles that delay project timelines. Traditional AI systems cannot be readily substituted into the software development life cycle because the outputs are too unpredictable for reliable software development, leading to unusable code, critical and unrecoverable errors, and unmet software requirements. Moreover, explainability, auditability, and human oversight are hampered by black box, opaque AI models, leading to poor expected performance in the software development environment. For legacy software systems, the lack of modernized software structures prohibits its further improvement. Applicant has identified several problems associated with both the traditional software development lifecycle and AI processes. Through applied ingenuity, the inventors have developed solutions to the aforementioned problems and more, many of which are described with respect to embodiments herein.

SUMMARY

Various embodiments of the present disclosure are directed to improved apparatuses, systems, methods, and computer readable media for providing agentic AI augmentation and modernization. These characteristics as well as additional features, functions, and details of various embodiments are described below. Similarly, corresponding and additional embodiments are also described below.

BRIEF DESCRIPTION OF THE DRAWINGS

In the following, certain embodiments will be described in greater detail with reference to the accompanying drawings, in which.

DETAILED DESCRIPTION

Figure 1:
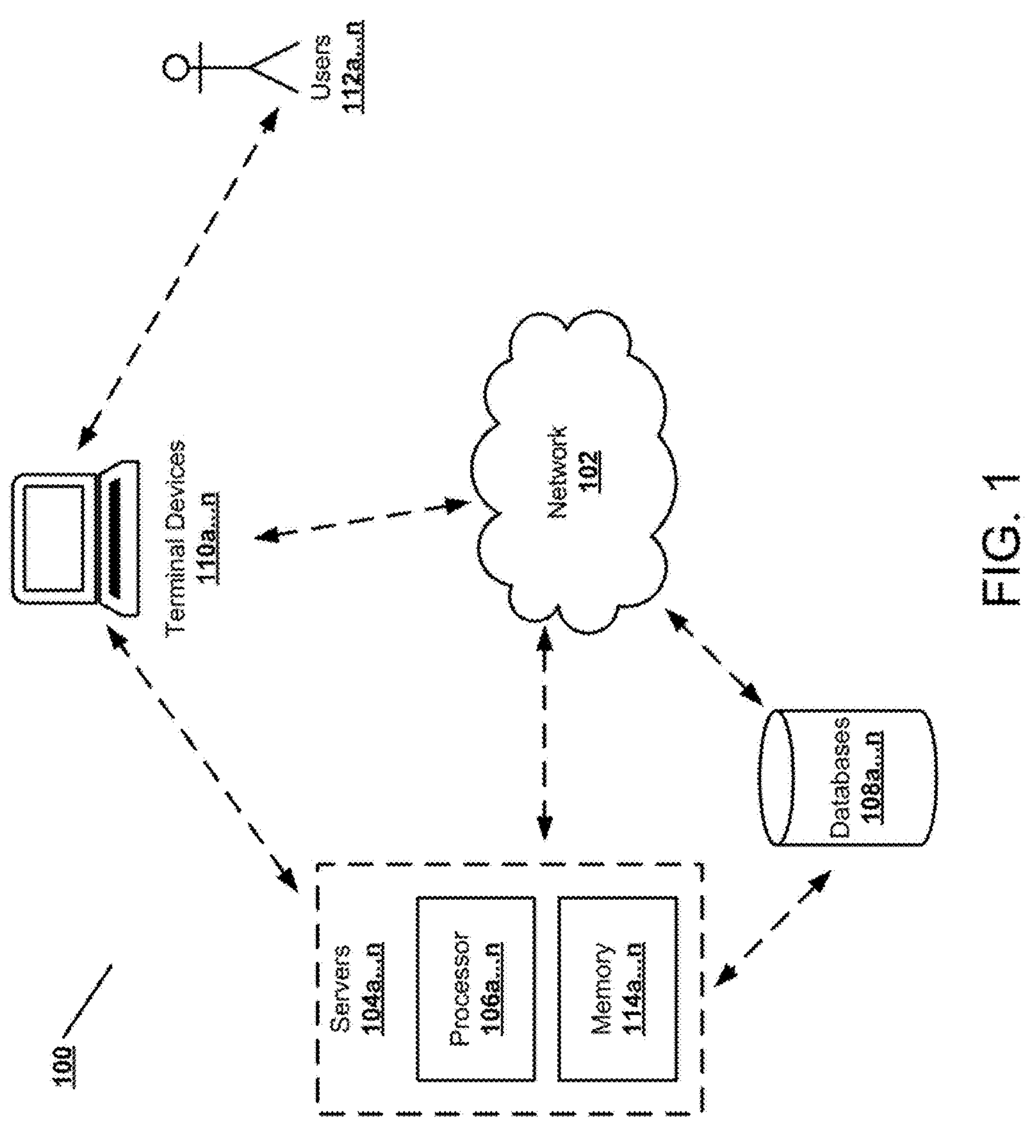
FIG. 1 shows an example system for implementing an agentic AI augmentation framework and/or a code modernization framework in accordance with at least one embodiment of the present disclosure.

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Further, when a particular feature, structure, or characteristic is described in connection with an embodiment, it is within the knowledge of one skilled in the art to apply such feature, structure, or characteristic in connection with other embodiments whether or not explicitly described. It shall be understood that although the terms "first", "second", and/or the like may be used herein to describe various elements, these elements should not be limited by these terms. These terms are only used to distinguish one element from another. For the purposes of the present disclosure, the phrases "at least one of A or B", "at least one of A and B", and "A and/or B" mean (A), (B), or (A and B). For the purposes of the present disclosure, the phrase "A, B, and/or C" means (A), (B), (C), (A and B), (A and C), (B and C), or (A, B, and C).

Overview

Some embodiments of the present disclosure relates to an agentic AI augmentation framework for improving the accuracy, quality, and speed of various aspects of a software development lifecycle. In some examples, the framework may include a human centric AI accelerator that streamlines the software development lifecycle by delivering faster outcomes with better quality software using AI techniques (e.g., generative AI) to supplement a traditional human coding process. The agentic AI framework may include various elements overlaying an entire software development lifecycle to maximize end-to-end performance of the software solutions created thereby. By embedding AI into the traditionally manual, human portions of the software development framework, the agentic AI augmentation framework improves the underlying software performance in previously unrealized ways and facilitates user-AI interoperability from initial ideation to at least implementation.

Embodiments of the agentic AI augmentation framework described herein enable developer systems to transform high level software development instructions and ideas into functioning software applications more quickly and reliably. The agentic AI augmentation framework may further reduce the expertise required to generate new software tools by linking natural language inputs with executable software outputs (e.g., using generative AI). Various embodiments discussed herein provide a more efficient process for building software.

In today's fast-paced digital landscape, software development must balance speed, adaptability, and precision. Embodiments of the agentic AI augmentation framework described herein address these needs by using purpose-built AI agents at every stage of a software development lifecycle (SDLC) to optimize workflows, minimize human error, and drive collaboration between AI and human contributors. Embodiments of the agentic AI augmentation framework described herein are designed for entities requiring rapid, scalable, and high-quality application development. This framework may be adaptable across various domains, enabling projects to leverage AI support without sacrificing human oversight, explainability, or usability of the tools and software. A high level example workflow associated with embodiments of the agentic AI augmentation framework described herein will now be described. Embodiments of the agentic AI augmentation framework may initiate upon receipt of a software functionality request (e.g., an idea). Based upon the software functionality request, the agentic AI augmentation framework may transition through multiple stages of the SLDC to generate inputs necessary for a software coding generative AI model output.

For example, the agentic AI augmentation framework may perform a requirements gathering process. The requirements gathering process may establish the initial guiderails and/or goals of the software functionality request (e.g., software requirements information). The requirements gathering process may be push based (e.g., an instruction set, OCR'd document, or other data is pushed to the agentic AI augmentation framework computing system for analysis and extraction of the requirements) and/or pull based (e.g., such data is retrieved by the agentic AI augmentation framework from a database, website, or other source, such as based on a query of information related to the software functionality request.). The agentic AI augmentation framework may then proceed with work item creation based on the requirements and/or software functionality request and then through one or more coding stages to generate the resulting software code. The agentic AI augmentation framework may operate independently after receiving the software functionality request or may work cooperatively with user input and/or approval at one or more stages of the process. In some embodiments, the agentic AI augmentation framework may operate in a collaborative requirement analysis, design, coding and testing process.

The agentic AI augmentation framework is configured to expedite the software development process by having clarity on what to build, edge cases, possible alternatives and ability to handle the exception flows in-context to the entire application. FIG. 1 below illustrates an example embodiment of the agentic AI augmentation framework. The depicted framework captures all the necessary components and detail as early as possible in the development lifecycle. This provides the ecosystem needed for the implementation phase and reduces the number of cycles involved for clarifications, improving the quality, accuracy, and speed of both the software and the software development process.

In some examples, an agentic AI augmentation framework may provide an AI accelerator that streamlines the software development lifecycle by delivering faster outcomes with better quality software using AI techniques (e.g., agentic AI enabled by one or more purpose-built generative AI models) to supplement a coding process with specific technical improvements described herein. The AI framework may include various elements overlaying a software development lifecycle to maximize end-to-end performance of the software solutions created thereby, which may include one or more agents configured to perform specific functions within the software development environment and providing constant or near constant transparency and adjustability for users to prevent unknown errors and substantial revision. Using one or more of the various embodiments discussed herein, the agentic AI augmentation framework improves the underlying software development process and the performance of the underlying software in previously unrealized ways and facilitates user-AI interoperability from initial ideation to at least implementation.

Embodiments of the agentic AI augmentation framework described herein enable developer systems to transform high-level software-development instructions and ideas into functioning software applications more quickly and reliably. The agentic AI augmentation framework may further reduce the expertise required to generate new software tools via the various technical improvements to the AI agents and AI systems described herein, such as by linking natural language inputs with executable software outputs (e.g., using generative AI) with more accurate, predictable outputs that do not require software development expertise to troubleshoot and deploy. Various embodiments discussed herein provide a more efficient process for building software, including specific improvements to various stages of the software development process in addition to a holistic system and process.

In a high level example workflow associated with at least some embodiments of the agentic AI augmentation framework described herein, the agentic AI augmentation framework may initiate upon receipt of a software functionality request describing one or more features, functionalities, or other parameters associated with a new computer-generated executable software program product. Based upon the software functionality request, the agentic AI augmentation framework may execute multiple stages of autonomous AI generation to develop one or more requirement data objects, generate one or more code generation work prompt sets, and generate one or more computer-generated executable software program products, optionally supplemented by human responses and inputs at one or more intermediate stages.

For example, the agentic AI augmentation framework may perform a requirements-gathering process. The requirements gathering process may establish the initial guiderails and/or goals of the software functionality request (e.g., software requirements information). The requirements gathering process may be push based (e.g., an instruction set, optical character recognition (OCR) processed document, and/or other data is pushed to the agentic AI augmentation framework computing system for analysis and extraction of the requirements) and/or pull based (e.g., such data is retrieved by the agentic AI augmentation framework from a database, website, and/or other source, such as based on a query of information related to the software functionality request.). The one or more requirement data objects may be output from this process.

The agentic AI augmentation framework may autonomously or semi-autonomously create one or more work items (e.g., code generation work prompt set(s)) based on the requirements and/or software functionality request and then through one or more coding stages to generate the resulting software code. The work items may be generated based on the requirement data object created at least in part by the upstream agents, and the work items may be used to generate the computer-generated executable software program product. The agentic AI augmentation framework may operate independently after receiving the software functionality request or may work cooperatively with user input and/or approval at one or more stages of the process. In some embodiments, the agentic AI augmentation framework may operate in a collaborative requirement analysis, design, coding and testing process.

Embodiments of the code preparation process described herein also represent a technical advancement in AI-augmented software development, particularly through the implementation of a code context agent that transforms basic application context from pre-generated executable software program products into enriched, semantically meaningful data structures. This process addresses one or more challenges in legacy code comprehension by leveraging one or more natural language processing and machine learning techniques to create a more intelligent foundation for downstream development tasks. The downstream development tasks are further improved by selective augmentation of pre-generated code to meet the newly generated requirement data objects as described herein, leading to faster and more accurate generative software development.

In some embodiments, the code context agent operates by receiving code context data and source code associated with one or more pre-generated executable software program products and systematically enriching this context through AI agentic analysis. In some embodiments, the code context agent may collect configuration details such as the source language, defaulting to predefined values when specific parameters are not provided. The agent may utilize utilities to load and process the, specifying parameters including file paths, relative paths, application context, file services, and language model services.

In some embodiments, the context enrichment process may involve the extraction of application structure data from the pre-generated executable software program products. The code context agent may analyze the organizational hierarchy of software components, identifying relationships between segments, classes, functions, and other structural elements to develop the application structure data. This application structure data may provide insights into how different parts of the codebase interact and depend on one another, creating a comprehensive map of the software architecture that may be used by subsequent AI agents for more informed decision-making.

The code context agent may further extract dependency data from the source code, identifying both internal and external dependencies that affect software functionality. In some cases, this dependency analysis may include mapping relationships between different code segments and functional groups, identifying third-party libraries and frameworks, and inferring data flow patterns throughout the application. The dependency data may enable more accurate impact analysis when modifications are proposed, helping to prevent unintended consequences from code changes.

Architectural standards data may also be extracted and analyzed by the code context agent. In some embodiments, this may involve identifying design patterns, coding conventions, and architectural principles employed within the pre-generated executable software program products. The agent may recognize common architectural patterns such as microservices architectures or layered architectures, and may compare and document adherence to or deviations from pre-stored coding standards and best practices.

Additionally or alternatively, the enrichment process may utilize large language models to generate contextual metadata for code chunks (also referred to as code segments) to be integrated as the enriched context data, capturing details such as the overall purpose of code segments, implementation specifics including main components and design patterns, data management strategies including data types and storage mechanisms, and important operations along with their significance within the broader application context. This metadata generation may be guided by structured prompts that ensure comprehensive analysis and consistent output formatting. The metadata may be used to supplement the existing code context data to generate enriched code context data.

In some embodiments, the code context agent may implement intelligent chunking mechanisms that split large code files into manageable portions to facilitate scalable analysis. This chunking process may be context-aware, ensuring that related code elements remain grouped together while maintaining semantic coherence across chunk boundaries. The agent may support parallel processing capabilities, handling multiple files concurrently through thread pool execution to improve efficiency when processing large codebases. These chunks may be stored for use in downstream processes, such as the code segmentation and/or segment analysis implemented by the change isolation agent.

The enriched context data generated by the code context agent may serve as a foundation for subsequent processing by other agents within the agentic AI augmentation framework. In some embodiments, the enriched context may be passed to a vectorize code agent that converts the contextualized code chunks into vector embeddings stored in vector databases, enabling semantic searching and similarity-based retrieval operations that support more sophisticated code analysis and modification tasks.

Embodiments of the code implementation process described herein represent a significant technical advancement in AI-augmented software development through the deployment of agents that work collaboratively to ensure precise, controlled code generation and modifications to existing codebases. The change isolation agent may leverage the enriched context data generated by the code context agent and be vectorized by the vectorize code agent to identify specific code segments from one or more pre-generated code segments requiring modification to satisfy the requirements defined in the code generation work prompt sets. This agent may utilize semantic analysis and dependency mapping to isolate only those code segments that relate to the new requirements, along with any dependent code segments that may be affected by the proposed changes, if needed. The identification process may involve comparing the vectorized representations of existing code against the requirements specifications, using similarity matching and contextual inference to pinpoint the minimal set of code segments that need modification. By limiting the scope of changes to only the necessary segments and their dependencies, the change isolation agent may significantly reduce the risk of AI-generated hallucinations and unintended modifications that could compromise the integrity of the broader codebase.

The implementation process may further include one or more improved AI agent systems for reviewing and validating the modified code before deployment. For example, the code change reviewer agent provides autonomous quality assurance capabilities that enhance the reliability of AI-generated code modifications. This agent may implement multi-layered review processes that evaluate modified code segments against data such as coding standards, architectural principles, and requirements extracted from the code generation work prompt sets or related context data. The reviewer agent may perform static code analysis, identify potential security vulnerabilities, assess compliance with established design patterns, verify that changes maintain consistency with the existing codebase architecture, and/or other preliminary analyses to preemptively catch errors in the generated code using, in some instances, a discrete and specifically trained AI agent. In some embodiments, the agent may utilize different AI models or configurations than those used for code generation, providing an independent perspective that may catch errors or improvements that the initial code change agent might have missed.

In some embodiments, a code tester agent complements this review process by executing comprehensive automated testing protocols that validate the functionality of modified code segments against the acceptance criteria defined in the code generation work prompt sets. This agent may generate and execute unit tests for individual code segments, perform integration testing to ensure proper interaction between modified and existing code segments, and conduct regression testing to verify that changes do not introduce unintended side effects (e.g., in a sandbox environment). The testing process may include validation against predefined test cases, generation of new test scenarios based on the requirements, and performance benchmarking to ensure that modifications meet specified performance criteria, thereby providing a robust validation framework that ensures code quality before deployment.

The agentic AI augmentation framework incorporates several technical improvements that enhance software development efficiency and reliability. The modular agentic system employs AI agents that each perform distinct functions within the development lifecycle, allowing for targeted optimization and independent operation of different development phases. This modular approach enables discrete sub-step separation where complex development tasks are broken down into well-defined, manageable components that can be executed sequentially or in parallel, leading to more predictable and controllable outcomes. Moreover, each agent can be created specifically for its niche purpose rather than using general purpose large language models or even software-development specific unitary models.

The framework is designed to be scalable and flexible to accommodate varying programming requirements and user expertise levels, automatically adjusting its assistance and automation based on project complexity and user preferences or implied based on user interactions with one or more agents. While maintaining this flexibility, the system maintains rigid operational constraints through built in guardrails, discrete compartmentalized stages that lead to a more deterministic workflow, near continuous enablement of user review and feedback, and validation mechanisms that prevent the generation of flawed or nonfunctional code by enforcing coding standards and architectural principles at each stage.

The framework supports autonomous agentic operation where AI agents can independently execute development tasks without constant human oversight, making intelligent decisions based on predefined parameters and learned patterns. Asynchronous user interaction allows the system to continue processing development tasks while users contribute input at their preferred intervals, with the framework creating branch points that enable seamless integration of user feedback without disrupting ongoing automated processes.

The user-focused output UI provides intelligent human-facilitated monitoring capabilities that maintain software focus through continuous feedback loops, preventing AI hallucinations and ensuring transparency in the development process. This interface solves the problem of requiring expert-level knowledge to supervise AI outputs by presenting information in accessible formats that enable non-expert users to provide meaningful oversight.

The code context vector store serves as a centralized repository of vectorized, contextualized code that is accessible to all agents for rapid code generation and analysis. This store is primed with enriched context data generated by the code context agent, enabling faster and more accurate coding decisions while providing a curated data environment that eliminates the need for extensive searching and data cleaning operations.

Various embodiments of the present disclosure, and portions thereof, represent improvements to the underlying technology and processes associated with agentic AI systems, with software development platforms, with generative AI based coding, with human-AI interaction facilitating computer systems, and with other technology and processes disclosed herein. For example, embodiments of the present disclosure accelerate a software development lifecycle using improvements to generative AI. In some instances, the agentic AI augmentation framework integrates software requirements directly with the codebase using AI to align development with specified requirements, reducing miscommunication between systems and agents and speeding up delivery by increasing accuracy of the developed code and reducing revisions. Code generation is improved via the pre-generation preparation of requirement data objects and code generation work prompt sets that serve as inputs to and reduce the error rate of the downstream agents, allowing for autonomous code generation with transparency and explainability that allows confidence and human supervision without sacrificing speed or quality. The system may also be faster, more intuitive, and more configurable without sacrificing code quality. The system integrates a traceability framework that links specific requirements to specific code changes for faster change isolation and faster code revision and explainability-improving both autonomous and human-driven revision and review of the generated code. The multi-agent, multi-step, structured development lifecycle improves communication and accuracy of the resulting generated code, while not sacrificing speed or efficiency. The flexible synchronous/asynchronous revision incorporation processes allow the framework to develop code as quickly as possible without impacting user transparency and control over the generation process. Moreover, the code review and revision processes ensure compliance with predefined requirements and standards before deployment and reduce error rates and mental load on human monitors through autonomous or semi-autonomous review and revision loops. The pre-generation requirements building also ensures that there are fewer late stage scope changes, further improving both the accuracy and the speed of the generation process.

The agentic AI augmentation framework integrates AI into static application security testing to perform contextual security analysis, enhancing the detection of vulnerabilities by inferring code context. This integration enables contextual analysis where AI analyzes code within the entire application context to detect complex security issues, while providing real-time feedback that delivers immediate security insights during code writing. These capabilities result in an enhanced security posture by identifying and fixing security issues early in development, developer empowerment that enables developers to write secure code without deep security expertise, and adaptive learning where AI improves detection capabilities by learning from new threats and feedback.

The agentic AI augmentation framework transforms high-level ideas into detailed user stories through human and AI collaboration and unique combinations of agentic AI systems, streamlining requirements gathering to produce comprehensive and actionable user stories. The framework implements AI-assisted drafting to generate initial drafts of user stories capturing objectives, roles, and criteria, combined with human review and refinement where analysts refine AI drafts to align with goals. Natural language processing converts unstructured ideas into structured user stories, while a feedback loop enables AI to learn from refinements to improve future generations. This pre-coding generation cleans the inputs to the code generation agent, leaving the resulting code more accurate. These features deliver significant efficiency gains by accelerating the planning phase through reduced drafting time, consistency by standardizing user story format and detail level, and enhanced creativity that allows human developers to focus on big picture concepts over the mechanics of coding.

The agentic AI augmentation framework converts development tasks into code by combining human expertise with AI capabilities, automating routine tasks while developers tackle bigger picture, but non-execution related problems. The system features AI code generation that generates code based on human inputs related to task descriptions and coding standards-including two way natural language conversion to also output natural language summarize of the coding process back to the user. These improvements facilitate developer oversight where programmers review and modify AI-generated code for accuracy. In addition, the system provides an interactive development environment that integrates AI suggestions into developer workflows. These capabilities provide increased productivity by automating boilerplate code and repetitive tasks, along with error reduction that reduces human coding errors for more reliable software.

The agentic AI augmentation framework may further enhance code generation by combining retrieval methods with generative AI models to produce accurate, contextually appropriate code grounded in existing codebases and documentation. The framework implements context awareness to infer the specific context like language, framework, and conventions, along with a hybrid generation approach that uses retrieved information as a foundation with generative AI customization. These features deliver improved accuracy by generating code compatible with existing codebases and best practices, while providing time savings by reducing the need to search for examples or write code from scratch.

The agentic AI augmentation framework enhances AI agents to handle complex coding tasks, enabling code that tackles challenging problems more efficiently than traditional generative AI systems. The framework provides capabilities for handling complexity by assisting with tasks involving intricate logic and advanced concepts, innovation acceleration that allows developers to focus on innovation by offloading complex tasks to AI without suffering from hallucinations and extensive revision that renders current generative AI not acceptable for coding, and quality improvement that leverages AI's processing power for higher code quality.

In addition, there are several challenges and technical problems related to software modernization and AI-augmented development. For one, modernization approaches that may require extensive manual analysis and rewriting of legacy codebases are impractically time consuming and inefficient, particularly when dealing with meaningfully large codebases. Furthermore, traditional AI-based code generation systems suffer from hallucinations and unpredictable outputs that generate unusable code, critical errors, and failure to meet software requirements, making them unreliable for production software development environments. These problems are exacerbated for more complex AI generation tasks, such as simultaneously generating an entire microservice or an entire monolithic software program product. In many cases, existing generative AI models lack the contextual inference necessary to preserve logic and functional relationships when transforming legacy code into modern architectures, resulting in broken dependencies and loss of critical functionality.

Additionally, the lack of systematic approaches for decomposing monolithic legacy systems (e.g., legacy software program products and/or supporting circuitry) into microservice architectures leads to inefficient modernization efforts that fail to achieve the scalability and maintainability benefits of modern software design patterns. The absence of explainability and auditability in black box AI models further hampers their adoption in enterprise software development environments where transparency and human oversight are used for quality assurance and compliance requirements. These unresolved issues and technical problems underscore the pressing demand for improved AI-augmented software modernization frameworks that combine the speed and efficiency of artificial intelligence with the reliability and transparency required for enterprise software development.

Embodiments of the present disclosure also include various software code modernization solutions. Some embodiments of present disclosure may include a framework designed to modernize legacy full stack applications, using artificial intelligence (e.g., various generative AI tools as discussed herein) alone and/or in combination with human developer expertise to modernize software (e.g., legacy software having issues with compatibility, usability, upgradability, etc.). Some embodiments include human and AI integrated ("HAI") solutions to deliver scalable modernization outcomes for enterprise systems and other software development environments. Some such software code modernization systems and processes may transform legacy systems into modern microservice-based architectures.

Reference is made to various AI agents and AI models associated with the agents in the associated framework. While multiple agents are described, all are not required in all embodiments. Each of the "agents" may include at least one AI model (e.g., a generative AI model, such as a transformer model) with or without one or more other algorithms, models, or other software based processes and corresponding processing and storage hardware components (e.g., processors, memory devices, and the like). Moreover, in some embodiments, features and processes attributed to an "agent" may be performed by multiple agents (e.g., one agent calling another or two independent agents doing portions of the described process). In some embodiments, agents may be part of a larger agentic framework such that an agent may be within one or more other agents. One or more of the agents may be configured to work with or alongside one or more human users. Various embodiments may also include network communication devices and interfaces configured to interact with one or more users and/or user devices.

In various embodiments, the various frameworks, agents, and associated AI models described herein may operate modularly and independently, such that discrete tasks may be separately automated and improved without requiring reliance on the entire framework in each instance. In various embodiments, users may be provided with the entire framework and may seamlessly work with or without the various tools and agents provided by the framework, allowing seamless integration of one or more of the improvements herein without disrupting the user's software development process or forcing compliance with specific workflows.

There are several further technical advantages of the agentic AI augmentation framework and software modernization systems of the present disclosure. First, the integration of AI agents within the code modernization framework substantially improves the efficiency and accuracy of transforming monolithic legacy code into modern microservice architectures or other modern software architectures. The systematic approach of grouping functionally related code segments and generating corresponding microservices ensures that logic is preserved while achieving the scalability and maintainability benefits of contemporary software design patterns. For example, a code context agent and vectorize code agent may work collaboratively to create enriched, semantically meaningful representations of legacy codebases, enabling more intelligent and targeted code modifications that reduce the risk of AI-generated hallucinations and unintended system disruptions.

The modular agentic architecture enables discrete substep separation where complex modernization tasks are broken down into well-defined, manageable components that can be executed sequentially with built-in validation and review mechanisms at each stage. This approach provides transparency and explainability throughout the modernization process, addressing the critical enterprise requirement for auditability and human oversight while maintaining the speed and efficiency benefits of AI automation. The change isolation agent specifically targets only the code segments that require modification, minimizing the scope of changes and reducing the risk of introducing errors into unrelated system components.

The UI modernization framework, which may be a part of the code modernization framework, provides complementary technical advantages through the vision-based generative AI model that systematically analyzes legacy user interfaces to extract visual and functional information, creating comprehensive mappings of screen flows, layout relationships, and component dependencies. The automated generation of modern UI screens based on legacy GUI visual context data objects ensures functional equivalence while incorporating contemporary design principles and user experience standards. The integration capabilities between modernized UI components and underlying microservices create cohesive, modernized applications that maintain continuity while benefiting from improved performance, enhanced security, and cloud-native deployment capabilities.

The iterative validation and testing mechanisms implemented throughout both the code and UI modernization processes ensure that generated components meet established quality standards, security requirements, and functional specifications before deployment. The comprehensive error resolution processes with automated compilation error analysis and correction cycles ensure robust, production-ready outputs that adhere to both functional and performance requirements. These technical advantages collectively contribute to a state-of-the-art solution for enterprise software modernization that combines AI efficiency with the reliability, transparency, and quality assurance required for mission-critical applications.

Without limiting the foregoing, various other improvements and technical advantages will become apparent to one skilled in the art in light of the present disclosure. The identified technical advantages are not exhaustive and merely represent examples of the improvements of the embodiments described herein.

Definitions

The terms "data," "content," "document", "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "data object" refers to a data structure, associated with one or more data elements or values in a computer-readable storage medium and/or computer-readable transmission medium, which represents content that is configured for use or display by one or more software applications, services, and/or microservices. A data object may take the structural form of a vector or other appropriate data structure for representing data. A data object may include metadata and may be stored via computer-readable storage medium (e.g., with a repository associated with a server). A data object (or one or mor values thereof) may be transmittable between services, microservices, applications, segments, computing devices, and/or systems by way of a computer-readable transmission medium (e.g., telecommunication signals, wired/wireless electrical signals, and/or the like). In some embodiments, a data object may comprise a plurality of data objects. A data object may be configured to follow a predefined format.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a laptop, a cellular network device, other network device, and/or other computing device.

As used herein, the term "agentic AI augmentation system" and similar terms refer to a comprehensive computing system that facilitates AI-enhanced software development through the deployment of AI agents operating within a structured software development lifecycle. An agentic AI augmentation system encompasses the entire technological infrastructure, processes, and methodologies described in various embodiments herein for transforming traditional software development workflows into AI-augmented processes that maintain human oversight while leveraging autonomous AI capabilities to improve speed, accuracy, and quality of software development outcomes. The term "agentic AI augmentation framework" refers to the processes executed by and managing the agentic AI augmentation system and the related data, rules, and other aspects of the agentic AI augmentation system.

The technical architecture of an agentic AI augmentation system comprises multiple interconnected components implemented across distributed computing environments. The system utilizes one or more servers, processors (including CPUs, GPUs, TPUs, NPUs, and processing units), databases (including relational databases, vector databases, graph databases, and AI-native databases), and network infrastructure to support the various AI agents and their associated generative AI models. As described herein, each AI agent within the system is implemented as a combination of at least one AI model (such as transformer models, large language models, or other generative AI models) along with supporting algorithms, software-based processes, and corresponding processing and storage hardware components. The system implements vector databases for semantic searching and similarity-based retrieval operations, enabling a contextual RAG system that supports code analysis and modification tasks. Network communication devices and interfaces are configured throughout the system to facilitate interaction between users, user devices, and the various AI agents via user interfaces.

The agentic AI augmentation system is utilized to execute end-to-end software development processes, from initial requirements gathering through final code deployment. The system operates by receiving software functionality requests through user interfaces, processing these requests through AI agents that perform distinct functions such as requirements analysis, work item generation, code context enrichment, vectorization, change isolation, code generation, code review, testing, and deployment. The system supports both autonomous operation, where AI agents independently execute development tasks, and collaborative operation, where human users provide input, oversight, and approval at various stages of the development process. The system maintains transparency and explainability through the various processes disclosed herein, including continuous feedback loops and user-accessible monitoring capabilities that prevent AI hallucinations and ensure software quality.

The functionality of an agentic AI augmentation system extends across multiple phases of software development, including requirements gathering through AI-supported brainstorming and iterative prompt refinement, work item creation through automated mapping between requirements and development tasks, and augmented coding through agents that prepare, modify, review, and validate code changes. The system implements modular agentic architecture that enables discrete sub-step separation, scalable and flexible operation, rigid operational constraints through built-in guardrails, and asynchronous user interaction capabilities. Alternative embodiments of the system may focus on specific aspects of software development, such as security analysis or domain applications, while maintaining the core agentic framework that combines AI automation with human oversight and control.

As used herein, "modern", "modernized", and similar terms refer to the output of a modernization process or a portion thereof. Modern refers to the described output being the result of a contemporary process generated, at least in part, during the described process. Modernization may include the described software or portion thereof being remade as a new software program product according to the various embodiments herein without regard to whether old portions of the legacy software program product are also included in the new software program product (e.g., legacy monolithic code being converted to modern microservice code, which may retain some of the underlying legacy code while modifying the codebase as a whole into a microservice based architecture). The term "modern" is not intended to otherwise narrow or limit the quality or character of the new software program product and is intended solely to differentiate the output of the modernization processes described herein from the input (e.g., "legacy" code, software program products, etc.).

As used herein, the term "software functionality definition data set" refers to a structured collection of data that specifies one or more software functionality request parameters, which may include the desired characteristics, behaviors, requirements, functions, output types, and/or other aspects of a software program product to be developed using an agentic AI augmentation framework. A software functionality definition data set serves as an initial input that may initiate and guide the software development lifecycle within an agentic AI augmentation system according to various embodiments of the present disclosure, providing information used for AI agents to predictively infer, analyze, and transform user intentions into executable software solutions. The software functionality definition data set may include the raw input provided from the user and/or one or more refined versions of the raw input provided from the user after prompting and/or conversation with one or more AI agents.

The software functionality definition data set encompasses multiple technical input modalities to accommodate diverse user preferences and communication styles. In some embodiments, a single AI agent may be configured to interpret each input type. In some embodiments, the agentic AI augmentation framework may receive a limited number of one or more specific input types, or multiple AI agents or discrete portions of an AI agent system may be used to interpret respective input types. Text-based inputs may include natural language descriptions, conversational chat inputs, or document uploads containing detailed specifications. Visual or graphical inputs may comprise sketches, images, videos, presentation slides, mockups, flowchart diagrams, annotations, screenshots, or whiteboard drawings that illustrate desired functionality. Structured input methods may involve drop-down menu selections, checkboxes, radio buttons, slider controls, form-based questionnaires with guided prompts, or template-based input forms that systematically capture requirements. Interactive input formats may include voice recordings transcribed to text using speech-to-text conversion algorithms, video explanations processed through natural language processing models, or screen recording sessions that demonstrate desired functionality through user interactions.

The technical implementation of software functionality definition data sets relies on data processing and storage mechanisms within the agentic AI augmentation system. Input devices such as touchscreens, keyboards, microphones, cameras, and other user interface components may capture raw input data, which may then be interpreted by one or more components of the system. Natural language processing models and/or computer vision algorithms may be employed to parse and interpret the diverse input formats, converting them into standardized data structures that can be processed by downstream AI agents. Vector databases may be used to store semantic representations of the functionality requirements, enabling efficient similarity searches and contextual retrieval during the development process.

In some embodiments, the software functionality definition data set serves as the primary trigger mechanism for initiating software development lifecycles within the agentic AI augmentation framework. When an initial software functionality definition data set is transmitted to the system, it activates AI agents that begin the requirements analysis and code generation processes. Throughout the development lifecycle, the data set may be dynamically modified by users or AI agents in response to clarifying prompts, testing results, or iterative refinement processes. For existing software development projects or legacy software program products, additional software functionality definition data sets may be supplied to specify modifications, enhancements, or new features, enabling the system to adapt and extend existing codebases while maintaining consistency with established architectural patterns and requirements. For example, an existing software program product may be modified by recalling an original software functionality definition data set and modifying or supplementing the original software functionality definition data set with new instructions.

As used herein, the term "configuration data set", "configuration file", or the like refers to a structured collection of context data used in the agentic AI augmentation framework. A configuration data set may be configured to direct, guide, and/or configure the agentic AI augmentation framework for one or more portions of the software development lifecycle. The configuration data set may define the initial parameters, constraints, and/or operational guidelines for generating, modifying, or updating software program products within the agentic AI augmentation system. This data may be accessed by one or more AI agents and generative AI models during different phases of software development, from initial requirements gathering through final code generation and deployment. In some embodiments, a single set of configuration data may be accessible to all agents. In some embodiments, one or more sets of configuration data may be accessible only to a subset of one or more agents.

The technical implementation of configuration data sets relies on data storage and retrieval mechanisms within the agentic AI augmentation system. Configuration data sets may be stored in various database types including relational databases, document databases, or configuration management systems that support versioning and hierarchical organization of contextual parameters. The system may implement configuration files using structured formats such as JSON, YAML, or XML that can be efficiently parsed and processed by AI agents and generative AI models. These configuration data sets may be organized hierarchically to support inheritance and override mechanisms, enabling specific configurations for individual projects while maintaining common baseline parameters across multiple software development lifecycles. The system may utilize caching mechanisms and in-memory storage for frequently accessed configuration parameters to optimize performance during real-time AI agent operations.

Configuration data sets may be utilized throughout multiple phases of the software development lifecycle to provide contextual guidance and ensure consistency across AI-driven processes. During the requirements generation phase, configuration data sets may serve as input to generative AI models, providing information for generating the requirement data objects, such as, but not limited to, contextual information about industry standards, compliance requirements, architectural patterns, and/or organizational preferences that help expand and refine initial software functionality definitions. The system uses configuration data to analyze gaps in requirements documentation, suggest additional features or considerations, and/or ensure alignment with existing systems and established development practices. AI agents reference configuration data sets to make informed decisions about code generation patterns, testing strategies, and deployment configurations, enabling more accurate and contextually appropriate outputs that align with organizational standards and project-specific requirements.

Configuration data sets may be automatically updated or supplemented with other context data based on feedback from completed software development projects, incorporating lessons learned and best practices into future development cycles. The system may support multiple configuration profiles for different types of software projects, development environments, or organizational contexts, allowing configurations that optimize AI agent performance for specific use cases. Configuration data sets may include prompt engineering templates, model parameters, validation rules, and integration specifications that collectively define how AI agents should behave and interact throughout the software development process. Some embodiments may implement configuration data sets as distributed configurations across multiple repositories, support real-time configuration updates during active development projects, or integrate with external configuration management systems to maintain consistency across enterprise software development environments. The configuration data set may comprise predefined data generated for a particular software development lifecycle or software program product, for a subset or class of software development lifecycles or software program products, or for each software development lifecycle or software program product.

As used herein, the terms "context data" and "context data set" refer to structured data that provides context (e.g., background, configuration, and/or situational guidance) for use in software development processes within an agentic AI augmentation system according to various embodiments discussed herein. Context data may encompass one or more of technical specifications, architectural constraints, requirements, and/or operational parameters that inform decision-making during code generation and system design. The context data may comprise metadata associated with one or more aspects of the code, which metadata may refer to structured descriptive information that provides additional details about data elements, code segments, or system components within or otherwise associated with the AI augmentation framework. In each instance, this data serves as a background knowledge base that enables AI agents to infer the specific environment, requirements, and constraints within which they must operate for processing inputs into outputs, ensuring that generated outputs align with project-specific needs and organizational standards.

The technical implementation of context data relies on data structures and processing mechanisms within the agentic AI augmentation system. The system may implement vectorization techniques to convert context data into vector embeddings that enable efficient searching and retrieval of relevant information during the development process. These vector representations may be stored in vector databases, such as FACEBOOK AI Similarity Search (FAISS) databases or other semantic search databases, that support similarity-based queries and contextual retrieval operations. In some embodiments, context data may be contained within or derived from one or more configuration data sets.

Context data is generated and utilized throughout multiple phases of the agentic AI augmentation framework as described herein to guide the generation of various development assets and inform AI agent decision-making. For example, during the requirements gathering phase, context data may provide background information that helps AI agents may predictively infer, for example, project scope, technical constraints, and objectives, enabling more accurate generation of requirement data objects. In the work item creation phase, context data may inform the generation of code generation work prompt sets by providing technical specifications and architectural guidelines that ensure generated tasks align with project requirements. Throughout the coding phase, context data may serve as reference information for AI agents, including the code context agent, vectorize code agent, change isolation agent, code change agent, code change reviewer agent, code tester agent, and/or code change commit agent, enabling these agents to make informed decisions about code generation, modification, and validation processes.

The functionality of context data extends beyond static information storage to include dynamic adaptation and continuous refinement capabilities. Context data may be derived from various sources including configuration files, product requirement documents (PRDs), requirement documents (BRDs), existing source code repositories, and user inputs received through user interfaces or other means. The system may implement automated extraction mechanisms that analyze existing software systems, documentation repositories, and codebases to generate metadata and other contextual information that enriches the overall context data repository. Context data may be dynamically updated and refined throughout the software development lifecycle based on new information, user feedback, system analysis, and iterative refinement processes, ensuring that the contextual foundation remains current and relevant as projects evolve. Some embodiments may implement context data as distributed data structures across multiple repositories, support real-time context updates during active development sessions, or integrate with external knowledge management systems to maintain consistency and accuracy across enterprise software development environments.

As used herein, the term "agent" refers to a software component or functional unit that executes one or more AI models to perform specific tasks within a software development lifecycle. An agent represents a computational entity designed to operate autonomously or semi-autonomously, leveraging AI capabilities to analyze data, generate outputs, and make decisions based on predefined parameters and learned patterns from training data.

The technical implementation of an agent relies on one or more AI architectures and supporting computational infrastructure within the agentic AI augmentation system. Each agent may execute one or more generative AI models, such as large language models (LLMs), transformer models, or other machine learning algorithms. The agent may additionally incorporate rules-based algorithms, decision-making algorithms, planning and state tracking systems, and executive algorithms that work in coordination with the AI models to enhance processing capabilities and ensure reliable outputs. These components may be implemented using various programming frameworks and may utilize vector databases for semantic searching, relational databases for structured data storage, and/or graph databases for managing complex relationships between different software development artifacts. A respective agent may also integrate with retrieval-augmented generation (RAG) systems that combine vector embeddings stored in databases with generative AI capabilities to improve response accuracy and contextual relevance.

Agents may be built upon configurable agentic frameworks such as LangGraph, CrewAI, Swarm, or LLaMa, which provide the preliminary architecture for agent development and facilitate communication, coordination, reasoning, and decision-making capabilities both within individual agents and between multiple agents operating collaboratively. These frameworks may establish standardized interfaces and protocols that enable agents to share data, coordinate tasks, and maintain consistency across complex multi-step software development processes. Each agent may be tailored to specific functions through, for example, customized training data, model selection, prompts, toolsets, configuration parameters, algorithms, decision-making frameworks, validation rules, integration specifications, performance metrics, and operational constraints that define its operational scope and capabilities within the broader software development lifecycle. For example, agents may be configured for code context analysis, vectorization operations, change isolation, code modification, code review processes, automated testing, and/or commit operations, with each agent optimized for its particular domain of expertise.

Agents may implement guardrails and constraint mechanisms to prevent undesirable output such as biased responses or harmful code generation, while maintaining explainability features that provide human-readable insights into decision-making processes and agent reasoning. Moreover, various agents may interact with each other, such as by prompting one another, reviewing one another's outputs, and/or generating context or input data that may later be used by another agent. Within the software development lifecycle, a first example agent whose operations are performed, or typically performed, prior to a second example agent's operations may be called an "upstream agent" to the second agent. Similarly the second agent may be called a "downstream agent" to the first agent in the preceding example.

Performance monitoring and evaluation capabilities may be integrated into each agent and/or centralized with one or more review focused agents (e.g., a code change reviewer agent and/or code change tester agent). Monitoring and evaluation of agents may include utilizing quantitative metrics and qualitative analysis frameworks to assess effectiveness and identify areas for improvement. Agents may operate within complex workflows that sequence multiple agents to execute multi-step processes, enabling collaborative operation where different agents handle various aspects of software development while maintaining coordination and data sharing capabilities. The modular design of agents allows for flexible deployment scenarios where users or subsystems within the framework may interact with individual agents or utilize the complete framework, with human oversight and feedback mechanisms available at multiple stages to supplement agent functions through iterative prompting, validation, and refinement of outputs, ultimately reducing processing requirements while increasing the speed and accuracy of software program product development. In some embodiments, agents may be swapped with other comparable agents and/or agents may be added or removed from the agentic AI augmentation framework without redesigning or reconfiguring the overall framework process flow.

Some implementations may integrate one or more agents with external knowledge management systems to maintain consistency across enterprise software development environments, while others may implement distributed processing capabilities that enable the agent to operate across multiple repositories and development environments simultaneously. Agents may also be configured with domain-specific knowledge bases that enhance their respective ability to infer and contextualize code within particular industries or application domains, such as healthcare, financial services, or embedded systems development, thereby providing more targeted and relevant contextual enrichment for software development projects.

As used herein, the term "code context agent" refers to an agent designed to enrich context data associated with executable software program products. The code context agent may systematically analyze and enhance the contextual inference of source code through automated metadata generation and semantic analysis. A code context agent may enrich context data by transforming basic application context from pre-generated executable software program products into enriched, semantically meaningful data structures that enable more intelligent and informed decision-making by downstream AI agents throughout the software development lifecycle.

The technical implementation of a code context agent relies on natural language processing and machine learning architectures integrated within the broader agentic AI augmentation system infrastructure. The agent utilizes one or more large language models (LLMs) and generative AI models that are specifically configured and trained to analyze source code files and extract contextual metadata through structured prompt-based analysis. Some embodiments of the code context agent implement intelligent chunking mechanisms that split large code files into manageable portions while maintaining semantic coherence across chunk boundaries, enabling scalable analysis of complex codebases. These chunking operations are supported by parallel processing capabilities through thread pool execution frameworks that handle multiple files concurrently, improving efficiency when processing large datasets. The agent interfaces with various database systems including vector databases for semantic storage and retrieval, relational databases for structured metadata storage, and file services that manage code repository access and processing workflows.

The code context agent is utilized during the code preparation phase of the agentic AI augmentation framework to systematically enrich source code with contextual intelligence before downstream processing by other agents. The agent receives code context data and source code associated with one or more pre-generated executable software program products, then extracts application structure data, dependency data, and/or architectural standards data from the source code. The enrichment process involves collecting configuration details such as source language specifications, application context parameters, and technical stack information, with the ability to default to predefined values when specific parameters are not explicitly provided. The code context agent may additionally or alternatively (e.g., via the same or a different iteration of the agent) operate in a code modernization workflow, in which the code context agent may prepare the existing code (e.g., an application, software program product, or the like) for AI-driven transformation. The code context agent may analyze the codebase and extract metadata such as file structures, dependencies, and technology usage, providing a comprehensive overview of the software program product's current state.

The functionality of the code context agent may encompass one or multiple layers of code analysis and metadata generation that enhance the contextual foundation for subsequent AI-driven development tasks. For example, the agent may generate contextual metadata for each code chunk (also referred to as a code segment) by capturing details such as the overall purpose of code segments, implementation specifics including main components and design patterns, data management strategies including data types and storage mechanisms, and important operations along with their significance within the broader application context. This metadata generation process may be guided by structured prompts that ensure comprehensive analysis and consistent output formatting, with the enriched context data being associated with respective code chunks to make them more informative for subsequent processing. The agent may implement incremental processing capabilities that track processing status through states such as NEW, COMPLETED, and FAILED, allowing for resumption after interruptions and ensuring robust operation across complex development workflows. The enriched context data generated by the code context agent serves as input for other agents within the agentic AI augmentation framework, particularly the vectorize code agent that converts the contextualized code chunks into vector embeddings for semantic searching and similarity-based retrieval operations and subsequently to the change isolation agent, which isolates specific code segments that require modification. In some embodiments, implementation of the context enrichment relies on at least one handler function (e.g., handler) of the code context agent configuring various features, tasks, and/or the like, interfacing with utility classes and/or services (e.g., file_service, llm_service, and/or the like) for file operations and/or LLM interactions. Such modularity enhances maintainability and scalability.

As used herein, the term "code generation work prompt set" refers to a structured collection of agent-executable tasks that are specifically designed to direct AI agents (e.g., as prompts or other inputs) in generating code for a software program product. A code generation work prompt set represents the output of the work item creation process within an agentic AI augmentation framework, serving as the bridge between high-level requirements and actual code implementation. This data structure is configured to prompt the coding portion of the agentic AI augmentation framework to generate specific code segments that fulfill the requirements defined in upstream processes. By breaking the requirement data object into a discrete set of code generation work prompts, the agentic AI augmentation framework may significantly reduce the risk of errors and hallucinations that commonly occur when generative AI models attempt to process overly broad or complex coding instructions. When requirements are decomposed into discrete, well-defined tasks, each individual task becomes more manageable and specific, allowing AI agents to focus on narrower problem domains where they can operate with greater accuracy and reliability. Error reduction may be further enhanced through the discrete task structure because each task can be independently validated and tested before proceeding to subsequent tasks, such as by displaying each respective task (or a summary thereof) to a user for approval and/or editing via one or more user interfaces. The framework may implement validation checkpoints between tasks, allowing for early detection of errors or deviations from expected outcomes before they propagate through the development process.

The discrete task methodology may also enable more effective use of AI agents (e.g., in the coding phase of the agentic AI augmentation framework), where each agent of a plurality of agents may be optimized for specific types of coding tasks rather than attempting to handle all aspects of software development simultaneously. Each agent of a plurality of agents (e.g., a plurality of change isolation agents, code change agents, code change reviewer agents, code change tester agents, and/or code change commit agents) may operate in parallel to its counterparts for handling tasks that are independent of each other. This specialization may reduce errors by ensuring that each task is handled by an agent with appropriate training and configuration for that particular domain, rather than relying on a general-purpose model that may lack the specific expertise needed for certain coding challenges, while also not overly delaying the code generation process.

Additionally, the structured nature of discrete tasks may facilitate better traceability and auditability throughout the development process. When each task is clearly defined and documented, it becomes easier to track how specific requirements translate into code implementations, enabling more effective review and validation processes that can catch errors before they impact the final software product.

The technical implementation of code generation work prompt sets relies on data processing and task decomposition mechanisms within the agentic AI augmentation system. Each code generation work prompt set is broken down into a plurality of discrete tasks that target specific coding portions, with each task containing detailed instructions, parameters, and contextual information necessary for AI agents to generate appropriate code. These tasks are derived from stories that have been generated and systematically broken down during the work item creation process, ensuring traceability from requirements through to executable code. The code generation work prompt sets are created by one or more autonomous AI agents that analyze requirement data objects, configuration data sets, and contextual information to determine the optimal decomposition of coding work into manageable, executable tasks. The system may utilize various database types including relational databases for structured task storage, vector databases for semantic task relationships, and graph databases for managing complex dependencies between different coding tasks.

Code generation work prompt sets are utilized throughout the coding phase of the agentic AI augmentation framework to guide AI agents in their respective functions. The tasks within these prompt sets serve as input to various coding agents including the code context agent, vectorize code agent, change isolation agent, code change agent, code change reviewer agent, code tester agent, and code change commit agent. Each task may contain specific instructions for automated code generation, requirements traceability information that links code changes to original requirements, parameters for enhanced collaboration between AI agents and human developers, and validation criteria for error reduction processes. The prompt sets enable the system to maintain consistency across the development process while allowing for parallel processing of different coding tasks by different agents.

The functionality of code generation work prompt sets may encompass one or multiple layers of code generation guidance and coordination across the agentic AI augmentation framework. These prompt sets define computer-executable tasks that enable automated code generation based on detailed requirements and user stories, facilitate requirements traceability by linking specific requirements to corresponding code changes for efficient change isolation, support enhanced collaboration through AI-generated insights that align code with requirements, and implement error reduction mechanisms by validating code segments against specific requirements before deployment. The prompt sets may be organized into phases, with a first phase focused on code preparation tasks including access to source code repositories and implementation of dedicated AI agents, and a second phase concentrated on code modification, review, and validation tasks. Some embodiments may implement code generation work prompt sets as distributed task collections across multiple processing environments, support real-time task updates during active development sessions, or integrate with external development tools and frameworks to maintain consistency across enterprise software development workflows.

As used herein, the term “vectorize code agent” refers to an agent designed to convert code and associated contextual information into vector embeddings as vectorized code context data sets for semantic storage and retrieval within an agentic AI augmentation system. A vectorize code agent may be a downstream component that receives enriched context data generated by a code context agent along with source code from one or more source code repositories, transforming this combined information into searchable vector representations that enable efficient semantic analysis and code manipulation by other AI agents within the software development lifecycle.

The technical implementation of a vectorize code agent relies on machine learning architectures, specifically embedding models and vector database technologies integrated within the broader agentic AI augmentation system infrastructure. The agent utilizes embedding models, such as those configured for code analysis and natural language processing, to convert contextualized code chunks into high-dimensional vector representations that capture semantic meaning and relationships between different code elements. The vectorize code agent may be configured to load the contextualized code chunks produced by the code context agent using one or more file services (e.g., pickle load, and/or the like). These vector embeddings are then generated through mathematical transformations that map discrete code segments and their associated metadata into continuous vector spaces where semantically similar code elements are positioned closer together. The vectorization process may convert respective contextualized code chunks (e.g., for one or more of the contextualized code chunks) into corresponding vector embeddings using one or more embeddings LLM models (e.g., preconfigured and/or retrieved via the one or more LLM models) configured to capture semantic meaning. The vectorization process may employ various embedding techniques including transformer-based models, Word2Vec, BERT, or other neural network architectures specifically trained for code functionality inference and semantic representation.

The vectorize code agent stores the generated vector embeddings as vectorized code context data sets in vector databases, such as FACEBOOK AI Similarity Search (FAISS) databases or other semantic search databases, which are optimized for high-dimensional vector storage and similarity-based retrieval operations. These vector databases may be organized hierarchically to support different levels of granularity, including individual file-level searches, combined database searches, and service-specific storage configurations that balance retrieval accuracy with performance requirements. The hierarchical storage may allow rapid scope scaling of a coding project for a specific type of coding (e.g., accessing only the specific vectorized code that is needed) without using unnecessary data or processing power and without generating hallucinations by giving the AI agents too much initial input breadth. The agent implements parallel processing capabilities through thread pool execution frameworks that enable concurrent vectorization of multiple code chunks, improving efficiency when processing large codebases. Error handling mechanisms with retry capabilities are integrated to manage failures during vector creation and database operations, ensuring robust operation across complex development environments.

The vectorize code agent is utilized throughout the agentic AI augmentation framework to create a searchable, semantically rich foundation of vectorized code context data sets that support various downstream AI agents in their code analysis and modification tasks. The agent receives enriched context data from the code context agent, which includes information such as metadata about code purpose, implementation details, architectural patterns, and/or dependency relationships, and combines this contextual information with the actual source code to create comprehensive vectorized code context data sets. These vectorized code context data sets enable other AI agents, including change isolation agents, code change agents, and code review agents, to perform semantic searches and similarity-based queries that identify relevant code segments for modification, analysis, or validation. For example, the vectorized code context data sets may be queried by a change isolation agent based on a code generation work prompt set to identify one or more vectorized code context data sets for isolation and code modification. The vector store created by the vectorize code agent serves as a centralized repository that facilitates context-aware information retrieval, enabling AI agents to make more informed decisions about code generation, modification, and optimization based on semantic interpretation (e.g., via inference) rather than simple text matching. The vectorize code agent may additionally or alternatively (e.g., via the same or another iteration of the agent) operate in a code modernization workflow. The vectorize code agent may embed the application context and store this data in a vector store (e.g., a legacy vector store), effectively making the existing legacy code searchable and enabling efficient context referencing throughout the modernization process. The vectorization process ensures that the code and its associated metadata are represented in a form that AI agents can read, infer, and utilize for subsequent tasks.

In some embodiments, implementation of the vector creation relies on at least one handler function (e.g., handler) of the vectorize code agent. For example, the at least one handler function may load the contextualized code chunks and call one or more methods (e.g., vector_db.create_db) to build the one or more vector databases. A class of the vectorize code agent (e.g., VectorDB class) may use parallel processing (e.g., via ThreadPoolExecutor) to create vector stores, for respective code chunks of the plurality of contextualized code chunks. The class may further combine the respective code chunks into a unified database and save the unified database locally. In some embodiments, the class is further configured to support at least: incremental updates (e.g., adding, updating, and/or deleting vectors); efficient merging of vectors; reranking of search results for improved relevance; Git-aware updates (and/or updates tailored to other code change tracking tools) to synchronize with codebase changes such that the unified database reflects the latest code state.

As used herein, the term "change isolation agent" refers to an agent designed to identify and/or isolate specific code segments within a vectorized code context data set that require modification to satisfy requirements defined in code generation work prompt sets. A change isolation agent enables precise, targeted code modifications while minimizing the risk of unintended changes to unrelated code segments, thereby maintaining system stability and architectural integrity throughout the software development process.

The technical implementation of a change isolation agent relies on machine learning architectures and semantic analysis capabilities integrated within the broader agentic AI augmentation system infrastructure. The agent utilizes one or more AI models, including generative AI models and search algorithms, to perform semantic searches and similarity-based queries against vectorized code context data sets. The agent implements one or more comparison algorithms that analyze the vectorized representations of existing code against the requirements and specifications contained within code generation work prompt sets, using similarity matching and contextual inference to identify the minimal set of code segments that need modification to satisfy the new requirements.

The change isolation agent may be utilized during the coding phase of the agentic AI augmentation framework prior to the actual code modification (e.g., modifying the isolated code). The agent receives vectorized code context data sets representing source code from one or more pre-generated executable software program products along with code generation work prompt sets that define the specific tasks and requirements for generating new software functionality. Through semantic analysis and dependency mapping, the change isolation agent identifies specific code segments, also referred to as code chunks, which relate to the new requirements while also considering any dependent code segments that may be affected by the proposed changes. This identification process involves querying the vector database using the requirements specifications as search criteria, leveraging the semantic embeddings to find code segments that are most relevant to the desired functionality while excluding unrelated components that should remain unchanged. The change isolation agent may additionally or alternatively (via the same or a different change isolation agent) be used in the code modernization framework to isolate areas (e.g., code segments) of the code from the legacy software program product. This function helps to identify the impact areas and limits modernization to only necessary components. This function may also make sure AI agents can independently work.

The change isolation agent serves as input to downstream AI agents, including code change agents, code change reviewer agents, and code tester agents, providing them with precisely targeted code segments that can be modified, reviewed, and tested independently of the larger codebase. Some embodiments may implement change isolation agents with different AI models or configurations optimized for specific types of code analysis, programming languages, or architectural patterns, while others may integrate multiple change isolation agents working in parallel to handle complex modification scenarios that require analysis of multiple code segments simultaneously.

As used herein, the term "code change agent" refers to an agent designed to implement controlled code modifications within an agentic AI augmentation system. A code change agent may be a downstream component that receives precisely targeted code segments from a change isolation agent and performs the coding tasks necessary to satisfy requirements defined in code generation work prompt sets, thereby automating the code modification process while maintaining accuracy and reducing the likelihood of human error.

The technical implementation of a code change agent relies on generative AI architectures and code generation capabilities integrated within the broader agentic AI augmentation system infrastructure. The agent utilizes one or more generative AI models, such as large language models (LLMs) or code generation models, which are configured and trained to utilize and receive code in various programming languages, coding patterns, and software development best practices. These models may be implemented using various machine learning frameworks and may leverage transformer architectures, neural networks, or other deep learning approaches specifically optimized for code generation tasks. The code change agent interfaces with various database systems including vector databases for accessing contextualized code representations, relational databases for storing modification history and metadata, and code repositories that maintain version control and change tracking information. The agent, or agents, may implement parallel processing capabilities to handle multiple code modifications simultaneously.

The code change agent is utilized during the implementation phase of the agentic AI augmentation framework to perform controlled code adjustments based on inputs received from upstream agents, such as the change isolation agent that identifies specific code segments requiring modification. The agent receives vectorized code context data sets along with code generation work prompt sets that define the specific modifications needed to satisfy new requirements or functionality. Through AI-assisted code generation, the agent analyzes the existing code structure, infers the intended modifications, and generates new code that integrates seamlessly with the existing codebase while maintaining architectural consistency and coding standards. The agent may implement various code generation strategies including template-based generation, pattern matching, and contextual code synthesis that leverages the enriched metadata provided by upstream code context agents.

Some embodiments may implement code change agents with different generative AI models or configurations optimized for specific programming languages, development frameworks, or coding paradigms, while others may integrate multiple code change agents working collaboratively to handle complex modification scenarios that span multiple code segments or require coordination across different system components. Alternative implementations may include code change agents that specialize in particular types of modifications such as refactoring operations, feature additions, bug fixes, or performance optimizations, with each agent optimized for its specific domain of expertise. Some embodiments may implement code change agents with learning capabilities that improve their code generation accuracy over time based on feedback from downstream review and testing processes, or may integrate with external development tools and integrated development environments to provide seamless integration with existing software development workflows.

As used herein, the term "code change reviewer agent" refers to an agent designed to autonomously review and validate modified code within an agentic AI augmentation system. A code change reviewer agent may receive modified code segments from a code change agent and perform quality assurance evaluations to ensure code integrity, compliance with established standards, and alignment with project requirements before the code proceeds to subsequent stages of the development lifecycle.

The technical implementation of a code change reviewer agent relies on multiple AI architectures and validation mechanisms integrated within the broader agentic AI augmentation system infrastructure. The agent utilizes one or more AI models, including generative AI models and/or code analysis models, which are configured and trained to work with, digest, and infer various programming languages, coding standards, architectural patterns, and software development best practices, including the various requirements represented by the code generation work prompt sets. These models may implement one or more different AI architectures or configurations than those used for code generation, providing an independent analytical perspective that can identify errors, inconsistencies, or improvements that the initial code change agent might have missed. The agent interfaces with various database systems including vector databases for accessing contextualized code representations, relational databases for storing review history and compliance metrics, and rule engines that maintain coding standards and validation criteria. The code change reviewer agent may implement static code analysis capabilities, security vulnerability scanning, architectural compliance checking, and performance impact assessment through integration with various analysis tools and frameworks. The review process may include syntax validation, semantic analysis, dependency impact assessment, performance benchmarking, and compliance verification with organizational coding guidelines, which may be specified in one or more configuration files and/or reflected in a code generation work prompt set. The agent may generate detailed review reports that identify potential issues, suggest improvements, and provide explanations for its assessments, enabling both human developers and downstream AI agents to infer the rationale behind review decisions. The agent may pass these assessments directly to the code change agent and/or code isolation agent for revision or may direct the assessment to a user terminal for human review and input prior to modifying the code further.

The functionality of the code change reviewer agent encompasses comprehensive code quality assessment and collaborative problem resolution within the agentic AI augmentation framework. The agent may implement various review methodologies including automated testing of code segments, cross-referencing with established design patterns, validation against security best practices, and assessment of maintainability and scalability characteristics. The agent may work collaboratively with the code change agent through iterative feedback loops, where identified issues are communicated back to the code change agent for resolution, creating a collaborative refinement process that improves code quality before proceeding to downstream testing and deployment stages. Some embodiments may implement code change reviewer agents with learning capabilities that improve their review accuracy over time based on feedback from downstream testing processes and human developer interactions, or may integrate with external code review tools and continuous integration systems to provide seamless integration with existing software development workflows. Alternative implementations may include code change reviewer agents that focus on particular aspects of code quality such as security analysis, performance optimization, or compliance with specific industry standards, with each agent optimized for its particular domain of expertise.

As used herein, the term "code change tester agent" refers to an agent designed to execute comprehensive automated testing protocols within an agentic AI augmentation system. A code change tester agent may receive modified code segments from code change agents and/or code change reviewer agents, performing systematic validation of code functionality against acceptance criteria defined in code generation work prompt sets or related requirements or configuration data to ensure software quality and reliability before deployment.

The technical implementation of a code change tester agent relies on automated testing frameworks and validation mechanisms integrated within the broader agentic AI augmentation system infrastructure. The agent utilizes one or more AI models, including generative AI models and testing algorithms, which are configured and trained to infer testing methodologies, code execution patterns, and quality assurance best practices. These models may interface with various testing frameworks and tools including unit testing libraries, integration testing platforms, regression testing suites, and/or performance benchmarking systems. The agent, or agents, may implement parallel processing capabilities to execute multiple test scenarios simultaneously and may utilize database systems including relational databases for storing test results and metadata, vector databases for semantic test case relationships, and test repositories that maintain testing history and validation criteria. The code change tester agent may implement both unit testing and integration testing capabilities, typically performing unit testing first to validate individual code segments in isolation, followed by integration testing to ensure proper interaction between modified code segments and existing system elements, thereby providing a comprehensive validation framework that progresses from granular component testing to broader system-level verification.

The code change tester agent is utilized during the validation phase of the agentic AI augmentation framework to perform automated quality assurance of code modifications before they are committed to the main codebase. The agent receives modified code segments along with code generation work prompt sets that define specific testing requirements and acceptance criteria, then generates and executes comprehensive test suites that validate functionality, performance, and compliance with established standards. The testing process may include unit testing that focuses on individual functions, methods, or classes to verify that each component behaves correctly in isolation, followed by integration testing that examines how modified components interact with existing system elements and external dependencies. The agent may also perform regression testing to ensure that new modifications do not introduce unintended side effects or break existing functionality, and may conduct performance benchmarking to verify that changes meet specified performance criteria and do not degrade system efficiency.

The functionality of the code change tester agent may encompass one or more layers of automated testing and collaborative problem resolution within the agentic AI augmentation framework. The agent may work collaboratively with code change agents and code change reviewer agents through iterative feedback loops, where identified testing failures are communicated back to upstream agents for resolution, creating a collaborative refinement process that improves code quality through systematic validation and correction cycles. The code change tester agent may implement various testing methodologies including functional testing to verify feature correctness, security testing to identify potential vulnerabilities, compatibility testing to ensure cross-platform functionality, and stress testing to evaluate system behavior under load conditions. Some embodiments may implement code change tester agents with learning capabilities that improve their testing accuracy and coverage over time based on feedback from deployment outcomes and production monitoring, or may integrate with external continuous integration and continuous deployment (CI/CD) systems to provide seamless integration with existing software development workflows. Alternative implementations may include code change tester agents that focus on particular types of testing such as security validation, performance optimization, or compliance with specific industry standards, with each agent optimized for its particular testing domain and equipped with testing tools and validation criteria appropriate for its area of expertise.

As used herein, the term "code change commit agent" refers to an agent designed to integrate verified code changes within an agentic AI augmentation system. A code change commit agent may receive validated code segments from upstream agents such as code change reviewer agents and code change tester agents, and may commit these verified changes to the main codebase while enforcing quality standards and mitigating integration risks.

The technical implementation of a code change commit agent may utilize version control systems and integration mechanisms integrated within the broader agentic AI augmentation system infrastructure. The agent may utilize one or more AI models, including generative AI models and validation algorithms, which are configured and trained to interpret version control protocols, branching strategies, and code integration best practices. These models may interface with various version control systems including Git repositories, centralized version control systems, and distributed version control platforms that manage code history and change tracking. The code change commit agent may implement automated conflict resolution capabilities, merge strategy optimization, and rollback mechanisms that ensure safe integration of code changes while maintaining repository integrity. The code change commit agent interfaces with various database systems including relational databases for storing commit metadata and change history, vector databases for tracking semantic relationships between code changes, and/or audit systems that maintain compliance records and change documentation. The agent, or agents, may implement parallel processing capabilities to handle multiple commit operations simultaneously.

The code change commit agent may complete the software development lifecycle or a portion thereof by integrating validated code changes into the production codebase. The agent receives verified code segments and may receive validation reports from upstream code change reviewer agents and/or code change tester agents, ensuring that all quality assurance processes have been completed successfully before proceeding with integration. The agent may optionally perform final validation checks including conflict detection, dependency verification, and compliance assessment to ensure that the proposed changes will not introduce instability or security vulnerabilities into the main codebase. Through automated commit processes, the agent generates appropriate commit messages, maintains proper version control metadata, and executes the integration while preserving code history and traceability information that links the committed changes back to their original requirements and work items.

The functionality of the code change commit agent encompasses comprehensive integration management and risk mitigation within the agentic AI augmentation framework. The agent may implement various commit strategies including atomic commits that ensure all related changes are integrated together, staged commits that allow for incremental integration of complex changes, and conditional commits that depend on successful completion of additional validation criteria. The agent may work collaboratively with other AI agents and human developers through notification systems that provide real-time updates on commit status, integration conflicts, and successful deployments. The code change commit agent may implement various safety mechanisms including pre-commit hooks that perform final validation checks, post-commit verification that confirms successful integration, and automated rollback capabilities that can reverse changes if issues are detected after integration. Some embodiments may implement code change commit agents with learning capabilities that improve their integration accuracy over time based on feedback from production monitoring and deployment outcomes, or may integrate with external continuous integration and continuous deployment (CI/CD) systems to provide seamless integration with existing software development workflows. Alternative implementations may include code change commit agents that focus on particular types of integration scenarios such as hotfix deployments, feature branch merges, or release candidate preparations, with each agent optimized for its specific integration domain and equipped with tools and validation criteria appropriate for its area of expertise.

As used herein, the term "code context data set" refers to a structured collection of data that combines source code with enriched contextual information corresponding to respective portions of that code. A code context data set represents the output of one or more of a code context agent's processing activities, where raw source code is systematically enhanced with semantic metadata and contextual intelligence to create a more comprehensive and meaningful representation of software components within an agentic AI augmentation system. The term "vectorized code context data set" refers to a code context data set that has been vectorized by a vectorize code agent.

As used herein, the term "requirement" may refer to a specification, condition, or constraint that defines what a software program product should do, how it should behave, or what characteristics it should possess. A requirement may describe functional capabilities, performance criteria, user interface elements, or technical constraints that guide the development of a computer-generated executable software program product. In some embodiments, a requirement may be in human readable text and/or other human interpretable indicia (e.g., graphics or flow diagrams).

A requirement may be derived from one or more initial software functionality definition data sets provided by users through interfaces, and/or may be generated by AI agents based on analysis of instructions, use cases, and system specifications. Requirements may encompass various types including functional requirements that describe specific behaviors or features, nonfunctional requirements that specify performance or quality attributes, and technical requirements that define implementation constraints. Requirements may be generated based on analysis of existing documentation such as requirement documents, product requirement documents, or user interface requirement documents. Requirements may include parameters for building code, use cases of the software program product, edge cases that define boundary conditions, features that describe specific functionality, and components that identify system elements. Requirements may be iteratively refined based on user feedback (e.g., via user interface in response to one or more intermediate outputs of an agent), additional software functionality definition data sets, or analysis of external sources by an agent such as requirements repositories and guideline sources.

As used herein, the term "requirement data object" refers to structured data representing a requirement. Requirement data objects may be generated at least partly by one or more AI agents (e.g., a "requirements agent") based on one or more software functionality definition data sets and one or more configuration data sets autonomously or with user input. In some embodiments, the initial software functionality definition data set may include dissimilar data types (e.g., images and text) that may be translated into a common data type (e.g., text) for analysis. In some embodiments, the requirements agent may be a multimodal model capable of receiving multiple data types. In some embodiments, the requirements agent may make one or more intermediate transformations of the data to output an initial one or more requirement data objects.

A requirement data object may serve as input to a downstream agent for generating code generation work prompt sets and may guide AI agents in creating, modifying, and validating software code. Requirement data objects may be structured to enable automated processing while remaining comprehensible to human stakeholders involved in the development process.

In some embodiments, "product requirement document", "product requirement data", or "PRD" may refer to a requirement data object comprising set of data associated with the requirements for a software program product. The requirement data object of the product requirement data may comprise an assembly of requirements generated by one or more AI agents, which may include user interface requirements data, requirements data, and/or nonfunctional requirements data. The product requirement data may be generated as a cumulative, ongoing record of the requirements for the software program product based on the initial software functionality definition data set, one or more additional software functionality definition data sets, user inputs, and/or AI agent generated requirements and prompt responses.

As used herein, the terms "software program product", "application," "software application," "app," "product," "program", "computer program", "computer program product", "service", "microservice" or similar terms refers to a complete, executable software application or system that is generated, modified, or enhanced through the agentic AI augmentation framework described herein. A software program product represents the usable output of the agentic AI augmentation system's development processes, embodying the transformation of initial software functionality definition data sets into functional, deployable software solutions that can perform specific operations and provide particular services to end users. Software program products may be usable with other software program products or part of a larger software program product.

The technical implementation of a software program product relies on multiple computational components and architectures within the agentic AI augmentation system. A software program product may comprise compiled object code that can be directly executed by computing devices, or interpreted source code that requires runtime interpretation by appropriate software environments. The term "code" may refer more broadly to any human and/or machine readable code, whether or not executable. The software program product may be constructed using various programming languages, markup languages, web development languages, and software architectures as specified in configuration data sets and/or determined by the AI agents and/or user input during the development process. Technical components of a software program product may include user interface components implemented through frontend frameworks, backend services utilizing server-side technologies, database systems for data storage and retrieval, application programming interfaces (APIs) for system integration, and other software components that work collaboratively to deliver the intended functionality. These components may be stored and managed using various database types including relational databases for structured data, vector databases for semantic operations, and graph databases for managing complex relationships between software components.

Software program products are utilized throughout the agentic AI augmentation framework as both input and output for various development processes. Pre-generated executable software program products may serve as input to the code context agent and vectorize code agent, where they undergo analysis and enhancement to create enriched, vectorized representations that inform subsequent development tasks. When used as input, various data associated with the pre-generated executable software program products may be used without necessarily, though not precluding, first starting with the executable software program product itself (e.g., based on the identity or other metadata associated with a pre-generated executable software program product, an agent may query a source code repository for the source code associated with the pre-generated executable software program product). New software program products are generated through the collaborative operation of AI agents, including but not limited to the change isolation agent, code change agent, code change reviewer agent, code tester agent, and code change commit agent, which work sequentially to create, modify, review, test, and deploy functional software solutions, including by modifying a vectorized code context data set to generate a modified vectorized code context data set for use in creating the final software program product. The software program products may be created by modifying existing codebases or by generating entirely new implementations based on requirement data objects, code generation work prompt sets, and contextual information provided to the system.

The functionality of software program products encompasses a broad spectrum of capabilities determined by the requirements and specifications provided during the development process. A software program product may implement simple applications with limited, focused functionality or complex enterprise systems with multiple integrated components that handle one or multiple processes and user interactions. The software program products may be created in one or more procedural layers that may include integrating disparate modules and functionalities into the final product. The software program product may incorporate both frontend components that provide user-facing interfaces and backend components that manage data processing, logic, and system integration. Software program products generated by the framework may be designed to operate across various computing platforms and environments, with the ability to integrate with external systems through API calls, database connections, and other communication mechanisms. In some embodiments, multiple software program products may be programmatically bundled or linked together through API calls or other integration methods to create comprehensive, multi-component software solutions. Software program products may be configured to interact with third-party services and external servers to retrieve data, algorithms, or other computational resources necessary for their operation, enabling the creation of distributed and interconnected software ecosystems that leverage both internally generated and externally provided capabilities.

As used herein, the term “computer-readable storage medium” refers to a non-transitory, physical, or tangible storage medium (e.g., volatile or non-volatile memory), which may be differentiated from a “computer-readable transmission medium,” which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization, or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms “client device,” “computing device,” “network device,” “server”, “computer,” “user equipment,” and similar terms may be used interchangeably to refer to computer hardware and/or software that is configured to communicate with and/or access a service made available by another device. The other device is often (but not always) on another computer system, in which case the client device accesses the service by way of a network. Client devices may include, without limitation, smart phones, tablet computers, laptop computers, wearables, personal computers, enterprise computers, and the like and may be used by a user to interact with one or more other computing devices of the agentic AI augmentation system, such as via a user interface associated with the client device. The agentic AI augmentation system may be executed on one or more computing devices, including a server or group of servers (e.g., a physical or virtual servers in a cloud-based computing environment) communicable via one or more networks.

The terms “database,” “repository,” and/or similar terms used herein may interchangeably refer to a collection of records or data that is stored in a computer-readable storage medium using one or more database types. The term “database type” may refer to a type of database, such as a hierarchical database, network database, relational database (e.g., Aurora, RDS), entity-relationship database, object database (e.g., S3), document database, semantic database, graph database, noSqL database (e.g., DynamoDB), and/or the like.

The terms “machine learning,” “machine learning model,” “ML model(s), “artificial intelligence,” “artificial intelligence model”, “AI”, “AI model”, or “AI/ML model” refer interchangeably to a machine learning or deep learning task or mechanism. The term “machine learning” refers to a method used to devise complex models and algorithms that lend themselves to prediction. A machine learning model is a computer-implemented algorithm that may learn from data with or without relying solely on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, a large language model as defined above, or the like. One or more machine learning models may be integrated into one or more agents of an agentic AI augmentation system in accordance with various embodiments of the present disclosure.

A machine learning model may be initially fit or trained on a training data set (e.g., a set of examples used to fit the parameters of the model). The model may be trained on the training dataset using supervised or unsupervised learning. The model may be run with the training dataset and produce a result, which is then compared with a target, for each input vector in the training dataset. Based on the result of the comparison and the specific learning algorithm being used, the parameters of the model may be adjusted.

The machine learning models described herein may make use of multiple ML engines (e.g., for analysis, transformation, and other needs). The system may train different artificial intelligence and/or machine learning (AI/ML) models for different needs and different ML-based engines. The system may generate new models (based on the gathered training data) and may evaluate their performance against the existing models. Training data may include any of the gathered information, as well as information on actions performed based on the various recommendations.

The AI/ML models may be any suitable model for the task or activity implemented by each ML-based engine. Machine learning models may be some form of neural network. The underlying AI/ML models may be learning models (supervised or unsupervised). As examples, such algorithms may be prediction (e.g., linear regression) algorithms, classification (e.g., decision trees) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative AI models (e.g., GANs).

The AI/ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Some ML models may be generative AI models (such as Generative Adversarial Networks or auto-encoders, generative pre-trained transformer (GPT) model, or the like).

In various embodiments, the AI/ML models may undergo a training or learning phase before they are released into a production or runtime phase or may begin operation with models from existing systems or models. During a training or learning phase, the AI/ML models may be tuned to focus on specific variables, to reduce error margins, or to otherwise optimize their performance. The AI/ML models may initially receive input from a wide variety of data, such as the gathered data described herein. The ML models herein may undergo a second or multiple subsequent training phases for retraining the models.

The term "generative artificial intelligence model," "generative AI model", and similar terms may be used interchangeably to refer to one or more AI models, including but not limited to some example machine learning models, configured to generate new outputs in response to a prompt or other input data. In some embodiments, generative AI model may include any type of model configured, trained, or the like to generate a natural language text, images, video, widgets, or the like in response to a prompt. For example, the generative AI model may include a large language model such as a generative pre-trained transformer (GPT) model. The generative AI model may be updated, in some embodiments, via reinforcement learning by providing short segments of data generated based on a particular topic (e.g., subset of the software development lifecycle) and updating the model based on the new data. In some embodiments, a generative AI model may be controlled, in part, by one or more predetermined configurations (e.g., via loading a configuration data set) that define optimization parameters, goals, guardrails, or the like for directing or constraining the model output, which may further ensure reliability of the model performance. In some embodiments, various agents may be configured to execute one or more generative AI models to carry out their respective functions.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases may but do not necessarily refer to the same embodiment.

As used herein, the terms "illustrative," "example," "exemplary" and the like are used to mean "serving as an example, instance, or illustration" with no indication of quality level. Any implementation described herein as "exemplary", or "example" is not necessarily to be construed as preferred or advantageous over other implementations.

The terms "about," "approximately," "generally," "substantially," or the like, when used with a number, may mean that specific number, or alternatively, a range in proximity to the specific number, as understood by persons of skill in the art field and may be used to refer to within manufacturing and/or engineering design tolerances for the corresponding materials and/or elements as would be understood by the person of ordinary skill in the art, unless otherwise indicated.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

If the specification presents a list, unless stated otherwise, it is to be understood that each individual element of that list, and every combination of components of that list, is a separate embodiment. For example, "1, 2, 3, 4, and 5" encompasses, among numerous embodiments, 1; 2; 3; 1 and 2; 3 and 5; 1, 3, and 5; and 1, 2, 4, and 5.

The term "plurality" refers to two or more items.

The term "set" refers to a collection of one or more items.

The term "or" is used herein in both the alternative and conjunctive sense, unless otherwise indicated.

As used herein, the term "legacy code" refers to code from a legacy software program product that may be modernized according to various embodiments of the disclosure. Legacy code represents existing software implementations that may have become outdated, difficult to maintain, incompatible with modern development practices and technological standards, or otherwise desirable to update (e.g., via modernization). This code typically originates from older software systems that were developed using previous generations of programming languages, frameworks, or architectural patterns that may no longer align with current industry best practices or organizational requirements.

The technical implementation of legacy code analysis and modernization in accordance with various embodiments discussed herein relies on AI agents and machine learning architectures integrated within software modernization frameworks. Legacy code may be processed through code context agents that utilize large language models (LLMs) and natural language processing techniques to analyze existing codebases and extract semantic metadata about code structure, dependencies, and functionality. Legacy code is utilized as input for modernization workflows where AI agents systematically analyze, categorize, and transform existing software implementations into modern architectures.

The functionality of legacy code within modernization frameworks encompasses serving as both a source of existing logic and a target for architectural transformation. Legacy code may contain valuable domain knowledge, rules, and functional implementations that need to be preserved during modernization while updating the underlying technical implementation to meet modern standards. The code may be analyzed to identify reusable components, extract logic patterns, and detect system dependencies that inform the design of modernized replacements, while isolating the portions of the code that should or must be changed during modernization.

Legacy code may originate from various sources including mainframe systems, monolithic applications, desktop software, or embedded systems that require different modernization approaches based on their specific technical characteristics and operational requirements. Some implementations may focus on partial modernization where only specific components of legacy code are updated, while others may involve complete system transformation where legacy code serves as a reference for entirely new implementations built using modern technologies and architectural patterns.

As used herein, the term "monolithic legacy code" refers to legacy code that is written as a monolith as opposed to in discrete microservices. Monolithic legacy code may include code with some microservices but at least some monolithic chunks needing to be modernized. This type of code represents software architectures where multiple functional components, logic modules, and system capabilities are tightly integrated within a single, unified codebase rather than being distributed across independent, loosely-coupled services.

In some embodiments, modernization of monolithic legacy code encompasses the transformation of tightly-coupled, single-deployment software systems into distributed, microservice-based architectures that offer improved scalability, maintainability, and deployment flexibility. The modernization process may preserve existing logic and functional capabilities, apart from those functions that relate to the differences between the monolithic and microservice architectures (e.g., functions that are not necessarily outwardly visible to the user) while restructuring the code organization to enable independent development, testing, and deployment of individual service components. Some implementations may focus on gradual decomposition where monolithic systems are incrementally broken down over time, while others may involve complete architectural transformation where the entire monolithic codebase is restructured into a microservice-based architecture in a single modernization effort.

In some embodiments, modernization of monolithic legacy code may encompass other code modifications in addition to or instead of microservice generation. For example, a modernization of monolithic legacy code using the various embodiments herein may rebuild user experiences (UX), which may retain the existing backend systems and modernize the UX layers, which may utilize the UI modification processes disclosed herein, such as is shown and described with respect to FIGS. 17-18, and may not require (though does not preclude) modification of the backend services.

In another example embodiment, a modernization of monolithic legacy code using the various embodiments herein may re-platform and refactor portions of the application. For example, critical features of an existing application may be migrated into a microservice without modifying (or with delayed modification of) other features of the existing application.

In another example embodiment, a modernization of monolithic legacy code using the various embodiments herein may access and rearchitect an application. For example, one or more agents may analyze an existing application (e.g., the complexities and structures of the application) and rearchitect it into a secure, scalable, and cloud-ready solution.

In another example embodiment, a modernization of monolithic legacy code using the various embodiments herein may incrementally refactor the legacy code of an application. For example, the various processes herein may upgrade frameworks, refactor code, and adopt service-oriented architectures incrementally to modernize legacy applications with two or more modernization processes, each of which may modernize a portion of the legacy code. Similarly, various code augmentation and modernization processes may be performed on monolithic legacy code before converting the entire codebase, or portions thereof, to microservices. These incremental improvements may later be modified again during a subsequent modernization process.

In another example embodiment, a modernization of monolithic legacy code using the various embodiments herein may include executing isolated upgrades, including but not limited to the AI augmentation processes disclosed herein. For example, the various embodiments herein may perform tech debt isolation and/or AI-powered auto-remediation of portions of complex legacy code with or without converting the legacy code to microservices.

In the example processes herein using microservice generation, any of the foregoing examples may be substituted for or added to the microservice generation process during modernization of monolithic legacy code. Similarly, any of the foregoing examples may be used with legacy microservice code without starting from monolithic code.

As used herein, the term "code segment", also referred to interchangeably as a "code chunk", "code component", or similar term, refers to a portion of monolithic legacy code that defines at least one function of the monolithic legacy code. A code segment represents a discrete, identifiable segment of source code that encapsulates specific functionality, logic, or system capabilities within a larger software system. These segments may include individual functions, methods, classes, modules, or other logical groupings of code that perform distinct operations or provide particular services within the overall application architecture.

The technical implementation of code segment analysis may include AI agents that utilize natural language processing and/or other machine learning techniques to identify and categorize functional segments within legacy codebases. Code context agents may implement parsing algorithms that can analyze source code across multiple programming languages to identify component boundaries, extract functional metadata, and detect dependencies between different code segments. Code segments may be utilized as the fundamental units of analysis and transformation within software modernization workflows. Service grouper agents may analyze collections of code segments to identify functionally related groups that can be combined into microservices. Change isolation agents may target specific code segments for modification while preserving the integrity of unrelated components within the system. Feature extractor agents may analyze code segments to identify specific capabilities or technical features that need to be preserved or enhanced during modernization processes.

As used herein, the term "functionally related code segments" refers to multiple code segments that are part of or work to accomplish a larger function or complementary functions. A sum of multiple code segments in a group of functionally related code segments may form part of the initial requirement data object for generating a microservice, which microservice will ultimately perform some or all of the function of the group of functionally related code segments. These groupings represent collections of code segments that share common purposes, technical dependencies, or operational characteristics that make them suitable for consolidation into unified service boundaries. The functional relationships may be based on factors such as the interdependence between code segments, shared dependence on other code segments, shared data models, common processes, similar performance requirements, lack of other independent uses for the respective code segments, and/or complementary technical capabilities that benefit from collocation within the same service.

As used herein, the term "group context data set" refers to context data extracted from one or more groups of code segments (e.g., by a service context extractor agent) that helps to provide context used to create the microservices. A group context data set represents structured information that captures the semantic meaning, functional characteristics, dependencies, and operational requirements associated with a specific group of functionally related code segments. This data provides context that enables AI agents to infer how to transform grouped legacy code segments into modern microservice implementations while preserving logic and maintaining system integrity. Capturing the context data set associated with the group of code segments that will ultimately be transformed into a microservice ensures that the context data set is relevant to the microservice as a whole rather than any individual code segment in isolation, which allows the system to generate better modern microservice code.

Service context extractor agents may utilize one or more models and processes, such as natural language processing models and code analysis algorithms, to extract meaningful information in the form of group context data sets from grouped code segments, which may be used during the downstream processes. As a non-limiting example, these agents may implement semantic analysis techniques that can infer the purpose and functionality of code segments, dependency analysis algorithms that map relationships between components and external systems, and architectural pattern recognition that identifies design principles and implementation approaches used within the grouped components. The extracted context data may be stored in structured formats using relational databases for metadata storage, vector databases for semantic representations, and graph databases for modeling complex relationships between different context elements.

Group context data sets are utilized throughout the microservice generation process to guide AI agents in creating appropriate service implementations that align with the original functionality and requirements of the grouped legacy components. For example, API creation agents may use context data, including group context data sets, to design service interfaces that properly expose the functionality encapsulated within the group. As another example, code generator agents may reference context data, including group context data sets, to ensure that generated microservice code maintains the same logic, performance characteristics, and integration patterns as the original legacy components. Code validator agents may use context data, including group context data sets, to verify that modernized implementations meet the functional and non-functional requirements derived from the original grouped components.

The context data may include data that captures aspects of the groups such as the specific functionality provided by the grouped components (independently and/or as an overall group), technical specifications that define performance requirements and integration patterns, dependency information that identifies external systems and shared resources, and architectural guidance that informs the design of modern service implementations. This information ensures that modernized microservices maintain functional equivalence with their legacy counterparts while benefiting from modern architectural patterns and technologies.

As used herein, the term "legacy software program product" refers to a software program product that uses legacy code, including monolithic legacy code. A legacy software program product represents a complete, functional software application or system that was developed using older technologies, architectural patterns, or development practices that may no longer align with current industry standards or organizational requirements. These products typically require modernization to improve maintainability, scalability, security, or compatibility with contemporary computing environments and needs. In some embodiments, legacy software program products may be embodied as computer-executable and/or human-readable legacy code, and legacy software program products may include or may be used to derive context or other non-code data.

As used herein, the term "modern microservice code" refers to code or any portion thereof that makes up one or more microservices generated in accordance with various embodiments of the present disclosure. Modern microservice code may define a microservice, which may include a modular set of code that forms a discrete service accessible to other systems and services, such as via an API. Modern microservice code may be generated from legacy code that has been modernized by grouping functionally related code segments and generating one or more microservices for each group to accomplish the same or a substantially similar overall function of the groups of legacy code. This code represents contemporary software implementations that follow microservice architectural principles, emphasizing loose coupling, high cohesion, and independent deployability while maintaining compatibility with modern development practices and cloud-native environments to achieve various technical improvements discussed herein.

The technical implementation of modern microservice code generation relies on AI agents that utilize advanced generative AI models, including large language models and transformer architectures, to create contemporary software implementations from legacy code. The generated code may be designed to integrate with contemporary frameworks, utilize modern programming languages, implement RESTful APIs or GraphQL interfaces, and support containerization technologies such as DOCKER and KUBERNETES for cloud-native deployment scenarios.

The functionality of modern microservice code encompasses providing scalable, maintainable, and independently deployable software components that collectively deliver the same capabilities as their legacy predecessors while benefiting from contemporary architectural patterns, and the benefits associated therewith, including the ability to utilize the agentic AI augmentation framework processes discussed herein to maintain and improve the code. The microservice code may implement modern security practices, utilize current programming frameworks, support horizontal scaling, and integrate with cloud-based infrastructure services. Each microservice may expose well-defined APIs that enable loose coupling with other services while maintaining clear service boundaries and responsibilities.

As used herein, the term "modernized software program product" refers to a software program product that comprises one or more microservices defined by modern microservice code generated in accordance with various embodiments of the present disclosure. A modernized software program product may represent the complete, functional output of software modernization processes where legacy systems have been transformed into contemporary, distributed architectures that leverage modern technologies, development practices, and architectural patterns while preserving the original functionality and user experience of a corresponding legacy software program product.

Modernized software program products may define production-ready software that can be deployed in contemporary computing environments including cloud platforms, hybrid infrastructures, and modern data centers. These products serve as replacements for legacy systems while maintaining continuity and user familiarity. The modernized products may integrate with existing enterprise systems, third-party services, and modern development toolchains that support continuous integration, continuous deployment, and comprehensive monitoring and observability practices. Modernized software program products may deliver enhanced performance, improved maintainability, better security, and increased scalability compared to their legacy counterparts. Enhanced monitoring, logging, and observability capabilities may provide better insights into system performance and user behavior compared to legacy implementations.

Alternative embodiments may result in different types of modernized software program products including cloud-native applications optimized for specific cloud platforms, hybrid systems that maintain some legacy components while modernizing others, or completely reimplemented systems that use legacy products as functional specifications for entirely new implementations. Some modernized software program products may be created with a focus on specific aspects such as user experience improvements, performance optimization, or security enhancements, while others may provide comprehensive modernization across all system components and capabilities.

As used herein, the term "target microservice boundaries" refers to predefined context associated with one or more microservices that may define guidelines or guardrails for microservices within a software modernization framework. Target microservice boundaries represent structured specifications that establish the scope, responsibilities, and architectural constraints for individual microservices during the transformation of legacy monolithic code into modern distributed architectures. For example, the target microservice boundaries may be based on a template set of microservices or similar breakdown of typical microservices for a software program product. These boundaries serve as predetermined guidelines that ensure consistency, maintainability, and logical organization of microservices generated through AI-assisted modernization processes.

Target microservice boundaries are utilized throughout the modernization workflow to guide AI agents in generating microservices that align with organizational standards and architectural principles, which may serve as guardrails for ensuring predictable microservice definition and coding. For example, service grouper agents may reference these boundaries when analyzing code segments to determine appropriate groupings that respect the predefined service scope and responsibility guidelines. The boundaries serve as input to decision-making algorithms that identify natural breaks within and between functionally related groups, enabling the system to delineate microservices in ways that minimize dependencies, and maximize cohesion. AI agents may compare the functions associated with functionally related groups against the target microservice boundaries to ensure that generated services conform to established patterns and do not violate architectural constraints or exceed recommended service complexity thresholds.

These boundaries may define various aspects of microservice design including functional scope limitations that prevent services from becoming overly complex or encompassing too many responsibilities, dependency management rules that guide how services should interact with external systems and other microservices, performance and scalability requirements that inform resource allocation and architectural decisions, and security and compliance constraints that ensure generated services meet organizational and regulatory requirements. The boundaries may also specify technical constraints such as preferred programming languages, framework selections, database technologies, and integration patterns that should be used for specific types of microservices. In some embodiments, the target microservice boundaries may be part of a configuration file used for generating the modern microservice code. Some embodiments may implement target microservice boundaries as dynamic templates that can be adjusted based on project requirements, organizational changes, or lessons learned from previous modernization efforts, while others may provide domain-specific boundary templates optimized for particular industries or application types.

As used herein, the term "microservice" refers to a modular software component that is programmed to perform a specific function or set of functions within a software architecture. A microservice may represent a discrete, independently deployable unit of software functionality that encapsulates particular capabilities or technical operations while maintaining clear boundaries and well-defined interfaces for interaction with other system components.

Microservices may be used in distributed computing architectures and integrated into modern software program products. Microservices may be implemented using various programming languages, frameworks, and runtime environments relative to other microservices, with each microservice potentially utilizing different technology stacks within the same computer architecture based on its specific functional requirements and performance optimization needs. The modular architecture enables microservices to be deployed across different computing environments including containerized platforms such as DOCKER and KUBERNETES, cloud-based infrastructure services, and hybrid deployment scenarios. Moreover, the modular architecture allows one microservice to perform its programmed function within two or more software program products by exposing an application programming interface (API) accessible to multiple software program products. Microservices typically expose their functionality through well-defined APIs, commonly implemented using RESTful web services, GraphQL endpoints, or message-based communication protocols that enable standardized interaction patterns between services.

Microservices are utilized throughout modern software development to create scalable, maintainable, and resilient distributed applications that can evolve independently while working collaboratively to deliver comprehensive functionality. Each microservice operates as a modularly complete software program product that can perform its respective functions independently, enabling development teams to work on different services simultaneously without requiring coordination of programming languages, development frameworks, or internal implementation details. Microservices may be integrated into larger systems through API-based communication patterns that define how services discover, authenticate with, and exchange data with other services within the distributed architecture. The independent nature of microservices enables organizations to scale individual services based on demand, deploy updates to specific functionality without affecting the entire system, and maintain different release cycles for different capabilities.

The functionality of microservices encompasses providing focused, single-responsibility software components that collectively deliver complex applications through coordinated interaction and data exchange. Microservices may implement various types of functionality including user interface services that handle presentation logic and user interactions, logic services that encapsulate domain-specific rules and processes, data access services that manage persistence and retrieval operations, and integration services that facilitate communication with external systems and third-party APIs. Each microservice maintains its own lifecycle, deployment schedule, and operational characteristics, enabling fine-grained control over system behavior and resource allocation. The API-driven architecture of microservices enables loose coupling between components while maintaining clear contracts for service interaction, allowing services to evolve independently as long as they maintain backward compatibility with their published interfaces.

As used herein, the term "API creation agent" refers to an agent designed to generate application programming interfaces (APIs) for microservices within a software modernization framework. An API creation agent may facilitate the creation of standardized interfaces that enable communication between discrete services and external systems. An API creation agent may use one or more generative AI models, such as large language models or code generation models, which are configured and trained to digest API design patterns, communication protocols, and interface specifications. These models may implement various machine learning frameworks and may leverage transformer architectures, neural networks, or other deep learning approaches specifically optimized for API generation tasks. The API creation agent interfaces with various database systems including one or more vector databases for accessing contextualized service representations, relational databases for storing API specifications and metadata, and repositories that maintain API documentation and versioning information. In some embodiments, the agent, or multiple agents, may implement parallel processing capabilities to handle multiple API generation tasks simultaneously.

The functionality of the API creation agent encompasses comprehensive API design and specification generation that ensures consistency, maintainability, and interoperability across the modernized microservice architecture. The agent may implement various API design strategies including resource-based API design for RESTful services, schema-first development approaches that prioritize data model consistency, and contract-driven development that establishes clear interface agreements between services. The agent may generate complete API specifications including endpoint definitions, request and response schemas, authentication and authorization requirements, error handling protocols, and documentation that facilitates both human understanding and automated integration processes. The generated APIs may include versioning strategies that enable backward compatibility and smooth evolution of service interfaces over time.

Some embodiments may implement API creation agents with different generative AI models or configurations optimized for specific API types, communication protocols, or integration patterns, while others may integrate multiple API creation agents working collaboratively to handle complex scenarios that require coordination across multiple microservices or integration with diverse external systems. Alternative implementations may include API creation agents that focus on particular aspects of API design such as security-focused APIs with enhanced authentication mechanisms, performance-optimized APIs for high-throughput scenarios, or domain-specific APIs that incorporate industry-standard protocols and data formats. Some embodiments may implement API creation agents with learning capabilities that improve their API generation accuracy over time based on feedback from downstream testing and integration processes, or may integrate with external API management platforms and development tools to provide seamless integration with existing enterprise API governance and lifecycle management workflows.

As used herein, the term "code generator agent" refers to an agent designed to generate modern microservice code within a software modernization framework. A code generator agent may generate the modern microservice code based on legacy service logic identified in upstream steps. A code generator agent may create consistent and scalable microservice components ready for deployment by converting monolithic legacy code into contemporary, distributed architectures while preserving the underlying, outward facing functionality and operational requirements. In some embodiments, the process executed by the code generator agent may begin by using the LLM context extractor to add relevant context and generate code (e.g., boilerplate code) based on the service grouping, API documentation (e.g., SWAGGER), and/or feature definitions. The extracted code context may be further enriched by leveraging both legacy and modern repository files (e.g., vectorized code context data associated with both legacy software program products and modern software program products). The LLM code generator may generate the initial version of the microservice code and then compile it. If compilation errors are encountered, the errors may be analyzed and the LLM Code Generator iterates until a successful build is achieved, ensuring that the generated code is error-free and optimized. The LLM context extractor may ensure that the code reflects both current and modern application standards and may consolidate various inputs and microservice generation processes to create a comprehensive view, thereby maintaining consistency across the different services generated. During the compilation stage, any errors that arise are analyzed in detail by the AI agent(s). The LLM code generator may be responsible for not just identifying errors but also inferring the context of those errors within the modernized architecture. This iterative build cycle continues until the code compiles successfully without errors, ensuring robust output that adheres to both functional and performance requirements.

The technical implementation of a code generator agent relies on advanced generative AI architectures and code generation capabilities integrated within the broader software modernization system infrastructure. The agent utilizes one or more trained generative AI models, such as large language models (LLMs) or generative pre-trained transformer (GPT) models, which are specifically configured and trained to work with, digest, and infer various programming languages, architectural patterns, and modern software development best practices. These models may be implemented using various machine learning frameworks and may leverage transformer architectures, neural networks, or other deep learning approaches specifically optimized for code generation and modernization tasks. The code generator agent interfaces with various database systems including vector databases for accessing contextualized legacy code representations, relational databases for storing generated code metadata and transformation history, and repositories that maintain modern coding standards and architectural templates. The agent, or multiple agents, may implement parallel processing capabilities to handle multiple code generation tasks simultaneously.

The code generator agent is utilized during the software modernization process to perform controlled conversion of legacy service logic into modern microservice implementations based on inputs received from upstream agents. For example, the agent may receive grouped legacy code segments along with contextual information such as information about service boundaries, architectural requirements, and modernization objectives, then generates new microservice code that maintains the original logic while implementing contemporary coding standards, architectural patterns, and deployment practices. The agent may implement various code generation strategies including template-based generation that utilizes predefined microservice patterns, contextual code synthesis that leverages enriched metadata from legacy systems, and iterative refinement processes that continuously improve generated code quality through compilation testing and validation feedback loops.

The functionality of the code generator agent encompasses comprehensive legacy-to-modern code transformation that ensures continuity while enabling technological advancement within enterprise software systems. For example, within a modernization workflow, the code generator agent may receive a group of functionally related legacy code segments identified by a service grouper agent, analyze the logic and dependencies within those segments, and generate a corresponding microservice that implements the same functionality using modern programming frameworks, containerization technologies, and/or cloud-native architectural patterns. The generated microservices may include proper error handling, logging mechanisms, security implementations, and API endpoints that enable integration with other modernized components and external systems.

Some embodiments may implement code generator agents with different generative AI models or configurations optimized for specific programming languages, modernization scenarios, or industry domains, while others may integrate multiple code generator agents working collaboratively to handle complex transformation projects that require coordination across multiple legacy systems or architectural components. Some implementations may include code generator agents that focus on particular aspects of modernization such as database migration, user interface transformation, or integration layer development, with each agent optimized for its specific domain of expertise and equipped with templates, patterns, and validation criteria appropriate for its area of focus. The code generator agent represents the modernization equivalent of the code change agent described elsewhere herein, and specifically tailored for the comprehensive transformation of legacy systems into modern microservice-based architectures.

As used herein, the term "service grouper agent" refers to an agent designed to organize and categorize functionally related code segments within legacy software systems to facilitate the creation of modern microservice architectures. A service grouper agent may systematically analyze monolithic legacy code to identify code segments that share common purposes, technical dependencies, or operational characteristics, then group these related segments together to form logical boundaries for future microservices during software modernization processes.

The technical implementation of a service grouper agent relies on machine learning architectures and semantic analysis capabilities integrated within software modernization frameworks. The agent utilizes one or more AI models, which may include generative AI models and/or clustering algorithms, to perform dependency analysis, functional relationship mapping, and architectural pattern recognition across legacy code. These models may implement various machine learning frameworks and may leverage natural language processing techniques, graph-based algorithms, or other analytical approaches specifically optimized for code structure analysis and component relationship identification. The service grouper agent interfaces with various database systems including vector databases for accessing contextualized code representations, relational databases for storing grouping metadata and dependency information, and repositories that maintain architectural standards and microservice boundary templates. The agent, or agents, may implement parallel processing capabilities to handle multiple code analysis tasks simultaneously.

The service grouper agent is utilized during the modernization workflow to perform systematic decomposition of monolithic legacy systems by organizing code segments into logically organized groups that serve as the foundation for microservice generation. The agent receives legacy code segments along with contextual information such as application structure data, dependency relationships, and architectural standards, then applies intelligent grouping algorithms to identify functionally related components that should be consolidated into unified service boundaries. The grouping process may involve analyzing code execution patterns, data flow relationships, shared logic, and integration dependencies to ensure that grouped components minimize external dependencies while maximizing internal cohesion. For example, within a legacy e-commerce application, the service grouper agent might identify and group all code segments related to user authentication, session management, and profile management into a single group that would become a user management microservice, while separately grouping inventory tracking, product catalog, and pricing logic into a product management microservice group. The agent may reference target microservice boundaries that define organizational standards and architectural constraints, ensuring that generated groups conform to established patterns and do not violate complexity thresholds or dependency management rules.

Some embodiments may implement service grouper agents with different AI models or configurations optimized for specific programming languages, architectural patterns, or industry domains, while others may integrate multiple service grouper agents working collaboratively to handle complex legacy systems that require analysis across multiple codebases or technological platforms. Some implementations may include service grouper agents that focus on particular aspects of service decomposition such as data-driven grouping based on database schema relationships, user interface-driven grouping based on screen flow analysis, or process-driven grouping based on workflow patterns, with each agent optimized for its specific analytical domain and equipped with algorithms and validation criteria appropriate for its area of expertise.

As used herein, the term "service context extractor agent" refers to an agent designed to extract and analyze contextual information from groups of functionally related code segments within legacy software systems to inform the creation of modern microservice architectures. For example, a service context extractor agent may systematically analyze grouped legacy code components to capture the semantic meaning, functional characteristics, dependencies, and operational requirements that define the scope and behavior of each group, ensuring that the extracted context preserves logic and system relationships during the modernization process.

The technical implementation of a service context extractor agent relies on natural language processing and semantic analysis capabilities integrated within software modernization frameworks. The agent utilizes one or more AI models, which may include generative AI models and code analysis algorithms, to perform deep contextual analysis of grouped code segments and extract meaningful information that captures the purpose, functionality, dependencies, and architectural patterns within each group. These models may implement various machine learning frameworks and may leverage transformer architectures, graph-based algorithms, or other analytical approaches specifically optimized for inferring code semantics and extracting domain-specific context from legacy systems.

The service context extractor agent may generate group context data sets that serve as the foundation for creating modern microservices that maintain functional equivalence with their legacy counterparts. The agent may receive grouped functionally related code segments from upstream service grouper agents and may analyze each group to extract contextual information including logic patterns, data flow relationships, integration dependencies, performance characteristics, and/or domain-specific requirements that define how the group operates within the broader legacy system. For example, within a legacy e-commerce application, the service context extractor agent might analyze a group of code segments related to payment processing and extract context indicating that the group handles credit card validation, payment gateway integration, transaction logging, and fraud detection, along with dependencies on customer data services and inventory management systems. This extracted context ensures that when the payment processing group is transformed into a modern microservice, it maintains all the underlying, outward facing functionality, rules, and integration patterns of the original legacy components while benefiting from modern architectural principles and deployment practices.

Some embodiments may implement service context extractor agents with different AI models or configurations optimized for specific types of contextual analysis, programming languages, or industry domains, while others may integrate multiple service context extractor agents working collaboratively to handle complex legacy systems that require comprehensive context extraction across multiple functional domains or technological platforms. Alternative implementations may include service context extractor agents that focus on particular aspects of context extraction such as data model analysis for database-driven services, user interface context extraction for presentation layer services, or process context extraction for workflow-oriented services, with each agent optimized for its specific analytical domain and equipped with algorithms and context extraction criteria appropriate for its area of expertise.

As used herein, the term "parser agent" refers to an agent designed to perform preliminary analysis and mapping of legacy software systems to establish a foundational anchor for modernization processes. A parser agent serves as an initial analytical component that systematically examines legacy software program products and their associated documentation to create comprehensive mappings that guide subsequent modernization activities, ensuring that the transformation process maintains functional equivalence while enabling architectural improvements. The parser agent may analyze aspects of the legacy software program products such as the overall schema of the legacy code and the underlying data and documentation.

The parser agent may use one or more AI models, which may include generative AI models and parsing algorithms, which are configured and trained to predictively interpret and digest various data formats, documentation standards, and system architectures commonly found in legacy environments. These models may implement natural language processing techniques for analyzing documentation, schema parsing algorithms for database structures, and API specification analysis for analyzing and interpreting service interfaces. The agent may process data models, database schemas, Web Services Description Language (WSDL) documents, and API documentation to characterize the data structures, service interfaces, and architectural patterns within the legacy system, creating a comprehensive baseline analysis that anchors the mapping between legacy and modernized solutions. The SQLDDL, WSDL, and/or API documentation then is used as a point from which the modernization can begin, and the service grouper agent and service context extractor agent.

The parser agent is utilized during the initial phases of software modernization workflows to establish a foundational inference of legacy systems to generate inferences based thereon before more agents begin their transformation activities. For example, within a legacy enterprise application modernization project, the parser agent might analyze existing database schemas to infer data relationships and constraints, examine WSDL files to map service interfaces and communication protocols, and process API documentation to identify integration points and dependencies. This preliminary analysis creates detailed mappings that inform downstream agents about the structure, functionality, and interdependencies of the legacy system, enabling more accurate and contextually appropriate modernization decisions. The parser agent may work collaboratively with other agents such as service grouper agents and feature extractor agents by providing them with structured information about legacy system components that can be used to make informed decisions about service boundaries and feature extraction strategies.

Some embodiments may implement parser agents with different AI models or configurations optimized for specific types of legacy systems, documentation formats, or technological platforms, while others may integrate multiple parser agents working collaboratively to handle complex legacy environments that span multiple technologies, databases, or architectural patterns. Some implementations may include parser agents that focus on particular aspects of legacy system analysis such as database-centric parsing for data-driven applications, service-oriented parsing for distributed systems, or user interface parsing for presentation layer analysis, with each agent optimized for its specific analytical domain and equipped with parsing algorithms and analysis criteria appropriate for its area of expertise.

As used herein, the term "feature extractor agent" refers to an agent designed to identify and extract specific features from legacy code to be modified, such as features to be augmented in the AI augmentation framework and features to be modernized within a software modernization framework. A feature extractor agent may systematically analyze code segments to identify discrete, well-defined components that encapsulate particular logic, technical functionality, or system capabilities that need to be preserved, enhanced, or transformed during the coding process. This process allows the respective augmentation or modernization frameworks to make necessary changes to the correct features of the code without unnecessarily modifying code or excessively modifying code that does not need such modification. The feature extractor agent helps to break down the coding process into manageable, well-defined components.

The agent may use one or more AI models, including generative AI models and pattern recognition algorithms, to perform code analysis, logic identification, and functional decomposition of the underlying code. These models may implement various machine learning frameworks and may leverage natural language processing techniques, code parsing algorithms, or other analytical approaches specifically optimized for feature identification and extraction from complex codebases. The agent, or multiple agents, may implement parallel processing capabilities to handle multiple feature extraction tasks simultaneously.

The feature extractor agent is utilized during the modernization workflow as a downstream component that receives output from change isolation agents and serves as an upstream component that provides input to API creation agents and code generator agents (e.g., input of extracted features of each respective service). For example, after a change isolation agent identifies specific areas of legacy code that require modernization, the feature extractor agent analyzes these isolated code segments to identify discrete features such as user authentication mechanisms, data validation routines, calculation logic, or integration interfaces that need to be extracted and transformed into modern microservice implementations. In some embodiments, the extracted features serve as structured input for API creation agents that design service interfaces and/or code generator agents that implement modern microservice code, ensuring that the underlying, outward facing functionality is preserved and enhanced throughout the transformation process (e.g., preserving the use case of the legacy software and its externally accessible functions while reconfiguring the software internally into a microservice architecture).

Some embodiments may implement feature extractor agents with different AI models or configurations optimized for specific programming languages, domains, or architectural patterns, while others may integrate multiple feature extractor agents working collaboratively to handle complex legacy systems that span multiple functional areas or technological platforms. Some implementations may include feature extractor agents that focus on particular types of features such as data processing features, user interface features, integration features, or security features, with each agent optimized for its specific domain of expertise and equipped with analysis algorithms and extraction criteria appropriate for its area of focus. Some embodiments may implement feature extractor agents with learning capabilities that improve their feature identification accuracy over time based on feedback from downstream modernization processes and successful deployment outcomes, or may integrate with external analysis tools and domain knowledge repositories to enhance their inference of context and functional requirements within specific industry verticals or organizational environments.

As used herein, the term "API tests agent" refers to an agent designed to generate test cases (e.g., example scenarios) that validate the functionality and correctness of application programming interfaces (APIs) within a software modernization framework. An API tests agent may ensure that APIs generated by upstream agents, particularly API creation agents, or retained legacy APIs meet established standards and functional requirements before proceeding to subsequent stages of the development lifecycle. API test generation may comprise a multi-step process that automatically generates unit, integration, and end-to-end tests for the APIs created during various processes herein (e.g., modernization). The system may leverage static and dynamic analysis of the legacy code, combined with knowledge extracted from documentation and runtime behavior.

The agent may use one or more AI models, which may include generative AI models and testing algorithms, which are configured and trained to predictively infer API testing methodologies, interface specifications, and quality assurance best practices. These models may interface with various testing frameworks and tools including REST API testing libraries, GraphQL testing platforms, integration testing suites, and performance benchmarking systems. The API tests agent, or agents, may implement parallel processing capabilities to execute multiple test scenarios simultaneously and may utilize database systems including relational databases for storing test results and metadata, vector databases for semantic test case relationships, and test repositories that maintain testing history and validation criteria. The agent may generate comprehensive test suites that include functional testing to verify API endpoints and response formats, security testing to identify potential vulnerabilities in API authentication and authorization mechanisms, performance testing to ensure APIs meet specified response time and throughput requirements, and integration testing to validate proper interaction between APIs and other system components.

The API tests agent is utilized during the modernization workflow to perform systematic validation of generated APIs before they are integrated into the final modernized software program product. For example, within a legacy system modernization process, the API tests agent may receive APIs generated by an API creation agent for newly defined microservices, then automatically generate test cases that validate aspects of the API such as endpoint functionality, data format compliance, error handling protocols, and integration compatibility with existing system components. The agent may create example scenarios that simulate real-world usage patterns, edge cases, and error conditions to ensure comprehensive coverage of API behavior under various operational circumstances. The testing process may include validation against acceptance criteria defined in upstream requirements, verification of API documentation accuracy, and assessment of compliance with organizational API standards and industry best practices.

Some embodiments may implement API tests agent with different AI models or configurations optimized for specific API types, communication protocols, or testing scenarios, while others may integrate multiple API tests agents working collaboratively to handle complex modernization projects that require comprehensive testing across multiple microservices or integration points. Alternative implementations may include API tests agents that focus on particular aspects of API testing such as security-focused testing with enhanced vulnerability scanning, performance-optimized testing for high-throughput scenarios, or compliance testing that ensures adherence to specific industry standards or regulatory requirements. Some embodiments may implement API tests agents with learning capabilities that improve their test generation accuracy and coverage over time based on feedback from deployment outcomes and production monitoring, or may integrate with external continuous integration and continuous deployment (CI/CD) systems to provide seamless integration with existing software development and testing workflows.

As used herein, the term "code validator agent" refers to an agent designed to review and validate generated code within a software augmentation and/or software modernization framework. A code validator agent may serve as a comprehensive quality assurance component that ensures generated code (e.g., modernized or otherwise modified code) meets established standards, requirements, and operational criteria before deployment. In some embodiments, the code validator agent may incorporate the functions of both code change reviewer agents and code change tester agents described herein, providing a unified validation framework that combines code review and testing capabilities within a single agent system, or the code validator agent may comprise a plurality of discrete agents for performing respective portions of the described functionality.

In a software modernization process, the code validator agent may be responsible for validating the generated microservice code against best practices, security standards, and functional requirements. In some embodiments, this process begins by running the unit tests and integration tests generated during the earlier stages by the API tests agent. If any test cases fail, the LLM code generator may take over to iteratively fix the code. The generator may use detailed context from the failed test cases to make adjustments, ensuring that any corrections are fully aligned with the intended functionality.

After resolving a failed tests, the code validator agent may perform further validation checks, such as adherence to coding standards, security best practices, and scalability considerations. In some embodiments, this phase of testing may also include static analysis, which helps identify potential vulnerabilities, code smells, and other issues that could impact the performance or security of the modernized microservice. In some embodiments, the validation phase may be exhaustive, ensuring that all edge cases are tested and verified. In some embodiments, the validation phase may include mandatory and/or optional validation steps. In some embodiments, the validation phase may include user-selectable validation steps. In the final steps, the validator may also look into the overall cohesion of the services, ensuring that interactions between services are reliable and efficient. Once all validations pass, the final microservice codebase is deemed production-ready, ensuring high quality and stability before deployment. The process iterates through the service components until all identified services have been modernized. The resulting output is a set of modernized microservice code that is ready for deployment and integration into the broader enterprise architecture.

The agent may use one or more AI models, which may include generative AI models and code analysis models, which are configured and trained to work with, digest, and infer various programming languages, coding standards, architectural patterns, security best practices, and functional requirements. These models may implement static code analysis capabilities, security vulnerability scanning, architectural compliance checking, and performance impact assessment through integration with various analysis tools and frameworks. The agent may execute comprehensive testing protocols including unit testing that validates individual code segments, integration testing that ensures proper interaction between modernized components and existing systems, and regression testing that verifies new modifications do not introduce unintended side effects or break existing functionality.

The code validator agent may be used during a final phase of the software modernization process, or at least a final phase of the individual microservice coding process, to perform systematic quality assurance of generated microservice code before production deployment. For example, within a legacy system modernization workflow, the code validator agent may receive modern microservice code generated by a code generator agent, execute comprehensive validation protocols including running unit tests and integration tests generated by API tests agents, perform static analysis to identify potential vulnerabilities and code quality issues, and validate compliance with organizational coding standards and architectural principles. The agent may implement iterative validation cycles where identified issues are communicated back to upstream code generation agents for resolution, creating a collaborative refinement process that ensures code quality through systematic validation and correction until all predetermined standards are satisfied.

Some embodiments may implement code validator agents with different AI models or configurations optimized for specific validation domains such as security-focused validation with enhanced vulnerability detection, performance-optimized validation for high-throughput scenarios, or compliance validation that ensures adherence to specific industry standards or regulatory requirements. Some implementations may include code validator agents that focus on particular aspects of code quality such as maintainability assessment, scalability evaluation, or compatibility testing across different deployment environments, with each agent optimized for its specific validation domain and equipped with analysis tools and validation criteria appropriate for its area of expertise. Some embodiments may implement code validator agents with learning capabilities that improve their validation accuracy over time based on feedback from production monitoring and deployment outcomes, or may integrate with external continuous integration and continuous deployment (CI/CD) systems to provide seamless integration with existing software development and quality assurance workflows.

As used herein, the term "LLM code generator" refers to the one or more large language models used, for example, by the code generator agent for making code. The LLM code generator represents an implementation of generative AI technology that is specifically configured and trained to work with, digest, and infer various programming languages, software development patterns, and code generation best practices within the context of software modernization and development workflows. For example, in a legacy system modernization scenario, an LLM code generator may receive input comprising grouped legacy code segments, a list of features for modification, and with contextual information about service boundaries and architectural requirements, then generate corresponding modern microservice code that maintains the original logic while implementing contemporary coding standards, containerization technologies, and cloud-native architectural patterns. The LLM code generator may utilize transformer architectures, such as generative pre-trained transformer (GPT) models, which have been trained on extensive repositories of high-quality code examples, enabling the model to generate syntactically correct and functionally appropriate code that adheres to established programming conventions and integrates seamlessly with existing system architectures. In the modernization workflow, the LLM code generator may work iteratively with other AI agents, analyzing compilation errors and refining generated code through multiple cycles until successful compilation is achieved, ensuring that the output code is both error-free and optimized for performance within the target deployment environment.

As used herein, the term "LLM context extractor" refers to the one or more large language models used, for example, by the service context extractor agent to extract relevant context from the legacy code for use in generating the modern microservice code. The LLM context extractor serves as a component within the code generator agent that analyzes legacy service logic and contextual information to create comprehensive input data for modern microservice generation. For example, in a legacy e-commerce application modernization scenario, the LLM context extractor may analyze monolithic code segments related to inventory management functionality, extracting contextual metadata such as logic patterns, data flow relationships, integration dependencies, and architectural constraints that define how the inventory system interacts with other application components. The extracted context may include information such as "function: inventory tracking," "data dependencies: product catalog, pricing engine," "integration patterns: REST API calls to payment processor," and "performance requirements: sub-second response time for inventory queries." This extracted contextual information is then used by the LLM code generator to ensure that the generated modern microservice code maintains functional equivalence with the original legacy system while implementing contemporary architectural patterns and coding standards appropriate for microservice-based deployments.

As used herein, the term "vision based generative AI model" refers to one or more generative AI models used by the interface for exploring legacy graphical user interfaces and/or testing modernized graphical user interfaces. The model, such as one or more models executed by FACTIF-AI provided by PRESIDIO running in Explorer Mode, may analyze the legacy user interfaces to extract relevant information and image data. For example, the model may extract the screen flows, layout, and detailed screen information, storing them for further processing. The model may also manipulate the interface to simulate human interaction (e.g., simulated touch inputs, keystrokes, mouse clicks, and the like), which may be used to map relational information about the flows and dependencies between UI screens and/or UI components.

Either as a second model or a second mode of the same vision based generative AI model (e.g., a Test Mode of FACTIF-AI), the vision based generative AI model may also validate the modernized graphical user interfaces after integration by the UI screen integrator agent. This testing process may occur at least partially autonomously in some embodiments. For example, in some embodiments, this automated validation is complemented by manual validation from human experts to ensure that the final UI meets all user experience and accessibility standards. In some embodiments, the validation may be fully automated. As an example, in a legacy e-commerce application modernization scenario, a vision based generative AI model may analyze the existing checkout interface by capturing screenshots of each step in the purchase flow, identifying interactive elements such as product selection buttons (e.g., via visual recognition and/or simulated inputs in various locations on the interface), quantity input fields, and payment form components, and mapping the navigation paths between shopping cart, billing information, and order confirmation screens, such as by tracking the relationship between inputs and subsequent UI screens and/or components. For example, the model may simulate user interactions by programmatically clicking "Add to Cart" buttons, filling in form fields with test data, and navigating through the complete purchase workflow to infer the functional relationships and data dependencies between different UI components. During the validation phase for the modernized checkout interface, the same vision based generative AI model operating in testing mode may automatically execute test scenarios such as adding multiple products to the cart, applying discount codes, selecting different payment methods, and verifying that error handling displays appropriate messages when invalid information is entered, thereby ensuring that the modernized interface maintains functional equivalence with the original legacy system while providing improved user experience and accessibility compliance.

As used herein, the term "screen information aggregator agent" refers to an agent designed to compile and organize information extracted from legacy user interfaces during software modernization processes. A screen information aggregator agent may receive, consolidate, and/or structure data about user interface elements, screen flows, functional relationships, and component dependencies that have been identified and analyzed by upstream vision-based generative AI models, which may transform disparate UI analysis results into comprehensive, organized datasets that support downstream modernization activities.

The agent may use one or more AI models and data management systems to receive input from vision based generative AI models that have analyzed legacy user interfaces, then process this information to create structured representations of the complete UI landscape. The agent may interface with various database systems including relational databases for storing organized screen metadata, graph databases for modeling complex relationships between UI components, and repositories that maintain comprehensive documentation of user interface structures and dependencies. In an example embodiment, the aggregation process may involve parsing visual analysis results, categorizing UI components by type and function, mapping navigation flows between different screens, identifying data dependencies and functional relationships, and/or creating hierarchical representations of the overall user interface architecture. The screen information aggregator agent, or multiple agents, may implement parallel processing capabilities to handle multiple UI analysis results simultaneously and may utilize data validation mechanisms to ensure accuracy and completeness of the aggregated information. For example, within a legacy e-commerce application modernization project, the screen information aggregator agent might receive analysis results from a vision based generative AI model that has examined product catalog pages, shopping cart interfaces, and checkout workflows, then compile this information into a comprehensive dataset that documents how users navigate between these screens, what data is shared between different interface components, and how various UI elements interact to support the complete purchasing process. The agent may also aggregate information about legacy banking application interfaces by compiling data about account management screens, transaction processing forms, and reporting dashboards, creating organized documentation that captures the relationships between different functional areas and the data flows that connect various user interface components throughout the application.

Some embodiments may implement screen information aggregator agents with different organizational strategies optimized for specific types of legacy applications, user interface frameworks, or modernization objectives, while others may integrate multiple aggregation agents working collaboratively to handle complex legacy systems that span multiple user interface technologies or architectural patterns. Some implementations may include screen information aggregator agents that focus on particular aspects of UI organization such as accessibility compliance documentation, responsive design considerations, or integration requirements with modern frontend frameworks, with each agent optimized for its specific domain of expertise and equipped with aggregation algorithms and validation criteria appropriate for its area of focus.

As used herein, the term "UI screen generator agent" refers to an agent designed to generate modernized graphical user interface screens, such as within a software modernization framework. A UI screen generator agent may serve as the user interface equivalent of the code generator agent and other generative coding agents, including LLMs, described elsewhere herein, transforming legacy user interface components and specifications into UI implementations that align with modern design standards and user experience principles while preserving functionality and user workflows from the original legacy interfaces. The UI screens may be configured to integrate with the generated microservice code.

The UI screen generator agent may include one or more generative AI architectures and user interface generation capabilities integrated within the broader software modernization system infrastructure. In some embodiments, the agent utilizes one or more generative AI models, such as image generation models or UI generation models, which are configured and trained to infer user interface design patterns, frontend frameworks, and modern web development best practices.

The UI screen generator agent may be used during the UI modernization workflow, which may be part of a larger software modernization workflow, to perform systematic transformation of legacy user interface components into modern, standards-compliant implementations that maintain functional equivalence while incorporating contemporary design principles and accessibility standards. For example, within a legacy application modernization project, the UI screen generator agent might receive aggregated information about a legacy data entry form along with modern UI context specifying that the modernized application should use a responsive web framework, then generate a modern equivalent that implements the same data collection functionality using contemporary form controls, validation patterns, and responsive layout techniques that work across multiple device types and screen sizes. The agent may implement various UI generation strategies including component-based generation that creates reusable interface elements, template-driven generation that utilizes predefined design patterns, and contextual synthesis that leverages metadata from legacy systems to ensure functional consistency between old and new interfaces.

In some embodiments, the UI screen generator agent and UI test generator agent may be implemented as part of the same agent system (e.g., a "UI screen and test generator agent"), whether integrated as a single unified agent or as two sub-agents within a larger agent framework that coordinates both UI generation and testing activities. This integrated approach may enable seamless coordination between interface generation and validation processes, ensuring that generated UI components are immediately tested for functionality, accessibility, and compliance with design standards. Some embodiments may implement UI screen generator agents with different generative AI models or configurations optimized for specific frontend frameworks, design systems, or user interface paradigms, while others may integrate multiple UI screen generator agents working collaboratively to handle complex modernization scenarios that require coordination across multiple interface components or integration with diverse modern frontend technologies.

As used herein, the term "UI test generator agent" refers to an agent designed to create automated test cases for validating generated graphical user interfaces and UI components within a software modernization framework. A UI test generator agent may ensure consistency between modernized user interfaces and their original legacy counterparts while verifying compliance with functional requirements and design specifications. The UI test generator agent may be configured to generate tests to be applied by at least one vision based generative AI model to run on a modernized UI.

The UI test generator agent may use one or more AI models, including generative AI models and testing algorithms, which are configured and trained to infer user interface testing methodologies, interaction patterns, and quality assurance best practices for frontend components. These models may interface with various testing frameworks including automated UI testing libraries, accessibility testing tools, cross-browser compatibility testing platforms, and user experience validation systems. The UI test generator agent, or agents, may implement parallel processing capabilities to execute multiple test scenarios simultaneously and may utilize database systems including relational databases for storing test results and validation metrics, vector databases for semantic test case relationships, and repositories that maintain testing history and UI validation criteria. The agent may generate comprehensive test suites that validate user interface functionality, visual consistency, accessibility compliance, and interaction behavior to ensure that modernized UI components maintain the same user experience and operational characteristics as their legacy predecessors.

The UI test generator agent is utilized during the UI modernization workflow to perform systematic validation of generated user interface components before they are integrated into the final modernized software program product. For example, within a legacy application modernization project, the UI test generator agent might receive legacy GUI visual context data objects and modern UI screens generated by a UI screen generator agent, then create automated test cases that verify proper button functionality, form validation behavior, navigation flow consistency, and visual element positioning across different screen sizes and browsers. The agent may work collaboratively with other agents such as vision-based generative AI models that analyze legacy interfaces and UI screen integrator agents that combine frontend components with backend microservices, ensuring that the entire modernized user interface maintains functional equivalence with the original system while benefiting from contemporary design standards and accessibility features.

Some embodiments may implement UI test generator agents with different AI models or configurations optimized for specific testing scenarios, user interface frameworks, or accessibility standards, while others may integrate multiple UI test generator agents working collaboratively to handle complex validation requirements that span multiple interface components or require coordination across diverse testing environments. Some implementations may include UI test generator agents that focus on particular aspects of interface validation such as performance testing for responsive design, security testing for user input handling, or compliance testing with specific industry standards, with each agent optimized for its particular testing domain and equipped with testing tools and validation criteria appropriate for its area of expertise. Some embodiments may implement UI test generator agents with learning capabilities that improve their test generation accuracy over time based on feedback from user acceptance testing and production monitoring, or may integrate with external continuous integration and user experience testing platforms to provide seamless integration with existing enterprise UI development and validation workflows.

As used herein, the term "UI context data" refers to data that includes context about a user interface and/or an underlying software program product or other computer implemented functionality. The UI context data may include configuration data and legacy application background data. For example, in some embodiments, the UI context data may include UI templates, UI & UX guidelines, application (i.e., software program product) background, repository setup, tech stack, and information architecture data. In the context of the UI modernization framework described herein, UI context data serves as an input for AI agents responsible for generating modern UI screens from legacy graphical user interfaces. For instance, UI context data may include modern React or Angular component templates that define contemporary design patterns, accessibility guidelines that ensure compliance with WCAG standards, application background information describing the logic and user workflows of the legacy system, repository setup details specifying the target deployment environment and integration requirements, technology stack specifications indicating preferred frontend frameworks and backend API protocols, and information architecture data that maps the hierarchical relationships between different UI components and their corresponding data sources. The UI context data may be part of a configuration file for instructing the UI screen generator agent to create one or more UI screens. This comprehensive contextual information enables UI generation agents to create modernized interfaces that maintain functional equivalence with legacy systems while incorporating contemporary design principles, responsive layouts, and enhanced user experience patterns appropriate for modern web and mobile platforms.

As used herein, the term "UI screen integrator agent" refers to an agent designed to combine modernized graphical user interface screens with underlying microservices or other generated code to create cohesive, modernized software program products. A UI screen integrator agent serves as the integration layer that bridges frontend user interface components with backend service architectures, ensuring seamless communication and functional coordination between the presentation layer and the underlying logic implemented through microservices.

The UI screen integrator agent may use one or more AI models, which may include generative AI models and integration algorithms, which are configured to infer API specifications, data flow patterns, and communication protocols between frontend and backend components. These models may interface with various systems including microservices API documentation that provides specifications for backend services, modern UI screens generated by UI screen generator agents, and integration testing frameworks that validate the proper interaction between frontend and backend components. The UI screen integrator agent, or agents, may implement parallel processing capabilities to handle multiple integration tasks simultaneously and may utilize database systems including relational databases for storing integration metadata and configuration information, vector databases for semantic relationship mapping between UI components and microservices, and repositories that maintain API documentation and service specifications. The UI screen integrator agent may coordinate data binding operations that connect UI elements with appropriate microservice endpoints, implement authentication and authorization protocols that ensure secure communication between frontend and backend systems, and establish error handling mechanisms.

As used herein, the term "application programming interface (API)" refers to one or more sets of rules or protocols that allow software program products or portions thereof, such as microservices, to communicate with each other. An API functions as a software interface allowing software program products or portions thereof (e.g., microservices) to make their functionalities available for use to other software program products or portions thereof. An API can form a part of the software that makes a microservice modular by defining a communication protocol and rule set that allows external entities (e.g., software program products or portions thereof) to use the functionality of the software program products or portions thereof without seeing or needing to interact with the internal functionality of the software program products or portions thereof.

In some embodiments, APIs may be implemented using RESTful web services, GraphQL endpoints, or message-based communication protocols that enable standardized interaction patterns between different software components. The API creation agent described herein may utilize generative AI models to automatically generate API specifications including endpoint definitions, request and response schemas, authentication and authorization requirements, error handling protocols, and comprehensive documentation that facilitates both human understanding and automated integration processes. APIs may interface with various database systems including relational databases for structured data exchange, vector databases for semantic operations, and repositories that maintain API versioning and compatibility information. Within the modernization framework, APIs serve as integration points that enable legacy systems to be transformed into modern microservice-based architectures while maintaining interoperability with existing enterprise systems. For example, when the code generator agent transforms monolithic legacy code into modern microservice code, the API creation agent may generate corresponding APIs that expose the microservice functionality in a standardized manner, enabling seamless integration with other modernized components and external systems.

As used herein, the term "compilation error" refers to a fault, error, or other issue that prevents code from being compiled by a compiler from human-readable source code to a working software program product (e.g., in object code form). In the context of the agentic AI augmentation framework and software modernization processes described herein, compilation errors may occur during the code generation phase when AI agents, such as the code generator agent, attempt to transform legacy service logic into modern microservice code or when generating new code based on code generation work prompt sets. For example, a compilation error may arise when the code generator agent generates initial microservice code that contains syntax errors, missing dependencies, undefined variables, or incompatible function signatures that prevent the compiler from successfully converting the source code into executable object code. The system may detect compilation errors through automated compilation processes and utilize iterative error resolution mechanisms where the LLM code generator analyzes the compilation error context, identifies the specific issues preventing successful compilation, and generates corrected code that addresses the identified problems, continuing this cycle until the code compiles successfully without errors and produces a functional software program product ready for deployment.

As used herein, the term "graphical user interface (GUI) visual context data object" refers to a context data object associated with one or more graphical user interfaces. In some embodiments, a GUI visual context data object may be generated by applying at least one vision based generative AI model to an UI screen or set of UI screens to generate context data associated with the UI screen(s). In some embodiments, the screen information aggregator agent may receive the output of at least the vision based generative AI model and generate the GUI visual context data object by aggregating the data associated with the UI.

A GUI visual context data object may include data indicative of the appearance and functionality of a GUI or portions thereof, a relationship between UI screens or portions thereof, a relationship between UI components, screen flows, layout, and detailed screen information. GUI visual context data may, in some embodiments, include both screenshots and other image data related to the GUI and operational context data related to the functionalities and underlying relationships of the GUI. For example, in a legacy software modernization context, a GUI visual context data object may comprise screenshots captured from a legacy application's UI (e.g., one or more UI screens) along with metadata describing the functional relationships between different interface elements, such as how clicking a "Submit Order" button on an e-commerce checkout screen transitions to a payment confirmation screen while triggering backend validation processes. The GUI visual context data object may include operational context data that maps the dependencies between UI components, such as how a dropdown menu selection for "Product Category" dynamically filters the options available in a "Product Type" dropdown, or how form validation rules prevent users from proceeding to the next screen until required fields are completed. In the context of UI modernization workflows, these GUI visual context data objects serve as input to UI screen generator agents and/or UI test generator agents that create and test modern, responsive UI components while preserving the underlying, outward facing functionality and user experience patterns.

Example AI Models

To further aid in analysis, inference, and downstream functionalities, the underlying technologies used to enable the various embodiments of the present disclosure, example AI and/or machine learning (ML) models (AI/ML models) are described. In embodiments of the various agents described herein, specific examples may be given of models usable for their particular purposes. AI/ML models are, at least partially, collections of software and data that implement AI trained to provide output, such as predictive data, newly generated software code, updated software code, and/or other outputs based on input (e.g., user input, pre-generated executable software program products, and/or the like). Examples of AI that may be implemented with machine learning may include neural networks (including recurrent neural networks), language models (including so-called "large language models"), generative models (e.g., transformers), natural language processing models, adversarial networks, decision trees, Markov models, support vector machines, genetic algorithms, others, or combinations thereof. A person of skill in the art having the benefit of this disclosure will understand that these AI implementations need not be equivalent to each other and may instead select from among them based on the context in which they will be used, such as the specific implementations described herein. AI/ML models may be built and/or refined from existing frameworks, such as TENSORFLOW by GOOGLE, INC., PYTORCH by the PYTORCH community, and/or other frameworks. Any one or more of the AI/ML models described herein may correspond to techniques leveraged by the agentic AI augmentation framework for software development lifecycles as described herein for generating, at least by collaboration of user(s) and AI, new or updated executable software program products.

AI/ML models may include one or more models that are the structured representation of learning and a user interface that supports use of the AI/ML models. The one or more models may take any of a variety of forms. In some embodiments, the AI/ML models include representations of nodes (e.g., neural network nodes, decision tree nodes, Markov model nodes, other nodes, or combinations thereof) and/or connections between nodes (e.g., weighted or unweighted unidirectional or bidirectional connections). In some embodiments, the AI/ML models may include representations of memory (e.g., providing long-term memory functionality, short-term memory functionality, and/or a combination thereof). The AI/ML models may be linked, may cooperate, and/or may compete to provide output.

The user interface may include software procedures (e.g., defined in a one or more libraries) that facilitate the use of the AI/ML models, for example, by enabling user(s) to establish and/or interact with the AI/ML models. For instance, the software procedures may include software for receiving input, preparing input for use (e.g., by performing vector embedding, such as using Word2Vec, BERT, and/or other techniques), processing the input with the AI/ML models, providing output, training the AI/ML models, performing inference with the AI/ML models, fine-tuning and/or refining the AI/ML models, one or more other software procedures, and/or any combinations thereof.

In some embodiments, the user interface may be used to facilitate one or more training methods. A training method (of the one or more training methods) may include at least one or more training operations. The one or more training operations may include operations which are implemented and/or performed sequentially (e.g., a first operation followed by a second operation, which is followed by a third operation, which is followed by a fourth operation, and so on). The one or more training operations may include at least establishing an AI/ML model, for example, such as initializing the AI/ML model. The establishing the AI/ML model may include setting up the AI/ML model for further use (e.g., by training, fine-tuning, refining, and/or any combinations thereof). The AI/ML model may be initialized with values. In some embodiments, the AI/ML model may be pretrained.

The one or more training operations may include at least obtaining training data. In some embodiments, the training data includes at least one or more pairs of (a) input (e.g., training sequence data objects, respective contextual data objects, and/or the like) and/or (b) desired output (e.g., labels and/or the like) given the input. In supervised or semi-supervised training, the data may be prelabeled, such as by human or automated labelers. In unsupervised learning the training data may be unlabeled.

In some embodiments, the training data may include at least validation data used to validate the trained AI/ML models. The one or more training operations may include at least providing a portion of the training data to the AI/ML models, for example, such as providing the training data in a format usable by the AI/ML models (e.g., human-readable formats, computer-readable formats, machine-level formats, machine-interpretable formats, and/or other formats). The AI/ML models may be configured to produce one or more outputs based on one or more respective inputs.

The one or more training operations may include at least comparing the expected output with the actual output. In some embodiments, one or more loss functions and/or other functions may be implemented to determine the difference between the expected output and the actual output. This difference may be used to indicate training progress of the AI/ML models.

The one or more training operations may include at least updating the AI/ML models based on the difference (e.g., the result of a comparison of the expected output and the actual output). Updating the AI/ML models may take any of a variety of forms, for example, depending on the nature of the AI/ML models. In some embodiments, wherein the AI/ML models include weights, the weights may be modified to increase the likelihood that the AI/ML models will produce correct output (e.g., relative to the expected output) based on an input. Depending on the types of AI/ML models, back-propagation and/or other techniques may be used to update the AI/ML models.

The one or more training operations may include at least determining whether a stopping criterion has been reached, for example, based on the output of the loss function (e.g., an actual value, a change in actual values over time, and/or the like). Additionally or alternatively, whether the stopping criterion has been reached may be determined based on a quantity of training epochs that have occurred and/or an amount of training data that has been used. In some embodiments, satisfaction of the stopping criterion may be achieved at least by once again obtaining training data (e.g., additional training data) and performing one or more of the subsequent operations, for example, if the stopping criterion has not been satisfied.

The one or more training operations include at least and/or result in deploying the trained AI/ML models for use in production, for example, such as providing the trained AI/ML models with real-world input data in order for the trained AI/ML models to produce output data suitable for use in real-world environments. For example, deploying the trained AI/ML models may include enabling user interaction with the trained AI/ML models to allow the user(s) to at least partially automate, improve, collaborate on, and/or otherwise modify software development lifecycles.

Figure 10:
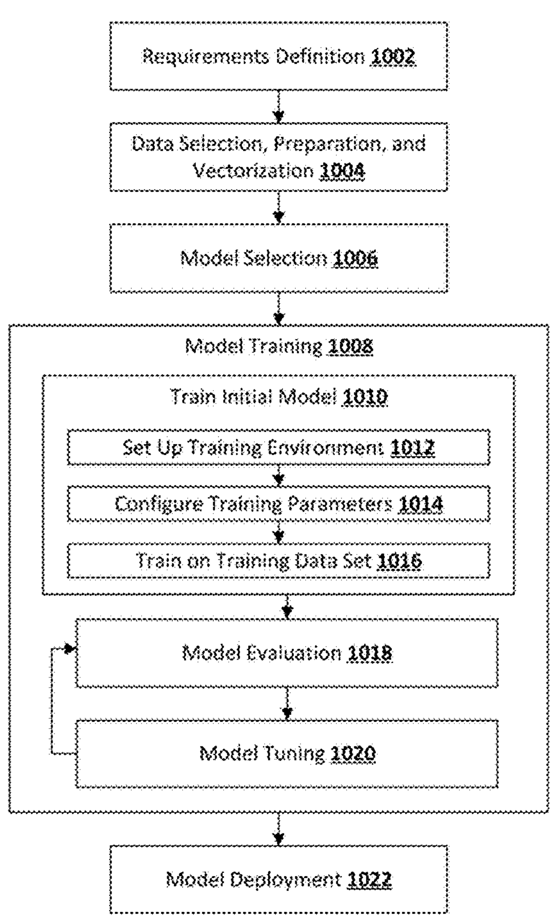
FIG. 10 shows a flowchart depicting an example process for training an AI agent in accordance with at least one embodiment of the present disclosure.

Without limiting the foregoing, FIG. 10 shows a flowchart depicting an example process 1000 for training an AI model to be used as part of an AI agent in accordance with at least one embodiment of the present disclosure. The depicted process begins with a requirements definition step 1002 that establishes the specifications and objectives for the AI model to be developed. The requirements definition may include determining the intended functionality, performance criteria, and operational parameters that the AI model should achieve. The depicted training process may be used as part of the various agentic AI frameworks disclosed herein, including the agentic AI augmentation framework and the code modernization framework.

Following requirements definition, the process proceeds to data selection, preparation, and vectorization 1004. In some embodiments, this step may involve identifying appropriate training datasets, cleaning and preprocessing the data to ensure quality and consistency, and converting the data into vector representations suitable for machine learning algorithms. The vectorization process may transform raw data into numerical formats that can be effectively processed by AI models.

The process then moves to model selection 1006, where appropriate AI architectures and algorithms are chosen based on the defined requirements and the nature of the prepared data. In some embodiments, a model is pre-selected. In some embodiments, a model is chosen or a plurality of models ranked based on the requirements definition 1002. In some embodiments, model selection may involve evaluating different AI frameworks, neural network architectures, machine learning approaches, or the like to determine which configuration may best meet the specified objectives.

Following the pre-training steps 1002, 1004, 1006, the process may move to model training 1008. The depicted model training process 1008 begins with training an initial model 1010, which comprises three sequential sub-steps: setting up the training environment 1012, configuring training parameters 1014, and training on the training data set 1016. The training environment setup may involve establishing the computational infrastructure, software frameworks, and system configurations necessary for model development. Configuring training parameters may include setting learning rates, batch sizes, optimization algorithms, and other hyperparameters that control the training process. Training on the training data set may involve executing the actual learning algorithms using the prepared datasets.

Within the model training process 1008, after training of the initial model 1010, the process may optionally implement a feedback loop between model evaluation 1018 and model tuning 1020 steps. The model evaluation step 1018 may assess the performance of the trained model against validation datasets and predetermined success criteria. In some cases, the evaluation 1018 may measure accuracy, precision, recall, or other relevant performance metrics. The model tuning step 1020 may involve adjusting model parameters, architecture, or training approaches based on the evaluation results. This iterative feedback loop may continue until the model achieves satisfactory performance levels or meets the stopping criteria established during requirements definition.

The process concludes with model deployment 1022, where the trained and validated AI model is implemented in a production environment. In some embodiments, model deployment 1022 may involve integrating the AI model into the broader AI augmentation framework, establishing monitoring and maintenance procedures, and enabling the model to process real-world data and generate outputs for end users.

Various embodiments may implement alternative training methodologies, different sequences of operations, and/or modified deployment strategies for developing and implementing AI models for software development applications.

Example System for AI Augmentation Framework

Various embodiments of the present disclosure relate to systems, apparatuses, methods, and/or the like AI augmentation frameworks for software development lifecycles. An agentic AI augmentation framework for software development lifecycles may be variously implemented.

Referring now to FIG. 1, an example system 100 for implementing an agentic AI augmentation framework and code modernization framework is illustrated in accordance with one or more embodiments of the present disclosure. The system 100 may include a network 102, one or more servers 104*a-n* (collectively "104"), the servers having one or more processors 106*a-n* (collectively "106") and one or more memories 114*a-n* (collectively "114"), one or more databases 108*a-n* (collectively "108"), and one or more terminal devices 110*a-n* (collectively "110"). One or more users 112*a-n* (collectively "112") may interact with the system via one or more of the aforementioned components, such as the terminal devices 110 as described herein. Although the example of FIG. 1 illustrates an example configuration of a network, multiple servers, multiple processors, multiple databases, multiple terminal devices, and multiple users, any number of these components may be present in the system 100 and/or similar systems. In some embodiments, any one or more components of the system 100 may be located at the same facility, for example, such as a datacenter, and/or at other locations, for example, such as other facilities, cloud-based services, and/or the like.

In some embodiments, the network 102 may be configured to enable communication between any one or more components of the system 100 and any one or more other components of the system 100. In some embodiments, the network 102 may be configured to enable communication between any one or more components of the system 100 and any one or more other devices (e.g., one or more devices external to the system 100). Based on the enabling of communication, the network 102 may allow for configuration of the agentic AI augmentation framework for SDLCs, configuration of the modernization process, and/or design, refinement, use, and/or the like thereof. In some embodiments, the network 102 may include one or more public networks (e.g., the Internet), one or more private networks (e.g., a local network), or a combination of one or more public networks and/or one or more private networks. For example, the network 102 may be at least: the Internet; a wireless network; a wired network (e.g., Ethernet); a local area network (LAN); a Wide Area Network (WAN); Near Field Communication (NFC); a Worldwide Interoperability for Microwave Access (WiMAX) network; a personal area network (PAN); a shot-range wireless network (e.g., a Bluetooth network); an infrared wireless network (e.g., IrDA); an ultra-wideband (UWB) network; an induction wireless transmission network; and/or any other type of network configured to enable communications between the components of the system 100 among one another and/or with external devices. In some embodiments, the network 102 may be implemented using one or more cellular networks, one or more satellite networks, one or more licensed radio networks, one or more unlicensed radio networks, or a combination of one or more cellular networks, one or more satellite networks, one or more licensed radio networks, and/or one or more unlicensed radio networks. Various devices in the depicted system may communicate directly with each other and/or via the network.

In some embodiments, the one or more servers 104 may include and/or refer to various types of computing devices, computing systems, computing entities, and/or the like (e.g., the one or more processors 106). For example, the one or more servers 104 may include and/or refer to at least: one or more computers; one or more computing entities; one or more desktop computers; one or more laptop computers; one or more mobile phones; one or more tablet devices; one or more notebook devices; one or more gaming devices; one or more Internet-of-Things (IoT) devices; one or more distributed systems; one or more distributed devices; one or more distributed terminals; one or more distributed servers; one or more distributed server networks; one or more blades; one or more gateways; one or more switches; one or more processing devices; one or more processing entities; one or more set-top boxes (STBs); one or more relays; one or more routers; one or more network access points (APs); one or more base stations (BSs); and/or other types of devices.

In some embodiments, the one or more servers 104 may be located at the same location, for example, such as a datacenter. In some embodiments, the one or more servers 104 may be located at one or more different locations, including as part of a cloud-based computing system. The one or more servers 104 may include and be configured to control a plurality of local machines (e.g., terminal devices, computers, and/or the like) located at one or more locations. In some embodiments, the one or more servers 104 may be configured to control the plurality of local machines such that one or more of the plurality of local machines are enabled to execute one or more computer program instructions (e.g., instructions stored on one or more memories 114 of the servers 104 or one or more databases 108).

For example, a plurality of servers (e.g., of the one or more servers 104) located at an example datacenter may be configured to control a plurality of local computers located at the example datacenter. Similarly, the plurality of servers may be configured to control one or more computers located at one or more other locations. The plurality of servers may be configured to control the plurality of local computers located at the example datacenter and the one or more computers located at the one or more other locations.

In some embodiments, the one or more servers 104 may be configured to receive input, via the one or more terminal devices 110 and/or from other sources, based on interactions by the one or more users 112. For example, a user (e.g., of the one or more users 112) may, using a user interface of a terminal device (e.g., of the one or more terminal devices 110), provide human-readable instructions to a plurality of servers (e.g., of the one or more servers 104). In some embodiments, a plurality of processors (e.g., of the one or more processors 106) may be configured to transform the human-readable instructions into one or more machine-level and/or machine-interpretable instructions which may be implemented and/or acted upon by one or more of the plurality of processors, stored and accessed via one or more of the pluralities of memories, and/or other components of the plurality of servers. In some embodiments, one or more portions of the plurality of processors (e.g., subsets of the plurality of processors indicated by percentages and/or fractions thereof) may be configured to process and/or act upon at least a portion of the human-readable, machine-level, and/or machine-interpretable instructions. For example, the human-readable instructions may indicate that a fraction (e.g., a quarter) of the plurality of processors should process and/or act upon at least some of the instructions.

In some embodiments, at least one processor (e.g., of the one or more processors 106) may be configured to monitor inputs received from one or more sources, for example, such as the terminal devices 110, the users 112, and/or other sources. Each server 104_a-n_ may include at least one of the one or more processors 106. In some embodiments, the at least one processor may be configured to respond, based on predetermined logic, to the received inputs. For example, the at least one processor may be configured to respond variously to different inputs and/or to different types of inputs. Moreover, the one or more processors 106 (including the at least one processor discussed above) may be configured to automatically and/or independently (e.g., using AI) perform various tasks and/or processes in accordance with the various embodiments described herein. In some embodiments, the one or more processors 106 may include at least: one or more central processing units (CPUs); one or more graphics processing units (GPUs); one or more tensor processing units (TPUs); one or more neural processing units (NPUs); one or more quantum processing units (QPUs); one or more controllers; one or more microcontrollers; one or more microprocessors; one or more field-programmable gate arrays (FPGAs); one or more application-specific integrated circuits (ASICs); one or more neuromorphic chips; and/or any other type of processor or processing hardware and/or software.

In some embodiments, the one or more databases 108 may be configured to store data including at least: instructions (e.g., human-readable instructions, machine-level instructions, machine-interpretable instructions, and/or the like), executable code (e.g., preexisting code, in-progress code; and/or any other type of code), and/or any other types of data. For example, data stored in the one or more databases 108 may include training data for various AI models and/or AI agents, feedback data for the various AI models and/or AI agents, and/or the like. In some embodiments, the one or more databases 108 may implement at least: one or more relational databases (e.g., SQL databases and/or the like); one or more non-relational/partially relational databases (e.g., NoSQL databases and/or the like); one or more vector databases; one or more graph databases; one or more time series databases; one or more in-memory databases; one or more AI-enabled databases; one or more AI-native databases; and/or any other types of databases. In some embodiments, the one or more databases 108 may use various types of non-volatile memory devices, various types of non-volatile media devices, and/or other types of hardware. For example, non-volatile memory devices may include at least: semiconductor memory devices (e.g., EPROM, EEPROM, flash memory devices, etc.); magnetic disks (e.g., internal hard disks, removable disks, etc.); magneto-optical disks; CD-ROM disks; DVD-ROM disks, and/or other non-volatile memory devices.

In some embodiments, the one or more terminal devices 110 may be one or more client computing systems or portions thereof configured with a user interface through which the one or more users 112 are enabled to send instructions to any one or more components of the system 100, for example, such as the network 102, the one or more servers 104, and/or the like. In some embodiments, the one or more terminal devices 110 may include at least: one or more computers; one or more computing entities; one or more desktop computers; one or more laptop computers; one or more mobile phones; one or more tablet devices; one or more notebook devices; one or more gaming devices; one or more IoT devices; one or more network connected virtual machines; one or more thin clients or terminal devices that provide display and input capabilities while relying on remote servers (e.g., one or more of the servers 104_a-n_) for processing and computational tasks; one or more processing devices; and/or any number of other computing devices and/or systems.

The system 100 may be configured to execute one or more of the various stages of the agentic AI augmentation framework to generate, optimize, automate, and/or otherwise modify any one or more portions of a software development lifecycle based on at least one non-transitory computer-readable medium (e.g., the medium of the memories 114_a-n_ and/or databases 108_a-n_) comprising computer program instructions that, when executed by at least one processor (of the one or more processors 106), cause the system 100 to implement, at least partially, the agentic AI augmentation framework. In some embodiments, the system 100 (whether the same system or another iteration) may be configured to execute one or more of the various stages of the code modernization framework (e.g., the framework shown and described with respect to FIGS. 11-18). In some embodiments, the system 100, using any one or more of its components, may be configured at least to: transmit data; receive data; operate on data; process data; display data; store data; determine data; create data; generate data; monitor data; evaluate data; compare data; and/or the like, wherein the term "data" may refer to data, content, information, and/or the like.

Figure 2:
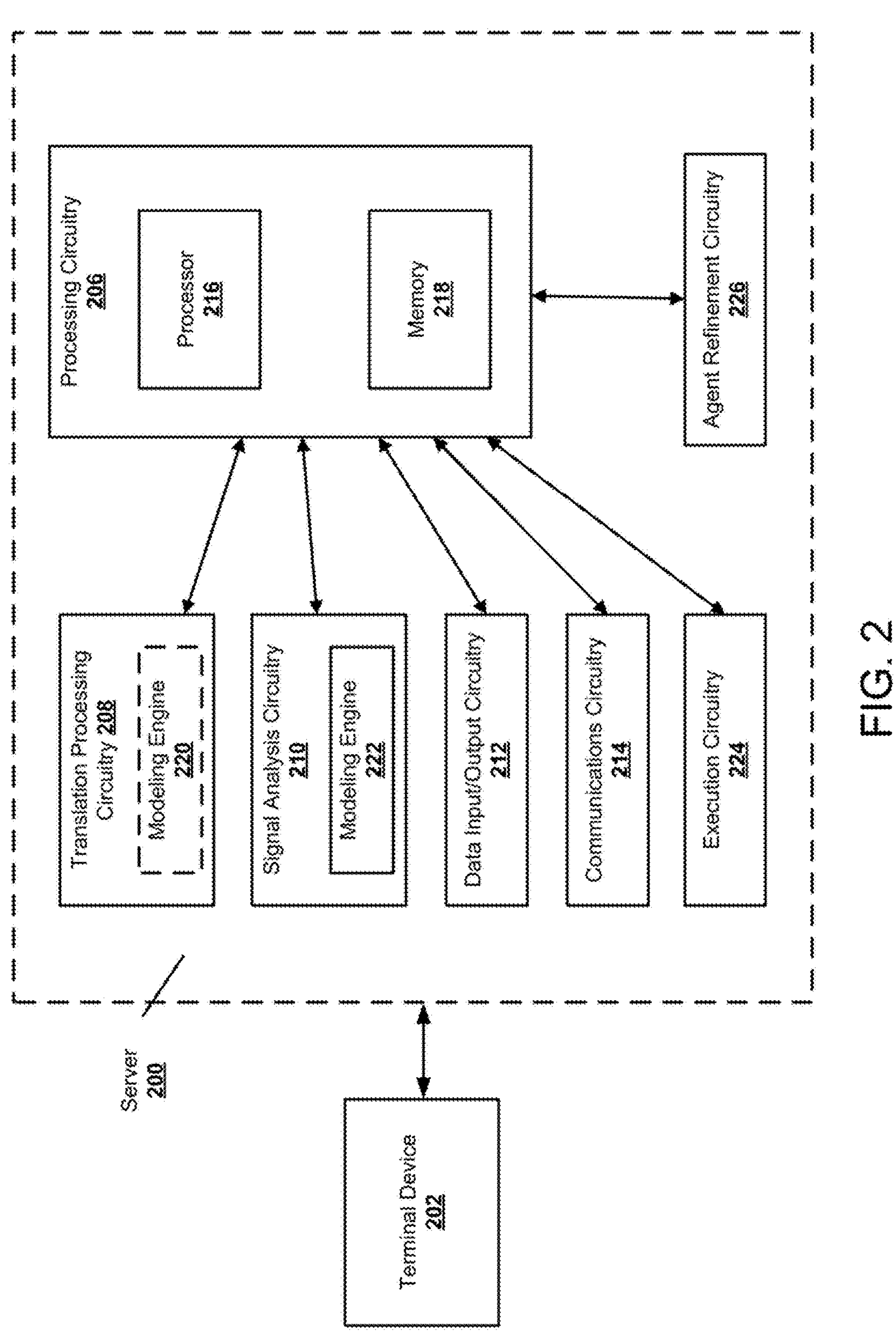
FIG. 2 shows an example sever system and terminal in accordance with at least one embodiment of the present disclosure.

Referring now to FIG. 2, an example of a server 200 and a terminal device 202 is illustrated in accordance with one or more embodiments of the present disclosure. While a single server 200 is depicted, this server is an example of any or all of the servers 104_a-n_ illustrated in FIG. 1. Similarly the terminal device 202 may correspond to any or all of the terminal devices 110_a-n_ shown in FIG. 1. The depicted server 200 includes a processing circuitry 206 comprising a processor 216 and a memory 218. The processor 216 may be an example of any or all of the processors 106_a-n_ shown in FIG. 1. The memory 218 may be an example of any or all of the memories 114_a-n_ shown in FIG. 1. The server 200 as illustrated further includes a translation processing circuitry 208, a signal analysis circuitry 210, a data input/output circuitry 212, and a communications circuitry 214. As used herein, the terminal device 202 is an example of the one or more terminal devices 110 as shown in FIG. 1. In some embodiments, the processor 216 is an example of the one or more processors 106 as shown in FIG. 1 and the memory 218 is an example of the one or more memories 114 shown in FIG. 1. The server 200 may be generically referred to as an "apparatus" in some embodiments.

As used herein, the terminal device 202 may be configured to enable a user (e.g., such as the one or more users 112) to input, provide, transmit, and/or otherwise send instructions (e.g., input commands, and/or the like) to the server 200, including directly or via the network (e.g., network 102 shown in FIG. 1). As used herein, the terminal device 202 may be configured to enable the user to input, provide, transmit, and/or otherwise send different instructions to respective servers and/or processors.

In some embodiments, the server 200 includes the translation processing circuitry 208, which may be configured to process and/or act on instructions received from a user via the terminal device 202. In various embodiments, the terminal device 202 may be located at the same location as the server 200 and/or at other locations.

In some embodiments, the server 200 may include a processing circuitry 206 as shown in FIG. 2. It should be noted, however, that the elements illustrated in and described with reference to FIG. 2 below may not be mandatory and thus one or more may be omitted in certain embodiments. Additionally, some embodiments, may include further or different elements beyond those illustrated in and described with reference to FIG. 2. In some embodiments, the functionality of the server(s) or any other computing devices or any subset thereof described herein may be performed by a single server 200 or multiple servers 200. In some embodiments, the server 200 may comprise one or a plurality of physical devices, including distributed, cloud-based, or local devices.

Although some elements are described with respect to functional limitations, it should be understood that the particular implementations necessarily include the use of particular computing hardware, such as the hardware shown in FIG. 2. It should also be understood that certain of the elements described herein may include similar or common hardware. For example, two sets of circuitries for example, may both leverage use of the same processor(s), network interface(s), storage medium(s), or the like, to perform their associated functions, such that duplicate hardware is not required for each set of circuitry and a single physical circuitry may be used to perform the functions of multiple circuitries described herein. The use of the term "circuitry" as used herein with respect to elements of the servers described herein should therefore be understood to include particular hardware configured to perform the functions associated with the particular circuitry as described herein.

In some embodiments, "circuitry" may include processing circuitry, storage media, network interfaces, input/output devices, or the like. In some embodiments, other elements of the server 200 may provide or supplement the functionality of another particular set of circuitry. For example, the processor 216 in some embodiments provides processing functionality to any of the sets of circuitries, the memory 218 provides storage functionality to any of the sets of circuitry, the communications circuitry 214 provide network interface functionality to any of the sets of circuitry, or the like.

The server 200 may include or otherwise be in communication with processing circuitry 206 that is configurable to perform actions in accordance with one or more example embodiments disclosed herein. In this regard, the processing circuitry 206 may be configured to perform or control performance of one or more functionalities of the server 200 in accordance with various example embodiments, and thus may provide means for performing functionalities of the server 200 in accordance with various example embodiments. The processing circuitry 206 may be configured to perform data processing, application, and function execution, or other processing and management services according to one or more example embodiments. In some embodiments, the server 200 or a portion(s) or elements(s) thereof, such as the processing circuitry 206, may be embodied as or comprise a chip or chip set. In other words, server 200 or the processing circuitry 206 may comprise one or more physical packages (e.g., chips) including materials, elements or wires on a structural assembly (e.g., a baseboard). The structural assembly may provide physical strength, conservation of size, or limitation of electrical interaction for element circuitry included thereon. The server 200 or the processing circuitry 206 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 206 may include a processor 216 (or co-processor or any other processing circuitry assisting or otherwise associated with the processor) and, in some embodiments, such as that illustrated in FIG. 2, may further include memory 218. The processing circuitry 206 may be in communication with or otherwise control a user interface (e.g., embodied by data input/output circuitry 212) or a communications circuitry 214 for facilitating communication elsewhere, such as with the terminal device 202. As such, the processing circuitry 206 may be embodied as a circuit chip (e.g., an integrated circuit chip) configured (e.g., with hardware, software or a combination of hardware and software) to perform operations described herein.

The processor 216 may be embodied in a number of different ways. For example, the processor 216 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 216 may comprise a plurality of processors. The plurality of processors may be in operative communication with each other and may be collectively configured to perform one or more functionalities of the server 200 as described herein. In some example embodiments, the processor 216 may be configured to execute instructions stored in the memory 218 or otherwise accessible to the processor 216. As such, whether configured by hardware or by a combination of hardware and software, the processor 216 may represent an entity (e.g., physically embodied in circuitry-in the form of processing circuitry 206) capable of performing operations according to embodiments of the present disclosure while configured accordingly. Thus, for example, when the processor 216 is embodied as an ASIC, FPGA or the like, the processor 216 may be specifically configured hardware for conducting the operations described herein. Alternatively, as another example, when the processor 216 is embodied as an executor of software instructions, the instructions may specifically configure the processor 216 to perform one or more operations described herein. The use of the terms "processor" and "processing circuitry" may be understood to include a single core processor, a multi-core processor, multiple processors internal to the server 200, or one or more remote or "cloud" processor(s) external to the server 200.

In some example embodiments, the memory 218 may include one or more non-transitory memory devices such as, for example, volatile or non-volatile memory that may be either fixed or removable. In this regard, the memory 218 may comprise a non-transitory computer-readable storage medium. It will be appreciated that while the memory 218 is illustrated as a single memory, the memory 218 may comprise a plurality of memories. The memory 218 may be configured to store information, data, applications, instructions or the like for enabling the server 200 to carry out various functions in accordance with one or more example embodiments. For example, the memory 218 may be configured to buffer input data for processing by the processor 216. Additionally or alternatively, the memory 218 may be configured to store instructions for execution by the processor 216. The memory 218 may include one or more databases that may store a variety of files, contents, or data sets. Among the contents of the memory 218, applications may be stored for execution by the processor 216 in order to carry out the functionality associated with each respective application. In some cases, the memory 218 may be in communication with one or more of the processors 216, data input/output circuitry 212 or communications circuitry 214, via a bus(es) for passing information among elements of the server 200.

The translation processing circuitry 208 may be configured to implement one or more portions of an AI architecture, for example, such as any of the AI models and/or AI agents described herein. In some embodiments, the translation processing circuitry 208 may be configured to receive the instructions input, provided, transmitted, and/or otherwise sent by the user, such as via the terminal device 202. The instructions may be human-readable (e.g., natural language) and/or computer-readable (e.g., computer-executable, machine-level, machine-interpretable, and/or the like) in accordance with any of the embodiments herein. Any agent which communicates with a user may make use of a translation processing circuitry 208. In some embodiments, the translation processing circuitry 208 may be configured to transform human-readable instructions into computer-readable instructions using one or more natural language processing (NLP) models (e.g., the one or more NLP models may be AI models). For example, the translation processing circuitry 208 may be configured to identify specific words, phrases, and/or commands using the one or more NLP models. The translation processing circuitry 208 may be configured to then correlate the identified words, phrases, and/or commands to configurable device processing machine parameters and subsequently translate the identified words, phrases, and/or commands into computer-readable (e.g., computer-executable, machine-level, machine-interpretable, etc.) parameters.

As an example, the requirements-gathering phase, work item generation phase, and coding phase of the agentic AI augmentation framework for SDLCs rely on the tasks, actions, and/or processes performed by the translation processing circuitry 208. As another example, the code preparation phase, the code modernization phase, and/or the UI modernization process may rely on the tasks, actions, and/or processes performed by the translation processing circuitry 208. In some embodiments, the requirements-gathering phase includes one or more human-AI interactions for further refining the requirements of the executable software program product, such as, but not limited to: receiving initial instructions, for generating a computer-generated executable software program product from a user which indicate one or more requirements for the computer-generated executable software program product to generate a software functionality definition data set; conversationally communicating with the user to further refine the initial software functionality definition data set and/or to receive other instructions such as an additional software functionality definition data set; suggesting additional features for the computer-generated executable software program product; presenting the user with proposed features of the computer-generated executable software program product in the form of a requirement data object; receiving feedback from the user (e.g., via the terminal device 202) to finalize the software functionality definition data set and eventually the requirement data objects; updating the proposed features; and/or other requirements-gathering tasks.

Similarly, the work item processing phase may receive the requirement data object(s) and generate one or more code generation work prompt sets. In some instances this work item processing may be performed autonomously with or without receiving additional input from the user requiring the translation processing circuitry. The coding phase may include the code preparation subphase, during which vectorized code context vector stores are prepared and/or a code implementation subphase, during which the code represented by the vectorized code context vector stores are modified based on the code generation work prompt sets.

In some embodiments, the translation processing circuitry 208 may be configured to process user inputs across different stages of the work item processing phase and coding phase through interpretation mechanisms. During the work item processing phase, the translation processing circuitry 208 may receive user inputs related to story prioritization, task breakdown preferences, or acceptance criteria modifications, and may translate these natural language inputs into structured data formats that can be processed by downstream AI agents for generating or refining code generation work prompt sets.

In some embodiments, the translation processing circuitry 208 may interpret user feedback regarding generated work items, such as requests to modify task scope, adjust implementation approaches, or specify technical constraints, and may convert these inputs into machine-readable parameters that guide the automated work item creation process. The circuitry may also process user inputs related to development methodology preferences, coding standards, or architectural decisions that influence how requirements are decomposed into executable tasks.

During the coding phase, the translation processing circuitry 208 may handle user inputs related to code preparation activities, such as repository selection preferences, context enrichment parameters, or vectorization configuration settings. The circuitry may translate natural language descriptions of code modification requirements into structured prompts that can be processed by coding agents, including change isolation agents, code change agents, and review agents.

In some cases, the translation processing circuitry 208 may interpret user feedback on generated code outputs, such as requests for specific implementation patterns, performance optimizations, or compliance requirements, and may convert these inputs into actionable parameters for code modification processes. The circuitry may also process user inputs related to testing preferences, deployment configurations, or quality assurance criteria, translating these natural language specifications into machine-interpretable instructions that guide the automated coding workflow throughout the code implementation subphase.

In some embodiments, the translation processing circuitry 208 may include a modeling engine 220 that serves as a computational component configured to execute one or more models for facilitating input translation and interpretation operations within the server 200. The modeling engine 220 may be implemented as a processing unit that manages and coordinates the execution of various AI models, including large language models (LLMs), natural language processing models, and other machine learning architectures that support the translation and interpretation functions of the translation processing circuitry 208.

In some embodiments, the requirements-gathering phase, work item phase, and/or coding phase may include and/or be characterized as prompt engineering, wherein user prompts are refined (e.g., through iterative processes) to better communicate desired outcomes to an AI model, AI agent, and/or the like. In some embodiments, prompts may include at least: user inputs (e.g., instructions, and/or the like) and/or instructions to learn from, update, and/or otherwise use one or more of: (i) requirements documentation, (ii) documentation, (iii) preexisting code, and/or the like. In some embodiments, the prompt engineering is configured to produce a refined list of instructions, based on initial user instructions, which has been adjusted and/or expanded based on the dialogue (e.g., conversational communication) between the user and the AI model and/or AI agent. The translation processing circuitry 208 and/or signal analysis circuitry 210 (described herein) may, in coordination with the other circuitries, be configured to facilitate the prompt engineering.

For example, a prompt engineering process in the context of AI augmentation frameworks for SDLCs and/or code modernization (which may include UI modernization) may include at least: (i) receiving, from a user and to a system implementing a, AI model and/or AI agent, initial instructions (e.g., prompt(s)) indicating one or more desired features, parameters, requirements, and/or the like of a computer-generated executable software program product; (ii) retrieving, by the system and from the user and/or at least one database, one or more configuration data sets (and/or predefined context data) indicating additional information and/or providing examples of the desired features, parameters requirements, and/or the like; (iii) participating in a dialogue (e.g., conversational communication) with the user to further refine the user prompts; (iv) interpreting, using one or more NLP AI models and/or the like to identify specific words, phrases, and/or commands, any user prompts and/or instructions; (v) participating in iteratively refining the user prompts by providing the user with proposed software development instructions generated based on any or all user prompts and/or instructions; and/or other prompt engineering actions.

In some embodiments, the signal analysis circuitry 210 may be configured to autonomously (e.g., without direct user interference) or semi-autonomously (e.g., directly or indirectly in response to input from a user, such as those facilitated by the translation processing circuitry 208) generate analysis, outputs, and instructions for various devices, for example, such as the processor 216, other devices included in the server 200, and/or other devices external to the server 200. In some embodiments, the instructions generated by the signal analysis circuitry 210 may be generated based on (and/or responsive to) one or more messages. In some embodiments, the one or more messages may be received by the signal analysis circuitry 210 from one or more devices, for example, such as the processor 216 and/or other devices included in the server 200. For example, the processor 216 may send the one or more messages to the server 200 (wherein the one or more messages are received by the signal analysis circuitry 210) to indicate one or more issues to be resolved and/or one or more tasks to be performed.

In some embodiments, the signal analysis circuitry 210 may include a modeling engine 222 that serves as a computational component configured to execute one or more models for facilitating data analysis and output generation operations within the agentic AI augmentation framework and/or code modernization framework. The modeling engine 222 may be implemented as a processing unit that manages and coordinates the execution of various AI models, including generative AI models, large language models (LLMs), machine learning models, and other AI architectures that support the analytical and generative functions of the signal analysis circuitry 210.

In some embodiments, the signal analysis circuitry 210 may serve as the primary computational entity responsible for the cognitive processing functions of AI agents within the system, including the analytical reasoning, decision-making, and output generation capabilities that characterize AI agent behavior. The signal analysis circuitry 210 may implement the core "thinking" processes of AI agents by executing complex algorithms, pattern recognition operations, and inference mechanisms that enable agents to process input data, analyze contextual information, and generate appropriate responses or actions based on their specific functional requirements.

The modeling engine 222 may execute various specific AI models that correspond to the different types of AI agents described herein, including but not limited to models for requirements analysis agents, work item generation agents, code context agents, vectorize code agents, change isolation agents, code change agents, code change reviewer agents, code tester agents, and code change commit agents. Each of these models may be optimized for particular tasks within the software development lifecycle, with the modeling engine 222 providing the computational infrastructure necessary to support their execution and coordination.

In some embodiments, the signal analysis circuitry 210 may coordinate the execution of multiple models simultaneously or sequentially, depending on the complexity of the tasks being performed and the interdependencies between different AI agents, such as those as described in some examples herein. The circuitry may implement load balancing mechanisms, resource allocation strategies, and scheduling algorithms to optimize the performance of the modeling engine 222 when executing multiple AI models concurrently.

The modeling engine 222 may support various types of model architectures, including transformer-based models for natural language processing tasks, neural networks for pattern recognition and classification, and generative models for code generation and modification tasks. The engine may also implement model switching capabilities that allow different AI agents to utilize different underlying models based on their specific functional requirements and performance optimization needs.

In some embodiments, the translation processing circuitry 208 and the signal analysis circuitry 210 may rely on one or more AI models (e.g., generative AI models, LLMs, NLP models, machine learning models, and/or other AI models). In some embodiments, an AI agent may implement an AI model. For example, various AI agents may be configured to implement various AI models, for example: (i) wherein a first AI agent implements a first AI model, a second AI agent implements a second AI model, a third AI agent implements a third AI model, and so on; (ii) wherein a first AI agent implements a first plurality of AI models, a second AI agent implements a second plurality of AI models, a third AI agent implements a third plurality of AI models, and so on; and/or (iii) an implementation based on any combination of (i) and (ii).

In some embodiments, the one or more AI models may be trained using one or more datasets of training data, wherein the training further includes updating one or more parameters of the one or more AI models based on the one or more datasets of training data and/or additional data, for example, such as instructions, feedback, and/or the like received from the user (e.g., via the terminal device 202 and/or any other client device). In some embodiments, the training may be implemented using iterative processes.

In some embodiments, the data input/output circuitry 212 may be configured to transmit and/or otherwise send information generated by at least the translation processing circuitry 208 and/or the signal analysis circuitry 210. In some embodiments, the input/output circuitry 212 is in communication with processor 216 to provide such functionality. The input/output circuitry 212 may include one or more user interface(s) or include a display that may comprise the user interface(s) rendered as a web user interface, an application interface, or the like, to the display of a client device, a backend system, or the like, these interfaces may be rendered remotely, such as on a terminal device 202, or locally (e.g., in a monitor attached to the server 200). The input/output circuitry 212 may be in communication with the processing circuitry 206 to receive an indication of a user input at the user interface or to provide an audible, visual, mechanical, or other output to the user. As such, the input/output circuitry 212 may include, for example, a keyboard, a mouse, a joystick, a display, a touch screen display, a microphone, a speaker, or other input/output mechanisms. As such, the input/output circuitry 212 may, in some example embodiments, provide means for a user to access and interact with the server 200. The processor 216 or input/output circuitry 212 comprising or otherwise interacting with the processor 216 may be configured to control one or more functions of one or more user interface elements through computer program instructions (e.g., software or firmware) stored on a memory accessible to the processor 216 (e.g., stored on memory 218, or the like). For example, the data input/output circuitry 212 may be configured to present the generated information to the user (e.g., to an interface run on a terminal device 202). The data input/output circuitry 212 may provide output to the user or an intermediary device and, in some embodiments, may receive one or more indication(s) of user input directly or indirectly. Specifically, the input/output circuitry may cooperate with the translation processing circuitry 208 to facilitate receiving and outputting data associated with the system to and from the users.

The communications circuitry 214 may include one or more interface mechanisms for enabling communication with other devices or networks. In some cases, the communications circuitry 214 may comprise any means such as a device or circuitry embodied in either hardware, or a combination of hardware and software that is configured to receive or transmit data from/to a network or any other device or component in communication with the processing circuitry 206. The communications circuitry 214 may, for example, include an antenna (or multiple antennas) and supporting hardware or software for enabling communications with a wireless communication network (e.g., a wireless local area network, cellular network, global positioning system network, or the like) or a communication modem or other hardware/software for supporting communication via cable, digital subscriber line (DSL), universal serial bus (USB), Ethernet or other methods. The communications circuitry 214 may be configured to enable the functionalities of the servers 104*a-n* to connect with the network 102 shown in FIG. 1 or any other device or component in communication with the processing circuitry 206.

In some embodiments, the server 200 may include execution circuitry 224 that serves as a computational component configured to generate computer executable instructions for facilitating interactions between the server 200 and external hardware and/or software systems. The execution circuitry 224 may be implemented as a dedicated processing unit that translates high-level commands and directives from other circuitries within the server 200 into specific, actionable instructions that can be executed by and/or transmitted by the communications circuitry 214, processing circuitry 206, or other system components to interact with remote servers, systems, and computing devices.

In some embodiments, the execution circuitry 224 may receive processed outputs from the translation processing circuitry 208 and/or the signal analysis circuitry 210, and may convert these outputs into structured command sequences that enable the server 200 to perform various external operations. The execution circuitry 224 may generate instructions for API calls, database queries, file transfers, network communications, and other inter-system operations that may be required to implement the agentic AI augmentation framework's functionality and/or code modernization framework's functionality across distributed computing environments.

The execution circuitry 224 may include instruction generation capabilities that produce computer executable code in various formats, including but not limited to REST API calls, GraphQL queries, database connection strings, file system operations, network protocol commands, and cloud service integration instructions. The circuitry may implement protocol-specific instruction generators that format commands according to the requirements of different external systems, ensuring compatibility and proper communication across diverse technological platforms.

The execution circuitry 224 may coordinate with the communications circuitry 214 to ensure that generated instructions are properly formatted for transmission over various network protocols and communication channels. The circuitry may also interface with the processing circuitry 206 to provide instructions for local execution of tasks that support external system interactions, such as data preprocessing, authentication token management, and response parsing operations.

In some embodiments, the execution circuitry 224 may maintain instruction templates and patterns that can be dynamically populated with specific parameters based on the requirements of different AI agents within the augmentation framework and/or code modernization framework. The circuitry may support both synchronous and asynchronous instruction generation, enabling the system to handle real-time interactions as well as batch processing operations that may be required for complex software development workflows.

The execution circuitry 224 may implement security and authentication instruction generation capabilities that ensure all external system interactions comply with appropriate security protocols and access control requirements. The circuitry may generate instructions for token-based authentication, certificate management, encrypted communications, and other security measures that may be necessary for secure inter-system operations within enterprise environments.

In some embodiments, the server 200 may include agent refinement circuitry 226 that serves as a computational component configured to train and manage AI agents within the agentic AI augmentation system and/or code modernization system through the execution of various learning functions and optimization processes. The agent refinement circuitry 226 may be implemented as a dedicated processing unit that coordinates multiple machine learning methodologies to continuously improve the performance, accuracy, and effectiveness of AI agents operating within the software development lifecycle framework.

The agent refinement circuitry 226 may implement various capabilities of the server 200, such as reinforcement learning capabilities, which enable AI agents to learn optimal behaviors through training and/or interaction with their operational environment. An example process implemented by the agent refinement circuitry 226 is shown with respect to FIG. 10. In some embodiments, the circuitry may execute reward-based learning algorithms that provide feedback signals to AI agents based on the quality of their outputs, decision-making accuracy, and alignment with desired outcomes. The reinforcement learning mechanisms may utilize policy gradient methods, Q-learning algorithms, or actor-critic architectures to optimize agent behavior over time, enabling agents to adapt their responses and improve their performance based on accumulated experience and feedback from users, other agents, and system performance metrics.

In some embodiments, the agent refinement circuitry 226 may execute supervised learning processes that train AI agents using labeled datasets and ground truth examples relevant to their specific functions within the software development lifecycle. The circuitry may coordinate the training of requirements analysis agents using datasets of requirements and corresponding software specifications, work item generation agents using examples of user stories and task breakdowns, and code generation agents using repositories of high-quality code examples paired with their corresponding requirements and documentation. The supervised learning capabilities may implement various training algorithms including gradient descent optimization, backpropagation, and transfer learning techniques to enhance agent performance on specific tasks.

The agent refinement circuitry 226 may also implement unsupervised learning methodologies that enable AI agents to discover patterns, relationships, and insights from unlabeled data sources. In some embodiments, the circuitry may execute clustering algorithms, dimensionality reduction techniques, and anomaly detection methods that help agents identify hidden structures in code repositories, requirements documents, and software development workflows. The unsupervised learning capabilities may enable agents to automatically discover coding patterns, architectural principles, and best practices from large codebases without explicit supervision, thereby improving their ability to generate contextually appropriate and architecturally consistent code modifications.

In some embodiments, the agent refinement circuitry 226 may coordinate multi-agent learning scenarios where different AI agents learn collaboratively or competitively to improve overall system performance. The circuitry may implement federated learning approaches that allow agents to share knowledge and insights while maintaining data privacy and security requirements. The multi-agent learning capabilities may enable the system to optimize the coordination and communication patterns between different agents, such as improving the handoff processes between code context agents and vectorize code agents, or enhancing the collaboration between code change agents and code review agents.

The agent refinement circuitry 226 may implement adaptive learning rate scheduling and hyperparameter optimization mechanisms that automatically adjust training parameters based on agent performance metrics and learning progress. In some embodiments, the circuitry may utilize Bayesian optimization, grid search, or evolutionary algorithms to identify optimal configurations for different AI models and agents. The adaptive optimization capabilities may enable the system to maintain training efficiency while preventing overfitting and ensuring stable learning convergence across diverse agent types and operational contexts.

Figure 3:
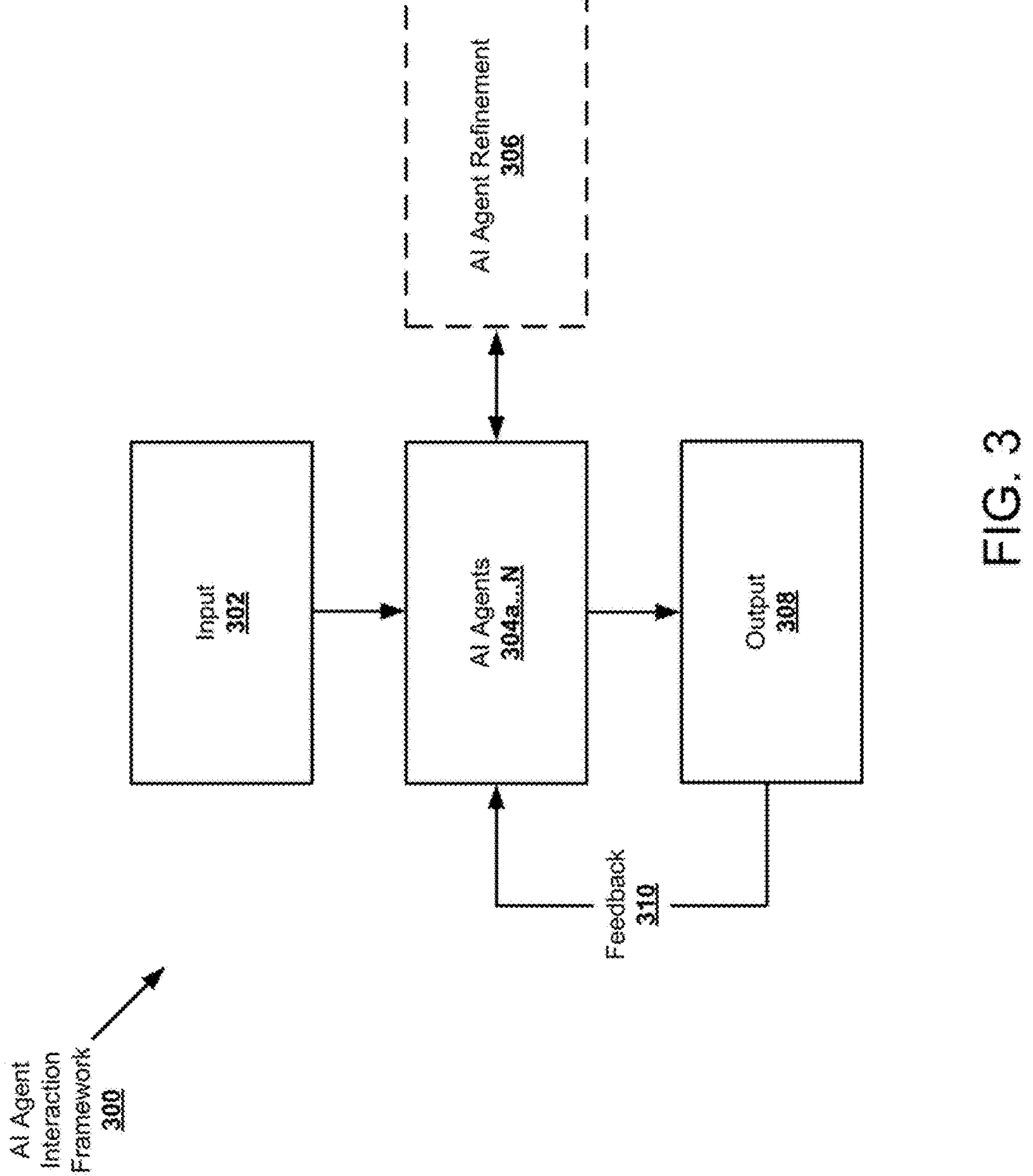
FIG. 3 shows an example block diagram of an AI agent interaction framework in accordance with at least one embodiment of the present disclosure.

In some embodiments, the agent refinement circuitry 226 may execute continuous learning processes that enable AI agents to adapt and improve their performance based on real-time feedback and new data encountered during operational deployment (e.g., feedback 310 as described with respect to FIG. 3 herein). The circuitry may implement online learning algorithms that allow agents to update their models incrementally without requiring complete retraining, enabling the system to adapt to changing requirements, new coding standards, or evolving software development practices. The continuous learning capabilities may include mechanisms for catastrophic forgetting prevention, ensuring that agents retain previously learned knowledge while incorporating new information.

The agent refinement circuitry 226 may coordinate with other system components to implement comprehensive evaluation and validation frameworks that assess agent performance across multiple dimensions including accuracy, efficiency, consistency, and alignment with user preferences. In some embodiments, the circuitry may execute A/B testing protocols, cross-validation procedures, and performance benchmarking processes that provide quantitative and qualitative assessments of agent improvements resulting from various learning interventions. The evaluation capabilities may enable the system to make data-driven decisions about which learning approaches and model configurations provide the most significant performance improvements for specific agent types and operational scenarios.

Example AI Agent Framework

Referring now to FIG. 3, an example block diagram of an AI agent interaction framework 300, for example, to be used for software development lifecycles, is illustrated in accordance with one or more embodiments of the present disclosure. The AI agent framework defines a high level process flow executed by an AI agent to receive input, execute one or more tasks based on the agent's purpose to generate an output and then refine both the output and the AI agent itself with feedback and one or more AI agent refinement processes. The AI agent interaction framework 300 includes input 302, one or more AI agents 304*a* . . . *n* (collectively "304"), AI agent refinement 306, output 308, and feedback 310. Although the example of FIG. 3 illustrates one input, one AI agent, one AI agent refinement, one output, and one feedback, any number of these components and/or processes may be present in the AI agent interaction framework 300 and/or in similar systems.

In some embodiments, one or more of the following tasks, processes, operations, steps, and/or the like may be performed: (i) the input 302 may be provided to the one or more AI agents 304; (ii) the one or more AI agents 304 may process the input 302; (iii) the one or more AI agents 304 may produce, based on processing the input 302, output 308; and/or (iv) feedback 310 may be provided to the one or more AI agents 304. Additionally or alternatively, in some embodiments, the one or more AI agents 304 may undergo AI agent refinement 306. The AI refinement 306 may be performed based on the one or more AI agents 304 processing the input 302, based on the feedback 310, and/or based on one or more other factors. In some embodiments, the input 302 and the feedback 310 may comprise human inputs provided by users through user interfaces. Additionally or alternatively, the input 302 and the feedback 310 may comprise inputs generated by computing devices, such as another AI agent or another model running within a particular AI agent, enabling automated interactions and processing within the AI framework.

In some embodiments, the one or more AI agents 304 may include at least: one or more AI models (e.g., generative AI models such as transformer models, LLMs, NLP models, machine learning models, and/or other AI models) configured to perform a specific task or a specific set of tasks. The one or more AI agents 304 may further include one or more other algorithms, models, and/or other software-based processes. In some embodiments, the one or more AI agents 304 may be implemented using one or more processing and/or storage hardware components such as processors, memory devices, and/or the like. For example, one or more AI agents 304*a-n* may be implemented on servers 200 as shown in FIG. 1 and be integrated into a system 100 as shown in FIG. 1. In some embodiments, the one or more AI agents 304 may include one or more network communication devices and/or interfaces configured to interact, via one or more user interfaces, with one or more users and/or user devices (e.g., client devices, such as a terminal device 202 shown in FIG. 2).

In some embodiments, the AI agent refinement 306 may include one or more iterative processes. The AI agent refinement 306 may be configured to iteratively refine the one or more AI agents 304, for example, to satisfy certain parameters. For example, an AI agent (of the one or more AI agents 304) may be refined such that the AI agent produces, after refinement, outputs which increasingly become more aligned with user preferences, instructions, parameters, and/or the like. In some embodiments, the AI agent refinement 306 may operate as a comprehensive feedback-driven optimization system that continuously improves the performance and accuracy of the one or more AI agents 304 through multiple refinement mechanisms. The AI agent refinement 306 may receive performance data, error metrics, and quality assessments from the output 308 and feedback 310 components, analyzing this information to identify areas where agent behavior may be enhanced or corrected.

The AI agent refinement 306 may implement parameter adjustment mechanisms that modify the underlying AI models within the one or more AI agents 304 based on observed performance patterns. In some embodiments, the refinement process may adjust model weights, bias parameters, attention mechanisms, or other configurable elements of the AI models to improve alignment with desired outcomes. The refinement 306 may utilize gradient-based optimization techniques, reinforcement learning algorithms, or other machine learning approaches to systematically update model parameters in response to feedback signals.

In some embodiments, the AI agent refinement 306 may incorporate prompt engineering refinement capabilities that automatically adjust the prompts, instructions, or contextual information provided to the AI models based on the quality of generated outputs. The refinement process may analyze successful and unsuccessful interactions to identify optimal prompt structures, formatting patterns, or contextual cues that lead to improved agent performance across different types of software development tasks.

The AI agent refinement 306 may implement behavioral pattern analysis that examines the decision-making processes of the one or more AI agents 304 to identify recurring errors, biases, or suboptimal choices. In some cases, the refinement process may create corrective training examples or adjustment rules that guide future agent behavior away from identified problematic patterns and toward more effective approaches.

In some embodiments, the AI agent refinement 306 may support multi-agent coordination refinement, where the interactions and collaboration patterns between different AI agents within the framework are analyzed and optimized. The refinement process may adjust communication protocols, task distribution strategies, or coordination mechanisms to improve overall system efficiency and reduce conflicts or redundancies between agents.

The AI agent refinement 306 may maintain refinement history and versioning capabilities that track the evolution of agent performance over time. In some embodiments, the refinement process may implement rollback mechanisms that allow the system to revert to previous agent configurations if new refinements result in degraded performance, ensuring system stability while enabling continuous improvement.

In some cases, the AI agent refinement 306 may incorporate user preference learning that adapts agent behavior based on explicit and implicit feedback from human users interacting with the system (e.g., via feedback 310). The refinement process may analyze user acceptance rates, modification patterns, and satisfaction indicators to personalize agent responses and align outputs more closely with individual user preferences and organizational standards.

The AI agent refinement 306 may implement real-time and batch refinement modes, where immediate adjustments may be made in response to critical errors or performance issues, while more comprehensive refinements may be performed during scheduled maintenance periods using accumulated performance data and feedback from multiple interactions.

In some embodiments, the output 308 may include generated information, for example, such as code, computer-generated (e.g., at least partially AI-generated) software program products, requirement data objects, code generation work prompt sets, and/or other outputs of the one or more AI agents 304. The one or more AI agents 304 may be configured to send the generated information, as the output 308, to at least one or more devices (e.g., client devices, devices within a server system implementing the AI agent interaction framework 300, devices external to the server system implementing the AI agent interaction framework 300, and/or the like).

In some embodiments, the feedback 310 may include and/or be based on user input. For example, the one or more AI agents 304 may be configured to provide the output 308 by conversationally communicating with a user. In some embodiments, the feedback 310 may include and/or be based on non-user-provided information, for example, such as training data and/or other types of non-user-provided information. The feedback 310 may be used to iteratively update the output 308 in collaboration with the user.

In some embodiments, the system may be configured to train the at least one generative AI model based on one or more datasets, for example, such as one or more datasets of training data. In some embodiments, the training further includes updating one or more parameters of the one or more AI models based on the one or more datasets of training data and/or additional data, for example, such as instructions, feedback, and/or the like received from the user. In some embodiments, the training may be implemented using iterative processes.

The various agentic framework embodiments may be discussed herein. These frameworks may vary depending on the particular use case and application described. In the embodiments discussed herein, one or more agent management systems may be used to facilitate the development, deployment, and management of AI agents for the particular functions described herein. In some example embodiments, the agentic frameworks may comprise components such as an agent core, an agent, tools, and agent workflows. This agent framework may be used to implement any of the agents of the present disclosure. Each component may contribute to a robust and versatile framework. Additionally, the framework may incorporate advanced features such as guardrails, explainability, observability and monitoring, governance, and an agent evaluation framework, ensuring reliability and transparency. Each such component and feature may be used with the various embodiments of AI agents discussed herein, and each description of an agent may leverage the various components and features described herein to facilitate operation of the respective agentic functions. Non-limiting examples of an agent pool that may be accessed via any one or more of the processes discussed herein, in addition to those agents described in the foregoing embodiments, include a testcase documentation agent, a developer agent, a holistic analysis agent, a static analysis agent, a tech-debt isolator agent, a tech-debt strategy agent, an architect agent, and an ODE developer agent. The depicted agents may form orchestration logic behind how the example modernization framework performs code understanding, transformation, and validation in an autonomous but controlled way.

The agent core may serve as the foundational layer of the framework, encapsulating core logic that may be used in any agent. In some embodiments, the agent core may include a tool calling feature. The tool calling function may enable agents to dynamically invoke external tools based on task requirements. The tool calling is optimized for efficiency, reducing latency in tool execution. In some embodiments, the agent core may include a retrieval augmented generation (RAG) function. The RAG function may integrate a custom retrieval system into the agent that enhances LLM responses by fetching highly relevant information from external sources. RAG may include indexing and retrieval functions which improve accuracy and speed over other RAG implementations. In some embodiments, the agent core may include multiple LLM provider support, which supports integration with various large language model (LLM) providers through a unified interface. The agent core may include an adapter system that allows seamless switching between LLMs, enhancing flexibility and performance. In some embodiments, the agent core may include a multi-cloud provider client (MCP). The MCP client may enable agents to operate across multiple cloud environments.

The agent itself may be a configurable instance built upon the agent core, tailored to specific tasks through prompts and toolsets. The agent may be configured by importing the agent core and accepting at least one prompt (e.g., a user defined prompt) and a list of tools to create a unique agent. The configuration process ensures rapid instantiation and adaptability of the agent. Each agent may have customizable prompting processes to optimize agent behavior for the agent's specific use cases (e.g., the code generator agent, feature extractor agent, and the like). Moreover, the agent has integrated tools that seamlessly links the agent with the provided tools leveraging the agent core's tool-calling capabilities to execute tasks.

The tools are external capabilities that the LLM can utilize within the agents to perform actions and gather information. Many tools may be available for the specific functions described herein, including both standard and custom-developed options unique to the framework. A tool invocation process may feature a decision-making process within the LLM to select and apply the most appropriate tool for a given task. Moreover, the tools may be extensible and utilize a flexible interface that allows for the addition of new tools, enhancing the framework's versatility. Various tool examples are described herein, and some additional non-limiting examples include file operation tools, puppeteer tools, MCP tools, a CLI tool, and/or any other tool.

The agent workflows enable the sequencing of multiple agents to execute complex, multi-step processes, with a focus on modernization workflows. These workflows may sequence the agents according to the function that the workflow is configured to accomplish. The workflows may chain agents in a specific order to achieve the various outcomes described herein. The sequencing logic may optimize the overall task flow. For modernization embodiments, the task flow may be optimized for modernization and the workflow may be tailored for modernization tasks, such as updating legacy systems or automating processes, with predefined workflow templates. The workflow management processes may coordinate agent interactions, ensuring efficiency and reliability in execution.

Each of the various agent frameworks may be executed by one or more apparatuses (e.g., the server 200 shown in FIG. 2) and may be configured to interface with the various other databases, servers, and systems disclosed herein.

Each agent within the framework may be equipped with advanced features to ensure safety, transparency, and performance. For example, any one or more agent frameworks may utilize guardrails that implement a set of constraints to prevent undesirable outputs, such as biased or harmful responses. The guardrails may use an enforcement mechanism to maintain compliance with ethical and operational standards. The enforcement mechanism may include rule-based or policy-driven components configured to evaluate agent outputs against predefined ethical, operational, or compliance constraints. Upon detecting a potential violation, the mechanism may block, modify, or trigger re-evaluation of the output to ensure adherence to guardrail standards.

Moreover, the various agentic frameworks may be explainable based on the improvements discussed herein, providing insights into agent decision-making through techniques such as generating human-readable explanations of actions as agent's reflections for a user to review and subsequently to correct if needed. The agentic frameworks further include observability and monitoring improvements, offering real-time tracking of agent behavior and performance via a custom monitoring system. The agents may have governance restrictions that establish policies and controls for agent usage, framework for accountability and compliance. Agents may also be evaluated and their performance may be assessed using a methodology that combines quantitative metrics and qualitative analysis. For example, in some embodiments, the analysis may include a hybrid methodology including quantitative metrics, such as accuracy, latency, and compliance rate, and qualitative assessments, such as explainability, contextual relevance.

Figure 4:
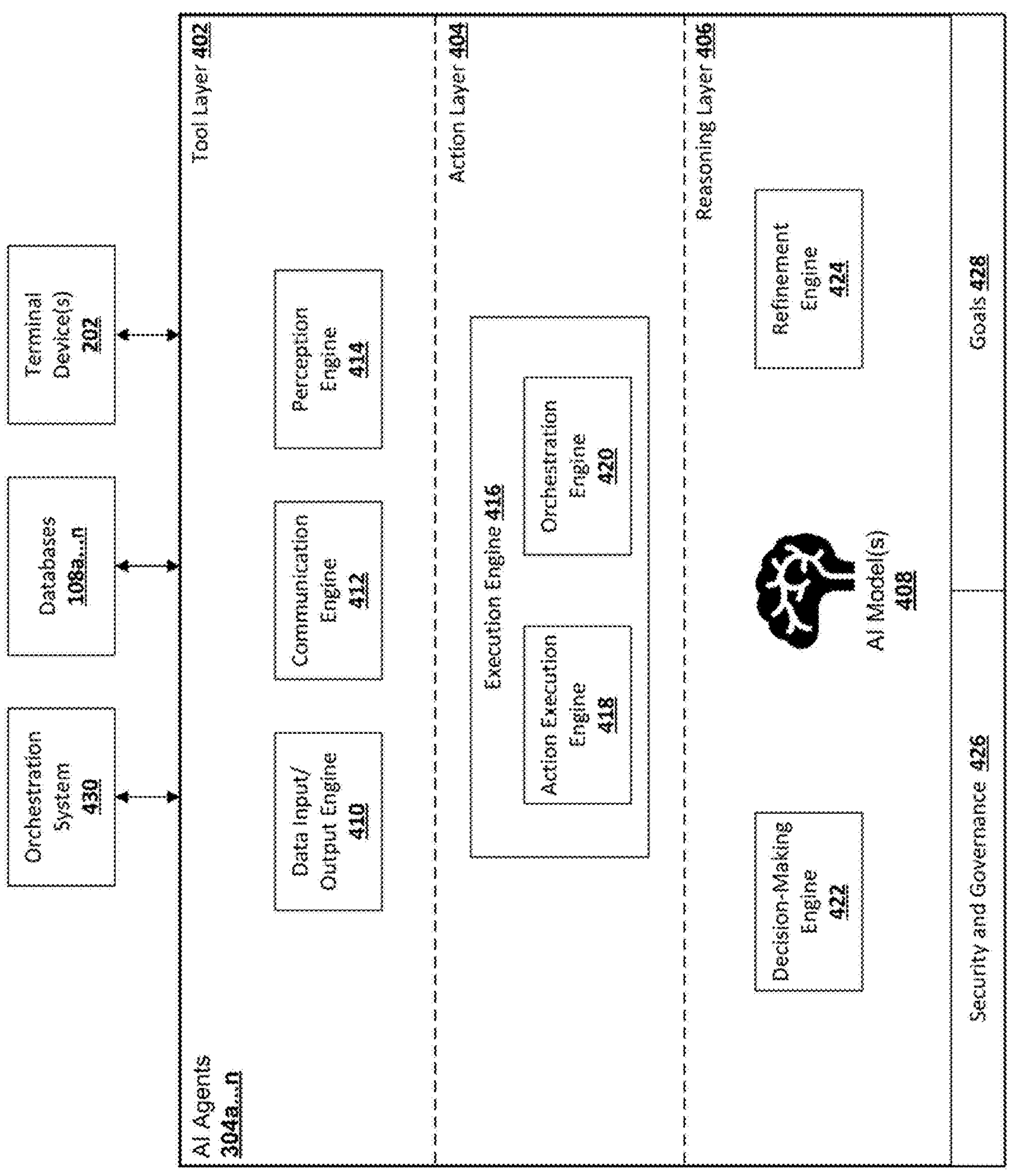
FIG. 4 shows an example block diagram of one or more AI agents and electronically connected systems of an agentic AI augmentation framework and/or code modernization framework in accordance with at least one embodiment of the present disclosure.

Referring now to FIG. 4, an example conceptual architecture of the AI agents 304*a-n* is illustrated in accordance with one or more embodiments of the present disclosure. The depicted architecture represents one example implementation of how an AI agent may be structured and organized to perform the various functions described herein. In some embodiments, one or more AI agents 304*a-n* may be relied upon to implement any one or more processes, steps, operations, features, parameters, requirements and/or the like for building at least one computer-generated (e.g., at least partially AI-generated) executable software program product. The depicted conceptual architecture comprises three distinct layers that work collaboratively to enable intelligent agent behavior: a tool layer 402, an action layer 404, and a reasoning layer 406.

The tool layer 402 may serve as the interface between the AI agent and various external agents, services, systems, and data sources. The tool layer 402 may enable one or more agents to dynamically invoke external tools based on task requirements, and is optimized for efficiency, thereby reducing latency in tool execution. In some embodiments, the tool layer 402 may be configured to gather the data necessary for the agent to operate effectively and may transmit relevant instructions back to external systems for coordinating AI operations. For example, in an instance in which the AI model 408 uses retrieval augmented generation (RAG), the AI agent 304*a-n* integrates a custom retrieval system that enhances responses of the AI model 408 by fetching highly relevant information from external sources and includes an indexing and retrieval scheme which improves accuracy and speed over conventional RAG implementations utilizing the tool layer 402 as well as the other layers of the AI agent in coordination. The tool layer 402 may also be modular and extensible and may be designed with a flexible interface which allows for the addition of new tools, thereby enhancing the agent framework's versatility.

The tool layer 402 may comprise a data input/output engine 410, which may be executed by the data input/output circuitry 212 shown in FIG. 2, for coordinating data input and output operations within the agent. In some embodiments, the data input/output engine 410 may be configured to transmit and send information generated by other components within the agentic AI augmentation system and/or code modernization system as described with respect to the data input/output circuitry 212.

The tool layer 402 may comprise a communication engine 412, which may be executed by the communications circuitry 214 shown in FIG. 2, for generating and receiving communications from other agents, services, systems, and data sources. The communication engine 412 may be configured to perform the various functions described with respect to the communications circuitry 214, enabling seamless interaction between the AI agent and external components of the system. The communications engine 412 may facilitate a multi-system environment that enables agents to operate across multiple computing environments, including cloud-based systems.

The tool layer 402 may also include a perception engine 414, which may be executed by the translation processing circuitry 208 of FIG. 2, configured to interpret raw information into a form that the system can analyze and process. The perception engine 414 may be configured to perform the various functions described with respect to the translation processing circuitry 208, including natural language processing and data transformation operations. In some embodiments, the perception engine 414 may receive human-readable instructions and transform them into computer-readable instructions using natural language processing models. The perception engine 414 may identify specific words, phrases, and commands, then correlate them to configurable device processing parameters. This enables the translation of natural language inputs into machine-interpretable parameters for downstream processing.

The action layer 404 may facilitate interactions between the reasoning layer 406 and external agents, services, systems, and data sources via the tool layer 402. In some embodiments, the action layer 404 may receive instructions from the reasoning layer 406 regarding which actions to take next, perform those actions using the tool layer 402, and provide the results back to the reasoning layer 406. The action layer 404 may include an execution engine 416, which may be executed by the execution circuitry 224 shown in FIG. 2, and may be generally configured to perform the various functions described with respect to the execution circuitry 224.

In the depicted embodiment, the execution engine 416 may include two example sub-engines that work collaboratively to implement the action layer's functionality. An action execution engine 418 may be responsible for carrying out the specific instructions received from the reasoning layer 406 as described with respect to the execution circuitry 224 of FIG. 2, translating decisions from the reasoning layer 406 into concrete actions that can be performed by the system.

An orchestration engine 420 may be responsible for coordinating interactions with other agents, services, systems, and data sources to achieve and deliver the overall system goals, managing the complex workflows that may be required for multi-step operations. The orchestration engine 420 may translate high-level instructions from the reasoning layer 406 into specific API calls, database queries, inter-agent communication protocols, and system commands that enable coordinated execution across multiple distributed components within the agentic AI augmentation framework and/or code modernization framework. The orchestration engine 420, in coordination with the other layers and engines, may be configured to enable the sequencing of one or more agents to execute complex, multi-step processes. For example, the AI agent, in coordination with an orchestration system 430 or decentralized coordination between orchestration engines 420 of two or more AI agents 304*a-n* may be configured to define workflows by chaining agents in a specific order to achieve various outcomes and may execute a sequencing logic which optimizes task flow. These coordinated processes may coordinate agent interactions, thereby improving efficiency and reliability in execution.

The reasoning layer 406 may serve as the signal analysis and "thinking" portion of the AI agent 304*a-n*, implementing the cognitive capabilities that enable intelligent decision-making and problem-solving. In the example embodiment shown, the reasoning layer 406, which may be executed by the signal analysis circuitry 210 shown in FIG. 2, may comprise at least one AI model 408 that interacts with engines to provide comprehensive reasoning capabilities. The AI model(s) 408 may be executed, for example, by the modeling engine 222 shown in FIG. 2.

The reasoning layer 406 may include a decision-making engine 422 that may be configured to coordinate with the at least one AI model 408 to determine what actions the AI agent should take and instruct the action layer 404 accordingly. The decision-making engine 422 may analyze available information, consider various options, and select appropriate courses of action based on the agent's objectives and constraints.

In some embodiments, the reasoning layer 406 may include a refinement engine 424 that may be configured to coordinate with the at least one AI model 408 to iteratively improve the performance of the reasoning layer 406. The reasoning layer 406 may support integration with various AI model providers through a unified interface and may include an adapter system which allows seamless switching between AI models (e.g., LLMs), thereby enhancing flexibility and performance. The refinement engine 424 may learn from previous experiences and improve the underlying models

408 through various mechanisms including reinforcement learning, feedback processing, and other optimization techniques that enhance agent performance over time. Also reflected in the reasoning layer 406 are the various contextual limitations on the reasoning layer 406, including the security and governance controls 426 and goals 428. The security and governance controls 426 may comprise features such as guardrails, policies, compliance requirements and safeguards, which may be global policies (e.g., as determined by a configuration file or other preference) or may be local policies specific to the individual AI agent. The AI models 408 may reference these constraints when generating outputs. Similarly the goals 428 may be generated individually for the AI agents and/or globally, and may include instructions from one or more users or other agents (e.g., requirement data objects, code generation work prompt sets, and the other instruction sets described herein). The AI agent framework may further include features such as explainability features (e.g., logging, intermediate user outputs, etc.), observability, and/or monitoring, and/or other features which provide for reliability and transparency of the human and AI software building process. In various embodiments, the security and governance 426 controls may implement guardrails comprising one or more constraints for preventing undesirable outputs (e.g., biased responses, harmful responses, and/or the like) and use enforcement mechanisms to maintain compliance with ethical and/or operational standards. Similarly, the governance controls may establish and/or enforce policies and/or controls for agent usage and may provide a framework for accountability and/or compliance. In addition or alternatively, these controls may promote explainability by providing insights into agent decision-making through various techniques such as generating human-readable explanations of actions and/or agent reflections. The observability and monitoring functions may offer real-time tracking of agent behavior and/or performance via one or more monitoring systems, which may facilitate agent evaluation to assess agent performance based on quantitative metrics and/or quantitative analysis.

It should be understood that the depicted configuration represents just one example of how an AI agent system may be configured and organized. In various embodiments, the described functions may be spread across multiple layers, engines, and/or agents, or alternatively, the functions associated with multiple layers, engines, and/or agents may be performed by a single layer, engine, and/or agent. The modular architecture shown may be adapted, modified, or reorganized based on specific implementation requirements, performance considerations, or operational constraints. The described embodiment is not intended to limit the scope of AI agent implementations and merely provides an example of how an agent may be conceptually structured to achieve the various functionalities described throughout this disclosure.

Example AI Augmentation Framework

Figure 5A:
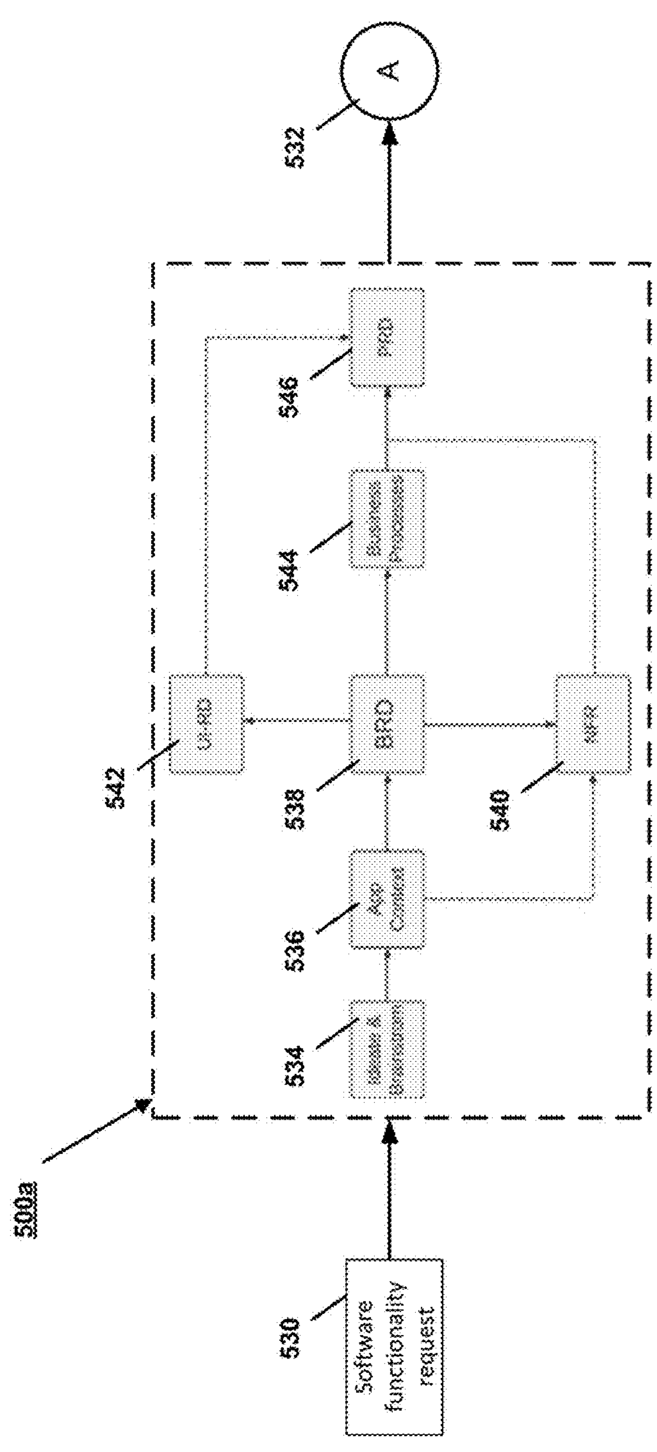
FIGS. 5A-5C show examples of an agentic AI augmentation framework or portions thereof in accordance with at least one embodiment of the present disclosure.
Figure 5B:
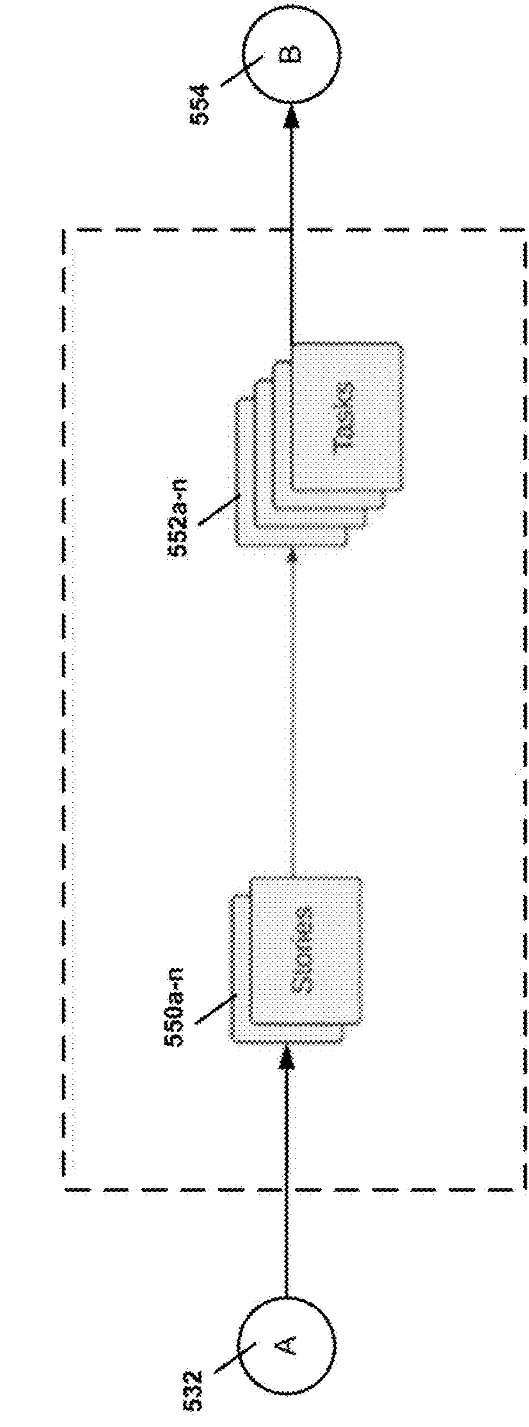
Figure 5C:
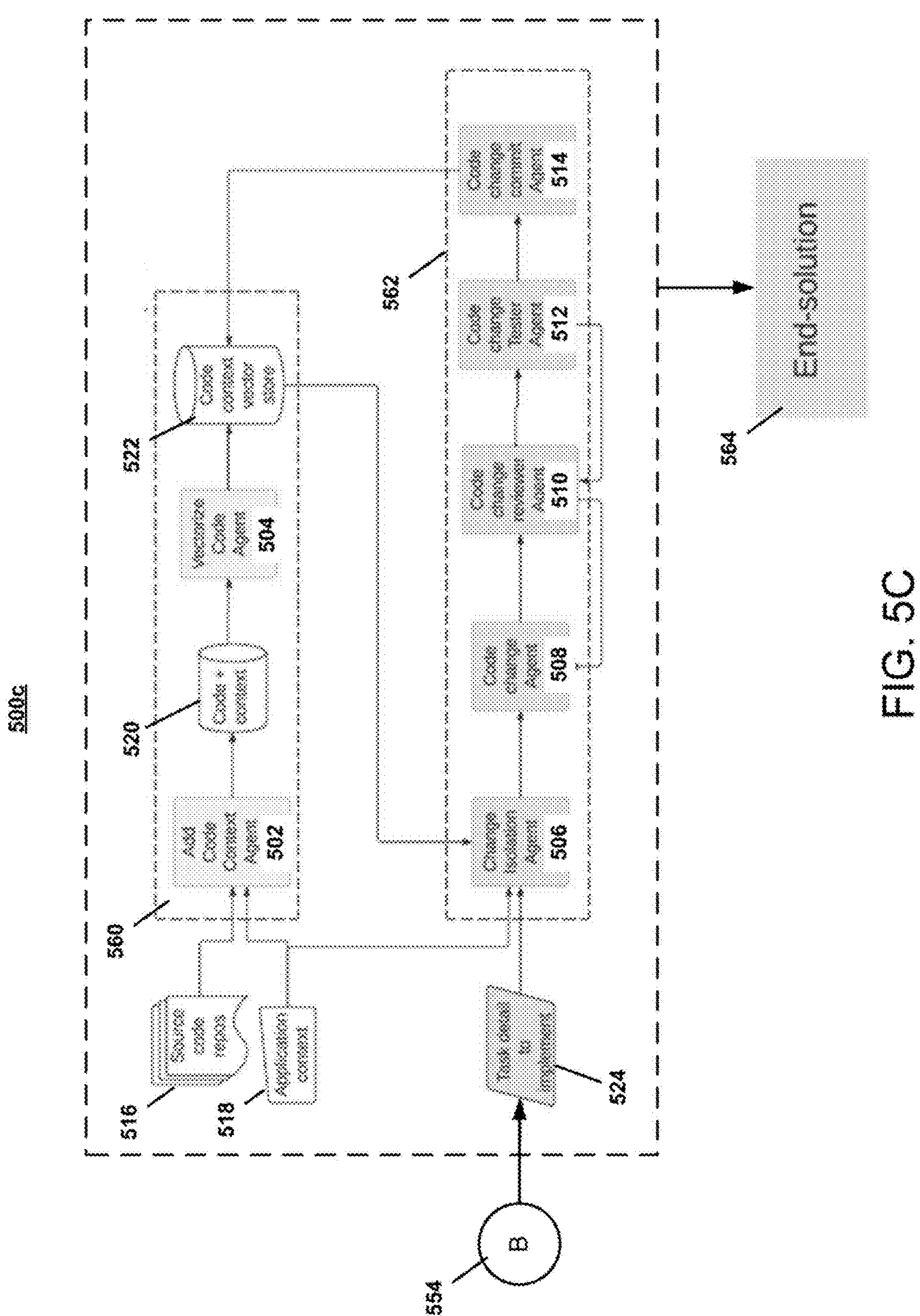

Referring now to FIGS. 5A-5C, an illustration of an example embodiment of an agentic AI augmentation framework 500*a-c* (collectively "500") is provided. The depicted AI augmentation framework 500 is configured to quickly and precisely refine the requirements for a software program product that meets a user's needs (e.g., framework portion 500*a* shown in FIG. 5A), reduce the requirements to specific work items comprising tasks represented by code generation work prompt sets (e.g., framework portion 500*b* shown in FIG. 5B), and implement efficient and accurate coding (e.g., framework portion 500*c* shown in FIG. 5C) based on the pre-coding processes. The agentic AI augmentation framework 500 reduces the number of cycles involved for clarifications, improving the quality, accuracy, and speed of both the software and the software development process while also maintaining the explainability and transparency necessary for trust in the coding process and compliance of the final software program product.

In some embodiments, one or more of the depicted steps may be combined with one or more other steps. Moreover, in some embodiments, one or more steps may be performed entirely automatically using the computer systems associated with the agentic AI augmentation framework, one or more steps may be omitted, and/or one or more steps may be generated with assistance of manual input by a user, including via one or more conversation loops at the respective steps to refine the input until it is suitable (e.g., as determined by a configuration file or one or more other parameters of the system). In various embodiments, the depicted steps may be performed jointly between a user and the agentic AI augmentation framework with an initial user input that is subsequently augmented by the agentic AI augmentation framework and/or by subsequent user review of a computer generated output. In various embodiments, the computing system of the agentic AI augmentation framework may utilize one or more AI models, including traditional machine learning models and/or generative AI (e.g., transformer) models. One or more different models, including sequences and other combinations thereof, may be used depending on the deployment, including but not limited to natively supported models with different logical capability on a cloud-based system such as AWS™ or AZURE™. In some embodiments, a multi-tiered model of generative AI combined with rules-based models or traditional machine learning may be used to generate content and verify its compliance with one or more rule sets (including but not limited to any of the requirements). In some embodiments, the various models and processes associated with the agentic AI augmentation framework may use retrieval-augmented generation to blend accurate retrieval methods with generative AI models for better code output. The retrieval-augmented generation may be provided with repositories of existing codebases, development requirements, and other context that may improve the software product generated by the system.

Reference is made to various AI agents and AI models associated with the agents in the associated framework. While multiple agents are described, all are not required in all embodiments. Each of the "agents" may include at least one AI model (e.g., a generative AI model, such as a transformer model) with or without one or more other algorithms, models, or other software based processes and corresponding processing and storage hardware components (e.g., processors, memory devices, and the like). Various embodiments may also include network communication devices and interfaces configured to interact with one or more users and/or user devices.

In various embodiments, the various frameworks, agents, and associated AI models described herein may operate modularly and independently, such that discrete tasks may be separately automated and improved without requiring reliance on the entire framework in each instance. In various embodiments, users may be provided with the entire framework and may seamlessly work with or without the various tools and agents provided by the framework, allowing seamless integration of one or more of the improvements herein without disrupting the user's software development process or forcing compliance with specific workflows.

The following describes the phases of the agentic AI augmentation framework and the processes performed during each phase by the AI agents described herein, including as described with respect to FIGS. 1-4. It should be understood that the agentic AI augmentation framework 500 shown in FIGS. 5A-5C represents just one example implementation according to various embodiments of the present disclosure and is not intended to limit the scope of the disclosure. The framework may be modified, adapted, or reorganized according to the various permutations disclosed throughout this specification and as would be appreciated by one skilled in the art in light of the present disclosure.

I. Requirements Gathering

In the depicted embodiment, the requirements gathering portion 500*c* of the agentic AI augmentation framework begins with a trigger, such as a user input of one or more software functionality requests (e.g., ideas) 530, for example, in the form of a software functionality definition data set and ends with the output of one or more requirement data objects 532. Each of the identified functional blocks of the diagram shown in FIG. 5A may be implemented by one or more AI agents (e.g., one or more AI agents 304*a-n* shown in FIGS. 3-4 and implemented via the systems shown in FIGS. 1-2), whether alone or in combination with one or more other functional blocks as described above.

Ideate and Brainstorm: At an initial ideation and brainstorming stage 534, users outline initial objectives, scope, and key features, and input the initial set of data 530 into a model of the agentic AI augmentation framework. The agentic AI augmentation framework may include AI-supported brainstorming (e.g., via generative AI) facilitated by at least one AI agent (e.g., AI agent 304*a-n* shown and described with respect to FIGS. 3-4) to refine ideas and identify actionable insights. This opinionated approach may solve requirements gathering problems associated with the modeling and/or software development environments. During this process, a collection of instructions are assembled for the AI models to streamline the downstream processes as requirement data objects 532 and ultimately code generation work prompt sets (described with respect to FIGS. 5B-5C). In some embodiments, the collected instructions form a configuration file (or a two or more configuration files) or are referenced to a separate configuration file (e.g., each configuration data set) to guide processes the AI models are configured to implement with predefined context data. Furthermore, the configuration file may comprise instructions for how the AI models should respond based on various inputs received (e.g., via a user interface, via requirements, and/or the like). In some embodiments, forming the configuration file is based on prompt engineering, wherein the AI models are provided with commands, instructions, and/or the like to establish guardrails for increasing desirable outputs from the AI models. In some embodiments, at least a portion of the configuration file may be pre-generated and/or not dependent on user input. The output of the ideation and brainstorming stage 534 may comprise application context 536 which comprises a further refined version of the software functionality definition data set comprising the output of the ideation and brainstorming process 534 and may be informed by or comprise the configuration data set.

The system may further break down and enhance the desired features of the software program product to generate a final requirement data object. For example, the app context 536 may be used to generate an initial requirements document (BRD) 538 and/or a non-functional requirements document (NRD) 540. In some embodiments, one or more agents may be dedicated to generating each of the BRD 538, NFR 540, UI-RD 542, and/or PRD 546. In some embodiments, discrete agents may be used for specific requirements. For example, separate agents may be used to generate the requirements for the interactive portions of the interface in the UI-RD (e.g., button layout and the like) and the requirements for the graphical portions of the interface in the UI-RD.

Requirements Document (BRD): A structured BRD 538 captures an initial requirements data set (e.g., the initial software functionality definition data sets described above) input by users, breaking down features such as user management and order handling. Another AI model of the agentic AI augmentation framework (or the same model the preceding step in some instances) then receives the initial BRD to analyze the BRD with a trained model made based on similar applications to identify requirements gaps, creating a final refined document defining an initial requirement data object as the basis for development.

Non-Functional Requirements (NFR): One or more models associated with the agentic AI augmentation framework may then optionally help define non-functional aspects like performance, scalability, and security by creating an NFR 540, ensuring the system meets all necessary technical and operational benchmarks. The NFR 540 may be a portion of the initial requirement data object.

User Interface Requirements Document (UI-RD): Based on the BRD 538, the agentic AI augmentation framework (e.g., via one or more AI agents) may generate both a front end user interface requirements document UI-RD 542 and a process requirements summary 544 (e.g., a back end functionality description). In each instance, the configuration data object described herein may inform the outputs of the process. The UI-RD 542 may specify user experience and design standards. AI augmentation framework may include a model to interpret and analyze the usability guidelines and compare with industry standards for enhanced UX design to ensure compliance and alignment. In some embodiments, the process requirements summary 544 may be continually updated and displayed to the user throughout two or more stages of the development process, including the requirements definition process (FIG. 5A), work item generation process (FIG. 5B), and/or coding process (FIG. 5C) so that the user can continually check and update the functional requirements of the code and trigger downstream updates of the code with natural language, high level inputs.

Product/Solution Requirements Document (PRD): As the final stage of the requirements portion 500*a* of the agentic AI augmentation framework, the agentic AI augmentation framework, with or without user input, may generate one or more detailed data sets defining functional modules for the software to be generated as the product or solution requirements document 546, which may then be output as the final requirement data object 532. The PRD 546 may comprise defined personas and services. One or more models of the agentic AI augmentation framework (e.g., instantiated within one or more AI agents) may categorize the determined functionalities of the software into modular tasks in the requirement data object 532, setting the stage for efficient code development in the downstream processes of the agentic AI augmentation framework.

Process Documentation and Upkeep: The agentic AI augmentation framework helps to create dynamic Processes that are maintained in real time, near real time, or via periodic updates by leveraging the existing BRD and PRD that are available to make sure the processes extracted are always up to date. The Process may be generated as a diagram that is continually updated to visualize the flow of the Requirements and Product/Solution Requirements as they are generated and updated. These may be displayed continuously or at periodic intervals to the user via a user interface (e.g., via a terminal device 202 as shown and described with respect to FIGS. 1-2). This diagram may lend transparency and explainability to the AI model outputs, while also allowing quick identification and adjustment of the process by a human user. The user interface may further comprise one or more input regions configured to receive user feedback on the ongoing documentation being shown so that the user can, in natural language, comment on and request changes to the development process either in real-time as the software program product is being designed and coded or asynchronously via requesting changes to already completed portions of the process. Thus, rather than merely reviewing the final output code, the user has the ability to correct any of the intermediate stages of the agentic AI augmentation framework which may be faster and more intuitive to adjust (e.g., adjusting one or more requirement document fields and/or one or more tasks of the requirement data object, which may propagate into one or more sections of the final output code). The system may then propagate the user's changes forward from the point of modification and seamlessly redo or modify the downstream processes as needed.

II. Work Item Creation

As shown in FIG. 5B herein, following the generation of the requirement data object(s) 532, a work item creation portion 500*b* of the agentic AI augmentation framework may occur. In the work item creation portion 500*b*, work items may be created by the agentic AI augmentation framework in the form of one or more code generation work prompt sets 554 generated by one or more AI agents. During this process, functionalities may be segmented into stories 550*a-n* with specific acceptance criteria. Each story may be broken down into tasks 552*a-n*. The stories may comprise a structured narrative description that captures a specific piece of functionality or feature from the perspective of an end user or stakeholder within the software development process. A story may serve as a bridge between high-level requirements making up the requirement data object and detailed implementation tasks making up the code generation work prompt sets, providing a user-centric view of desired software behavior that can be understood by both technical and non-technical stakeholders.

Stories 550*a-n* may be derived from requirement data objects through decomposition processes performed by AI agents within the agentic AI augmentation framework, where complex requirements are broken down into discrete, manageable units that describe specific user interactions, system behaviors, or functional capabilities. Stories may follow structured formats that include user roles, desired actions, and expected outcomes, enabling clear communication of functionality requirements across development teams. In some embodiments, stories may include acceptance criteria that define the conditions under which the story is considered complete and functional. Stories may encompass various types including user stories that describe end-user interactions with the software, technical stories that address system-level requirements or architectural concerns, and epic stories that represent larger features or capabilities that may be further decomposed into smaller stories.

Stories may be generated automatically by AI agents based on analysis of requirement data objects and, optionally, configuration data sets, or may be created collaboratively through human-AI interaction processes. Stories may be iteratively refined based on feedback from downstream processes, user input, or changes in requirements, and may maintain traceability links back to their originating requirement data objects to ensure alignment with overall project objectives and needs.

The story and task generation process may be entirely or at least partially generated by the agentic AI augmentation framework (e.g., by a generative AI model executed by the one or more AI agents). The agentic AI augmentation framework's AI agents may create automated mappings between requirements and stories, ensuring that no requirement is overlooked (e.g., each of the previously generated requirements is complied with), and all tasks are aligned with project goals. The code generation work prompt sets 554 may comprise the final assembly of tasks and the related information described herein. Similar to the requirements portion 500*a* of the agentic AI augmentation framework shown in FIG. 5A, the user may be presented with the code generation work prompt sets, the stories, the tasks, or any intermediate output and may provide additional inputs to guide the downstream processes.

III. Augmented Coding

With reference to FIG. 5C herein, the coding phase is where the agentic AI augmentation framework AI agents provide direct support to human developers, streamlining and improving the quality of both code preparation 560 and implementation 562. The AI agent may be a combination of logic and Large Language Model ("LLM") within one or more AI agents, tuned and adjusted based on best practices & prompts, that autonomously perceives its environment, processes information, and takes actions to achieve goals in accordance with the various embodiments disclosed herein. Some example features of the AI agent(s) may include perception (e.g., gathering data from an environment); decision making (e.g., analyzing and choosing actions); action (e.g., interacting with the environment); and/or autonomy (e.g., operating independently).

Phase 1: Code Preparation

The code preparation phase 560 represents a stage of the agentic AI augmentation framework where existing code repositories are systematically analyzed and enhanced to create an intelligent foundation for downstream development tasks. This phase may transform raw source code into enriched, semantically meaningful data structures that enable more accurate and efficient AI-assisted code generation and modification.

In some embodiments, the code preparation phase 560 may operate independently of specific code generation work prompt sets and may not be tied to any particular development cycle. This process may occur asynchronously with receiving a prompt from a user for developing a new software program product (or modifying a current software program product). In some embodiments, the code preparation process may be executed preemptively to establish a comprehensive vectorized code context data store that serves as a resource for future software development projects. This proactive approach may enable the system to maintain a continuously updated repository of enriched code context data that can be leveraged across multiple development initiatives without requiring repetitive preparation steps for each new project. Additionally or alternatively, existing code repositories may be enriched and contextualized so that future (or concurrent) user requests to modify the existing code repositories start with an improved foundation.

In some embodiments, the preemptive code preparation may involve systematically processing existing codebases, legacy systems, and template repositories to create a robust foundation of vectorized code context data sets. This approach may allow organizations to build and maintain a centralized knowledge base of their software assets, architectural patterns, and coding standards that can be readily accessed by AI agents during subsequent development cycles. The preemptive preparation may also enable the system to continuously update and refine the vectorized representations as codebases evolve, ensuring that the context data store remains current and relevant for future development activities.

Alternatively or additionally, in some embodiments, the code preparation phase 560 may be initiated in response to specific coding requirements and may be performed ad hoc based on the particular software development lifecycle currently in progress. In these instances, the code preparation process may be triggered by the receipt of specific code generation work prompt sets or the initiation of a new development project that requires analysis of particular source code repositories. This responsive approach may allow the system to focus its preparation efforts on the specific codebases, architectural components, and contextual elements that are most relevant to the immediate development objectives. In some embodiments, if prepared code is unavailable, the agent may be configured to individually look at relevant files.

This may also allow a "plug-and-play" functionality for the agentic AI augmentation framework that allows it to quickly be deployed on new codebases without lengthy preliminary code preparation processes. In such situations, the agentic AI augmentation framework may use a combination of ad hoc and preemptive code preparation based on server capacity and user usage needs. The ad hoc code preparation approach may provide flexibility in resource allocation and processing efficiency by concentrating the enrichment and vectorization efforts on the code segments and repositories that are directly applicable to the current development tasks. In some cases, this targeted preparation may reduce processing overhead and enable faster initiation of the coding implementation phase by focusing on the most pertinent code context data for the specific software program product being developed.

Code Context Agent (502): The code context agent 502 may serve as the initial processing component that receives source code from one or more repositories 516 along with application context data 518 defining the context associated with respective software program products represented by the source code in the source code repositories 516 (e.g., the context data may be stored as context files in the repositories). This agent may enrich code context by gathering data on application structure, tech stack, and architecture, enhancing the accuracy of AI-supported changes. Users may manually provide the context and/or AI augmentation framework AI agents pull in data from repositories, providing contextual insights on application structure, dependencies, and architectural standards. This initial repository analysis helps ensure all necessary components are available for coding.

This agent 502 may systematically enrich the code by extracting application structure data, dependency relationships, and architectural standards information from the code. The code context agent 502 may utilize generative AI models to analyze code segments and generate contextual metadata that captures the overall purpose of code sections, implementation details including main components and design patterns, data management strategies, and important operations along with their significance within the broader application context. Similar to the requirements generation process 500*a*, the code context agent 502 may extract UI context, non-functional context, and/or business/backend context to supplement the code itself and enrich the code context data. The agent may implement intelligent chunking mechanisms to split large code files into manageable portions while maintaining semantic coherence, and may support parallel processing capabilities to handle multiple files concurrently for improved efficiency when processing large codebases. The chunking may also enable segments of code from different repositories to be used to enrich other code and/or develop new code. The code context agent 502 may be configured to output enriched code context data 520 comprising both the code and context.

Vectorize Code Agent (504): The vectorize code agent 504 may receive the enriched code context data 520 from the code context agent 502 and convert the contextualized code chunks into vector embeddings for semantic storage and retrieval as a code context vector store comprising vectorized enriched code context data 522. This agent 504 may vectorize both code and contextual information, creating a searchable vector store that serves as a reference for all AI agents. This process allows agents to retrieve context-aware information, facilitating seamless code analysis and updates. For example, this agent 504 may utilize embedding models to transform the combined code and contextual information into high-dimensional vector representations that capture semantic meaning and relationships between different code elements. The vectorized representations may be stored in vector databases that support similarity-based queries and contextual retrieval operations. The vectorize code agent 504 may organize these vector embeddings hierarchically to support various levels of granularity, including individual file-level searches and combined database searches, thereby balancing retrieval accuracy with performance requirements.

Together, these agents may create a searchable, semantically rich foundation that serves as input for subsequent AI agents in the coding implementation phase, enabling more informed decision-making and context-aware code modifications throughout the development process. While depicted as two discrete agents, the functions of the code preparation portion 560 of the coding portion 500*c* of the agentic AI augmentation framework may be performed by a single AI agent or by two or more AI agents.

Phase 2: Implementation

The agentic AI augmentation framework implementation phase is supported by one or more AI agents that work collaboratively to modify, review, and validate code changes. Beginning with the code generation work prompt sets 554 (e.g., loaded into the system as task details to implement 524) and the vectorized code context data set 522, the coding portion 500*c* of the agentic AI augmentation framework may further comprise a code implementation sub-portion 562 configured to generate the software program product 564.

The code implementation sub-portion 562 operates through a systematic process of identifying, isolating, and modifying specific portions of the vectorized code context data set 522 to fulfill the requirements defined in the code generation work prompt sets 554. This process begins with analyzing the vectorized representations to determine which code segments are most relevant to the tasks at hand, leveraging the semantic embeddings to identify contextually appropriate code segments that align with the desired functionality.

The implementation process 562 may utilize AI agents that perform targeted modifications on isolated code segments rather than attempting to modify entire codebases or generate an entire piece of software simultaneously. By working with vectorized code context data, the system can efficiently locate and extract relevant code patterns, functions, and architectural components from one or more code sets from one or more source repositories, enabling the creation of new software solutions through intelligent code assembly and modification. Using this process, the final code is more accurate and functions better than "vibe coding" processes or similar freehand, unfettered generative code creation.

The final software program product 564 may be constructed through various approaches depending on the specific requirements and available source materials. In some cases, the output may represent a modified version of a single existing software program product, where the AI agents have identified and updated specific code segments to incorporate new functionality or address particular requirements while preserving the overall structure and integrity of the original codebase.

Alternatively or additionally, the final software program product 564 may comprise an entirely new software application assembled from modified code segments sourced from multiple existing software program products within the source code repositories. In this approach, the AI agents may extract relevant functions, components, modules, or architectural patterns from different codebases, modify these components as needed to ensure compatibility and meet the specified requirements, and integrate them into a cohesive new software solution.

The vectorized code context data enables this flexible approach by maintaining semantic relationships between code elements, allowing the AI agents to infer how different code segments may work together and what modifications may be necessary to ensure proper integration. This process may involve updating variable names, adjusting function signatures, resolving dependency conflicts, and ensuring that the assembled code segments adhere to consistent coding standards and architectural principles throughout the final software program product.

Change Isolation Agent (506): The first agent in the implementation phase 562 is a change isolation agent 506. This AI agent 506 may comprise an AI model that isolates specific code segments in the vectorized code context data that require modification to implement code generation work prompt set 554. Through targeted change isolation, the agentic AI augmentation framework reduces risk, ensures modularity, and allows for efficient code alterations without impacting unrelated components. This framework also may reduce the risk of AI-generated hallucinations and other negative effects of an unrestrained generative AI model.

The change isolation agent may utilize a machine learning algorithm to perform vector search operations within the vectorized code context database, enabling semantic matching between the code generation work prompt sets and the stored code segments. In the depicted embodiment, the application context 518 associated with the source code repositories 516 is optionally fed into the change isolation agent 506 for comparison with the task detail to implement 524 from the code generation work prompt set to identify the vectorized code segments for modification. In some embodiments, for example, the vector search may employ nearest neighbor algorithms to identify the most contextually relevant code segments that need modification based on semantic similarity between the work prompt requirements and the vectorized code representations. The identified code segments may then be isolated for targeted modification while maintaining their semantic relationships and dependencies with the broader codebase and not modifying the code of the unaffected and non isolated sections of the codebase.

In some embodiments, the code preparation phase 560 may not have occurred for at least a portion of the code being analyzed (e.g., due to any factor, such as sudden shifts in scope by the user, backlog in preparation processing, or the like). In such embodiments, the change isolation agent 506 or another agent may fall back to individually looking at relevant source code files without the enriched context provided in the code preparation phase.

Code Change Agent (508): Tasked with implementing AI-assisted modifications, this agent may make controlled code adjustments, increasing development speed and reducing the likelihood of human error, for example, by automating the code development process. The code change agent may utilize one or more generative AI models, such as an LLM or other code generation models, that are configured and trained to work with, digest, and infer programming languages, coding patterns, and software development best practices as described herein. The agent may analyze the isolated code segments identified by the change isolation agent along with the code generation work prompt sets to determine necessary modifications. Based on this analysis, the agent may generate new code or modify existing code segments while maintaining consistency with the broader codebase architecture and coding standards.

Following generation of the code, the implementation sub-portion 562 of the coding process 500*c* may execute one or more review and testing steps with iterative updating and optional feedback from a user before finalizing the code.

Code Change Reviewer Agent (510): The code change reviewer agent may autonomously review modified code, checking for alignment with coding standards and identifying potential issues. For example, the agent may comprise a different LLM to act as a critic reviewing the modified code. By pre-emptively flagging concerns, the agentic AI augmentation framework may minimize the manual review burden and ensures high code quality. Any issues flagged by the code change reviewer agent 510 may be transmitted to the code change agent 508 and/or the user (e.g., via a terminal device) to autonomously or semi-autonomously (e.g., in response to a user confirmation or other input) update the generated code to resolve the issue. In some embodiments, a user may be able to select or edit the code based on the identified issue manually. Following any updates, whether triggered by the code change reviewer agent 510 or another agent (e.g., code tester agent 512), the revised code may be fed back into the code change reviewer agent for subsequent review and approval.

Code Tester Agent (512): This agent may execute automated testing of the developed code, including unit and integration tests, validating changes against acceptance criteria. It further supports regression testing, reducing the likelihood of defects in the codebase. The code tester agent may utilize generative AI models and/or testing algorithms that are configured to infer testing methodologies, code execution patterns, and quality assurance best practices. The agent may interface with various testing frameworks including unit testing libraries, integration testing platforms, regression testing suites, and performance benchmarking systems to execute comprehensive test scenarios. The agent operates by receiving modified code segments along with code generation work prompt sets that define testing requirements and acceptance criteria, then generates and executes test suites that validate functionality, performance, and compliance with established standards.

Code Change Commit Agent (514): Once all checks are complete, the code change commit agent 514 may commit verified code changes to the main branch (e.g., back to the source code repositories 516), finalizing the development cycle. It enforces quality standards and mitigates risks associated with code integration. In some embodiments, this process may include a combination of the code change commit agent and a human operator. For example, once the user initiates the commit, there will be a pre-commit hook that will be initiated to cause the agent to make sure the changes are appropriate.

The code change commit agent 514 may implement version control mechanisms that create snapshots or checkpoints of the codebase state before and after each commit operation, enabling the system to maintain a comprehensive history of all code modifications and their associated metadata. In cases where issues are detected post-deployment or when rollback is necessary, the agent may utilize these versioned snapshots to revert the codebase to any previous stable state while preserving the integrity of the vectorized code context data set and maintaining consistency across all related AI agents in the framework.

Throughout the requirements definition portion 500*a* shown in FIG. 5A, each agent executing the ideate and brainstorm process 534, application context generation process 536, requirements document generation process 538, non-functional requirements generation process 540, user interface requirements generation process 542, process generation process 544, and/or product requirements generation process 546 may present one or more outputs to users via user interfaces (e.g., intermediate outputs of the overall framework, showing the users the decisions and outputs being fed from one agent to another), enabling users to provide feedback, edits, or additional inputs that can be incorporated in real-time or trigger the system to restart processing from the modified stage. Similarly, during the work item creation portion 500*b* shown in FIG. 5B and the coding portion 500*c* shown in FIG. 5C, agents responsible for generating stories 550*a-n*, tasks 552*a-n*, code generation work prompt sets 554, and executing the code context agent 502, vectorize code agent 504, change isolation agent 506, code change agent 508, code change reviewer agent 510, code change tester agent 512, and code change commit agent 514 may continuously communicate with users to display progress, solicit approvals, and accept modifications that can either be processed immediately or stored for later application, causing the framework to regenerate outputs from the point of user intervention forward through the development pipeline.

Example Process Flow Diagrams

Figure 6A:
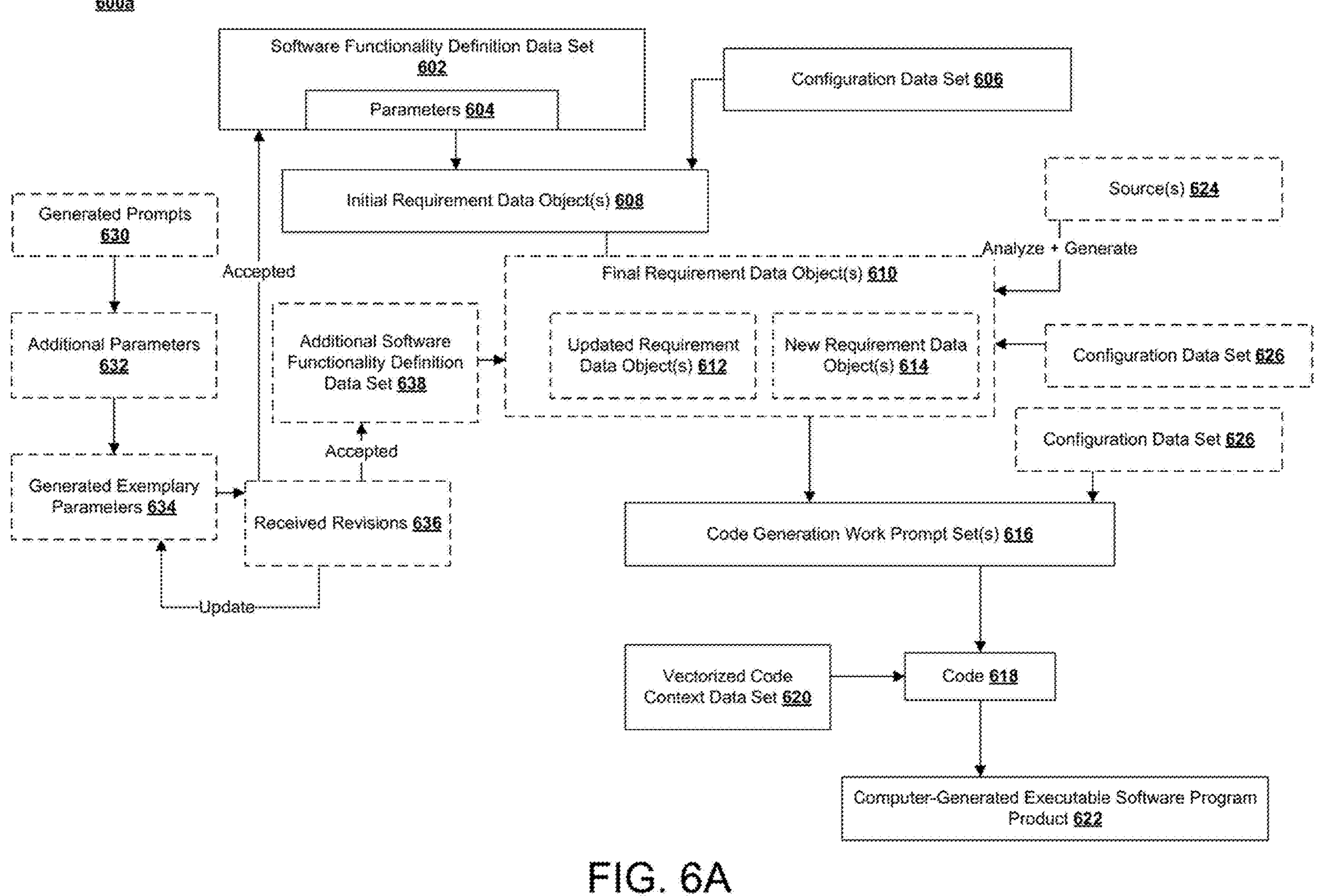
FIGS. 6A-6C show flowcharts depicting example processes carried out by an agentic AI augmentation framework or portions thereof in accordance with at least one embodiment of the present disclosure.

FIG. 6A illustrates an example of an agentic AI augmentation framework process 600*a* showing the transformation of initial user requirements into a functional software program product through multiple stages of AI-assisted processing and refinement. In the depicted embodiment, the process begins when a user provides a software functionality request in the form of a software functionality definition data set 602, or a portion thereof, containing parameters 604 that describe the desired characteristics, features, and functionalities of a software program product to be developed. This initial input corresponds to the software functionality request input 530 described in FIG. 5A and serves as the primary trigger that initiates the requirements gathering phase of the agentic AI augmentation framework.

The software functionality definition data set 602 may take various forms including natural language descriptions, structured documents, visual mockups, or multimedia inputs that capture the user's intended software requirements as described herein. In some embodiments, the software functionality definition data set 602 may represent raw input directly provided by the user, or alternatively, may comprise processed data that has been refined by the system to ensure completeness, accuracy, and/or compatibility with downstream processing steps. For example, an initial software functionality definition data set may trigger one or more AI agents to generate clarifying prompts to be displayed to the user or request additional information from the user, with the resulting responses being incorporated into a more comprehensive final software functionality definition data set that better supports subsequent requirements analysis and code generation processes.

In the depicted example, the system retrieves a configuration data set 606 comprising predefined context data that provides technical specifications, architectural guidelines, organizational standards, and other contextual information that may be used by one or more agents during the agentic AI augmentation framework to guide the development process. The software functionality definition data set 602 and configuration data set 606 are processed through the comprehensive requirements gathering workflow described in FIG. 5A, including one or more of the ideate and brainstorm process 534, application context generation process 536, requirements document generation process 538, nonfunctional requirements generation process 540, user interface requirements generation process 542, process generation process 544, and/or product requirements generation process 546 to generate initial requirement data object(s) 608.

The initial requirement data object(s) 608 may be passed on to the work item creation phase of the agentic AI augmentation framework as final requirement data object(s) or the initial requirement data object(s) 608 may be updated based on one or more inputs and/or additional data sources. For example, the system (e.g., via one or more agents) may present generated prompts 630 to a user (e.g., via a user interface) that request additional parameters 632 from the user to clarify, expand, or refine the initial requirements. These additional parameters 632 may be processed by one or more AI agents to produce generated example parameters 634 that demonstrate potential features, functionalities, or implementation approaches or the user inputs may be the example parameters themselves. The example parameters 634 may be presented to a user for review and the user may provide revisions 636 to modify, accept, or refine these example parameters, which, whether revised or not, may result in an additional software functionality definition data set 638 that supplements and enhances the original input. The additional software functionality definition data set 638 may, for example, be merged with or used to update the initial requirement data object(s).

In some embodiments, the system analyzes information from various sources 624 (e.g., external databases comprising repositories relevant to the user's initial software functionality definition data set 602 and/or the initial requirement data objects 608) for supplementing the initial requirement data object to provide a complete set of requirements for downstream coding that contains sufficient information to generate the software program product. The system may further apply the configuration data set 626 to generate final requirement data object(s) 610, which comprises updated requirement data objects 612 representing modifications to existing requirements and/or new requirement data objects 614 representing entirely new requirements identified through the analysis process. This comprehensive analysis and refinement process corresponds to the requirements gathering activities described in the requirements definition portion 500*a* of FIG. 5A, where multiple AI agents work collaboratively to transform initial user input into structured, comprehensive requirements documentation.

The final requirement data object(s) 610 and configuration data set 626 are then processed through the work item creation activities described in FIG. 5B, where AI agents decompose the requirements into stories and break the stories into manageable development tasks to generate code generation work prompt sets 616. These code generation work prompt sets 616, along with a vectorized code context data set 620 that has been prepared through the code preparation processes, are used to build code 618 through the coding processes described in FIG. 5C. The process concludes with the generation of an executable software program product 622, which represents the final output of the complete AI augmentation framework and embodies the transformation of the initial user requirements into functional, deployable software.

Figure 6B:
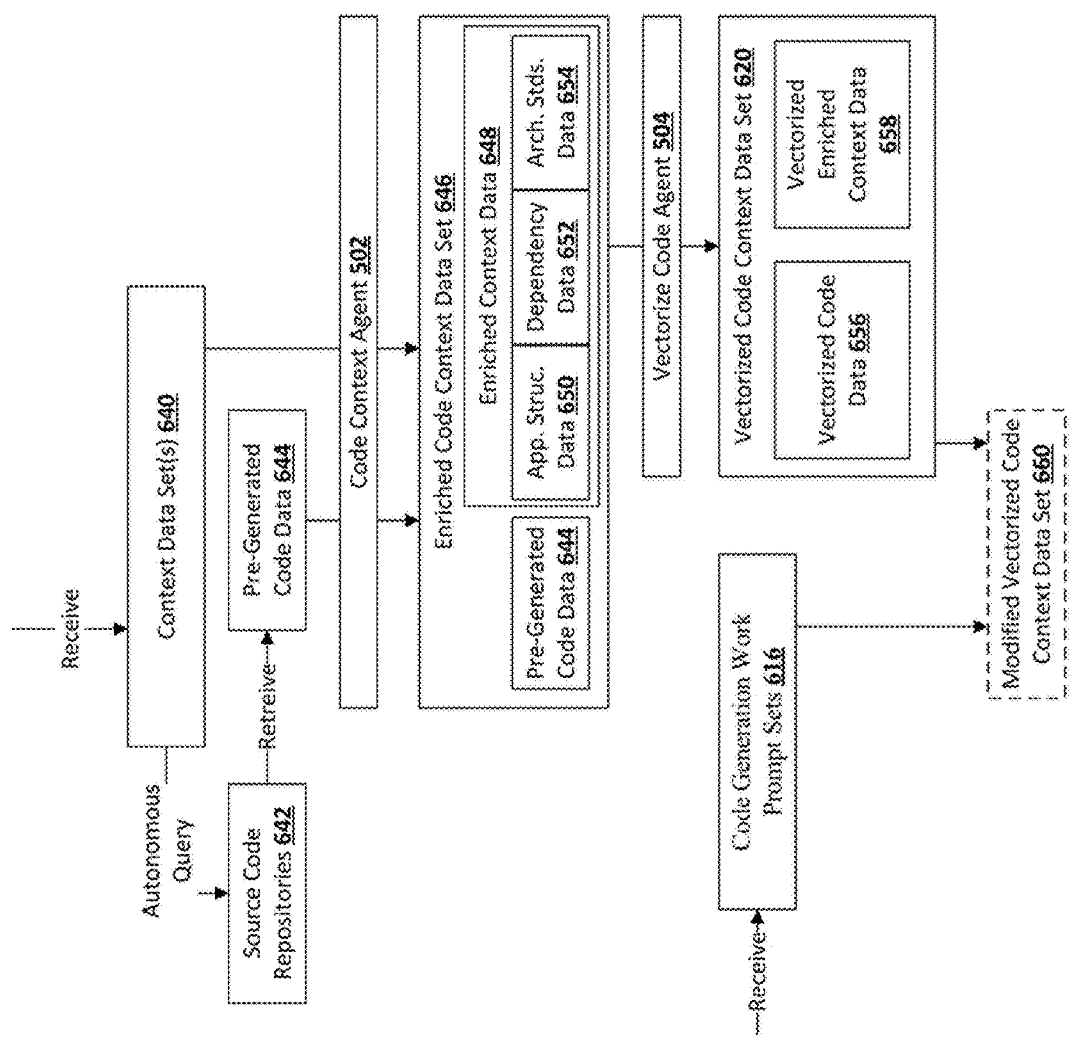

FIG. 6B illustrates an example code context enrichment, vectorization, and modification process 600*b* that transforms raw source code into semantically enriched and vectorized representations suitable for AI-assisted code modification and analysis. During the depicted process, context data associated with pre-generated code is enriched to provide a robust foundation for quickly identifying and modifying sections of the pre-generated code to accomplish the coding requirements set out by a user (e.g., in a code generation work prompt set 616). In the depicted embodiment, the process begins with a context data set 640 that contains application-specific information, contextual parameters, and other relevant metadata associated with existing software systems. The system may also access source code repositories 642 (e.g., via receipt, query, or otherwise) to retrieve pre-generated code data 644 associated with existing software program products that may serve as a foundation or reference for new development activities. In some embodiments, the pre-generated code data 644 may be code from a main codebase of an enterprise whose functionality is being modified by the code generation work prompt sets. In this example, the software program product may represent a modified version of an earlier software program product that has been modified based on the user's requirements. In some embodiments, the pre-generated code data 644 may comprise any other code used as a seed for generating the new code via the subsequent coding processes. In this example, the software program product may represent an entirely new piece of software or portion of a piece of software.

In some embodiments, the system may be configured to receive the one or more context data sets 640 together with a plurality of pre-generated executable software program products or identifiers linking the context data sets to one or more pre-generated executable software program products. The pre-generated executable software program products may include at least: (i) one or more computer-generated (e.g., at least partially AI-generated) executable software program products generated using any one or more features, components, and/or the like of an agentic AI augmentation framework such as the agentic AI augmentation frameworks described herein; (ii) one or more executable software program products of unknown origin; and/or (iii) other pre-generated executable software program products. In some embodiments, the system may be configured to retrieve, from one or more source code repositories 642 and/or from a user via a user interface, the pre-generated code 644 associated with the pre-generated executable software program products.

The code context agent, corresponding to the code context agent 502 described in FIG. 5C, processes both the context data set 640 and the pre-generated code data 644 to generate an enriched code context data set 646. This enrichment process modifies the code context data and, for example, adds semantic metadata and/or contextual intelligence to the raw code through AI-powered analysis (e.g., analysis of the related pre-generated code data 644), creating enriched context data 648 that includes relevant context such as, but not limited to, application structure data 650 describing the organizational hierarchy and architectural relationships of software components, dependency data 652 identifying relationships between code segments, external libraries, and system dependencies, and architectural standards data 654 documenting design patterns, coding conventions, and architectural principles employed within the codebase. In some embodiments, the system may be configured to generate metadata for at least one portion of at least one of one or more enriched code context data sets. In some embodiments, the system may be configured to extract at least one of the one or more context data sets or metadata for combining into the enriched code context data set from at least one product requirement document (PRD) or other portions of the initial requirements definition process.

The one or more context data sets 640 may include at least contextual information for the pre-generated executable software program products, for example, such as contextual information indicating how the software program product may be used, for whom the software program product may be generated, any other software and/or code upon which the software program product may be based, and/or other predefined context data. In some embodiments, the predefined context data includes at least: (i) information indicating backend specifications, requirements, parameters, features, and/or the like for the computer-generated executable software program product; and/or (ii) information indicating frontend specifications, requirements, parameters, features, and/or the like for the computer-generated executable software program product. In some embodiments, the code context agent 502 may be configured to process source code files to add contextual metadata, enhancing inference and/or usability (further described herein).

The vectorize code agent, corresponding to the vectorize code agent 504 described in FIG. 5C, processes the enriched code context data set 646 to produce a vectorized code context data set 620. This vectorization process transforms contextualized code chunks of the pre-generated code data 644 and the corresponding enriched context data 648 into high-dimensional mathematical vector representations that enable semantic searching, similarity-based retrieval operations, and intelligent code analysis. The vectorize code agent 504 may be configured to convert contextualized code chunks (e.g., code chunks enriched with contextual metadata by the code context agent) into vector embeddings and further storing the vector embeddings in one or more vector databases enabling similarity searching, which allows for semantic retrieval. The vectorized code context data set 620 contains vectorized code data 656 representing the mathematical embeddings of the actual code segments and vectorized enriched context data 658 representing the vectorized metadata and contextual information that enhances the semantic inference of the code and facilitates the downstream searching and coding operations described herein. In some embodiments, the vectorized code context data set may be at least partially stored in one or more vector databases (e.g., such as the vector database 404B).

In some embodiments, one or more of the respective agents described herein, including for example the code context agent 502 and/or the vectorize code agent 504 may utilize a contextual RAG system. The code context agent 502 and the vectorize code agent 504 may be implemented sequentially, for example, the code context agent first enriches code with context, and then the vectorize code agent generates searchable embeddings. Such a sequential workflow assists developers with analyzing, searching, and/or transforming complex code with greater efficiency. The implementation of the code context agent 502 and the vectorize code agent 504 may, in some embodiments, provide parallel processing for speed, incremental updates for large codebases without bottlenecking the code through each agent, Git integration for tracking changes (which enhances version control in AI-driven code analysis), and/or other features.

In some embodiments, the code context agent 502 is configured to collect configuration details, process code files, use one or more LLMs to add metadata (e.g., purpose, functionality, and/or the like), and/or the like. Adding metadata to code affords advantages such as making code more understandable and operable on by the downstream agents. In some embodiments, the vectorize code agent is configured to convert code portions enriched with metadata (e.g., such as the metadata added by the LLMs) into vector embeddings. The vector embeddings may be stored in one or more vector databases for semantic searches, for example such as Facebook AI Similarity Search (FAISS) databases, thereby improving retrieval accuracy.

Legacy codebases, often large and undocumented, pose significant challenges in software development, including difficulty in comprehension, inefficient search and retrieval, high maintenance costs, barriers to modernization, and/or other challenges. The contextual RAG system relying on the code context agent and the vectorize code agent is configured to address such issues. In some embodiments, the contextual RAG system may leverage one or more natural language processing (NLP) and/or machine learning techniques, for example, through the code context agent and the vectorize code agent. These agents work, in some embodiments, sequentially to analyze, contextualize, and/or make legacy code searchable in a semantically meaningful way.

The code context agent and the vectorize code agent together form a foundation for various downstream tasks within an agentic AI augmentation framework, integrating with one or more other agents (further described herein) within the agentic AI augmentation framework.

The code context agent and the vectorize code agent are, in some embodiments, implemented sequentially within a contextual RAG system (e.g., using the contextual RAG shown in FIG. 13) or another embodiment of the agentic AI augmentation system. In an example embodiment using a contextual RAG system, the code context agent first enriches raw code with semantic context, and then the vectorize code agent transforms the enriched data into vector embeddings for improving searching efficiency. The contextual RAG system further integrates with and/or supports one or more other agents within the agentic AI augmentation framework. The contextual RAG system includes at least: facilitating informed decision-making, enhancing efficiency of downstream tasks, and/or other advantages based on providing a searchable and semantically rich representation of the codebase.

Some advantages of a contextual RAG system include at least (i) deep code inference with LLMs (e.g., achieves comprehensive understanding of code by leveraging LLMs beyond conventional methods); (ii) reranking for improved search relevance (e.g., enhances search results by reranking, thereby improving accuracy and/or usefulness of one or more retrieved code snippets); (iii) contextual enrichment of code chunks (e.g., adds rich metadata as context to respective code chunks, thereby providing a foundation for search and/or analysis); (iv) multi-level vector storage (e.g., organizes vectors hierarchically, thereby balancing retrieval accuracy and/or performance, for example, for large codebases); (v) incremental processing (e.g., supports updates without reprocessing the entire codebase, thereby enhancing scalability for continuous integration environments); and (vi) git-aware vector updates (e.g., integrates with Git (and/or other code change tracking tools), thereby allowing the vector database to remain synchronized with codebase evolution).

In some embodiments, the system may be configured to modify, by at least one generative AI model (e.g., of the change isolation agent 506), at least one of the one or more code segments of the vectorized code context data set using at least the one or more code generation work prompt sets to create a new generated executable software program product. In some embodiments, the system may be configured to modify, by the at least one generative AI model, one or more respective code segments of the one or more code segments independently from at least one other code segment of the one or more code segments. For example, as discussed above, at least one code segment, different from the one or more respective code segments, may remain unmodified. In some embodiments, the system may be configured to modify, by the at least one generative AI model, each code segment of the one or more code segments independently of each other code segment of the one or more code segments. In some embodiments, the system may be configured to modify respective code segments of the one or more code segments using different generative AI models. In some embodiments, the system may be configured to modify, by the at least one generative AI model, all code segments of a plurality of code segments, wherein the modifying of one or more of the code segments is dependent on the modifying of one or more other code segments of the plurality of code segments.

After generation of the vectorized code context data set 620, the system may retrieve code generation work prompt sets 616, which correspond to the code generation work prompt set 554 generated through the work item creation portion 500*b* described in FIG. 5B and discussed with respect to FIG. 6A. These code generation work prompt sets 616 define specific development tasks and requirements that guide the code modification process. The work prompt sets, combined with the vectorized code context data set 620, may be used to generate a modified vectorized code context data set 660, shown in dashed lines to indicate its status as an optional, intermediate processing result that will be further refined through the coding implementation processes described in the code implementation portion 562 of FIG. 5C to produce the software program product.

Figure 6C:
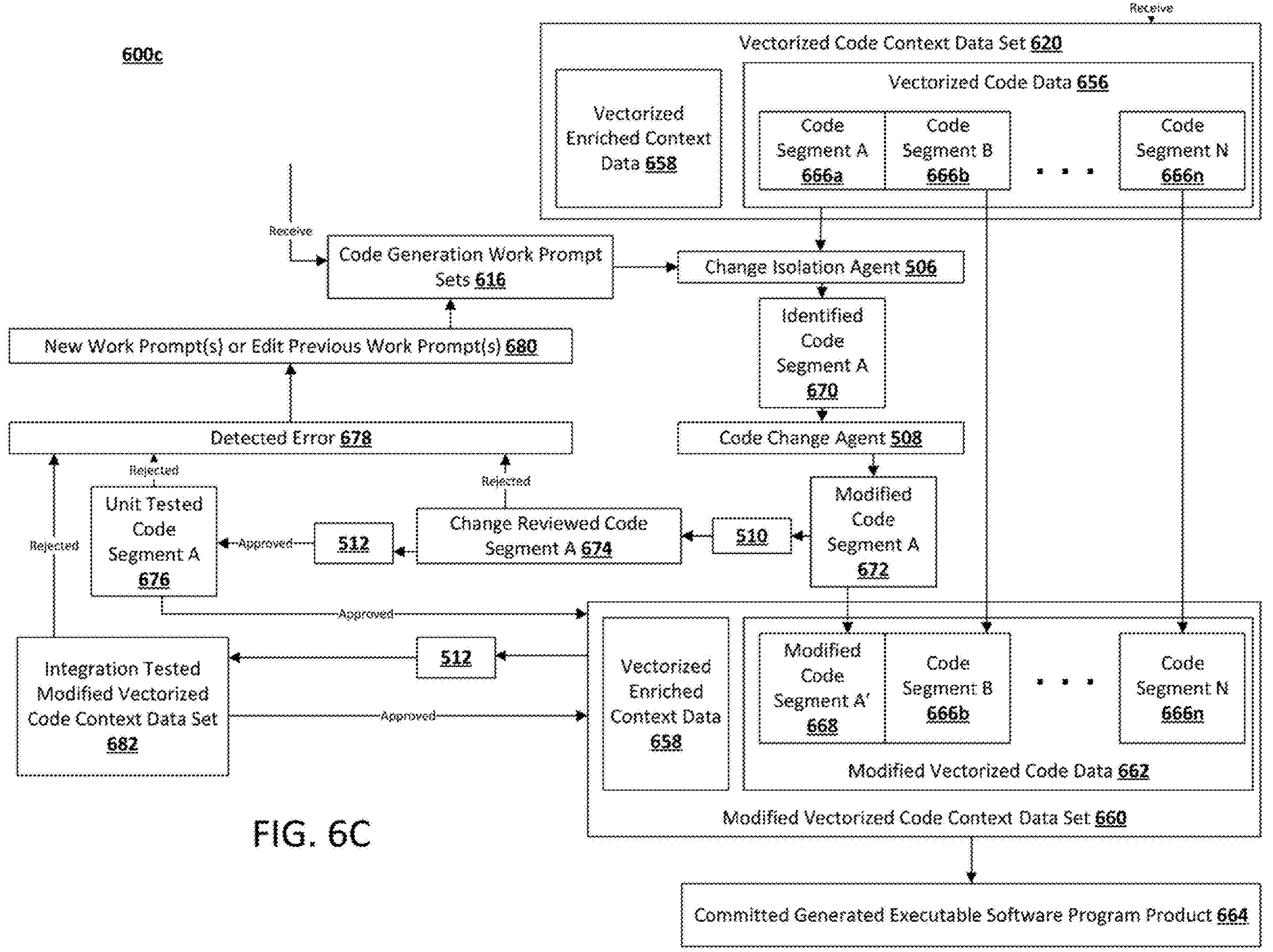

FIG. 6C illustrates an example embodiment of a coding process 600*c* that implements targeted code modifications through a sequence of AI agents working collaboratively to ensure code quality, functionality, and compliance with established standards. The depicted process 600*c* receives code generation work prompt sets 616 and a vectorized code context data set 620 as primary inputs. The vectorized code context data set 620 contains vectorized code data 656 comprising multiple discrete code segments including code segment A 666*a*, code segment B 666*b*, through code segment N 666*n*, along with vectorized enriched context data 658 that provides semantic context, dependency information, and architectural guidance for each code segment.

In some embodiments, the one or more code generation work prompt sets 616 may prompt the system (e.g., via change isolation agent 506 and the subsequent agents) to generate a new computer-generated (e.g., at least partially AI-generated) executable software program product. The one or more code generation work prompt sets may define a list of computer-executable tasks configured to generate code for the computer-generated executable software program product. For example, the one or more computer-executable tasks may include at least: (i) one or more tasks for enabling automated code generation; (ii) one or more tasks for enabling requirements traceability; (iii) one or more tasks for enabling enhanced collaboration; (iv) one or more tasks for enhancing error reduction, and/or (v) other tasks.

In some embodiments, the system may be configured to receive a vectorized code context data set 620 comprising vectorized and/or contextualized data representing source code of a plurality of pre-generated executable software program products. In some embodiments, at least one of the plurality of pre-generated executable software program products may be computer-generated (e.g., at least partially AI-generated). In some embodiments, the vectorized code context data set 620 is configured (e.g., retrieved from a vector data store comprising a plurality of vectorized code context data sets) based on a classification scheme which selects a portion of the source code that is most relevant, desirable, preferred, and/or the like for modification (e.g., by the change isolation agent). As noted herein, the vectorized code context data set 620 may comprise all of the code associated with a software program product or at least a portion of the code associated with one or more software program products. For example, if a user's requirements are to add a function to an existing codebase associated with an existing software program product and the function is not currently present in the existing codebase, the vectorized code context data set 620 may comprise at least a portion of the existing codebase and/or at least a portion of a codebase from a different software program product that includes the requested function. The code change agent 508 may then modify one or more code segments associated with the function taken from the different codebase and/or one or more code segments associated with the existing codebase.

In some embodiments, the system may be configured to analyze, by at least one change isolation agent (e.g., the change isolation agent 506) executing at least one AI model, the vectorized code context data set based on the one or more code generation work prompt sets to identify one or more code segments (e.g., code chunks) associated with the vectorized code context data set that differ from the one or more code generation work prompt sets (e.g., that require modification to meet the requirements in the one or more code generation work prompt sets). The change isolation agent, corresponding to the change isolation agent 506 described in FIG. 5C, analyzes the vectorized code context data set 620 based on the specific requirements and tasks specified in the code generation work prompt sets 616 to identify an identified code segment 670 from the vectorized code data 656 that requires modification to satisfy the new requirements. In the depicted embodiment, the change isolation agent 506 has identified code segment A 666*a* as needing modification. In various embodiments, any one or more segments (e.g., code chunks) may be identified across one or more pre-stored code data sets (e.g., existing software program products or portions thereof). This targeted isolation process ensures that only relevant code segments are selected for modification while preserving the integrity and functionality of unrelated components within the broader codebase.

The code change agent, corresponding to the code change agent 508 described in FIG. 5C, processes the identified code segment A 670 using generative AI models to generate a modified code segment A' 672 that implements the required functionality, features, or modifications specified in the work prompt sets. In some embodiments, the code change agent 508 may be configured for generative code creation, based user input (e.g., by the system and/or one or more components thereof, of one or more code segments, including the modified code segment A' 672, based on user input (e.g., the one or more requirement data objects). In some embodiments, the requirements traceability facilitated by the embodiments of the present disclosure includes associating one or more specific requirements (of the one or more requirement data objects and/or of the user input) to one or more code changes, thereby enabling enhanced and/or more efficient change isolation. In some embodiments, the enhanced collaboration includes improving communication between the user and the system, based on computer-generated (e.g., AI-generated) information using computer-generated (e.g., AI-generated) insights indicating how to better align code with requirements and/or parameters. In some embodiments, the error reduction includes validating, by the system and/or one or more components thereof, any one or more portions of the one or more code snippets against any one or more of the specific requirements, thereby enhancing compliance with the one or more specific requirements prior to deployment of the system. In the depicted embodiment, the remaining code segments 666*b*-666*n* of the vectorized code data 656 are retained as the modified vectorized code data 662 (e.g., only the modified code segment A' 668 is distinct). In various embodiments, as described herein, one or more code segments may be added (e.g., code segments from other vectorized code data) or omitted from the modified vectorized code data 662 and/or one or more other code segments 666*a*-666*n* may be modified. The vectorized code data 656 may represent a single software program product or may be segments pre-generated code data associated with multiple software program products.

The code change reviewer agent, corresponding to the code change reviewer agent 510 described in FIG. 5C, performs comprehensive review and validation of the modified code segment A' 672 to produce a change reviewed code segment A 674 that has been validated against coding standards, architectural principles, security requirements, and other quality criteria as described herein.

The code change tester agent, corresponding to the code change tester agent 512 described in FIG. 5C, performs comprehensive unit testing on the change reviewed code segment A 674 to create a unit tested code segment A 676 that has been validated for functionality, performance, and compliance with acceptance criteria. If testing reveals issues, defects, or non-compliance, the system generates a detected error 678 that may result in new work prompt(s) and/or edits to previous work prompt(s) 680, creating a feedback loop for iterative improvement and refinement of the identified code segment 670 and/or isolation of additional code segments and modification thereof to remedy the error. The unit tested code segment A 676 may be approved or rejected at various stages throughout the workflow, with rejected code being routed back through the modification and testing process for additional refinement.

In some embodiments, upon approval of the unit testing phase or concurrent with the unit testing phase, the system performs integration testing to generate an integration tested modified vectorized code context data set 682 that validates the proper interaction between the modified code segment and the existing codebase, ensuring compatibility and system-wide functionality. Similar to the unit testing, the integration tested modified vectorized code context data set 682 may generate new and/or edited work prompts 680 in response to a detected error 678 to remedy the error. In some embodiments, the new and/or edited work prompt will be generated based on a user input (e.g., after the error is presented to the user for review). In some embodiments, the new and/or edited work prompt may be generated autonomously for autonomous code updating to remedy the errors. The process produces a modified vectorized code context data set 660 containing modified vectorized code data 662, which includes the modified code segment 668 representing the successfully tested and validated code changes along with the unchanged code segments B 666*b* through N 666*n* that remain unmodified from the original vectorized code context data set.

The code change commit agent, corresponding to the code change commit agent 514 described in FIG. 5C, finalizes the development cycle by performing final validation checks and outputting a committed generated executable software program product 664 that represents the completed software solution. The process may include one or more approval and rejection pathways throughout the workflow, ensuring that code quality, functionality, and compliance are maintained through iterative refinement and validation processes before final commitment to the codebase and deployment of the software program product.

The processes described with respect to FIGS. 6A-6C represent one example implementation of the agentic AI augmentation framework and are not intended to be limiting. Various embodiments may implement alternative configurations, different sequences of operations, or modified agent interactions while maintaining the core functionality of transforming user requirements into executable software program products through AI-assisted development processes.

Provided below are several example data flow and prompt processes for facilitating the foregoing functions:

In some embodiments, a use case for the code context agent 502 may begin with the code context agent receiving or retrieving source files (e.g., source code and context 516, 518 source files and basic metadata (file name, language, path)). The code context agent then prompts a large language model (LLM) to extract and enrich context information for each code segment.

The code context agent 502 may prompt the LLM for structure detection using the following prompt formula:

SYSTEM: Identify logical units (classes, functions, methods) in this file.

USER: <insert code file contents>

OUTPUT: JSON list of {unit_name, start_line, end_line, language}

The code context agent 502 may then prompt the LLM for context enrichment using the following prompt formula:

SYSTEM: For the following code block, describe its purpose, key operations, inputs, outputs, dependencies, and any design patterns used. Return valid JSON in this format: {"purpose": . . . , "operations": . . . , "inputs": . . . , "outputs": . . . , "dependencies": . . . , "patterns": . . . , "security_notes": . . . }

USER: <insert code chunk>

The LLM may return a structured JSON file, the code context agent 502 may validate the response, add language/architecture tags, and save the results.

In some embodiments, the code context agent 502 may then optionally prompt the LLM for an architecture summary using the following prompt formula:

SYSTEM: Summarize the architecture style (e.g., layered, microservice) and any violations of coding standards found in this code.

USER: <insert code summary+context info>

In some embodiments, a use case for the vectorize code agent 504 may convert the enriched JSON text into embeddings and store the enriched text in a searchable vector database for later agents. For example, given a legacy Java service file, the prompts output JSON metadata stating the code implements a "Repository" pattern, depends on OrderRepo, and logs no PII. This becomes part of the enriched context store.

In some embodiments, a use case for the change isolation agent 506 uses prompts to find and isolate which code should be modified to satisfy a new requirement. The change isolation agent 506 may receive as an input a code generation work prompt such as "Add proration to subscription upgrades and update invoices in Stripe."

The change isolation agent 506 may then prompt an LLM for query generation using the following prompt formula:

SYSTEM: From this task, extract search queries that will locate the code implementing the related functionality.

USER: "Add proration to subscription upgrades and update invoices in Stripe."

OUTPUT: ["SubscriptionService", "StripeBillingAdapter", "Invoice update"]

The change isolation agent 506 may then run those queries in the vector store to fetch matching chunks.

The change isolation agent 506 may then prompt an LLM for a match check using the following prompt formula:

SYSTEM: Does this code already implement or partially implement the requirement?

Explain briefly and return JSON: {"match": "none|partial|full", "reason": " . . . ", "required_changes": [. . . ]}

USER: <insert candidate code chunk>

In some embodiments, the change isolation agent 506 may then optionally prompt an LLM for dependency expansion using the following prompt formula:

SYSTEM: Based on this code, list directly dependent classes or functions that must be modified together to apply the change safely.

USER: <insert accepted chunk>

The change isolation agent 506 may produce an isolation plan, such as the following format:

{"targets": ["SubscriptionService.java: 410-612", "StripeBillingAdapter.java:95-220"], "risks": ["payment side effects"], "tests_to_run": ["SubscriptionServiceTest"]}

In an example use case, for a task such as "Add proration", the prompts may identify exactly two methods to update, list related dependencies, and output a short JSON plan that downstream agents use to generate and test the new code.

Example Methods

Figure 7:
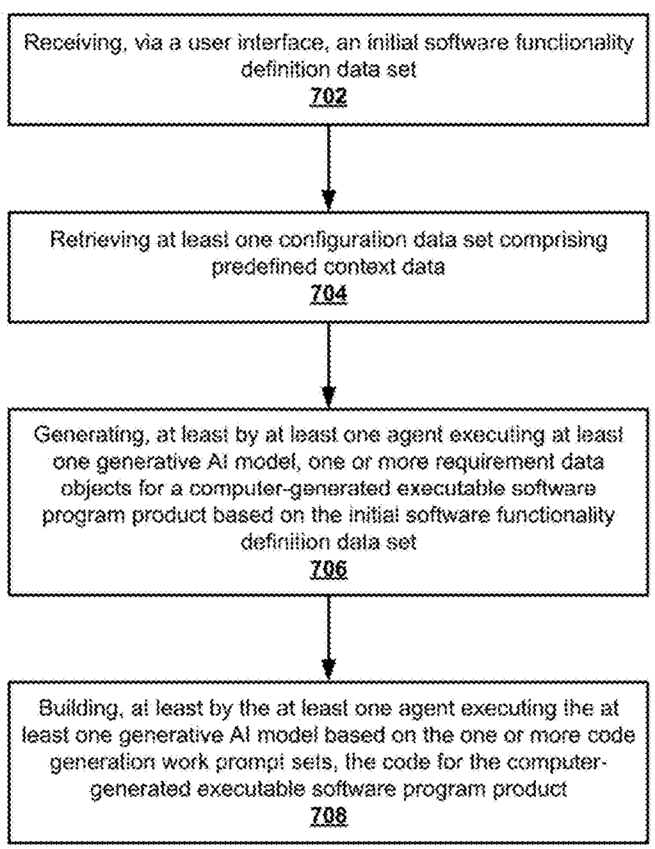
FIG. 7 shows a flowchart depicting an example process for an agentic AI augmentation framework in accordance with at least one embodiment of the present disclosure.
Figure 8:
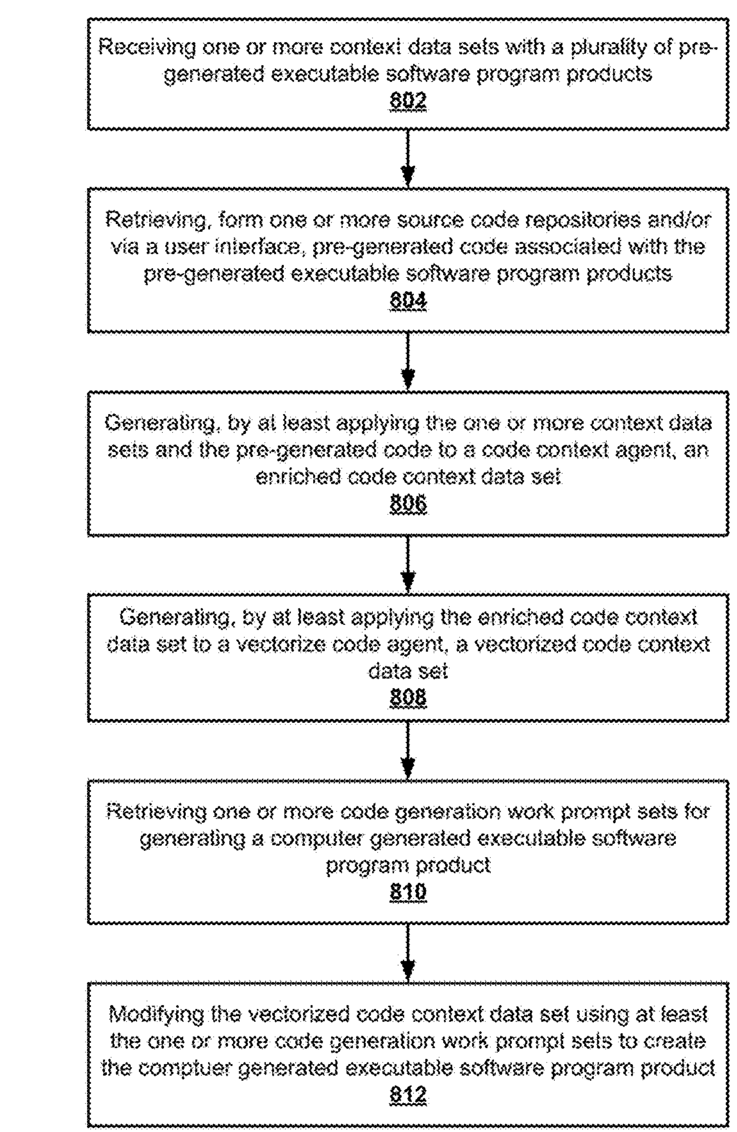
FIG. 8 shows a flowchart depicting an example process for implementing a code context and vectorize code agent in accordance with at least one embodiment of the present disclosure.
Figure 9:
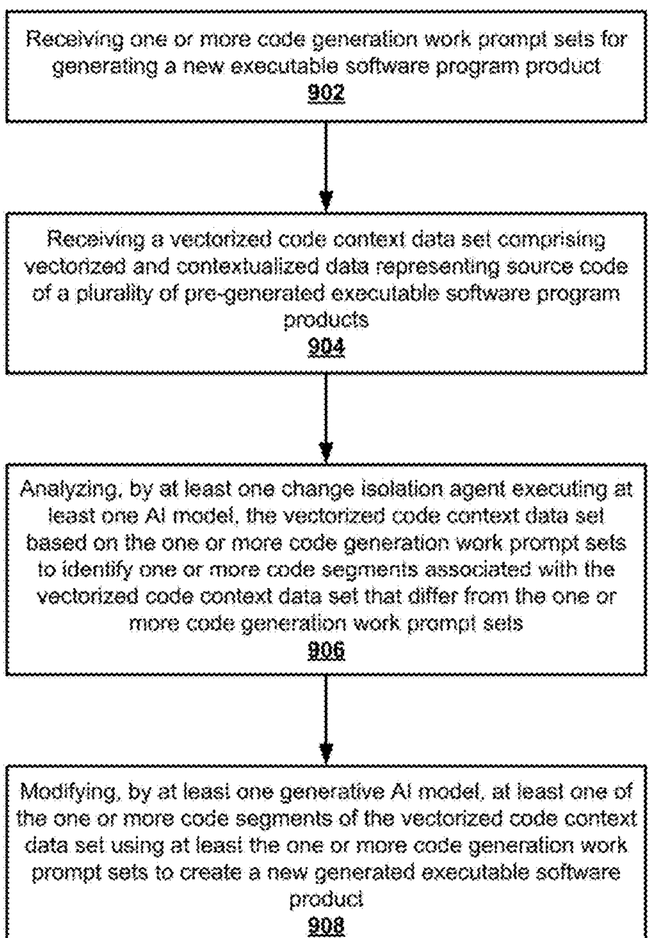
FIG. 9 shows a flowchart depicting an example process for implementing a change isolation agent in accordance with at least one embodiment of the present disclosure.

Referring now to FIGS. 7-9, example methods relating to various embodiments of the present disclosure are provided.

FIG. 7 is an example of a method 700 for implementing one or more embodiments of the present disclosure. At step/operation 702, an initial software functionality definition data set may be received via a user interface. At step/operation 704, at least one configuration data set comprising predefined context data may be retrieved. At step/operation 706, one or more requirement data objects may be generated at least by at least one agent executing at least one generative AI model, for a computer-generated executable software program product, based on the initial software functionality definition data set. At step/operation 708, code for the computer-generated executable software program product may be built at least by the at least one agent executing the at least one generative AI model based on the one or more code generation work prompt sets.

FIG. 8 is an example of a method 800 for implementing one or more embodiments of the present disclosure relating to a code context agent (e.g., the code context agent 502) and a vectorize code agent (e.g., the vectorize code agent 504). At step/operation 802, one or more context data sets with a plurality of pre-generated executable software program products may be received. At step/operation 804, pre-generated code associated with the pre-generated executable software program products may be received from one or more source code repositories and/or via a user interface. At step/operation 806, an enriched code context data set may be generated by at least applying the one or more context data sets and the pre-generated code to a code context agent. At step/operation 808, a vectorized code context data set may be generated by at least applying the enriched code context data set and optionally the pre-generated code to a vectorize code agent. At step/operation 810, one or more code generation work prompt sets may be retrieved for generating a computer generated executable software program product. At step/operation 812, the vectorized code context data set may be modified using at least the one or more code generation work prompt sets to create the computer generated executable software program product.

FIG. 9 is an example of a method 900 for implementing one or more embodiments of the present disclosure relating to a change isolation agent (e.g., the change isolation agent 404). At step/operation 902, one or more code generation work prompt sets may be received for generating a new executable software program product. At step/operation 904, a vectorized code context data set, comprising vectorized and contextualized data representing source code of a plurality of pre-generated executable software program products, may be received. At step/operation 906, the vectorized code context data set may be analyzed, by at least one change isolation agent executing at least one AI model, based on the one or more code generation work prompt sets to identify one or more code segments associated with the vectorized code context data set that differ from the one or more code generation work prompt sets. At step/operation 908, at least one of the one or more code segments of the vectorized code context data set may be modified, by at least one generative AI model, using at least the one or more code generation work prompt sets to create a new generated executable software product.

Example Modernization Framework

Figure 11:
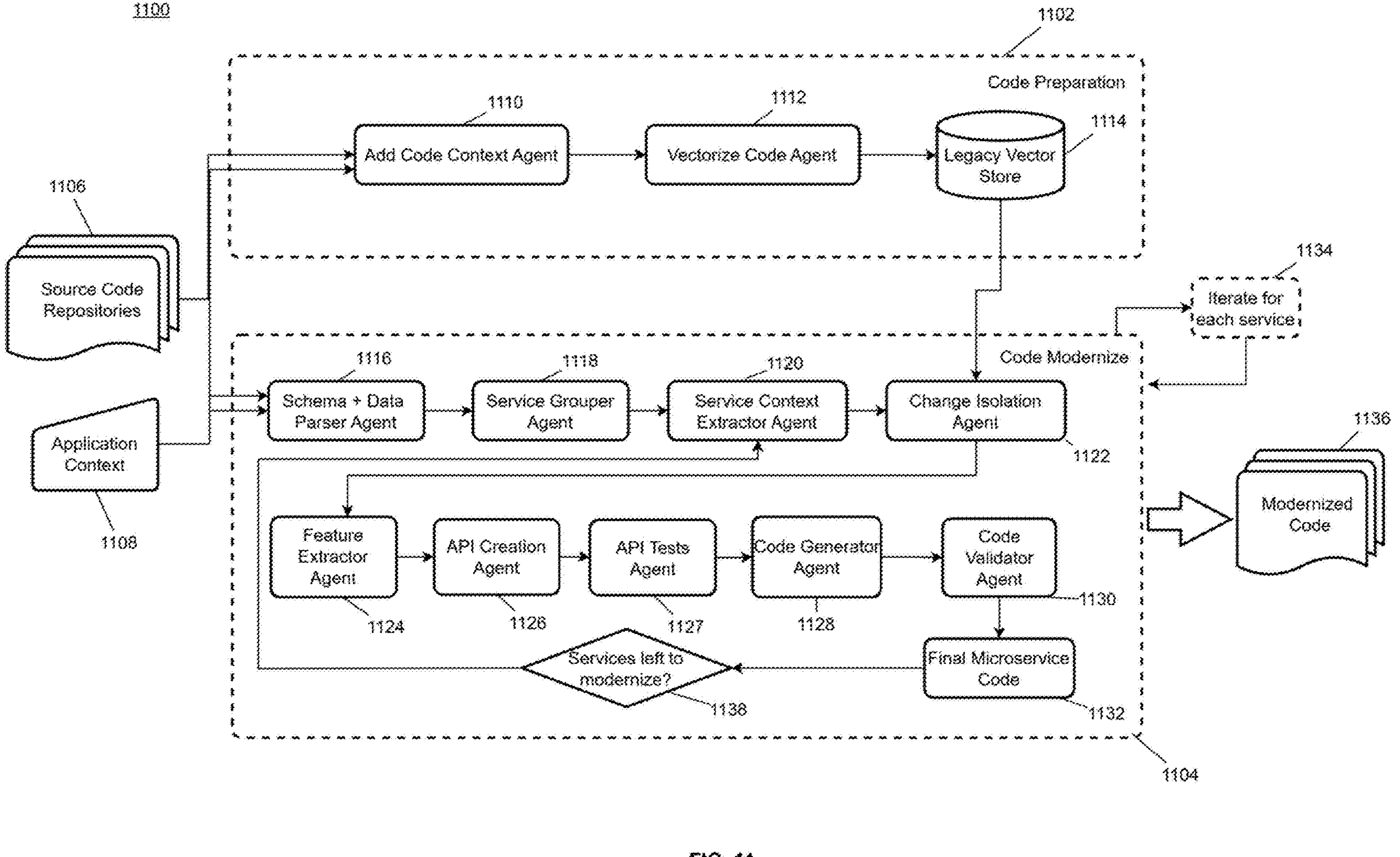
FIG. 11 shows a code modernization framework in accordance with at least one embodiment of the present disclosure.

FIG. 11 illustrates a code modernization framework 1100 according to various embodiments. The code modernization framework 1100 may be configured to transform legacy software systems into modern architectures through systematic analysis and AI-assisted code generation processes. In some embodiments, the modernization process includes converting monolithic legacy code to a microservice-based architecture. The code modernization framework 1100 may comprise a code preparation phase 1102 and a code modernization phase 1104 that work collaboratively to process monolithic legacy code and generate modernized software program products.

Legacy codebases, often large and undocumented, pose significant challenges in software development, including difficulty in comprehension, inefficient search and retrieval, high maintenance costs, and barriers to modernization. The contextual RAG system implemented by the modernization framework discussed herein addresses these issues by leveraging advanced natural language processing (NLP) and machine learning techniques, for example, through the code context agent 1110 and vectorize code agent 1112. These agents work sequentially to analyze, contextualize, and make legacy code searchable in a semantically meaningful way, supporting broader modernization efforts. The code preparation phase 1102, also referred to as the contextual retrieval augmented generation ("RAG") system for its ability to retrieve content for use in the generative AI processes downstream. Unique features of the code preparation phase 1102 may include parallel processing for speed, incremental updates for large codebases, and Git integration to track changes, which may help version control in AI-driven code analysis. The code modernization framework 1100 may receive input from source code repositories 1106 and context data 1108 (e.g., application context). In some embodiments, the context data 1108 may be manually entered, autonomously retrieved or received, or otherwise loaded into the framework. The source code repositories 1106 may contain legacy software program products (e.g., legacy software program products comprising monolithic legacy code) that requires modernization to meet contemporary architectural standards and operational requirements. The context data 1108 may provide application-specific information, technical specifications, and architectural guidance that inform the modernization process and ensure that generated microservices maintain functional equivalence with their legacy counterparts. As used herein, one agent, component, or the like "receiving input from" another component, agent, or other entity, or similar terminology, is intended to broadly refer to one process triggering or being noticed to another process without limiting the data available to the downstream process (e.g., one agent providing input to another agent does not suggest that the second agent cannot access data not provided by the first agent).

In the code preparation phase 1102, a code context agent 1110 may process the legacy code from the source code repositories 1106 and the context data 1108 (collectively referred to as code context data) to analyze the legacy codebase and extract metadata such as file structures, dependencies, and technology usage and ready the legacy code and the generated code context data for AI-driven transformation. For example, the code preparation phase 1102 may begin by preparing the existing, legacy code (e.g., the initial, subject legacy code to be modernized) with associated application context via the code context agent 1110. The application context includes elements such as application background, repository setup, code structure, technology stack, and architectural components. The code context agent 1110 may analyze the codebase and extract metadata such as file structures, dependencies, and technology usage, providing a comprehensive overview of the legacy software program product's current state. For example, the code context agent 1110 may collect configuration details, process code files, and use one or more LLMs to add metadata like purpose and functionality, making code more understandable. Non-limiting examples of innovative features of the code context agent 1110 include its intelligent code analysis (e.g., leverages LLMs for deep semantic understanding, extracting details beyond traditional static analysis), parallel processing (e.g., handles multiple files concurrently using, for example, ThreadPoolExecutor, improving efficiency for large datasets), and incremental processing (e.g., tracks processing status (e.g., NEW, COMPLETED, FAILED) to allow resumption after interruptions, ensuring robustness).

The code context agent 1110 may perform parallel processing, for example, using ThreadPoolExecutor to handle multiple files concurrently for improved efficiency with large datasets. This parallel processing capability may enable the code context agent 1110 to systematically analyze complex legacy systems without creating processing bottlenecks that could delay the modernization workflow. The code context agent 1110 may operate in substantially the same manner as the code context agent 502 discussed above in that it may enrich the code context data set by enriching the context data 1108 by extracting additional metadata such as the structural data, dependency data, and/or architectural standards data from the code context data (e.g., the legacy code and/or context data 1108) to generate enriched code context data (e.g., enriched code context data 646 shown in FIG. 6B).

The output from the code context agent 1110 may be processed by a vectorize code agent 1112, which may convert the enriched code and contextual information into vector embeddings. The vectorize code agent 1112 may support hierarchical storage maintaining vectors at multiple levels including individual files, combined databases, and service-specific stores. This hierarchical organization may enable efficient retrieval operations that can scale from granular code segment analysis to comprehensive system-wide modernization activities while balancing retrieval accuracy with performance requirements. The code context agent 1110 and vectorize agent 1112 may operate in sequence, with the code context agent (also referred to as a code context addition agent) first enriching code with context, followed by the vectorize code agent 1112 creating searchable embeddings. This process helps developers analyze, search, and transform complex code more efficiently.

Operationally, the code context agent 1110 may perform at least some of the following sequence of steps in some embodiments. Input Collection: code context agent 1110 gathers configuration details such as application context data and source language, defaulting to predefined values if not specified, through user feedback or existing settings; Document Processing: code context agent 1110 utilizes code_context_utils to load documents, specifying parameters like file paths, relative paths, application context, and services (file and LLM services); Chunking: code context agent 1110 splits large code files into manageable chunks to facilitate analysis, ensuring scalability for large codebases; Context Enrichment: code context agent 1110 uses LLMs to generate contextual metadata for each chunk, capturing details such as (a) the overall purpose of the code, (b) implementation details, including main components, design patterns, and key features, (c) data management strategies, such as data types, storage, and state management, and (d) important operations and their significance. This process may be guided by a structured prompt, which may for example outline the foregoing features and steps, ensuring comprehensive analysis. The enriched context may be added as metadata to the code chunks, making them more informative for subsequent processing. The code context agent 1110 may include a handler function (handler) that orchestrates these tasks, interfacing with utility classes and services (e.g., file_service, llm_service) for file operations and LLM interactions. This modularity enhances maintainability and scalability.

The vectorize code agent 1112 may embed the context data and store the vectorized data in a legacy vector store 1114, making the existing legacy code and enriched context data searchable and enabling efficient context referencing throughout the modernization process. Similar to the vectorization processes discussed herein, the vectorize code agent 1112 may be configured to create vector embeddings from the enriched code chunks and store them in a FAISS vector database for efficient similarity searches. The vectorization process ensures that the code and its associated metadata (e.g., enriched context data) are represented in a form that AI agents can read, generate inferences on, and utilize for subsequent tasks. Some non-limiting examples of innovative features of the vectorize code agent 1112 include (a) efficient vector creation by generating accurate vector representations, ensuring semantic fidelity for search operations, (b) hierarchical storage that maintains vectors at multiple levels (individual files, combined databases, service-specific stores) to cater to different use cases, and (c) error handling that implements robust error handling with retry mechanisms to manage failures during vector creation or database operations.

The system may include Git-aware vector updates that integrate with Git to track changes and ensure the vector database remains synchronized with codebase evolution. These Git-aware updates may maintain consistency between the vectorized representations and the actual codebase state, enabling the modernization framework to adapt to ongoing development activities and code changes.

The process may subsequently or in parallel proceed to the code modernization phase 1104. This portion of the modernization workflow according to some embodiments is divided into multiple agent-driven steps, some or all of which may be executed in a particular embodiment. Each of the agents described herein may be responsible for distinct tasks in the transformation journey. Each agent may receive, as an input, the output of the agent preceding it. In some embodiments, the functions associated with the various "agents" may be performed by separate respective agents and/or various functions assigned to groups of agents may be combined and performed by a single agent. Similarly, in some embodiments, the functions associated with a particular agent may be performed by multiple agents. In some embodiments, the various functions described in association with the agents discussed herein may be performed by one or more computing apparatuses.

Operationally, the vectorize code agent 1112 may perform at least some of the following sequence of steps in some embodiments. Input Loading: loads the contextualized chunks produced by the code context agent 1110 using file services (e.g., pickle_load); Vector Creation: converts each chunk into a vector embedding using an embeddings LLM model, either pre-configured or retrieved via the LLM service, capturing semantic meaning; Database Creation: stores these embeddings in a vector database (e.g., FAISS), organized hierarchically to support both individual file-level and combined searches, balancing accuracy and performance. The vectorize code agent 1112 may include a handler function (handler) that loads the contextualized chunks and calls the vector_db.create_db method to build the vector database. The VectorDB class, an example core component, uses parallel processing (via ThreadPoolExecutor) to create vector stores for each chunk, combines them into a unified database, and saves the result locally. The vectorize code agent 1112 may further support one or more of: incremental updates (adding, updating, or deleting vectors); efficient merging of vector stores; and reranking of search results for improved relevance. Git-aware updates to synchronize with codebase changes, ensuring the database reflects the latest code state.

Together, the code preparation phase 1102 may define a contextual RAG system that first enriches raw code with semantic context (e.g., via code context agent 1110) and then transforms this enriched data into vector embeddings for efficient search (e.g., via vector code agent 1112). The system integrates with and supports the modernization workflow by providing data and search capabilities to agents such as, but not limited to, the change isolation agent 1122, the feature extractor agent 1124, the code generator agent 1128, and/or the API creation agent 1126. By providing a searchable and semantically rich representation of the codebase, the contextual RAG system facilitates informed decision-making and enhances the efficiency of these downstream tasks of the code modernization phase 1104. Some non-limiting examples of innovative features of the code preparation phase 1102 include (a) deep code inference with LLMs (e.g., achieves comprehensive comprehension by leveraging LLMs, going beyond traditional static analysis tools); (b) reranking for improved search relevance (e.g., enhances search results by reranking, improving the accuracy and usefulness of retrieved code snippets); (c) contextual enrichment of code chunks (e.g., adds rich metadata to each chunk, providing a foundation for advanced search and analysis); (d) multi-level vector storage (e.g., organizes vectors hierarchically, balancing retrieval accuracy and performance, which is particularly useful for large codebases); (e) incremental processing (e.g., supports updates without reprocessing the entire codebase, enhancing scalability for continuous integration environments); and (f) Git-aware vector updates (e.g., integrates with Git to track changes, ensuring the vector database remains synchronized with codebase evolution, an unexpected detail that enhances version control in AI-driven analysis).

The code modernization phase 1104 may receive input from the legacy vector store 1114 and may process the vectorized data through multiple agents as described herein. The code modernization phase 1104 may also receive the legacy code from the source code repositories 1106 and/or the application context data 1108 for definition of the microservices. With continued reference to FIG. 11, parser agent 1116 may process the legacy code from the source code repositories 1106 and the context data 1108 (e.g., application background, repository setup, code structure, tech stack, architecture, etc.) to characterize the code and data structure within legacy software program product as an anchor point for the modernization process. For example, The parser agent 1116 may process the data models, database schemas, WSDL or API documentation to characterize the data structure within the legacy system (e.g., as characteristic data or similar context data). This step may be configured to anchor the mapping of the modernized solution to the legacy software solution. The parser agent 1116 may establish foundational inferences based on the legacy system architecture, data relationships, and service interfaces that serve as reference points for subsequent modernization activities.

A service grouper agent 1118 may receive output from the parser agent 1116 and may group services by identifying functionally related components (e.g., code components) and aligning them with targeted microservices boundaries to define initial groups that may become the delineation of distinct microservices. In some embodiments, the functional relationships are identified first and boundaries may be subsequently applied second to rationalize and optimize those groupings. For example, the service grouper agent 1118 may analyze the monolithic legacy code to identify functionally related code segments of a plurality of code segments and may define a plurality of groups by combining these functionally related code segments with boundaries defined by one or more microservices. This grouping process may minimize dependencies and maximize cohesion for future microservices while ensuring that each group contains logically related functionality that can be effectively transformed into discrete service components. In some embodiments, the grouping process may also expand the modularity and combinability of the microservices with other software and other microservices.

A service context extractor agent 1120 may receive the grouped services from the service grouper agent 1118 and may extract contextual information for each group, ensuring that service boundaries maintain the required domain context and functionality. The extracted context may be relevant to the group such that the context reflects the context used to create the microservice itself. The service context extractor agent 1120 may extract one or more group context data sets from each group of the plurality of groups, capturing semantic meaning, functional characteristics, dependencies, and operational requirements that define the scope and behavior of each group. The group context data set generation may be qualitatively different than the individual context extraction. For example, some embodiments of group context data set generation may add a layer of semantic synthesis, reconciling, summarizing, and aligning the collective meaning of interrelated components so that the resulting "group context" becomes a coherent representation of a microservice domain, not just a merged set of file-level facts.

A change isolation agent 1122 may receive input from the service context extractor agent 1120 and may isolate areas of the code from the legacy application. This isolation may help to identify impact areas and limit modernization to necessary components, which may improve the accuracy of the generated modern code by focusing only on the segments of the code that must be changed. For example, legacy code that may be run within a microservice may be retained without or with only minor modification, while the code to be modified to create the respective microservices may be identified and isolated, for example, as discussed with respect to the change isolation agent 506 in FIG. 5C. In the depicted embodiment, in an instance in which the modernization framework is attempting to generate an entire working microservice at once, a model such as the o1 model by OPENAI may be used to prepare the modernized code. The change isolation agent 1122 may analyze a vectorized code context data set based on the monolithic legacy code to identify at least one section of the one or more portions of the monolithic legacy code to be modified to generate modern microservice code. This isolation process may ensure that AI agents can work independently on specific code segments without affecting unrelated system components.

A feature extractor agent 1124 may receive input from the change isolation agent 1122 and may identify specific features to be extracted and modernized, making it possible to break down the modernization process into manageable and well-defined components. The feature extractor agent 1124 may analyze isolated code segments to identify discrete capabilities, technical functionality, or system capabilities that need to be preserved or enhanced during the transformation process.

An API creation agent 1126 may receive input from the feature extractor agent 1124 and may generate (e.g., via generative AI) one or more APIs for the newly defined microservices based on the extracted features. The API creation agent 1126 may be configured to generate APIs for each identified group, ensuring that functionality is exposed in a consistent manner and simplifying future integrations. The API creation agent 1126 may create standardized interfaces that enable communication between discrete services and external systems.

In some embodiments, automated testing is introduced at the API tests agent 1127 stage. An API tests agent 1127 may receive input from at least the API creation agent 1126 and may generate test cases and scenarios to validate the correctness of the created APIs. The API tests agent 1127 may be configured to ensure that modernized components meet expected standards before moving forward. The API tests agent 1127 may be configured to generate comprehensive test suites for each identified group's APIs, ensuring that modernized components meet expected standards before proceeding to subsequent stages of the modernization process. The API tests agent 1127 may create automated validation frameworks that verify API functionality, performance characteristics, and compliance with established requirements, thereby providing quality assurance mechanisms that validate the integrity of the generated interfaces and their ability to support the intended microservice interactions.

A code generator agent 1128 may receive input from the feature extractor agent 1124, the API tests agent 1127, and/or the API creation agent 1126 and may transform legacy service logic into modern microservice code for each of the identified microservices, creating consistent and scalable components ready for deployment. The code generator agent 1128 may be configured to generate modern microservice code for each identified group to define a modernized software program product. The code generator agent 1128 may create consistent and scalable components ready for deployment by implementing contemporary coding standards, architectural patterns, and deployment practices while maintaining the original logic and functional requirements. In some embodiments, the code generator agent 1128 may comprise one or more trained generative AI models (e.g., a large language model, such as a generative pre-trained transformer) to be used to transform the legacy service logic into modern microservice code.

A code validator agent 1130 may receive the generated code from the code generator agent 1128 and may review the generated microservice code to ensure it meets requirements such as best practices, security standards, and functionality requirements. The code validator agent 1130 may validate the modernized software program product through comprehensive quality assurance processes that verify code integrity, compliance with established standards, and alignment with project requirements. In some embodiments, the microservices may be validated individually and/or the final assembled code may be validated together. In some embodiments, the final stages of the modernization process involve code generation and validation to ensure the modernized components are production-ready and adhere to industry standards, customer requirements, and/or one or more other requirements.

Upon successful validation, the code validator agent 1130 may output final microservice code 1132, which represents the completed microservice implementation for a single service component. The code modernization phase 1104 may include an iterative process 1134 that allows the system to repeat the modernization steps for each service component (e.g., to create each microservice) until all identified services have been modernized. The entire process need not be repeated with each iteration where the preceding inputs are already known. The iterate process 1134 may ensure systematic processing of all grouped code segments through the sequential agent workflow.

The final output of the code modernization framework 1100 may be modernized code 1136, which represents the complete modernized microservice code that is ready for integration with a modernized UI and/or deployment and integration into a broader enterprise architecture. This process may iteratively check for more microservices to generate 1138 for each microservice until a complete set of final modernized microservice code is generated. The set of modernized microservice code may comprise multiple microservices that collectively provide the same functionality as the original legacy system while benefiting from modern architectural principles, improved maintainability, enhanced scalability, and cloud-native deployment capabilities.

Figure 12:
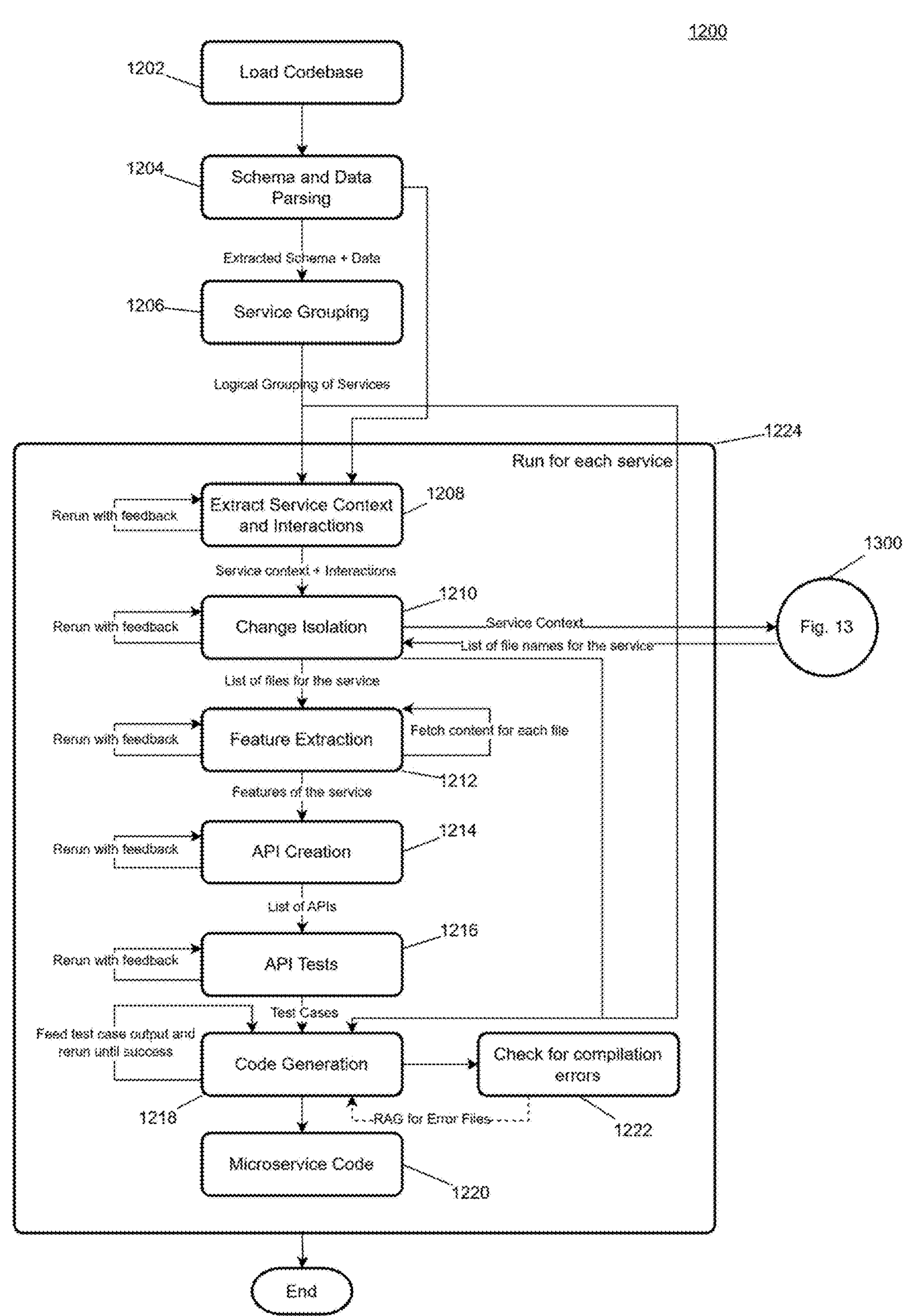
FIG. 12 shows a flowchart depicting a detailed code modernization process in accordance with at least one embodiment of the present disclosure.

FIG. 12 illustrates a detailed code modernization process 1200 according to various embodiments. The detailed code modernization process 1200 may define an expanded implementation of the code modernization phase 1104 described with respect to the framework of FIG. 11, providing granular detail about the specific operations and data flows that occur during legacy system transformation.

The detailed code modernization process 1200 may begin with a load codebase step 1202 where legacy software program products are loaded into the system for processing. The load codebase step 1202 may access the source code repositories 1106 (shown in FIG. 11) to retrieve monolithic legacy code and associated documentation that will serve as input for the modernization workflow. In some embodiments, the load codebase step 1202 may implement parallel loading mechanisms to handle large codebases efficiently while maintaining data integrity and ensuring that all necessary components are available for subsequent processing steps.

Following the load codebase step 1202, the detailed code modernization process 1200 may proceed to a schema and data parsing step 1204 that processes data models, database schemas, and API documentation to characterize the data structure within the legacy system. The schema and data parsing step 1204 may correspond to the functionality of the parser agent 1116 described with respect to FIG. 11, establishing foundational inferences of the legacy system architecture that serves as an anchor point for the modernization process. The schema and data parsing step 1204 may analyze Web Services Description Language (WSDL) documents, database schemas, and other structural documentation to create comprehensive mappings of the legacy system's data relationships and service interfaces.

The detailed code modernization process 1200 may continue with a service grouping step 1206 that identifies functionally related code components and groups them to define logical groupings of services. The service grouping step 1206 may correspond to the functionality of the service grouper agent 1118 described with respect to FIG. 11, analyzing monolithic legacy code to identify functionally related code segments and combining these segments with boundaries defined by target microservices. In some embodiments, the service grouping step 1206 may minimize dependencies and maximize cohesion for future microservices while ensuring that each group contains logically related functionality that can be effectively transformed into discrete service components.

An extract service context and interactions step 1208 may receive the grouped services from the service grouping step 1206 and may extract contextual information for each group to ensure that service boundaries maintain required domain context and functionality. The extract service context and interactions step 1208 may correspond to the functionality of the service context extractor agent 1120 described with respect to FIG. 11, capturing the context, such as semantic meaning, functional characteristics, dependencies, and operational requirements, that define the scope and behavior of each group. The extract service context and interactions step 1208 may generate group context data sets that provide context for creating modern microservices that maintain functional equivalence with their legacy counterparts.

Figure 13:
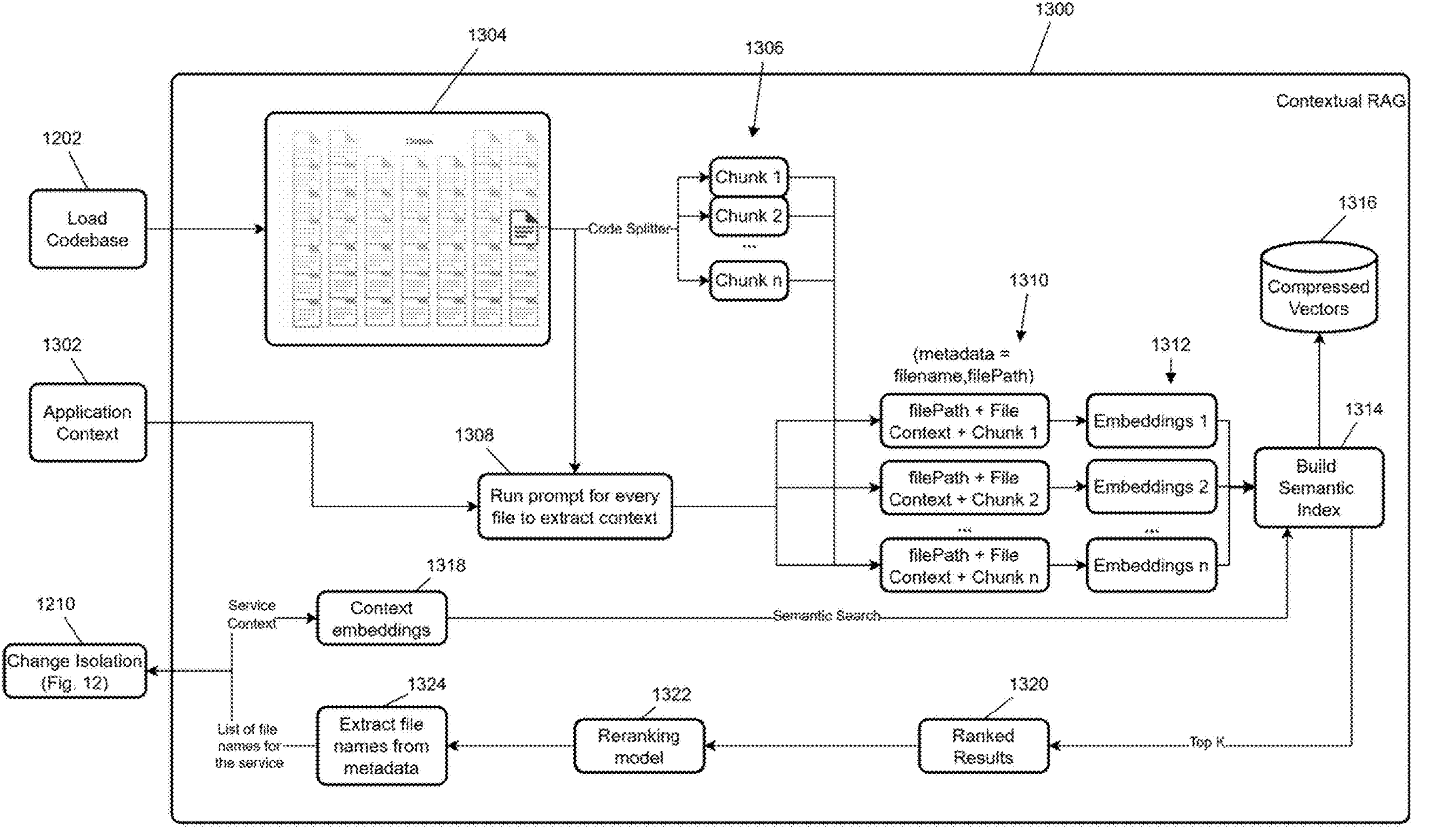
FIG. 13 shows a flowchart depicting a detailed code preparation process in accordance with at least one embodiment of the present disclosure.

The detailed code modernization process 1200 may proceed to a change isolation step 1210 that may include receiving service context and interactions from the extract service context and interactions step 1206 as well as a list of file names for the service from the code preparation process 1300 shown in FIG. 13 as inputs. The change isolation step 1210 may correspond to the functionality of the change isolation agent 1122 described with respect to FIG. 11, isolating specific areas of code that require modification while limiting modernization to necessary components. In some embodiments, the change isolation step 1210 may utilize K Nearest Neighbor (KNN)-based vector search algorithms to identify impacted files requiring modification, leveraging semantic similarity matching between modernization requirements and vectorized code representations to precisely target code segments that need transformation.

A feature extraction step 1212 may receive the list of files for the service from the change isolation step 1210 and may fetch content for each file to identify specific features to be extracted and modernized. The feature extraction step 1212 may correspond to the functionality of the feature extractor agent 1124 described with respect to FIG. 11, analyzing isolated code segments to identify discrete capabilities, technical functionality, or system capabilities that need to be preserved or enhanced during the transformation process. The feature extraction step 1212 may produce features of the service as output, breaking down the modernization process into manageable and well-defined components. In some embodiments, the system may extract the one or more context data sets from at least one database to support the feature extraction process, providing additional contextual information that enhances the accuracy of feature identification and extraction operations.

An API creation step 1214 may receive the extracted features from the feature extraction step 1212 and may generate APIs for the newly defined microservices based on the identified features. The API creation step 1214 may correspond to the functionality of the API creation agent 1126 described with respect to FIG. 11, creating software interfaces that enable communication between discrete services and external systems, which allows each microservice to be modular, scalable, and independent. The API creation step 1214 may ensure that functionality is exposed in a consistent manner, simplifying future integrations and maintaining compatibility with existing enterprise systems.

Following API creation, the detailed code modernization process 1200 may move to an API tests creation step 1216 that generates test cases and scenarios to validate the correctness of the created APIs. The API tests creation step 1216 may correspond to the functionality of the API tests agent 1127 described with respect to FIG. 11. The API tests creation step 1216 may produce a list of APIs as output and may ensure that modernized components meet expected standards before proceeding to code generation. In some embodiments, the generation of the one or more test cases may be automated based at least in part on one or more features extracted from the monolithic legacy code, enabling comprehensive validation coverage that reflects the specific functionality and requirements of the original legacy software program product.

A code generation step 1218 may receive input from, for example, the service grouping step 1206 and the API tests creation step 1216 to transform legacy service logic into modern microservice code. The code generation step 1218 may correspond to the functionality of the code generator agent 1128 described with respect to FIG. 11, implementing contemporary coding standards, architectural patterns, and deployment practices while maintaining the original legacy logic and functional requirements. The code generation step 1218 may create consistent and scalable components ready for deployment by generating modern microservice code that implements the same functionality as the grouped legacy components.

The code generation step 1218 may include iterative compilation error resolution where an LLM code generator analyzes compilation errors and iterates until a successful build is achieved. In some embodiments, the code generation step 1218 may receive test case output and may feed the test case output back iteratively until success is achieved, ensuring that generated code meets both functional and quality requirements. The iterative compilation error resolution process may utilize detailed context from compilation failures to make targeted adjustments, ensuring that corrections are fully aligned with the intended functionality and architectural requirements.

For example, the generated code may proceed to a check for compilation errors step 1222 that validates whether the generated code compiles successfully without errors. If compilation errors are detected, the check for compilation errors step 1222 may use a retrieval-augmented generation approach for error files, feeding error information back to the code generation step 1218 for iterative identification and correction of any compilation errors. The check for compilation errors step 1222 may analyze compilation failures in detail, inferring the context of errors within the modernized architecture to enable targeted resolution of issues that prevent successful code compilation.

Once the code successfully compiles without errors, the detailed code modernization process 1200 may produce a microservice code output 1220 representing the modernized microservice code for a single service. The microservice code output 1220 may comprise production-ready code that maintains functional equivalence with the original legacy components while benefiting from modern architectural principles and deployment capabilities.

The entire sequence from the extract service context and interactions step 1208 through the microservice code output 1220 may be executed within an iteration for each service loop 1224, which runs the process for each identified service until all services have been modernized. The iterations for each service loop 1224 may ensure systematic processing of all grouped code segments through the sequential workflow, enabling comprehensive transformation of complex legacy systems into modern microservice-based architectures. Within each step, as depicted in FIG. 12, the steps may be rerun with feedback to improve the outputs (e.g., by a human reviewer or another connected system or model). The feedback may allow transparency of the outputs of each step and rapid identification and resolution of any errors before they propagate through the process (or to allow rerunning of the process at the place where the error began if the error has already propagated) as described in various embodiments herein.

FIG. 13 illustrates a detailed code preparation process 1300 according to various embodiments. For example, in some embodiment the depicted code preparation process 1300 corresponds to at least a portion of an embodiment of the code preparation phase 560 shown in FIG. 5C as executed by the respective add code context agent 502 and vectorize code agent 504. The detailed code preparation process 1300 may transform legacy code into a searchable, semantically enriched format for use in software modernization workflows. The detailed code preparation process 1300 may begin with the load codebase step 1202, where the legacy codebase is loaded into the system for processing. The detailed code preparation process 1300 may receive application context 1302, which may provide contextual information about the application being modernized.

The detailed code preparation process 1300 may process code files 1304 from the corpus of files in the codebase (e.g., including the code files for the legacy software program product to be modernized) from the loaded codebase. A code splitter component may divide the code files 1304 into manageable code chunks 1306, including chunk 1, chunk 2, through chunk n. The code context agent may perform chunking by splitting large code files into manageable portions to facilitate analysis and ensure scalability for large codebases. These code chunks 1306 may then be processed through a prompt step 1308, which may run a prompt for every file to extract context.

The code context agent may perform parallel processing using ThreadPoolExecutor to handle multiple files concurrently for improved efficiency with large datasets. This parallel processing capability may enable the system to systematically analyze complex legacy systems without creating processing bottlenecks that could delay the modernization workflow. The system may implement incremental processing that tracks processing status as NEW, COMPLETED, or FAILED to allow resumption after interruptions, ensuring robust operation across complex development workflows.

The prompt step 1308 may generate extracted metadata 1310 (e.g., context data), which may include metadata such as filename and file path for each code chunk. The extracted metadata 1310 may be combined with file context and chunk information to generate embeddings 1312. The embeddings 1312 in the depicted embodiment include embeddings 1, embeddings 2, through embeddings n, corresponding to the respective code chunks 1306.

A build semantic index step 1314 may process the embeddings 1312 to create a searchable index. The build semantic index step 1314 may output compressed vectors 1316 (e.g., as stored in a database for later access, such as the legacy service vector database (DB) 1506 and/or modern vector DB 1508 shown in FIG. 15), which may store the vectorized representations of the code chunks and their associated context in a compressed format.

The detailed code preparation process 1300 may include a semantic search capability that utilizes context embeddings 1318. The context embeddings 1318 may provide service context for querying the compressed vectors 1316 as shown in the depicted embodiment. In some embodiments, a semantic search operation may retrieve top K results from the compressed vectors 1316, producing ranked results 1320. For example, using top K sampling, the top "k" (e.g., top 10, 15, 20, etc.) most probable results are used to limit token usage and processing power needed.

The ranked results 1320 may be processed by a reranking model 1322, which may refine the search results to improve relevance. The system may support reranking of search results for improved relevance when retrieving code snippets from the vector database. Following reranking, an extract file names from metadata step 1324 may retrieve a list of file names for the service from the metadata associated with the ranked results 1320 for transmission to the code modernization phase. The foregoing examples enable handling of larger codebases by the system, such as may be used to generate whole microservices.

For example, the detailed code preparation process 1300 may interface with the change isolation step 1210, which may receive the list of file names for the service. The change isolation step 1210 may utilize the output from the detailed code preparation process 1300 to identify specific code segments that require modification during the modernization workflow.

Figure 14:
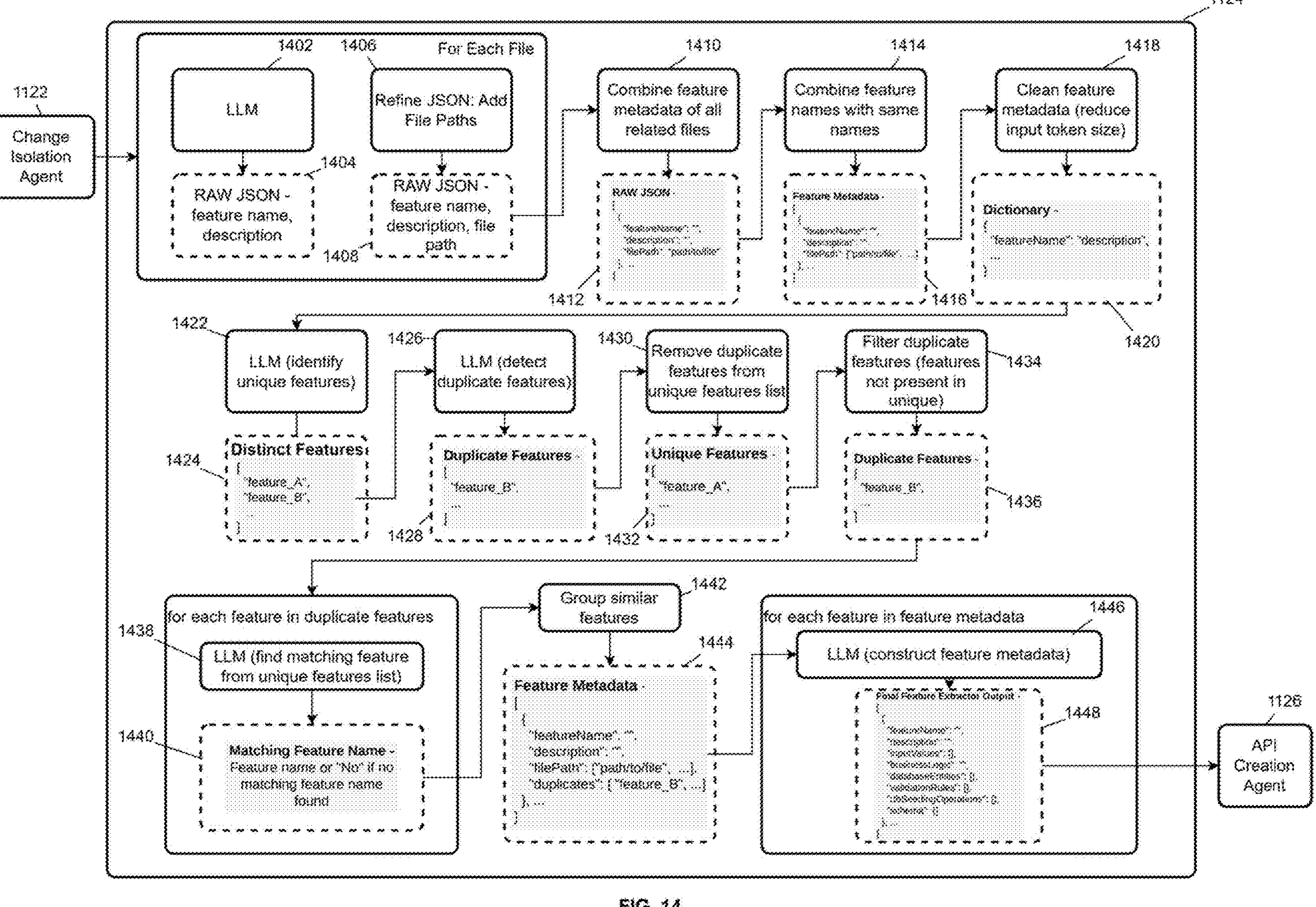
FIG. 14 shows a flowchart depicting a detailed feature extraction process in accordance with at least one embodiment of the present disclosure.

FIG. 14 illustrates a flowchart depicting a feature extraction process that operates downstream from the change isolation agent 1122 and upstream to the API creation agent 1126 according to various embodiments, including the embodiment of FIG. 11. The feature extractor agent 1124 is designed to identify and extract underlying contextual features (e.g., business, functional, or otherwise purposeful features) from legacy codebases. This feature extractor agent 1124 may transform unstructured legacy code into structured and actionable feature definitions. The feature extractor agent 1124 leverages AI, including LLM, techniques to automate the identification, cleaning, and merging of features, reducing the manual effort required for legacy software program product modernization. In the depicted embodiment, the process begins with the change isolation agent 1122 providing input to the feature extractor agent 1124, which processes the input through multiple sequential steps to generate a final feature extractor output 1448.

In some instances, legacy software program products may contain large volumes of unstructured code with embedded logic. Extracting clear, relevant features from such code is a labor-intensive task prone to human error. Additionally, the features often exist in a fragmented form across various files, making it difficult to identify their full scope and impact. The feature extractor agent 1124 may resolve these issues by automatically analyzing and interpreting code to detect potential features, grouping semantically similar features to avoid duplication, and/or providing clean, actionable feature definitions that can be directly used for modernization.

The feature extractor agent 1124 may first consume files or one or more code segments identified as relevant by the change isolation agent 1122, which may reduce noise and enhance feature identification accuracy. The feature extractor agent 1124 may then parse the consumed code to identify functionalities associated with the code, extracting metadata such as the feature name (e.g., derived from function/method names, comments, and context), feature description (e.g., using LLMs to describe the logic embedded in the code), and file path (e.g., location of the feature in the codebase). The feature extractor agent 1124 may initiate processing with a JSON LLM 1402 that analyzes input data for each file. The JSON LLM 1402 may produce a JSON LLM output 1404 containing raw feature information including feature names and descriptions. This output may be processed through a refine JSON step 1406, which adds file paths to the feature data to generate a refine JSON step output 1408 comprising refined JSON data with feature names, descriptions, and file paths. This process may iterate for each of the analyzed files.

To eliminate redundant or duplicate features, the feature extraction agent 1124 may merge features with identical or highly similar names. This process uses semantic similarity algorithms to identify related features across different files. As shown in FIG. 14, a combine feature metadata step 1410 may aggregate feature metadata from all related files to produce a combined feature metadata output 1412, which may include a combined RAW JSON output for all files. This combined data may then be processed through a combine feature names step 1414, which consolidates features having identical names to generate a combine feature names output 1416 containing feature metadata which may include merged duplicate names.

The extracted features may have redundant or conflicting definitions. Next, a cleaning phase may use heuristic rules and LLM-based suggestions to produce a concise and meaningful feature set. Referring to FIG. 14, a clean feature metadata step 1418 may process the combine feature names output 1416 to reduce input token size and generate a clean feature metadata output 1420 comprising a dictionary structure mapping feature names to descriptions.

In a unique feature identification stage, one or more LLM models may identify semantically unique features by, comparing feature descriptions, extracting and inferring contextual usage, and/or eliminating noise from helper functions or boilerplate code. In particular, the cleaned metadata may be analyzed by an LLM to identify unique features 1422, which produces an identified distinct features output 1424 listing distinct features such as "feature_A" and "feature_B".

Next, the system may perform duplicate detection. By using embedding-based similarity comparison, the feature extractor agent 1124 may detect and merge duplicate features across files, ensuring a clean, non-redundant feature list. The feature extraction process may further include using an LLM to detect duplicate features 1426, which includes analyzing the feature set to generate a detect duplicate features output 1428 identifying redundant features. The feature extractor agent 1124 may perform semantic similarity matching to combine related features from different code files and eliminate duplicates using embedding-based similarity comparison. A remove duplicate features from unique features list step 1430 may process both the identified distinct features output 1424 and the detect duplicate features output 1428 to produce a unique features without duplicate features output 1432 containing only non-redundant features.

A filter duplicate features step 1434 may operate on the detect duplicate features output 1428 to identify features not present in the unique features list, generating a filter output 1436 containing the filtered duplicate features. For each feature in the filtered duplicate features, an LLM to find matching features from unique features list 1438 may identify corresponding features from the unique features set, producing a matching feature name output 1440 that indicates either a matching feature name or "No" if no match is found between the two lists. The feature extractor agent 1124 can trace code dependencies and usage patterns to generate predictive inferences on the impact of each feature. This helps in identifying high-impact features that require priority attention during modernization.

The matching results may be processed through a group similar features step 1442, which consolidates related features to generate grouped similar feature metadata 1444. This grouped metadata may include feature names, descriptions, file paths, and identification of lists of duplicate features for each identified feature (e.g., each distinct feature 1424). For each feature in the feature metadata, an LLM to construct final feature metadata 1446 may process the grouped data to generate the final feature extractor output 1448.

The final feature extractor output 1448 may comprise comprehensive feature metadata including, but not limited to, feature names, descriptions, input values, logic descriptions, validation rules, database operations, schema definitions, and/or other attributes. This output may be transmitted to the API creation agent 1126 for subsequent processing in the software modernization workflow.

Structurally, embodiments of the feature extractor agent 1124 may comprise (a) an input handler, which consumes input from the change isolation agent 1122; (b) a feature parser, which uses one or more LLM models to extract features and metadata; (c) a feature merger, which combines semantically similar features; (d) a feature cleaner, which removes redundant or low-value features; and/or (e) an output generator, which produces a structured feature definition JSON. The foregoing computer executed functions may operate in a containerized environment for easy integration into modernization workflows. Some non-limiting example innovations accomplished by the feature extractor agent 1124 include (a) automated feature identification (e.g., the ability to extract features without human intervention); (b) semantic similarity matching (e.g., combining related features from different code files); (c) feature impact analysis (e.g., identifying high-impact features for modernization); and (d) integration with change isolation agent (e.g., seamlessly working with other modernization agents to streamline the process). The feature extractor according to various embodiments may significantly reduce the time and effort involved in generating predictive inference around software features for coding and modernizing legacy applications.

Figure 15:
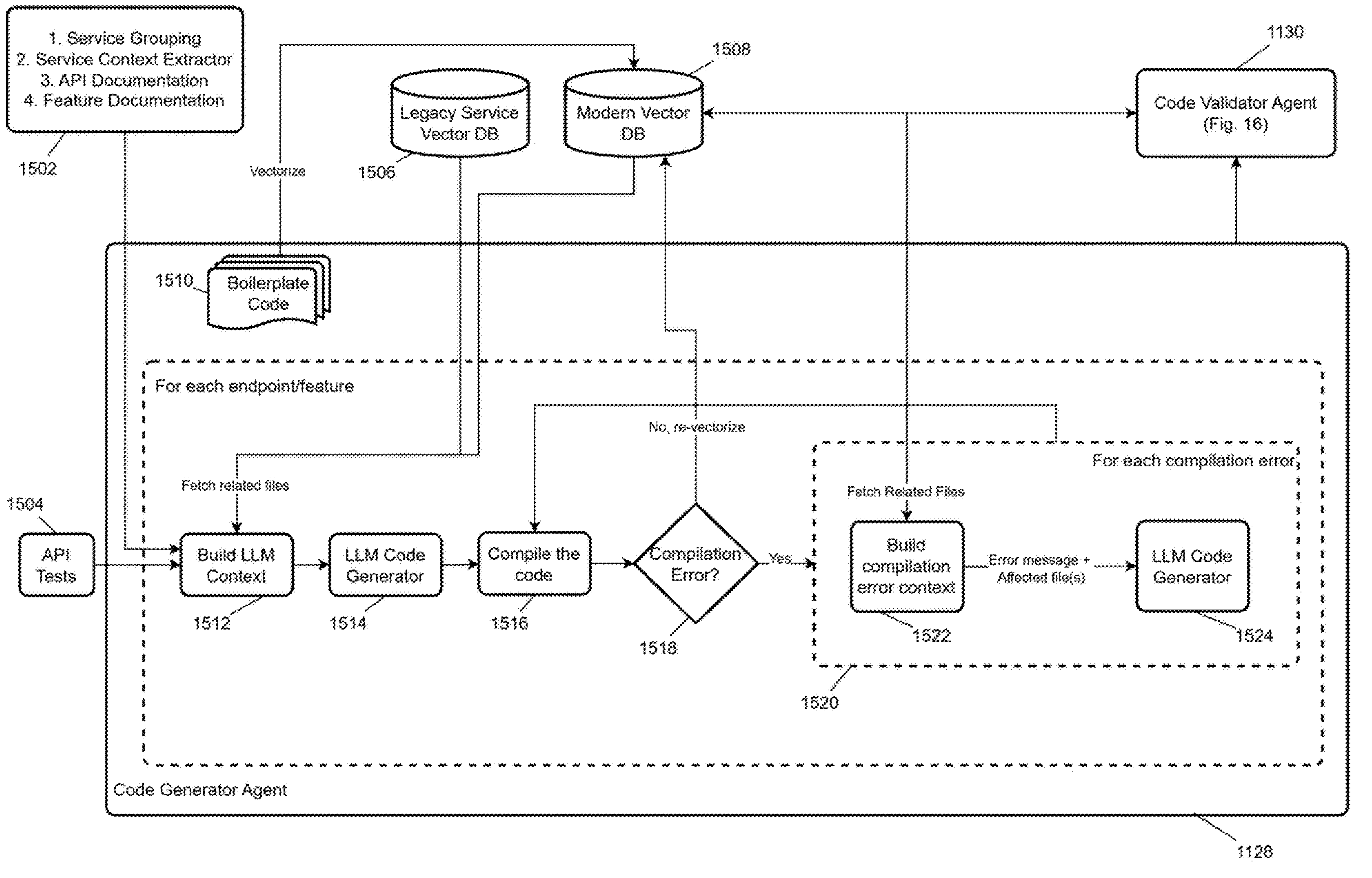
FIG. 15 shows a flowchart depicting a detailed code generation process in accordance with at least one embodiment of the present disclosure.

FIG. 15 illustrates a code generation workflow within a code generator agent 1128 and its connection to a code validator agent 1130 according to various embodiments. As discussed herein, the code generator agent 1128 may transform legacy service logic into modern microservice code. The workflow may receive input data 1502 and API tests 1504 (e.g., API tests from the API tests generator agent 1127 shown in FIG. 11) as initial inputs to the code generator agent 1128. The code generator agent 1128 may access a legacy service vector DB 1506 and a modern vector DB 1508 to retrieve relevant vectorized code context data, including code and enriched context data, which may define patterns and other data that inform the generation of modern microservice code. The legacy code may be enriched using the various processes discussed herein (e.g., as described with respect to FIGS. 5C and 6B-6C) while the modernized code in the modern code DB already includes relevant context and may not require enrichment. In the depicted embodiment, the agents operated under a Reason and Act (ReAct) logical framework, whereby each agent passes its generated output to the downstream agents, and each agent is simultaneously able to retrieve other information, including the outputs of further upstream agents, on demand to perform their tasks. All data need not be automatically fed to the downstream agent(s) for it to be accessible to them.

The code generator agent 1128 may include boilerplate code 1510 that provides foundational code structures for microservice generation. For example, boilerplate may set the base for each service that is going to be generated and may not require any additional logic. A build LLM context step 1512 may process the input data 1502, the boilerplate code 1510, and information from the legacy service vector DB 1506 and the modern vector DB 1508 to create a comprehensive context for code generation. The build LLM context step 1512 may consolidate various inputs including service grouping information, API documentation, and feature definitions to create a unified contextual foundation that enables accurate code generation aligned with both legacy functionality and modern architectural standards. For example, the build LLM context step 1512 may consolidate repository code and associated documentation, parsed schemas and interface definitions, configuration/build artifacts, service grouping outputs and file lists, and/or API documentation.

The output from the build LLM context step 1512 may be provided to an LLM code generator use step 1514, which may generate initial modern microservice code based on the assembled context. The code generator agent 1128 may utilize reasoning-heavy models, such as the o1 model created by OPENAI, GPT 5, CLAUDE SONNET 4.5, or the like, for complex service generation requiring extensive reasoning capabilities. These reasoning-heavy models may enable the system to handle intricate logic patterns, complex architectural decisions, and sophisticated code generation tasks that have a deep inferences of both legacy system functionality and modern microservice design principles.

The generated code may proceed to a compile code step 1516, which may attempt to compile the generated code to verify syntactic correctness and structural integrity. If the compilation is successful, the code may proceed to the code validator agent 1130 for validation (e.g., following re-vectorization in the depicted embodiment). If the compilation fails, a compilation error 1518 may be detected, triggering an error resolution process 1520 that implements iterative error resolution mechanisms. In some embodiments, generating the modern microservice code for each identified group may comprise generating initial modern microservice code for each identified group, analyzing one or more compilation errors in at least one of the initial modern microservice code, and generating corrected modern microservice code for each compilation error. The process may further comprise iterating multiple cycles of analyzing compilation errors, including the one or more compilation errors, and generating iterative corrected modern microservice code, including the corrected modern microservice code, wherein the modernized microservice code comprises a final corrected modern microservice code that successfully compiles.

Within the error resolution process 1520, a build compilation error context step 1522 may analyze the compilation error 1518 along with the affected files and error messages. The build compilation error context step 1522 may fetch related files and construct detailed error context information that provides comprehensive inference of the compilation failure and its relationship to the broader codebase architecture. This error context may be provided to an LLM code generator use step 1524, which may generate corrected code to address the compilation error 1518.

The code generation process may include iterative compilation error resolution where the LLM code generator analyzes compilation errors and iterates until a successful build is achieved. The corrected code may be fed back to the compile code step 1516 for re-compilation, creating an iterative cycle that continues until the code compiles successfully without errors, with the depicted process occurring for each compilation error, followed by attempting to recompile the code 1516. This iterative approach may ensure that the generated modern microservice code meets both functional requirements and technical compilation standards before proceeding to validation.

Figure 16:
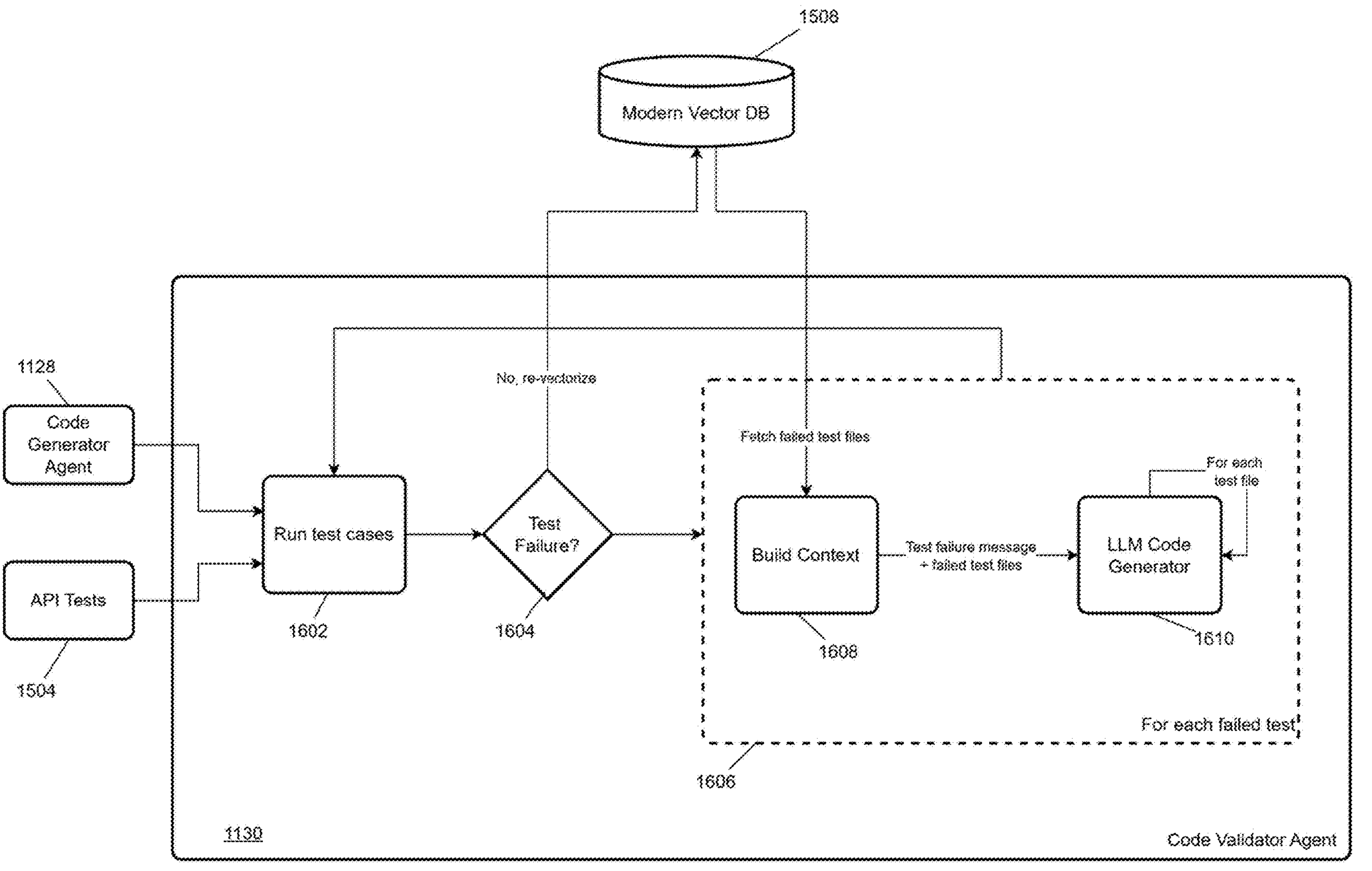
FIG. 16 shows a flowchart depicting a detailed code validation and testing process in accordance with at least one embodiment of the present disclosure.

Once compilation is successful, the compiled code may be transmitted to the code validator agent 1130 as shown and described in FIG. 16. The code validator agent 1130 may perform validation operations on the compiled code, which may include running the API tests 1504 and performing additional validation checks to ensure the code meets predetermined standards and requirements. The code validator agent 1130 may also interact with the error resolution process 1520 and/or LLM code generator 1524 if validation failures are detected, allowing for iterative refinement of the code until all validation criteria are satisfied.

In some embodiments, the code generator agent 1128 may be configured to generate the modern microservice code for each identified group through multiple processing stages. The code generator agent 1128 may generate extracted code context data for each identified group via communication with at least one LLM context extractor (e.g., at the build LLM context step 1512 shown in FIG. 15), and may generate modern microservice code for each identified group based at least in part on the extracted code context data via the at least one LLM context extractor. The at least one LLM context extractor may be further configured to enrich the extracted code context data using vectorized legacy code context data and vectorized modern code context data to generate enriched extracted code context data, which may be stored, for example, in the legacy service vector DB 1506 shown in FIG. 15. For example, the process may begin by using the LLM context extractor to add relevant context and generate code (e.g., boilerplate code) based on the service grouping, SWAGGER API documents, and feature definitions. The extracted code context may be further enriched by leveraging both legacy and modern repository files (e.g., legacy service vector DB 1506 and modern vector DB 1508). The LLM code generator steps 1514, 1524 (e.g., whether performed by one LLM or multiple LLMs) may generate the initial version of the microservice code and then compile it.

The generation of modern microservice code may be further based on one or more features associated with each of the plurality of groupings, ensuring that the generated microservices maintain functional equivalence with their legacy counterparts while implementing contemporary architectural patterns. The code generator agent 1128 may utilize at least one generative pre-trained transformer model to perform the code generation operations, leveraging advanced natural language processing capabilities to infer and transform legacy code patterns into modern implementations.

Thus, as described above, if compilation errors are encountered, the errors may be analyzed and the LLM code generator iterates until a successful build is achieved, ensuring that the generated code is error-free and optimized. The LLM context extractor may ensure that the code reflects both current and modern application standards. It may consolidate various inputs to create a comprehensive view, thereby maintaining consistency across the different services generated. During the compilation stage, any errors that arise are analyzed in detail as described above. The LLM code generator is responsible for not just identifying errors but also inferring the context of those errors within the modernized architecture. This iterative build cycle continues until the code compiles successfully without errors, ensuring robust output that adheres to both functional and performance requirements.

FIG. 16 illustrates a flowchart depicting a code validation and testing process performed by a code validator agent 1130 following receipt of code from a code generator agent 1128 according to various embodiments. The code validator agent 1130 may be responsible for validating the generated microservice code against best practices, security standards, and functional requirements. In some embodiments, this process begins by running the unit tests and integration tests generated during the earlier stages by the API tests agent (e.g., API tests agent 1127 shown in FIG. 11). If any test cases fail, the LLM code generator step 1610 may take over to iteratively fix the code. The generator 1610 may use detailed context from the failed test cases to make adjustments, ensuring that any corrections are fully aligned with the intended functionality. After resolving a failed tests, the code validator agent 1130 may perform further validation checks, such as adherence to coding standards, security best practices, and scalability considerations. In some embodiments, this phase may also include static analysis, which helps identify potential vulnerabilities, code smells, and other issues that could impact the performance or security of the modernized microservice.

In some embodiments, the validation phase may be exhaustive, ensuring that all edge cases are tested and verified. In some embodiments, the validation phase may include mandatory and/or optional validation steps. In some embodiments, the validation phase may include user-selectable validation steps. In the final steps, the validator may also look into the overall cohesion of the services, ensuring that interactions between services are reliable and efficient. Once all validations pass, the final microservice codebase is deemed production-ready, ensuring high quality and stability before deployment. The process iterates through the service components until all identified services have been modernized. The resulting output is a set of modernized microservice code that is ready for deployment and integration into the broader enterprise architecture.

With continued reference to FIG. 16, for example, the process may receive API tests 1504 (e.g., as generated by an API tests generator agent 1127 shown in FIG. 11) and may access a modern vector DB 1508 to support code generation and validation operations. The compiled, generated, and subsequently vectorized code from the code generator agent 1128 may be retrieved from the modern vector DB 1508. The code validation and testing process may implement a dual validation approach that combines probabilistic validation using LLM-based reasoning with deterministic validation using static code analysis tools to ensure comprehensive quality assurance of generated microservice code. In some embodiments, results from both validators (e.g., probabilistic reasoning and deterministic code analysis) are reconciled in a feedback loop that can trigger automated regeneration.

The code validator agent 1130 may execute a run test cases step 1602, which may perform testing operations on generated code. The run test cases step 1602 may evaluate whether the code satisfies predetermined testing criteria by analyzing the modernized microservice code to determine that the modern microservice code satisfies one or more predetermined standards (e.g., using the dual validation process described above). In some embodiments, the one or more predetermined standards may include at least one or more modernization best practices, one or more security standards, or one or more functional requirements for the modernized microservice code. The run test cases step 1602 may implement one or both of unit tests and integration tests that validate individual code segments and their interactions with other system components.

If the testing is successful, the process may proceed to completion (e.g., via re-vectorizing the tested code if needed and confirming that the version in the modern vector DB 1508 is validated or uploading the vectorized, validated code to the modern vector DB 1508. If the testing identifies issues, the process may detect a test failure 1604. The test failure 1604 may indicate that the generated code does not meet the established validation criteria or fails to satisfy the predetermined standards for code quality, functionality, or compliance requirements.

Upon detection of the test failure 1604, the process may initiate an error resolution process 1606 that implements iterative error resolution mechanisms. As compared to the error remediation process 1520 shown in FIG. 15 for resolving compilation errors (e.g., syntax issues), the error resolution process 1606 based on test failures are configured to identify logical misses which may require the agent(s) to look at the logic of the code. Test validation can be done only if the code compilation issues are resolved. The error resolution process 1606 may include a build context step 1608, which may analyze the test failure 1604 to construct detailed contextual information about the failure. The build context step 1608 may fetch failed test files and examine the nature of the errors to provide comprehensive context for correction. The build context step 1608 may analyze context information indicating details of the failure to satisfy the one or more predetermined standards for one or more portions of the modern microservice code which fail to satisfy the one or more predetermined standards.

The error resolution process 1606 may proceed to an LLM code generator use step 1610, which may generate corrected code based on the context information provided by the build context step 1608. The LLM code generator use step 1610 may utilize the test failure message and failed test files to produce updated code that addresses the identified issues. An at least one LLM code generator (e.g., as included in the code generator agent 1128 or a separate LLM code generator) may be configured at least to generate, based on the analysis, one or more respectively updated portions of the modernized microservice code.

Following the LLM code generator use step 1610, the corrected code may be fed back to the run test cases step 1602 for re-evaluation. This may create an iterative feedback loop where the process continues cycling through test execution, failure detection, context building, and code correction until all test cases pass successfully similar to the tests and processes shown with respect to the portion of the code generation process of FIG. 6C. The at least one LLM code generator may be further configured at least to iterate, at least by executing the one or more generative AI models and until the one or more predetermined standards have been satisfied, at least the analyzing or the generating a plurality of times until the one or more predetermined standards are satisfied.

In some embodiments, the at least one code validator agent 1130 may be configured to analyze the modern microservice code by running one or more unit tests and one or more integration tests on the modern microservice code. The one or more unit tests and the one or more integration tests may be generated by the API tests agent 1127 based on features extracted from the monolithic legacy code. In some embodiments, the code validator agent 1130 may be further configured at least to perform testing on a plurality of edge cases designed to identify potential vulnerabilities, implement one or more mandatory validation protocols, implement one or more optional validation protocols, or implement one or more user-selectable validation protocols.

In some embodiments, the code validator agent 1130 may be further configured at least to determine, based on analyzing one or more services of the modern microservice code, whether any of the one or more services are interfering with any other services of the one or more services. This analysis may ensure that the modernized microservices maintain proper isolation and do not create conflicts or dependencies that could compromise system stability or performance.

In some embodiments, the code validator agent 1130 may be further configured at least to iterate, at least by executing the one or more generative AI models, any one or more code validation operations until at least a predetermined amount of the one or more validation protocols (e.g., all or a subset of the validation protocols) have been satisfied, the one or more validation protocols including the one or more predetermined standards. The process may demonstrate an automated approach to code validation that combines testing, error analysis, and iterative code generation to ensure code quality and compliance with testing requirements.

UI Modernization Framework

Figure 17:
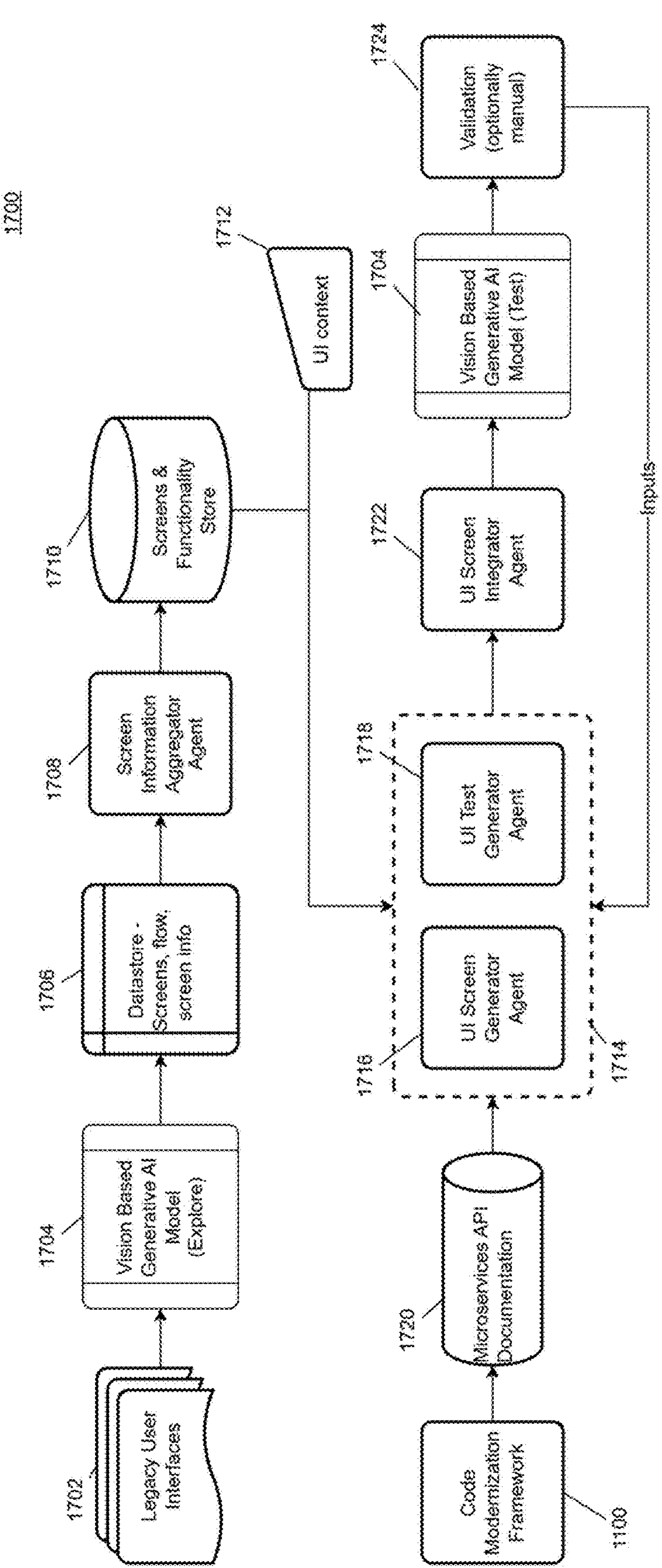
FIG. 17 shows a UI modernization framework in accordance with at least one embodiment of the present disclosure.

FIG. 17 illustrates a UI modernization framework 1700 according to various embodiments. Some embodiments of the UI modernization framework 1700 may include a UI generation workflow that focuses on transforming legacy user interfaces into modern, responsive UI components using automated agents and/or human input. This workflow may ensure that both functionality and user experience are preserved and enhanced during the modernization process. The various "generator" and "agent" terms described herein may be used interchangeably. In various embodiments, the UI modernization framework may be a standalone process to create modernized UIs or may be integrated with the code augmentation or modernization frameworks discussed herein. The UI modernization framework 1700 may transform legacy user interfaces into modern UI components through a sequence of agents and processing stages that preserve functionality while incorporating contemporary design principles and user experience standards. The UI modernization framework 1700 may receive input from legacy UIs 1702, which represent existing user interface implementations that require modernization to align with current design standards, accessibility requirements, and user experience expectations. In some embodiments, the legacy UIs 1702 may be retrieved for the specific software program product being augmented and/or modernized.

A vision based generative AI model 1704 (e.g., a FACTIF-AI model) may process the legacy UIs 1702 to analyze and extract information about the user interface structure, layout, and functionality. The vision based generative AI model 1704 may operate in two distinct modes to support comprehensive UI analysis and validation. In an explorer mode, the vision based generative AI model 1704 may systematically examine the legacy UIs 1702 to capture relevant interface characteristics, extract screen flows, layout information, and detailed screen information for storage and further processing. The vision based generative AI model 1704 may generate legacy graphical user interface (GUI) visual context data objects comprising screenshots of a legacy graphical user interface and operational context data indicating at least flow relationships between two or more of the screenshots and functionality associated with one or more components captured in each screenshot of the screenshots. The vision based generative AI model 1704 may capture the screenshots and apply analysis algorithms to the screenshots to determine at least a portion of the operational context data.

In some embodiments, the vision based generative AI model 1704 may manipulate the interface to simulate human interaction through simulated touch inputs, keystrokes, mouse clicks, and similar interactions, which may be used to map relational information about the flows and dependencies between UI screens and UI components. The simulated inputs may be conveyed to the interface through programmatic interaction mechanisms that interface directly with the underlying operating system and application programming interfaces. For example, the vision based generative AI model 1704 may utilize automated testing frameworks and browser automation tools that provide low-level access to user interface elements and input simulation capabilities.

In some embodiments, the simulated touch inputs may be generated through coordinate-based interaction systems that calculate precise screen positions for UI elements and transmit touch events to the target interface using system-level APIs. The vision based generative AI model 1704 may employ computer vision techniques to identify interactive elements within the legacy UI screenshots, determine their spatial coordinates, and generate corresponding touch events that are injected into the application's event handling system. The legacy UI itself may be operated in a simulated sandbox within the system server hardware.

Simulated keystrokes may be conveyed through virtual keyboard input mechanisms that generate keyboard events and transmit them to the active application window. The vision based generative AI model 1704 may utilize operating system input APIs to create synthetic keyboard events that include key press, key hold, and key release sequences, enabling the simulation of complex text input patterns and keyboard shortcuts that may be present in the legacy interface.

The technical implementation may utilize headless browser environments or application automation frameworks that provide programmatic control over user interface interactions. In some embodiments, the vision based generative AI model 1704 may interface with a software automation platform that enables script-based interaction with web-based legacy interfaces, allowing for systematic exploration of interface functionality through automated user simulation. For desktop applications, the system may employ platform-specific (e.g., operating system specific) automation APIs that provide programmatic access to application UI elements and enable the generation of synthetic user input events. These APIs may allow the vision based generative AI model 1704 to identify UI controls, retrieve their properties, and simulate user interactions in a manner that closely replicates human behavior patterns.

The one or more components may comprise two or more components, wherein the functionality associated with the one or more components of the operational context data comprises a mapping of at least one dependency functionality between the two or more components. This interaction simulation may enable the vision based generative AI model 1704 to infer the functional relationships and data dependencies between different UI components by tracking how user inputs affect interface behavior and navigation patterns.

The extracted information may be stored in a datastore 1706, which may maintain data related to screen flows, layouts, and detailed screen information captured during the analysis process. A screen information aggregator agent 1708 may retrieve data from the datastore 1706 and compile the information about screens, flow relationships, and functionality that was extracted by the vision based generative AI model 1704. The compilation may occur concurrent with requests to modernize specific legacy UIs or the compilation may be pre-generated in advance. Generating the legacy graphical user interface (GUI) visual context data objects may further comprise aggregating, via the screen information aggregator agent 1708, the operational context data, the operational context data comprising the portion of the operational context data. The screen information aggregator agent 1708 may ensure that all UI components are fully documented in the legacy graphical user interface (GUI) visual context data objects, including their relationships and dependencies, which helps in effectively inferring the complete UI landscape of the legacy application.

The aggregated information may be stored in a screens and functionality store 1710, which may serve as a repository for the compiled UI component data. The UI modernization framework 1700 may also receive UI context data 1712, which may provide contextual information including UI templates, UX guidelines, application background, repository setup, technology stack specifications, and information architecture data. The UI context data 1712 may comprise at least one or more modern UI templates and may further comprise configuration data and legacy application background data. The UI context data 1712 may serve as input for AI agents responsible for generating modern UI screens that maintain functional equivalence with legacy systems while incorporating contemporary design principles, responsive layouts, and enhanced user experience patterns. In some embodiments, the UI context 1712 may include any additional context data other than the data gleaned from the vision based generative AI model analysis. In some embodiments, at least a portion of the UI context 1712 may be manually loaded by a user.

A UI screen and test generator agent 1714 may receive inputs from both the screens and functionality store 1710 and the UI context data 1712. Within the UI screen and test generator agent 1714, a UI screen generator agent 1716 may generate modern UI screens based on the aggregated legacy interface information and the UI context data 1712. The UI screen generator agent 1716 may be configured to generate the modern UI screens, for example, using the legacy GUI visual context data objects and/or the UI context data 1712. The modern UI screens may comprise one or more modern components corresponding to the one or more components from the legacy interface. A UI test generator agent 1718 may create test cases to validate the generated UI components, ensuring consistency with original user interfaces and functional requirements. The UI test generator agent 1718 may be configured to generate one or more test cases based on the legacy graphical user interface (GUI) visual context data objects and/or UI context data 1712 to validate the modern UI screens. The one or more test cases may be configured to validate one or more requirements associated with the modern UI screens. For example, step 1718 may utilize legacy visual context objects and modern UI context data to construct executable test cases validating both functional behavior and visual consistency of generated user-interface components.

The UI modernization framework 1700 may also receive microservices API documentation 1720, which may provide specifications for backend services with which the modernized UI components will interact. Once the individual screens are generated, a UI screen integrator agent 1722 may integrate the modern UI screens generated by the UI screen generator agent 1716 with underlying microservices to generate a modernized software program product. Integrating the modern UI screens with the one or more microservices associated with the modernized software program product may comprise applying the UI screen integrator agent 1722 to the one or more microservices and the modern UI screens. The UI screen integrator agent 1722 may ensure seamless communication between front-end components and back-end services by coordinating data binding operations that connect UI components with appropriate microservice endpoints, implementing authentication and authorization protocols that ensure secure communication between frontend and backend systems, linking individual screens by flow to upstream and downstream screens via their underlying microservice processes, and establishing error handling mechanisms that maintain system stability during user interactions.

Following integration, the modernized UI components may undergo validation 1724. The validation 1724 process may utilize the vision based generative AI model 1704 operating in a testing mode to validate the modernized user interfaces. In the testing mode, the vision based generative AI model 1704 may apply analysis algorithms to the modernized software program product to validate the modern UI screens. The vision based generative AI model 1704 may be configured to manipulate the modern UI screens autonomously to test the modernized software program product by executing automated test scenarios, verifying proper functionality of interactive elements, and ensuring that the modernized interface maintains functional equivalence with the original legacy system. The validation 1724 may be performed autonomously by the vision based generative AI model 1704 or may be complemented by manual validation to ensure that the final UI meets user experience and accessibility standards. The vision based generative AI model 1704 may be the same model that initially populates the datastore 1706 or a separate model. The UI generation workflow may ensure that the transformed user interfaces not only retain the original functionality but also improve upon usability, aesthetics, and overall user experience, making them ready for modern web or mobile platforms.

In some embodiments, the human users may work in concert with the various processes disclosed herein to improve the code development process and generate better, faster, more accurate, higher quality code than human users alone. For example, in some embodiments of the framework, the automated agents handle at least repetitive, analysis-heavy tasks, enabling human experts to focus on critical decision-making points, such as defining appropriate service boundaries, validating API interactions, and managing complex edge cases. Human oversight at each stage may ensure that the modernization aligns with requirements while AI accelerates and enhances the accuracy of execution. In some embodiments, varying degrees of human involvement or no human involvement are each contemplated.

In some embodiments, the various computer-implemented processes herein, including the various AI processes, may facilitate improvements to legacy computing systems, including codebases and UIs. By leveraging embodiments of the present disclosure, enterprises and other users can transform legacy systems into microservice-based architectures with significant speed and reduced costs. Thus, various embodiments accelerate the transformation journey while maintaining a high level of quality, minimizing downtime, and ensuring that critical functionality is retained throughout the modernization process.

Figure 18:
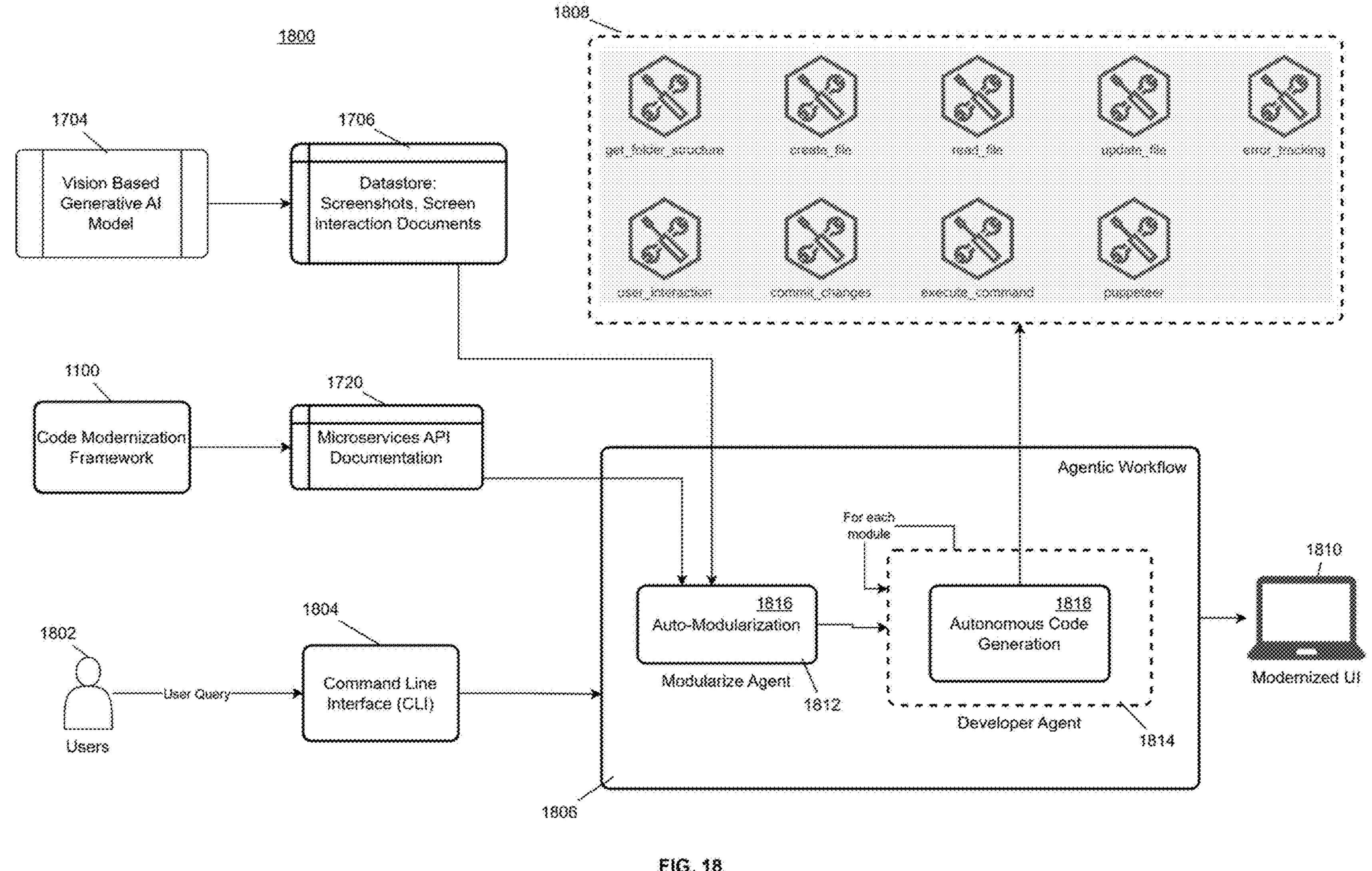
FIG. 18 shows a flowchart depicting a detailed UI modernization process in accordance with at least one embodiment of the present disclosure.

FIG. 18 illustrates a detailed UI modernization process 1800 according to various embodiments. The detailed UI modernization process 1800 may transform legacy user interfaces into modernized UI components through a sequence of agents and processing stages that coordinate human oversight with automated AI-driven modernization capabilities. The detailed UI modernization process 1800 may receive input from user(s) 1802 through a command line interface 1804 that provides an interface through which the user(s) 1802 can interact with the system and provide instructions for UI modernization. The detailed UI modernization process 1800 may correspond to and be included in the process shown and described with respect to FIG. 17.

The detailed UI modernization process 1800 may operate within an agentic workflow 1806 that coordinates the various components and agents involved in the modernization process. The agentic workflow 1806 may include tools 1808 that provide functionality for the modernization operations. The tools 1808 may comprise multiple functions including get_folder_structure, create_file, read_file, update_file, error_tracking, user_interaction, commit_changes, execute_command, and puppeteer, which collectively enable the system to perform various operations required for UI modernization. These tools 1808 may facilitate human-in-the-loop design by allowing human intervention and approval at every stage of the modernization process, including requirements validation, task refinement, code review, and test result interpretation.

Within the agentic workflow 1806, a developer agent 1814 may be configured to perform code generation and modification tasks for UI modernization. The detailed UI modernization process 1800 may also include a modularize agent 1812 that receives input from the agentic workflow 1806. The modularize agent 1812 may perform an auto-modularization step 1816 that processes code to identify and separate functional components within legacy UI implementations. The developer agent 1814 may further include autonomous code generation 1818 that generates modernized code based on the modularization analysis performed by the auto-modularization step 1816. The auto-modularization step 1816 and autonomous code generation 1818 may work iteratively, with the auto-modularization step 1816 analyzing code structure for each module and the autonomous code generation 1818 generating corresponding modernized implementations that maintain functional equivalence while incorporating contemporary design standards. The modularize agent 1812 may be configured to break down legacy UI components into discrete, manageable modules that can be independently processed and modernized. The modularize agent 1812 may analyze legacy interface structures to identify logical boundaries between different functional areas, enabling the system to process complex user interfaces through systematic decomposition into smaller, more manageable components.

The detailed UI modernization process 1800 may interface with the vision based generative AI model 1704 that analyzes legacy user interfaces to extract visual and functional information via the datastore 1706. The vision based generative AI model 1704 may operate in two distinct modes to support comprehensive UI analysis and validation. In an explorer mode, the vision based generative AI model 1704 may systematically examine legacy UIs to capture relevant interface characteristics, extract screen flows, layout information, and detailed screen information. In a test mode, the vision based generative AI model 1704 may validate modernized user interfaces by executing automated test scenarios and verifying proper functionality of interactive elements.

The vision based generative AI model 1704 may store extracted information in the datastore 1706, which may maintain data related to screen flows, layouts, and detailed screen information from the legacy UI. The detailed UI modernization process 1800 may receive the microservices API documentation 1720 that provides specifications for backend services with which the modernized UI components will interact. The microservices API documentation 1720 may enable the system to ensure proper integration between the modernized UI and the underlying microservices architecture, facilitating seamless communication between front-end components and back-end services. The agentic workflow 1806 may receive these inputs from the respective microservices API documentation 1720 and the datastore 1706 and generate the modernized UI integrating the microservices with the newly modernized UI with software connections between the screens and UI components and the respective microservice code components.

The detailed UI modernization process 1800 may produce a modernized UI 1810 as output. The modernized UI 1810 may represent the transformed user interface that has been generated through the coordinated operation of the various agents and components within the agentic workflow 1806. The modernized UI 1810 may incorporate both the visual design elements extracted by the vision based generative AI model 1704 and the functional integration requirements specified in the microservices API documentation 1720, ensuring that the final interface maintains functional equivalence with the original legacy system while benefiting from contemporary design principles and enhanced user experience patterns.

Example User Interfaces

Figure 19:
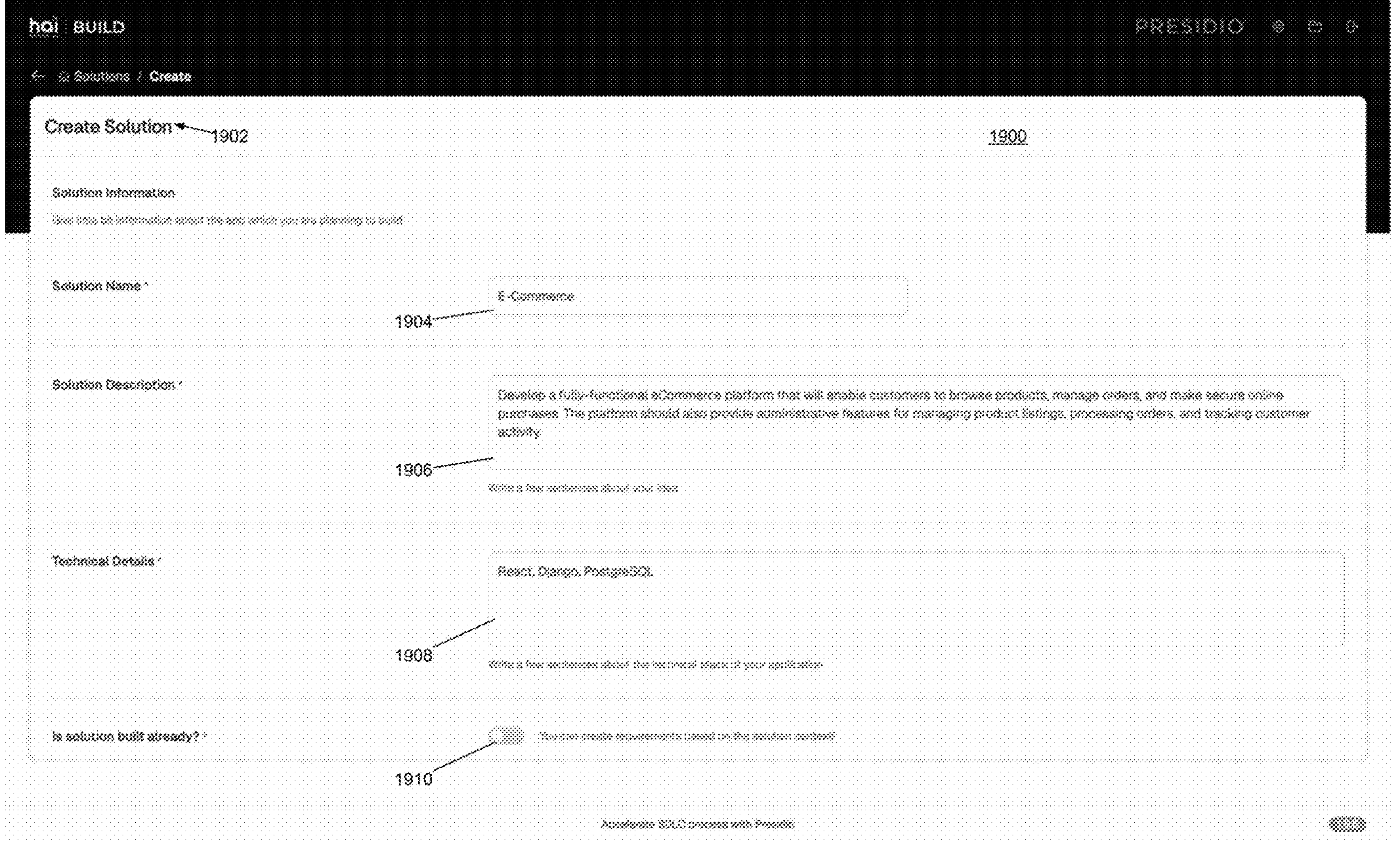
FIG. 19 shows an example graphical user interface displaying a create solution page for initiating software development in accordance with at least one embodiment of the present disclosure.

FIGS. 19-30 depict example interfaces that may be used in association with the various processes disclosed herein. For example, FIG. 19 shows a system GUI 1900 displaying a create solution page 1902 for initiating software development within an agentic coding environment (e.g., an agentic AI augmentation framework). The interface includes and provides access to a number of features, which provide functionality such as AI-powered document generation (e.g., efficiently and effortlessly, for the user, automate creation of detailed SDLC documentation); intelligent chat interface (e.g., get real-time requirement edits and context-specific suggestions); business process visualization (e.g., easily and efficiently generate and manage process flows); user story generation (e.g., convert requirements into actionable user stories and tasks); real-time collaboration (e.g., collaborate and refine requirements with team members); desktop integration (e.g., seamlessly integrate with your existing workflow tools); and/or multi-modal support (e.g., allow a user to choose or autonomously choose the model that best suits the development needs). The depicted GUI 1900 corresponds to a screen a user may be presented with during a requirements definition phase (e.g., as shown in FIG. 5A) of an agentic AI coding process (e.g., AI augmentation and/or modernization). The create solution page 1902 includes a solution name field 1904 configured to receive a name for a software program product to be developed or otherwise worked on. A solution description field 1906 is positioned below the solution name field 1904 and is configured to receive a description of the software purpose, functionality requirements, and any other information the user inputs. A technical details field 1908 is positioned below the solution description field 1906 and is configured to receive technical specifications (e.g., technical stack information) including but not limited to models, programming languages, frameworks, and architectural requirements for the software program product. A preexisting solution toggle 1910 is presented to allow the user to indicate whether there is preexisting code from which to start the project (e.g., preexisting software to modify and/or preexisting code to serve as a model for the new, fresh development and/or modernization).

Figure 20:
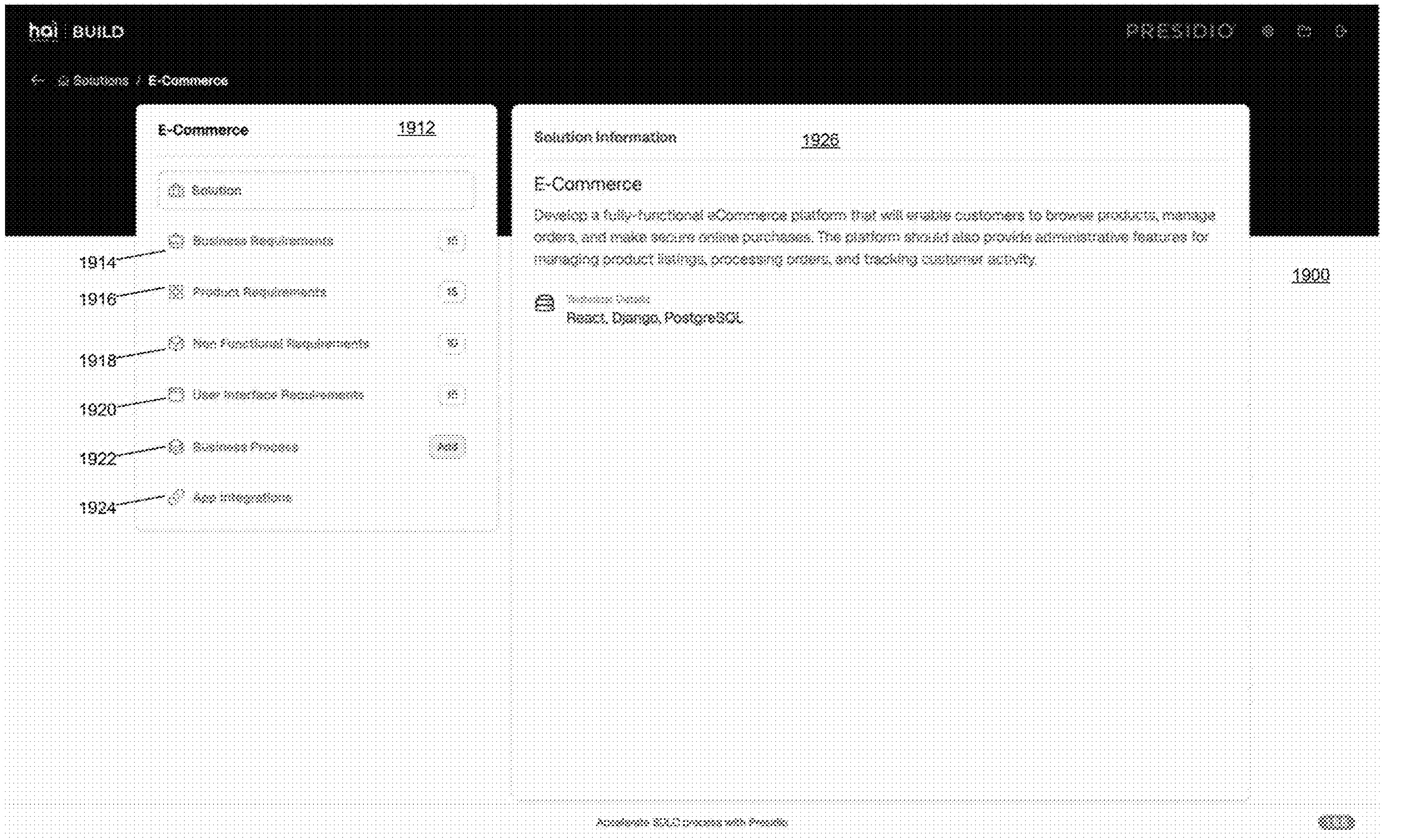
FIG. 20 shows an example graphical user interface displaying a solution description page in accordance with at least one embodiment of the present disclosure.

FIG. 20 shows a system GUI 1900 displaying a solution description page 1926 for managing software development requirements within an agentic AI augmentation framework. The system GUI 1900 includes a requirements management toolbar 1912 positioned at the left side of the interface, which provides access to various requirement documentation categories. The depicted requirements management toolbar 1912 contains multiple navigation buttons such as a business requirements button 1914, a product requirements button 1916, a nonfunctional requirements button 1918, a user interface requirements button 1920, a business process button 1922, and an app integrations button 1924. These buttons enable users to navigate between different types of requirement documentation and configuration options within the software development lifecycle. The interface may present each sub-page as the process proceeds through each step of the requirements definition process (e.g., as shown in FIG. 5A) with the buttons corresponding to the depicted agents.

Each of the sets of information in each page may correspond to the information generated by each agent with or without human interaction as described with respect to FIGS. 5A and 6A. For example, comparing FIGS. 5A and 20, the business requirements button 1914 may lead to a business requirements page (e.g., business requirements page 1928 shown in FIG. 21) which shows the output of the requirements document generation process 538; the product requirements button 1916 may lead to a product requirements page (e.g., product requirements page 1932 shown in FIG. 22) which shows the output of the product requirements generation process 546; the nonfunctional requirements button 1918 may lead to a nonfunctional requirements page (e.g., nonfunctional requirements page 1936 shown in FIG. 23) which shows the output of the nonfunctional requirements generation process 540; the user interface requirements button 1920 may lead to a user interface requirements page (e.g., user interface requirements page 1940 shown in FIG. 24) which shows the output of the user interface requirements generation process 542; and/or the business process button 1922 may lead to a business requirements page which shows the output of the process generation process 544. The app integrations 1924 may allow modular functionalities, such as third party apps, to be integrated with the system and directly work on the requirements definition process or any other process described herein.

In the embodiment depicted in FIG. 20, the solution description 1926 that presents detailed information about the software program product being developed, which includes the information provided by the agent and/or user on the create solution page 1902. With each of the various GUI pages, the user may be able to return at any time and view or modify these underlying requirement outputs to modify the downstream coding output.

Figure 21:
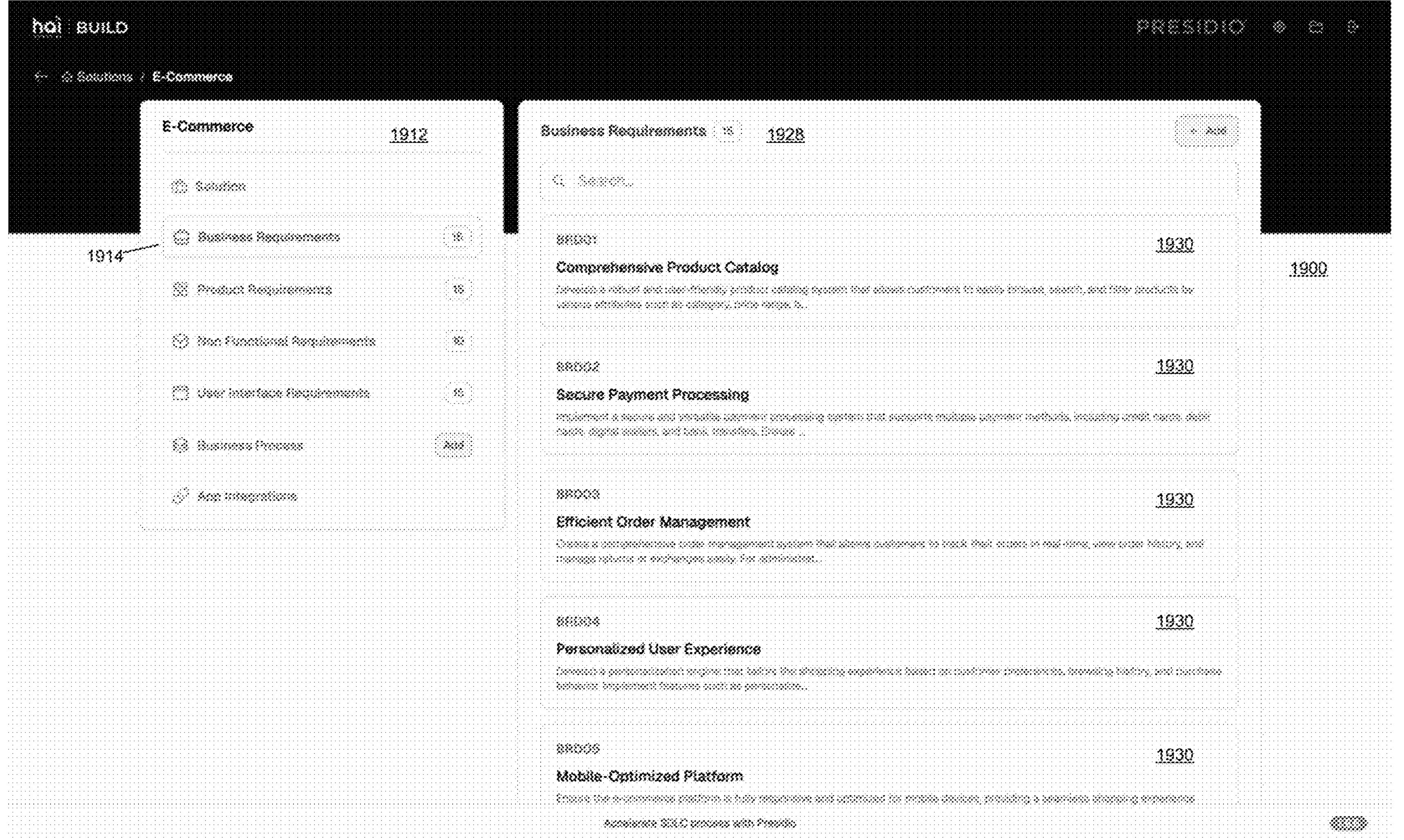
FIG. 21 shows an example graphical user interface displaying a business requirements page in accordance with at least one embodiment of the present disclosure.

FIG. 21 shows a system GUI 1900 displaying a business requirements page 1928 that presents detailed business requirement information for a software program product being developed. The page includes multiple requirement elements 1930 organized in a structured format that enables users to review, modify, and validate requirements throughout the software development lifecycle.

Figure 22:
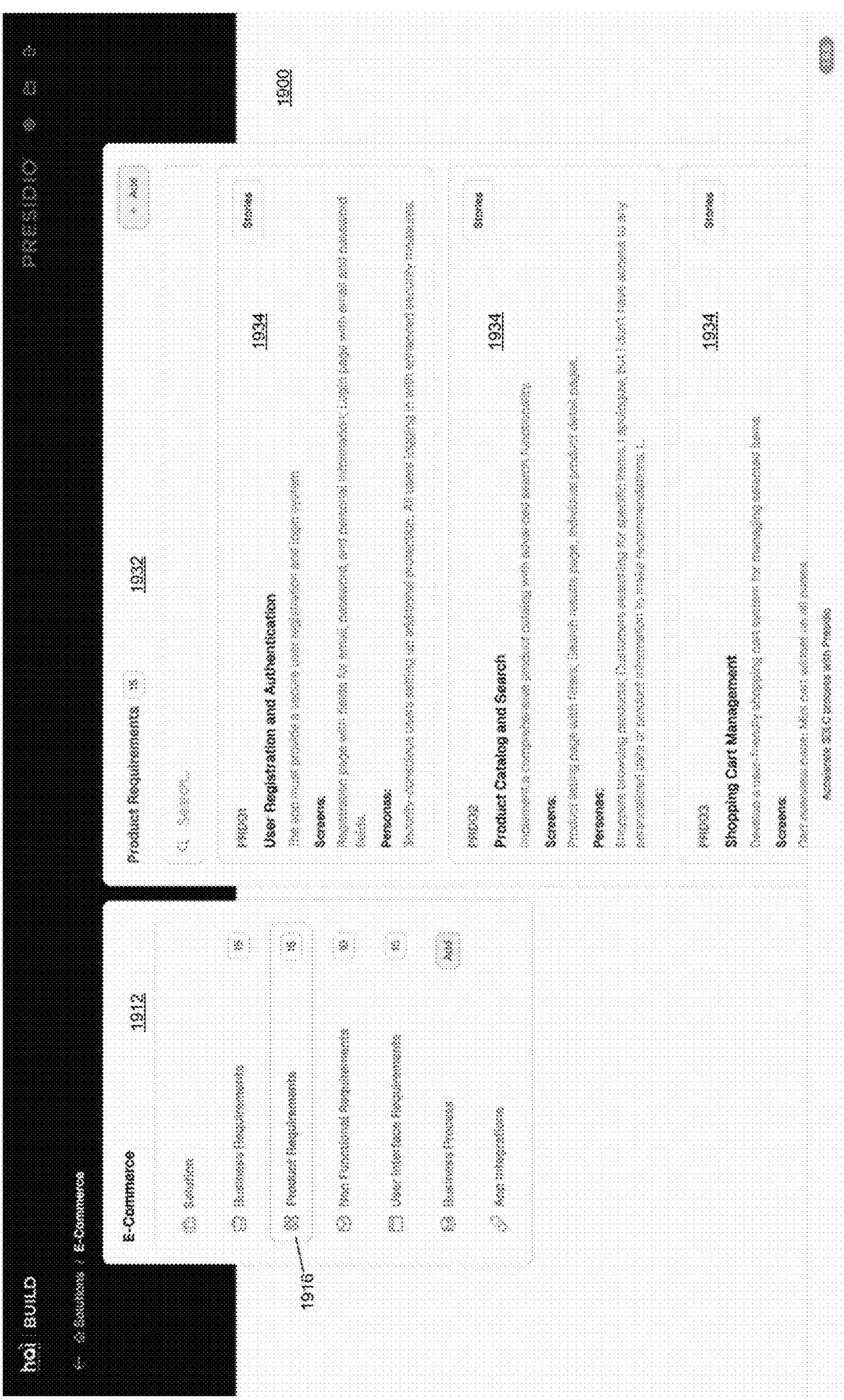
FIG. 22 shows an example graphical user interface displaying a product requirements page in accordance with at least one embodiment of the present disclosure.

FIG. 22 shows a system GUI 1900 displaying a product requirements page 1932 that presents detailed product requirement information. The page includes multiple product requirement elements 1934 that define specific outputs of the product requirements generation process, organized in a structured format for user review and validation.

Figure 23:
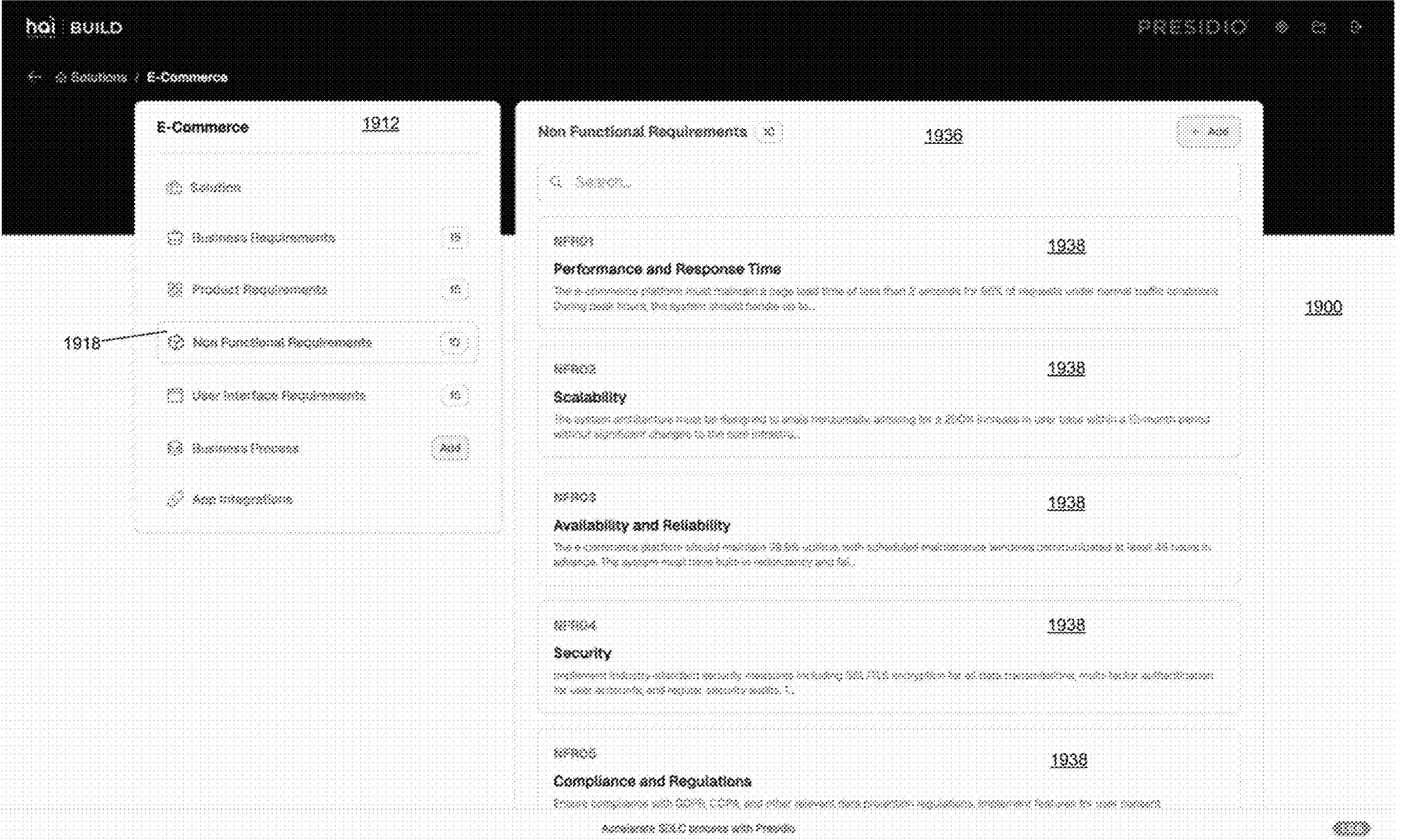
FIG. 23 shows an example graphical user interface displaying a nonfunctional requirements page in accordance with at least one embodiment of the present disclosure.

FIG. 23 shows a system GUI 1900 displaying a nonfunctional requirements page 1936 that presents detailed nonfunctional requirement information. The page includes multiple nonfunctional requirement elements 1938 that define specific outputs of the nonfunctional requirements generation process, organized for user review and validation throughout the development lifecycle.

Figure 24:
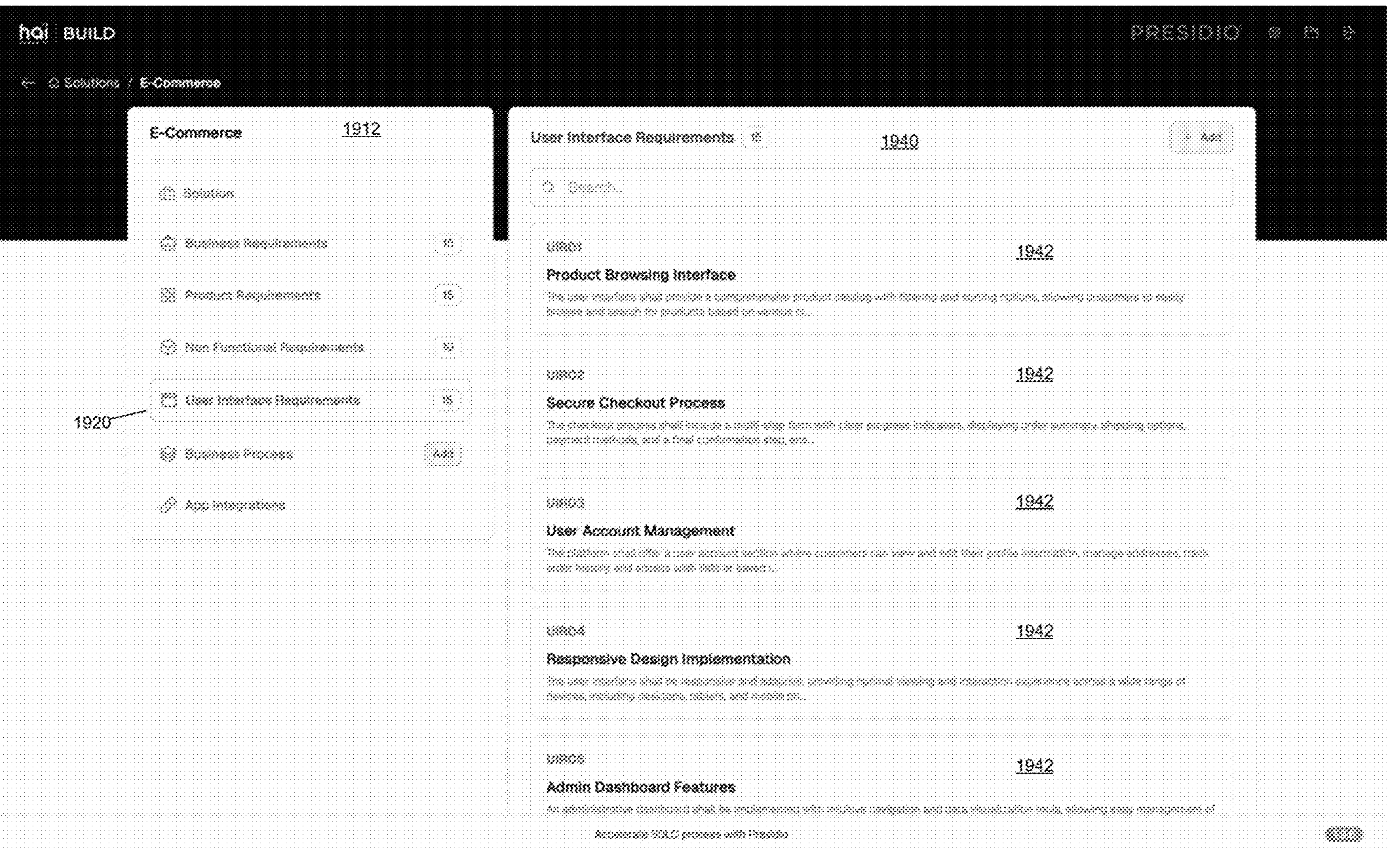
FIG. 24 shows an example graphical user interface displaying a user interface requirements page in accordance with at least one embodiment of the present disclosure.

FIG. 24 shows a system GUI 1900 displaying a user interface requirements page 1940 that presents detailed user interface requirement information. The page includes multiple user interface requirement elements 1942 that define specific outputs of the user interface requirements generation process, organized in a structured format for user interaction.

Figure 25:
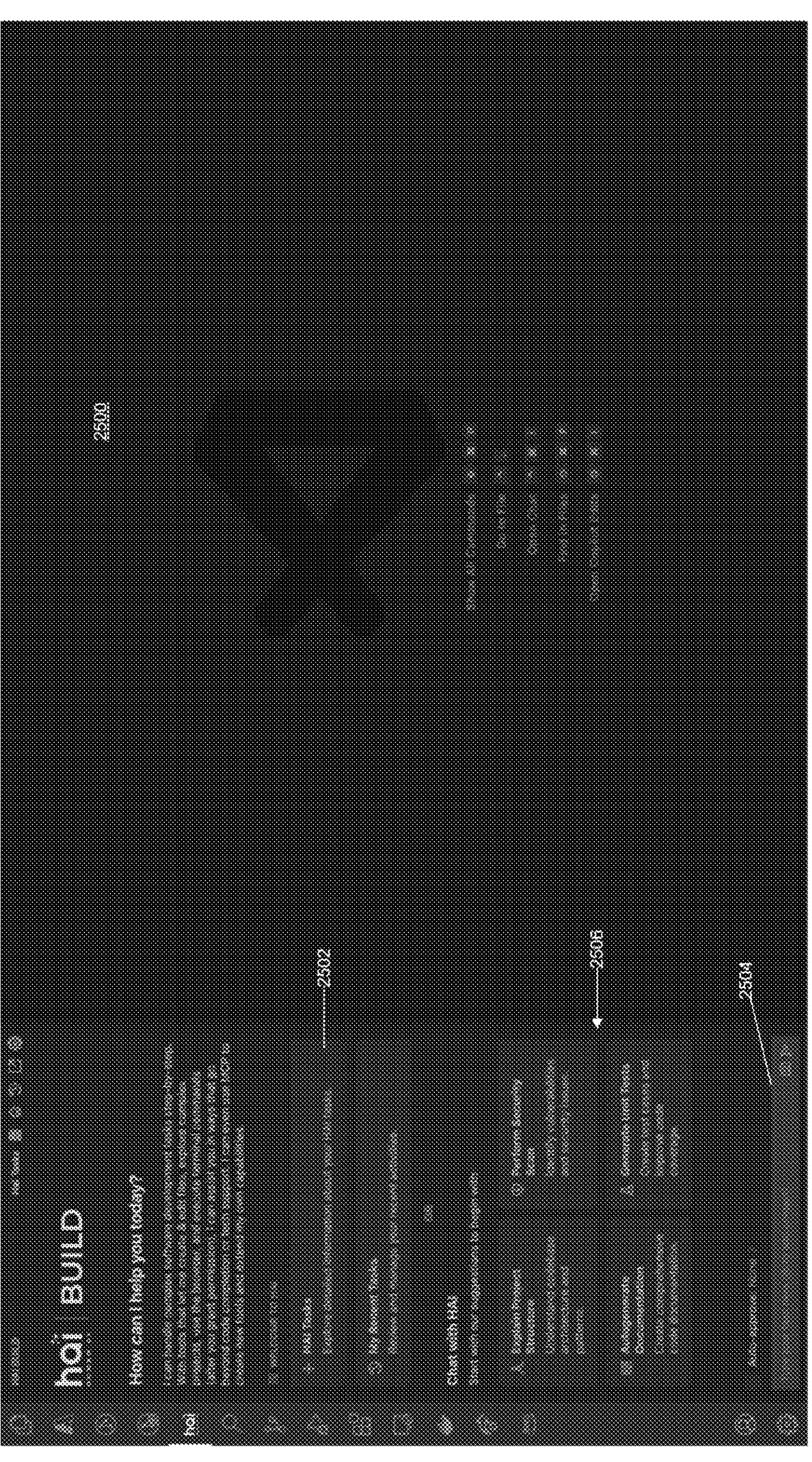
FIG. 25 shows an example software program product management interface in accordance with at least one embodiment of the present disclosure.

FIG. 25 shows a software program product management interface 2500 displaying an agentic AI augmentation framework interface for managing software development tasks. The software program product management interface may facilitate the various code generation functions of the system (e.g., as shown in FIGS. 5B-5C and 6B-6C). Some example features of or made available by the software program product management interface include code indexing (e.g., index files with Faiss DB); code context (e.g., auto-generate code comments); tasks (e.g., executes defined tasks via the requirement AI and/or the requirement definition interface, such as the interface shown in FIGS. 19-24); user stories interface (e.g., accordion view of user stories); detailed user story view (e.g., in-depth user story information); detailed task view (e.g., view and execute tasks); fuzzy search (e.g., quick search across tasks); and/or settings interface (e.g., configure LLM, models, and preferences). The software program product management interface 2500 includes code creation tasks 2502 positioned in a left panel that lists various development activities and their associated status indicators (e.g., one or more projects or portions of projects in progress that a user may begin or resume). An agent chat field 2504 is positioned in a left, lower region of the software program product management interface 2500, providing an interactive communication area where users can engage with AI agents through natural language inputs. Example prompts 2506 are displayed above the agent chat field 2504, offering suggested queries or commands that users can select to initiate specific interactions with the AI agents for software development operations.

Figure 26:
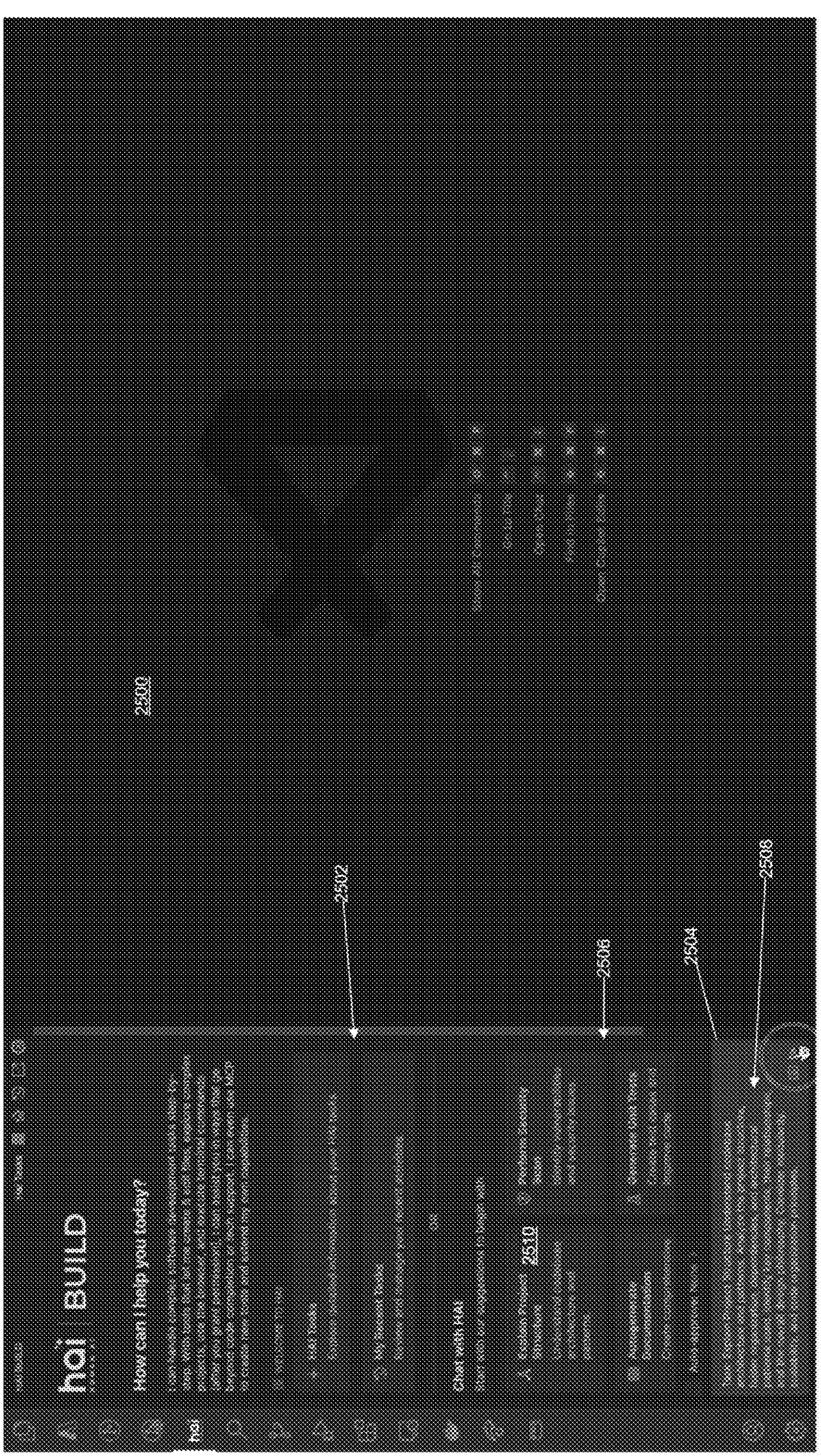
FIG. 26 shows an example software program product management interface in accordance with at least one embodiment of the present disclosure.

FIG. 26 shows the software program product management interface 2500 of FIG. 25, which includes an explain project structure option 2510 among the example prompts 2506. After selection of the explain project structure option 2510, the software program product management interface 2500 automatically populates the agent chat field 2504 with an example explain project structure input prompt 2508 corresponding to the option. The prompt may be pre-stored for the example or may be generated (e.g., via LLM) in response to selecting the explain project structure option 2510.

Figure 27:
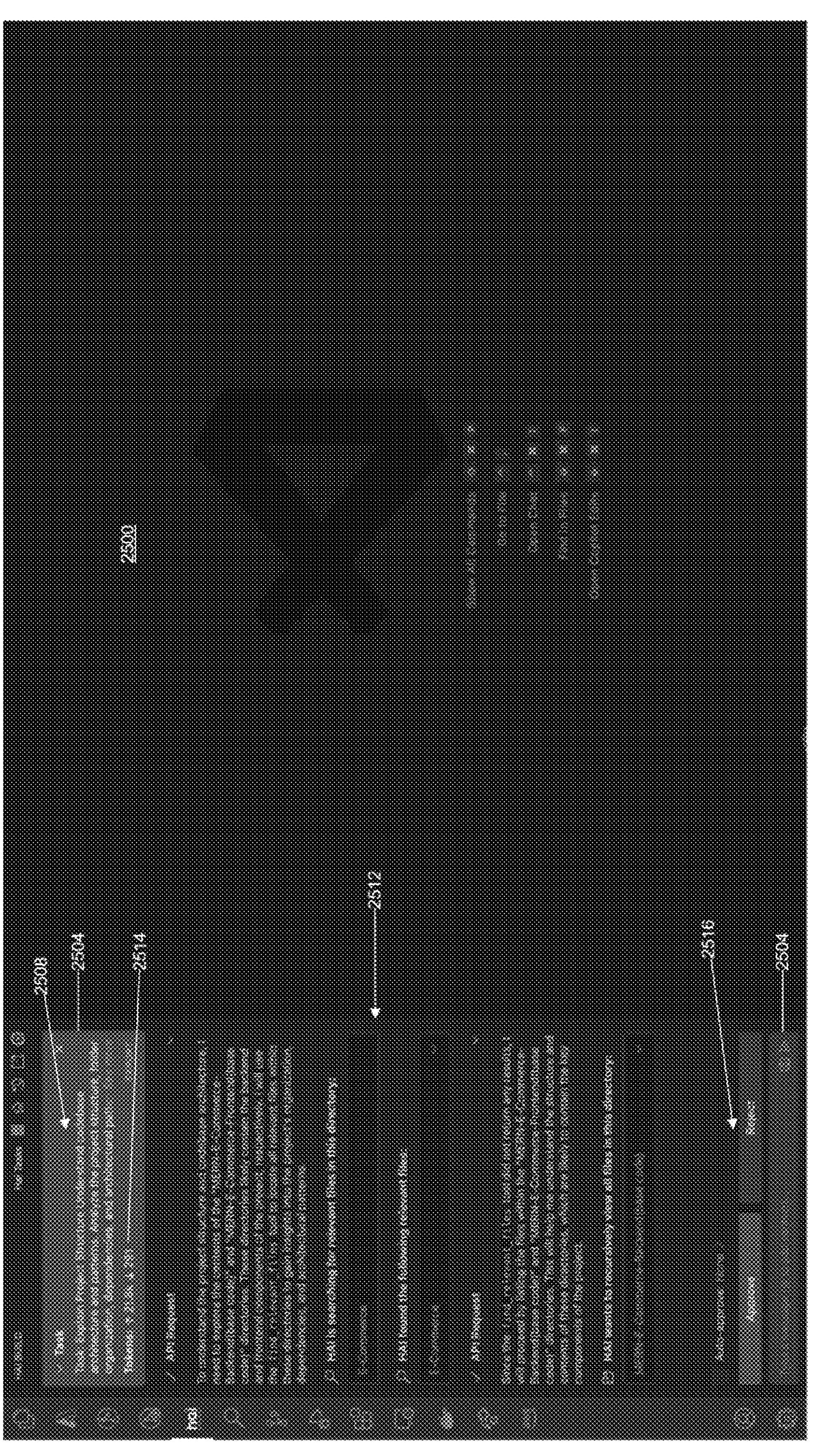
FIG. 27 shows an example software program product management interface in accordance with at least one embodiment of the present disclosure.

FIG. 27 illustrates the software program product management interface 2500 of FIG. 25 after entering the explain project structure prompt 2508 into the chat panel agent chat field 2504. The interface includes a transparent task display 2512 showing ongoing AI agent operations, a token count 2514 indicating computational resources being utilized, and approve options 2516 that enable user interaction and oversight of AI agent actions via approving or rejecting the AI output, as well as allowing the user to auto-approve all outputs.

Figure 28:
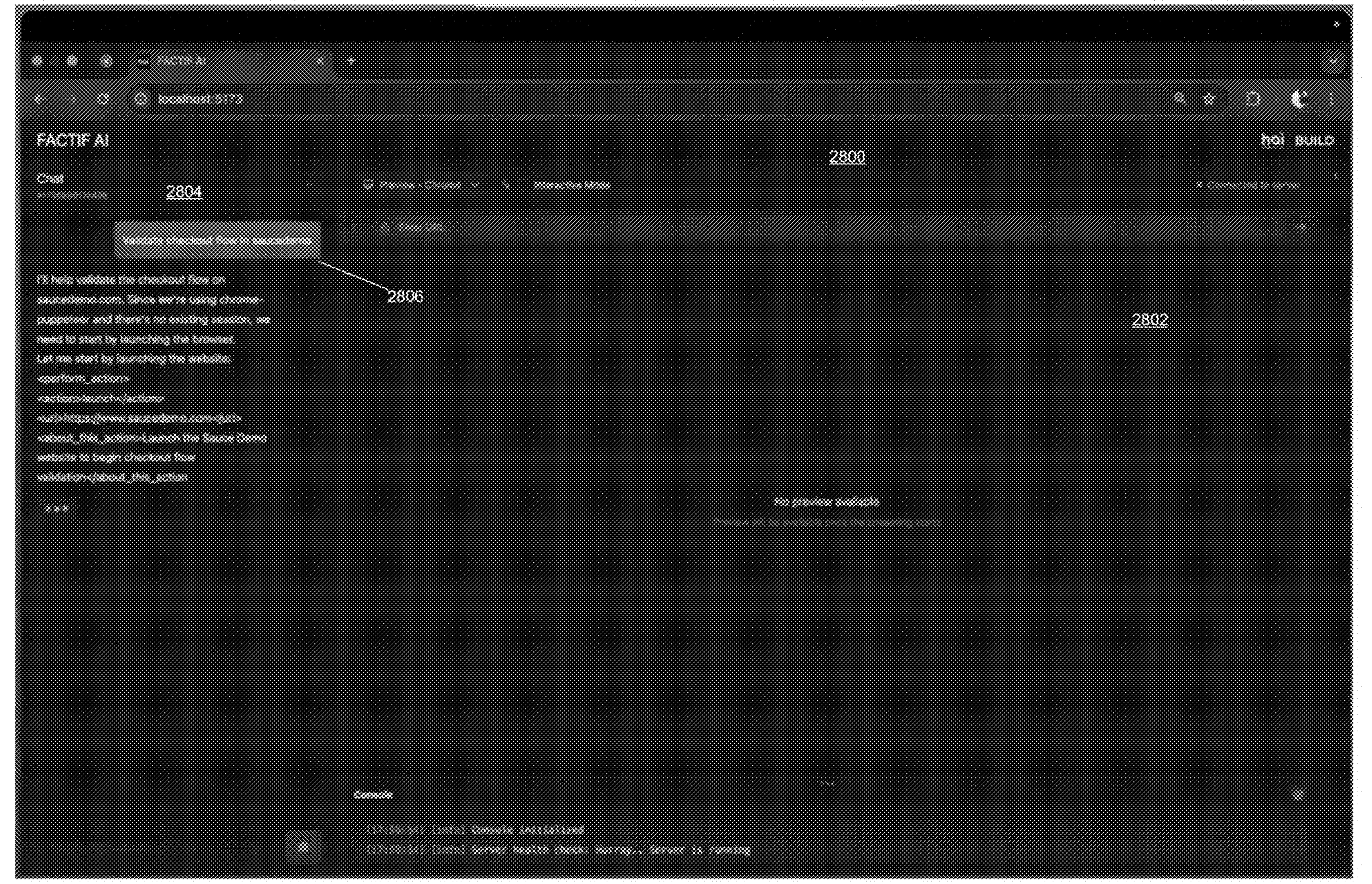
FIG. 28 shows an example vision based AI agent interface in accordance with at least one embodiment of the present disclosure.

FIG. 28 shows a vision based AI agent interface 2800 displaying a user interface for interacting with a vision-based generative AI model during the various UI creation and/or updating (e.g., modernization or augmentation) processes described herein (e.g., the depicted embodiment corresponds to FACTIF-AI discussed above). The vision based AI agent underlying vision based AI model may facilitate direct control of a user's computer through the described systems and processes. Using built-in vision capabilities of one or more LLMs along with computer use, the agent can navigate any application naturally-clicking, typing, and verifying results on the interface. Some example features of the vision based AI agent interface 2800 include multi-modal support (e.g., built-in support for one or more vision-language models including but not limited to CLAUDE, OPENAI, GEMINI, and OMNIPARSER); AI-powered computer control (e.g., intelligent element detection, navigation, and automated verification); automated documentation (e.g., comprehensive test documentation with automated screenshot capture); flexible testing modes (e.g., support for both web applications (e.g., PUPPETEER) and desktop/mobile applications (e.g., DOCKER VNC). The vision based AI agent interface 2800 includes a page preview 2802 positioned on the right side of the interface, which displays a visual representation of a user interface being analyzed or tested. A chat panel 2804 is positioned on the left side of the depicted vision based AI agent interface 2800, providing an interactive communication area where users can engage with the vision-based AI agent through natural language inputs and view an ongoing display of the agent(s) actions. A prompt 2806 is displayed within the chat panel 2804, showing an example input or instruction that can be provided to the vision-based AI agent for UI analysis, testing, or modernization operations, with the agents responsive actions displayed below the prompt. Below the prompt 2806 within the chat panel 2804 are the AI agent's responses and analysis process for the user to review, edit, and validate as needed.

Figure 29:
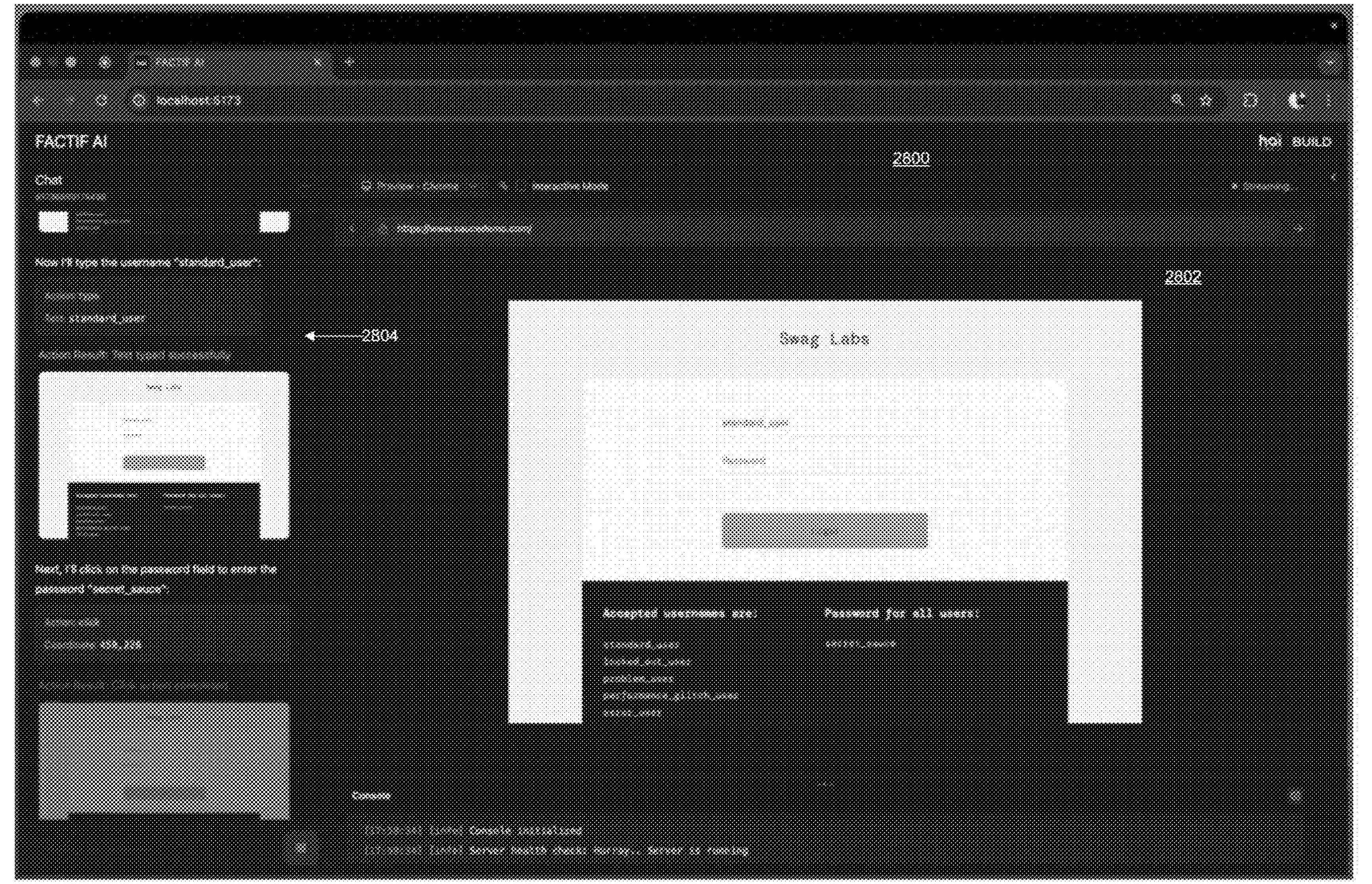
FIG. 29 shows an example vision based AI agent interface in accordance with at least one embodiment of the present disclosure.

FIG. 29 shows a vision based AI agent interface 2800 that includes a page preview 2802 positioned on the right side of the interface, which displays a visual representation of a user interface being analyzed or tested (e.g., a site or app, "saucedemo.com" in the illustrated embodiment). A chat panel 2804 is positioned on the right side of the vision based AI agent interface 2800, providing an interactive communication area where users can engage with the vision-based AI agent (e.g., a dedicated agent or the agent that otherwise uses or calls the vision-based generative AI model) through natural language inputs and view an ongoing display of the agent's actions. In the depicted embodiment, the vision based agent is analyzing the page preview and attempting to enter the username and password into the fields as the vision-based generative AI model identifies and parses the various elements on the screen.

Figure 30:
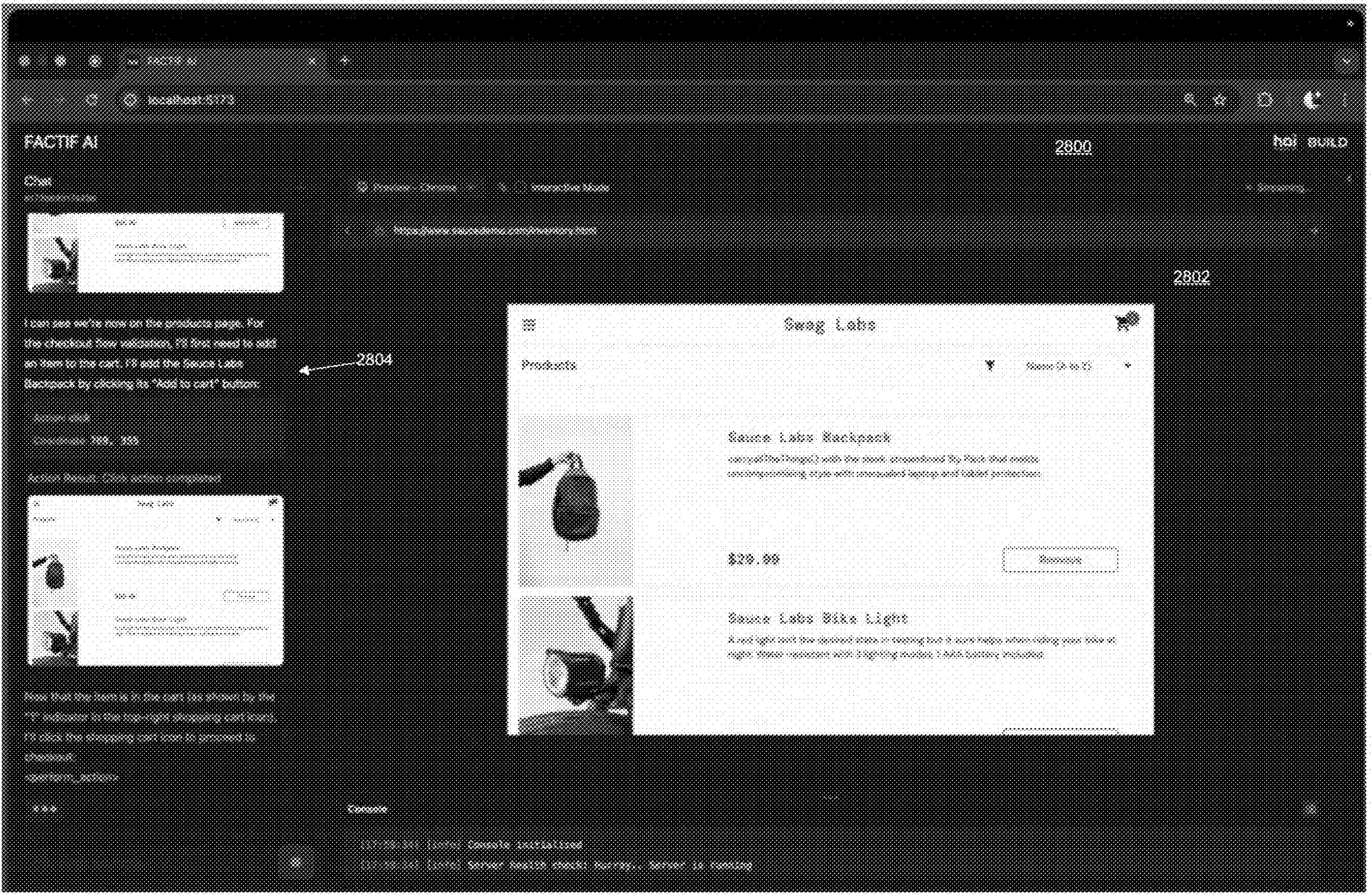
FIG. 30 shows an example vision based AI agent interface in accordance with at least one embodiment of the present disclosure.

FIG. 30 illustrates a vision based AI agent interface 2800 that includes a page preview 2802 positioned on the right side of the interface, which displays a visual representation of a user interface being analyzed or tested. A chat panel 2804 is positioned on the left side of the vision based AI agent interface 2800, providing an interactive communication area where users can engage with the vision-based AI agent through natural language inputs and view an ongoing display of the agent's actions. The chat panel 2804 displays a conversation flow showing user prompts and corresponding agent responses, with the agent providing detailed explanations of its analysis and actions taken on the page preview 2802. In the depicted embodiment, the agent has identified the page being displayed using the vision-based generative AI model (e.g., a products page), chosen an action (e.g., select the "add to cart" button), and confirmed that the action occurred (e.g., identifying the "1" that appears in the cart) to follow and execute the UI functions via visual analysis and automated user-like manipulation. FIGS. 28-30 follow a sequence of events that comprise example steps for accessing and interacting with an interface page preview for testing. As depicted in the foregoing example interfaces, the various functions disclosed herein may be accessible to a user via intuitive interfaces (e.g., including web interfaces accessible locally or remotely).

In the examples depicted in the figures and in the embodiments discussed herein, one or more agents may be configured to perform the respective functions. For example, the embodiments of FIGS. 19-24 may perform the requirements (e.g., FIG. 5A, 6A) and actions (e.g., FIGS. 5B, 6B) definitions processes. These processes may use one or more agents for functions which may include generating requirements, brainstorming, competitive analysis, reverse engineering starting with drafted code, handle the various "requirements" inputs and outputs, including governance and user experience tracking, and/or versioned requirements.

The embodiments of FIGS. 25-27 may perform the coding process (e.g., FIGS. 5C, 6C). These processes may use one or more agents for functions which may include converting actions to code, identifying the files to change and the changes to be performed, creating test cases, automation of infrastructure and deployment, validating acceptance criteria, reviewing code against best practices, and/or refactoring and optimizing.

The embodiments of FIGS. 28-30 may perform the visual analysis aspects of the software development process as described herein. These processes may use one or more agents for functions which may include end to end testing, AI powered testing without deterministic UI mappings, centralized test plan and test data, and versioning aligned with requirements & code. For each of the foregoing agents, the system may provide additional data and functionalities such as organization context, application context, best practices and everything as code (EaC), security, and/or human validation.

Example Embodiments

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1: A system for executing an artificial intelligence (AI) augmentation framework, the system comprising at least one non-transitory computer-readable medium comprising computer program instructions that, when executed by at least one processor, cause the system to: receive, via a user interface, an initial software functionality definition data set; retrieve at least one configuration data set comprising predefined context data; generate, at least by at least one agent executing at least one generative AI model, one or more requirement data objects for a computer-generated executable software program product based on the initial software functionality definition data set; generate, at least by the at least one agent executing the at least one generative AI model based on the one or more requirement data objects and based on the at least one configuration data set, one or more code generation work prompt sets defining a list of computer-executable tasks configured to generate code for the computer-generated executable software program product; and build, at least by the at least one agent executing the at least one generative AI model based on the one or more code generation work prompt sets, the code for the computer-generated executable software program product.

Clause 2. A system according to the foregoing Clause, wherein the predefined context data comprises at least: information indicating backend specifications for the computer-generated executable software program product; or information indicating frontend specifications for the computer-generated executable software program product.

Clause 3. A system according to any of the foregoing Clauses, wherein the predefined context data comprises at least information indicating one or more tools to be used for building the code.

Clause 4. A system according to Clause 3, wherein the one or more tools comprise at least: one or more computer programming languages; one or more markup or web development languages; or one or more software architectures.

Clause 5. A system according to any of the foregoing Clauses, wherein the computer program instructions, when executed by the at least one processor, further cause the system to: update, at least by the at least one agent executing the at least one generative AI model, the one or more requirement data objects based on at least one additional software functionality definition data set; or generate, at least by the at least one agent executing the at least one generative AI model, one or more new requirement data objects based on the at least one additional software functionality definition data set.

Clause 6. A system according to any of the foregoing Clauses, wherein the initial software functionality definition data set comprises at least: one or more parameters for building the code.

Clause 7. A system according to Clause 6, wherein the computer program instructions, when executed by the at least one processor, further cause the system to: send, via the user interface, one or more prompts for one or more additional parameters for building the code.

Clause 8. A system according to Clause 7, wherein the one or more additional parameters comprise at least: one or more use cases of the computer-generated executable software program product; one or more edge cases of the computer-generated executable software program product; one or more features of the computer-generated executable software program product; or one or more components of the computer-generated executable software program product.

Clause 9. A system according to Clause 8, wherein the computer program instructions, when executed by the at least one processor, further cause the system to: generate, at least by the at least one agent executing the at least one generative AI model, one or more example parameters satisfying the one or more additional parameters; and send, via the user interface, the one or more example parameters.

Clause 10. A system according to Clause 9, wherein the computer program instructions, when executed by the at least one processor, further cause the system to: receive, via the user interface, at least one of: an indication of acceptance of at least a portion of the one or more example parameters; an indication of rejection of at least a portion of the one or more example parameters; or an indication of revisions to at least a portion of the one or more example parameters.

Clause 11. A system according to Clause 10, wherein the indication of revisions comprises: at least one update to the initial software functionality definition data set; or at least one new software functionality definition data set.

Clause 12. A system according to Clause 11, wherein the computer program instructions, when executed by the at least one processor, further cause the system to: update, at least by the at least one agent executing the at least one generative AI model, the one or more example parameters based on the indication of revisions; or generate, at least by the at least one agent executing the at least one generative AI model, one or more example parameters based the indication of revisions.

Clause 13. A system according to any of the foregoing Clauses, wherein the computer program instructions, when executed by the at least one processor, further cause the system at least to: analyze information retrieved from one or more sources; update, based on the analyzed information, the one or more requirement data objects; or generate, based on the analyzed information, one or more new requirement data objects.

Clause 14. A system according to Clause 13, wherein the one or more sources comprise at least: one or more requirements sources; one or more guideline sources; or one or more software code sources.

Clause 15. A system according to any of the foregoing Clauses, wherein the computer program instructions, when executed by the at least one processor, further cause the system at least to: send, via the user interface, a prompt for new features.

Clause 16. A system according to any of the foregoing Clauses, wherein the computer program instructions, when executed by the at least one processor, further cause the system at least to: convert natural language input into computer-executable or computer-compilable code, wherein the natural language input is received via the user interface.

Clause 17. A system according to any of the foregoing Clauses, wherein the computer program instructions, when executed by the at least one processor, further cause the system at least to: train the at least one generative AI model based on one or more training datasets.

Clause 18. A method comprising: receiving, via a user interface, an initial software functionality definition data set; retrieving at least one configuration data set comprising predefined context data; generating, at least by at least one agent executing at least one generative AI model, one or more requirement data objects for a computer-generated executable software program product based on the initial software functionality definition data set; generating, at least by the at least one agent executing the at least one generative AI model based on the one or more requirement data objects and based on the at least one configuration data set, one or more code generation work prompt sets defining a list of computer-executable tasks configured to generate code for the computer-generated executable software program product; and building, at least by the at least one agent executing the at least one generative AI model based on the one or more code generation work prompt sets, the code for the computer-generated executable software program product.

Clause 19. A method according to Clause 18, wherein the predefined context data comprises at least: information indicating backend specifications for the computer-generated executable software program product; or information indicating frontend specifications for the computer-generated executable software program product.

Clause 20. A method according to any of the foregoing Clauses 18-19, wherein the predefined context data comprises at least information indicating one or more tools to be used for building the code.

Clause 21. A method according to Clause 20, wherein the one or more tools comprise at least: one or more computer programming languages; one or more markup or web development languages; or one or more software architectures.

Clause 22. A method according to any of the foregoing Clauses 18-21, further comprising: updating, at least by the at least one agent executing the at least one generative AI model, the one or more requirement data objects based on at least one additional software functionality definition data set; or generating, at least by the at least one agent executing the at least one generative AI model, one or more new requirement data objects based on the at least one additional software functionality definition data set.

Clause 23. A method according to any of the foregoing Clauses 18-22, wherein the initial software functionality definition data set comprises at least: one or more parameters for building the code.

Clause 24. A method according to Clause 23, further comprising: sending, via the user interface, one or more prompts for one or more additional parameters for building the code.

Clause 25. A method according to Clause 24, wherein the one or more additional parameters comprise at least: one or more use cases of the computer-generated executable software program product; one or more edge cases of the computer-generated executable software program product; one or more features of the computer-generated executable software program product; or one or more components of the computer-generated executable software program product.

Clause 26. A method according to Clause 25, further comprising: generating, at least by the at least one agent executing the at least one generative AI model, one or more example parameters satisfying the one or more additional parameters; and sending, via the user interface, the one or more example parameters.

Clause 27. A method according to Clause 26, further comprising: receiving, via the user interface, at least one of: an indication of acceptance of at least a portion of the one or more example parameters; an indication of rejection of at least a portion of the one or more example parameters; or an indication of revisions to at least a portion of the one or more example parameters.

Clause 28. A method according to Clause 27, wherein the indication of revisions comprises: at least one update to the initial software functionality definition data set; or at least one new software functionality definition data set.

Clause 29. A method according to Clause 28, further comprising: updating, at least by the at least one agent executing the at least one generative AI model, the one or more example parameters based on the indication of revisions; or generating, at least by the at least one agent executing the at least one generative AI model, one or more example parameters based the indication of revisions.

Clause 30. A method according to any of the foregoing Clauses 18-29, further comprising: analyzing information retrieved from one or more sources; updating, based on the analyzed information, the one or more requirement data objects; or generating, based on the analyzed information, one or more new requirement data objects.

Clause 31. A method according to Clause 30, wherein the one or more sources comprise at least: one or more requirements sources; one or more guideline sources; or one or more software code sources.

Clause 32. A method according to any of the foregoing Clauses 18-31, further comprising: sending, via the user interface, a prompt for new features.

Clause 33. A method according to any of the foregoing Clauses 18-32, further comprising: converting natural language input into computer-executable or computer-compilable code, wherein the natural language input is received via the user interface.

Clause 34.A method according to any of the foregoing Clauses 18-33, further comprising: training the at least one generative AI model based on one or more datasets.

Clause 35. A non-transitory computer readable medium comprising program instructions that, when executed by an apparatus, cause the apparatus to: receive, via a user interface, an initial software functionality definition data set; retrieve at least one configuration data set comprising predefined context data; generate, at least by at least one agent executing at least one generative AI model, one or more requirement data objects for a computer-generated executable software program product based on the initial software functionality definition data set; generate, at least by the at least one agent executing the at least one generative AI model based on the one or more requirement data objects and based on the at least one configuration data set, one or more code generation work prompt sets defining a list of computer-executable tasks configured to generate code for the computer-generated executable software program product; and build, at least by the at least one agent executing the at least one generative AI model based on the one or more code generation work prompt sets, the code for the computer-generated executable software program product.

Clause 36. A non-transitory computer readable medium according to Clause 35, wherein the predefined context data comprises at least: information indicating backend specifications for the computer-generated executable software program product; or information indicating frontend specifications for the computer-generated executable software program product.

Clause 37. A non-transitory computer readable medium according to any of the foregoing Clauses 35-36, wherein the predefined context data comprises at least information indicating one or more tools to be used for building the code.

Clause 38. A non-transitory computer readable medium according to Clause 37, wherein the one or more tools comprise at least: one or more computer programming languages; one or more markup or web development languages; or one or more software architectures.

Clause 39. A non-transitory computer readable medium according to any of the foregoing Clauses 35-38, wherein the program instructions, when executed by the apparatus, further cause the apparatus to: update, at least by the at least one agent executing the at least one generative AI model, the one or more requirement data objects based on at least one additional software functionality definition data set; or generate, at least by the at least one agent executing the at least one generative AI model, one or more new requirement data objects based on the at least one additional software functionality definition data set.

Clause 40. A non-transitory computer readable medium according to any of the foregoing Clauses 35-39, wherein the initial software functionality definition data set comprises at least: one or more parameters for building the code.

Clause 41. A non-transitory computer readable medium according to Clause 40, wherein the program instructions, when executed by the apparatus, further cause the apparatus to: send, via the user interface, one or more prompts for one or more additional parameters for building the code.

Clause 42. A non-transitory computer readable medium according to Clause 41, wherein the one or more additional parameters comprise at least: one or more use cases of the computer-generated executable software program product; one or more edge cases of the computer-generated executable software program product; one or more features of the computer-generated executable software program product; or one or more components of the computer-generated executable software program product.

Clause 43. A non-transitory computer readable medium according to Clause 42, wherein the program instructions, when executed by the apparatus, further cause the apparatus to: generate, at least by the at least one agent executing the at least one generative AI model, one or more example parameters satisfying the one or more additional parameters; and send, via the user interface, the one or more example parameters.

Clause 44. A non-transitory computer readable medium according to Clause 43, wherein the program instructions, when executed by the apparatus, further cause the apparatus to: receive, via the user interface, at least one of: an indication of acceptance of at least a portion of the one or more example parameters; an indication of rejection of at least a portion of the one or more example parameters; or an indication of revisions to at least a portion of the one or more example parameters.

Clause 45. A non-transitory computer readable medium according to Clause 44, wherein the indication of revisions comprises: at least one update to the initial software functionality definition data set; or at least one new software functionality definition data set.

Clause 46. A non-transitory computer readable medium according to Clause 45, wherein the program instructions, when executed by the apparatus, further cause the apparatus to: update, at least by the at least one agent executing the at least one generative AI model, the one or more example parameters based on the indication of revisions; or generate, at least by the at least one agent executing the at least one generative AI model, one or more example parameters based the indication of revisions.

Clause 47. A non-transitory computer readable medium according to any of the foregoing Clauses 35-46, wherein the program instructions, when executed by the apparatus, further cause the apparatus to: analyze information retrieved from one or more sources; update, based on the analyzed information, the one or more requirement data objects; or generate, based on the analyzed information, one or more new requirement data objects.

Clause 48. A non-transitory computer readable medium according to Clause 47, wherein the one or more sources comprise at least: one or more requirements sources; one or more guideline sources; or one or more software code sources.

Clause 49. A non-transitory computer readable medium according to any of the foregoing Clauses 35-48, wherein the program instructions, when executed by the apparatus, further cause the apparatus to: send, via the user interface, a prompt for new features.

Clause 50. A non-transitory computer readable medium according to any of the foregoing Clauses 35-49, wherein the program instructions, when executed by the apparatus, further cause the apparatus to: convert natural language input into computer-executable or computer-compilable code, wherein the natural language input is received via the user interface.

Clause 51. A non-transitory computer readable medium according to any of the foregoing Clauses 35-50, wherein the program instructions, when executed by the apparatus, further cause the apparatus to: train the at least one generative AI model based on one or more datasets.

Clause 52. A system for executing an artificial intelligence (AI) framework, the system comprising at least one non-transitory computer-readable medium comprising computer program instructions that, when executed by at least one processor, cause the system to: receive one or more context data sets comprising application context associated with a plurality of pre-generated executable software program products; retrieve, from one or more source code repositories and/or via a user interface, pre-generated code associated with the pre-generated executable software program products; generate, by at least applying the one or more context data sets and the pre-generated code to a code context agent, an enriched code context data set; generate, by at least applying the enriched code context data set to a vectorize code agent, a vectorized code context data set; retrieve one or more code generation work prompt sets for generating a new computer-generated executable software program product; and modify the vectorized code context data set using at least the one or more code generation work prompt sets to create the new computer-generated executable software program product.

Clause 53. A system according to Clause 52, wherein the code context agent comprises at least one generative AI model.

Clause 54. A system according to Clause 53, wherein the enriched code context data set is generated by a large language model (LLM) associated with the code context agent.

Clause 55. A system according to Clause 54, wherein to generate the enriched code context data set comprises: generating metadata for at least one portion of at least one of the one or more context data sets.

Clause 56. A system according to any of the foregoing Clauses 52-55, wherein the computer program instructions, when executed by the at least one processor, further cause the system to: extract the one or more context data sets from at least one requirement data object.

Clause 57. A method comprising: receiving one or more context data sets with a plurality of pre-generated executable software program products; retrieving, form one or more source code repositories and/or via a user interface, pre-generated code associated with the pre-generated executable software program products; generating, by at least applying the one or more context data sets and the pre-generated code to a code context agent, an enriched code context data set; generating, by at least applying the enriched code context data set to a vectorize code agent, a vectorized code context data set; retrieving one or more code generation work prompt sets for generating a new generated executable software program product; and modifying the vectorized code context data set using at least the one or more code generation work prompt sets to create the new generated executable software product.

Clause 58. A method according to Clause 57, wherein the code context agent comprises at least one generative AI model.

Clause 59. A method according to Clause 58, wherein the enriched code context data set is generated by a large language model (LLM) associated with the code context agent.

Clause 60. A method according to Clause 59, wherein the generating the enriched code context data set comprises at least: generating metadata for at least one portion of at least one of the one or more context data sets.

Clause 61. A method according to Clause 57, further comprising: extracting the one or more context data sets from at least one requirement data object.

Clause 62. A non-transitory computer readable medium comprising program instructions that, when executed by an apparatus, cause the apparatus to: receive one or more context data sets with a plurality of pre-generated executable software program products; retrieve, form one or more source code repositories and/or via a user interface, pre-generated code associated with the pre-generated executable software program products; generate, by at least applying the one or more context data sets and the pre-generated code to a code context agent, an enriched code context data set; generate, by at least applying the enriched code context data set to a vectorize code agent, a vectorized code context data set; retrieve one or more code generation work prompt sets for generating a new generated executable software program product; and modify the vectorized code context data set using at least the one or more code generation work prompt sets to create the new generated executable software product.

Clause 63. A non-transitory computer readable medium according to Clause 62, wherein the code context agent comprises at least one generative AI model.

Clause 64. A non-transitory computer readable medium according to Clause 63, wherein the enriched code context data set is generated by a large language model (LLM) associated with the code context agent.

Clause 65. A non-transitory computer readable medium according to Clause 64, wherein the generating the enriched code context data set comprises at least: generating metadata for at least one portion of at least one of the one or more context data sets.

Clause 66. A non-transitory computer readable medium according to any of the foregoing Clauses 62-65, wherein the program instructions, when executed by the apparatus, further cause the apparatus to: extract the one or more context data sets from at least one requirement data object.

Clause 67. A system for executing an artificial intelligence (AI) framework, the system comprising at least one non-transitory computer-readable medium comprising computer program instructions that, when executed by at least one processor, cause the system to: receive one or more code generation work prompt sets for generating a new executable software program product; receive a vectorized code context data set comprising vectorized and contextualized data representing source code of a plurality of pre-generated executable software program products; analyze, by at least one change isolation agent executing at least one AI model, the vectorized code context data set based on the one or more code generation work prompt sets to identify one or more code segments associated with the vectorized code context data set to modify based on the one or more code generation work prompt sets; and modify, by at least one generative AI model, at least one of the one or more code segments of the vectorized code context data set using at least the one or more code generation work prompt sets to create a new generated executable software program product.

Clause 68. A system according to Clause 67, wherein modifying the at least one of the one or more code segments of the vectorized code context data set comprises modifying, by the at least one generative AI model, respective code segments of the one or more code segments independently from one or more additional code segments associated with the vectorized code context data set.

Clause 69. A system according to Clause 68, wherein the one or more additional code segments, different from the respective code segments, remain unmodified.

Clause 70. A system according to any one of Clauses 67-69, wherein modifying the at least one of the one or more code segments of the vectorized code context data set comprises modifying, by the at least one generative AI model, each code segment of the one or more code segments independently of each other code segment of the one or more code segments.

Clause 71. A system according to any one of Clauses 67-69, wherein the one or more code segments comprise a plurality of code segments, and wherein modifying the at least one of the one or more code segments of the vectorized code context data set comprises modifying two or more respective code segments of the one or more code segments using different generative AI models.

Clause 72. A system according to any one of Clauses 67-69, wherein the one or more code segments associated with the vectorized code context data set are identified based on a classification scheme which selects a portion of the source code that is most relevant to the modifying.

Clause 73. A method comprising: receiving one or more code generation work prompt sets for generating a new executable software program product; receiving a vectorized code context data set comprising vectorized and contextualized data representing source code of a plurality of pre-generated executable software program products; analyzing, by at least one change isolation agent executing at least one AI model, the vectorized code context data set based on the one or more code generation work prompt sets to identify one or more code segments associated with the vectorized code context data set to modify based on the one or more code generation work prompt sets; and modifying, by at least one generative AI model, at least one of the one or more code segments of the vectorized code context data set using at least the one or more code generation work prompt sets to create a new generated executable software product.

Clause 74. A method according to Clause 73, wherein modifying the at least one of the one or more code segments of the vectorized code context data set comprises modifying, by the at least one generative AI model, respective code segments of the one or more code segments independently from at least one of the one or more code segments.

Clause 75. A method according to Clause 74, wherein at least one code segment, different from the respective code segments, remains unmodified.

Clause 76. A method according to any of Clauses 73-75, wherein modifying the at least one of the one or more code segments of the vectorized code context data set comprises, by the at least one generative AI model, each code segment of the one or more code segments independently of each other code segment of the one or more code segments.

Clause 77. A method according to any of Clauses 73-76, wherein modifying the at least one of the one or more code segments of the vectorized code context data set comprises respective code segments of the one or more code segments using different generative AI models.

Clause 78. A method according to any of Clauses 73-77, wherein the one or more code segments associated with the vectorized code context data set are identified based on a classification scheme which selects a portion of the source code that is most relevant to the modifying.

Clause 79. A non-transitory computer readable medium comprising program instructions that, when executed by an apparatus, cause the apparatus to: receive one or more code generation work prompt sets for generating a new executable software program product; receive a vectorized code context data set comprising vectorized and contextualized data representing source code of a plurality of pre-generated executable software program products; analyze, by at least one change isolation agent executing at least one AI model, the vectorized code context data set based on the one or more code generation work prompt sets to identify one or more code segments associated with the vectorized code context data set to modify based on the one or more code generation work prompt sets; and modify, by at least one generative AI model, at least one of the one or more code segments of the vectorized code context data set using at least the one or more code generation work prompt sets to create a new generated executable software product.

Clause 80. A non-transitory computer readable medium according to Clause 79, wherein modifying the at least one of the one or more code segments of the vectorized code context data set comprises modifying, by the at least one generative AI model, respective code segments of the one or more code segments independently from at least one of the one or more code segments.

Clause 81. A non-transitory computer readable medium according to Clause 80, wherein at least one code segment, different from the respective code segments, remains unmodified.

Clause 82. A non-transitory computer readable medium according to any one of Clauses 79-81, wherein modifying the at least one of the one or more code segments of the vectorized code context data set comprises modifying, by the at least one generative AI model, each code segment of the one or more code segments independently of each other code segment of the one or more code segments.

Clause 83. A non-transitory computer readable medium according to any one of Clauses 79-82, wherein modifying the at least one of the one or more code segments of the vectorized code context data set comprises modifying respective code segments of the one or more code segments using different generative AI models.

Clause 84. A non-transitory computer readable medium according to any one of Clauses 79-83, wherein the one or more code segments associated with the vectorized code context data set are identified based on a classification scheme which selects a portion of the source code that is most relevant to the modifying.

Clause 85. A system comprising at least one non-transitory computer-readable medium comprising computer program instructions that, when executed by at least one processor, cause the system to: receive a software functionality request; generate one or more requirements for a software product based on the software functionality request; and code the software product with or without manual input to or supplementation of the software product using one or more generative AI models.

Clause 86. An agentic-AI-based software modernization system, the system comprising at least one non-transitory computer-readable medium comprising computer program instructions that, when executed by at least one processor, cause the system to: receive one or more portions of monolithic legacy code of a legacy software program product, the monolithic legacy code comprising a plurality of code segments; group the monolithic legacy code by functionally related code segments of the plurality of code segments to define a plurality of groups; generate, by at least one agent executing at least one generative AI model, an API for each identified group; generate, by the at least one agent executing the at least one generative AI model, modern microservice code for each identified group to define a modernized software program product; and validate the modernized software program product.

Clause 87. A system according to Clause 86, wherein grouping the monolithic legacy code by functionally related code segments of the plurality of code segments to define a plurality of groups is further based on target microservice boundaries.

Clause 88. A system according to any of Clauses 86-87, the computer program instructions being further configured to, when executed by at least one processor, cause the system to: receive one or more context data sets comprising application context associated with at least the legacy software program product; generate, by at least applying the one or more context data sets and the monolithic legacy code to a code context agent, an enriched code context data set; generate, by at least applying the enriched code context data set to a vectorize code agent, a vectorized code context data set; retrieve one or more code generation work prompt sets for generating the modernized software program product; and modify the vectorized code context data set using at least the one or more code generation work prompt sets to create the modernized software program product.

Clause 89. The system according to Clause 88, wherein the code context agent comprises an AI model comprising a large language model.

Clause 90. A system according to Clause 89, wherein generating the enriched code context data set comprises at least: generating metadata for at least one portion of at least one of the one or more context data sets.

Clause 91. A system according to any of Clauses 86-90, wherein the at least one agent comprises at least an API creation agent and at least one code generator agent, and wherein the API creation agent is configured to generate the APIs for each identified group and the at least one code generation agent is configured to generate the modern microservice code for each identified group.

Clause 92. A system according to any of Clauses 86-91, wherein the computer program instructions, when executed by the at least one processor, further cause the system to: extract the one or more context data sets from at least one database.

Clause 93. A system according to any of Clauses 86-92, wherein grouping the monolithic legacy code by the functionally related code segments of the plurality of code segments to define the plurality of groups comprises: identify, by at least one service grouper agent executing at least one generative AI model, the functionally related code segments of the plurality of code segments; define, by the at least one service grouper agent executing at least one generative AI model, one or more microservices; generate, by the at least one service grouper agent executing at least one generative AI model, the plurality of groups by combining the functionally related code segments with boundaries defined by the one or more microservices.

Clause 94. A system according to any of Clauses 86-93, further comprising at least one service context extractor agent, wherein the at least one service context extractor agent is configured to: extract one or more group context data sets from each group of the plurality of groups.

Clause 95. A system according to any of Clauses 86-94, further comprising at least one change isolation agent, wherein the at least one change isolation agent is configured at least to: analyze a vectorized code context data set based on the monolithic legacy code to identify at least one section of the one or more portions of the monolithic legacy code to be modified to generate the modern microservice code.

Clause 96. A system according to Clause 95, further comprising at least one feature extractor agent, wherein the at least one feature extractor agent is configured to: receive the one or more portions of the monolithic legacy code to be modified to generate the modern microservice code; and analyze the one or more portions of the monolithic legacy code to identify at least one feature associated with each of the one or more portions to be modified.

Clause 97. A system according to any of Clauses 86-96, wherein the at least one agent executing the at least one generative AI model comprises at least one API creation agent, wherein the at least one API creation agent is configured to generate the API for each identified group.

Clause 98. A system according to Clause 97, further comprising at least one API tests agent, wherein the at least one API tests agent is configured to: generate one or more test cases for validating the APIs for the plurality of groups; and execute a test of the APIs.

Clause 99. A system according to Clause 98, wherein the generation of the one or more test cases is automated based at least in part on one or more features extracted from the monolithic legacy code.

Clause 100. A system according to any of Clauses 86-99, wherein the at least one agent executing the at least one generative AI model comprises at least one code generator agent, wherein the at least one code generator agent is configured at least to generate the modern microservice code for each identified group.

Clause 101. A system according to Clause 100, wherein the at least one generative AI model associated with the at least one code generator agent comprises at least one generative pre-trained transformer models.

Clause 102. A system according to any of Clauses 100-101, wherein the at least one code generator agent is configured to generate the modern microservice code by: generating, via at least one LLM context extractor, extracted code context data for each identified group; and generating, via the at least one LLM context extractor, modern microservice code for each identified group based at least in part on the extracted code context data.

Clause 103. A system according to Clause 102, wherein the at least one LLM context extractor is further configured to enrich the extracted code context data using vectorized legacy code context data and vectorized modern code context data to generate enriched extracted code context data.

Clause 104. A system according to any of Clauses 102-103, wherein generating the modern microservice code is further based on at least one or more features associated with each of the plurality of groupings.

Clause 105. A system according to any of Clauses 100-104, wherein generating the modern microservice code for each identified group comprises generating initial modern microservice code for each identified group, analyzing one or more compilation errors in at least one of the initial modern microservice code, and generating corrected modern microservice code for each compilation error.

Clause 106. A system according to Clause 105, wherein generating the modern microservice code for each identified group further comprises iterating multiple cycles of analyzing compilation errors, including the one or more compilation errors, and generating iterative corrected modern microservice code, including the corrected modern microservice code, wherein the modernized microservice code comprises a final corrected modern microservice code that successfully compiles.

Clause 107. A system according to any of Clauses 86-106, further comprising at least one code validator agent, wherein the at least one code validator agent is configured to validate the modernized software program product is performed by analyzing the modernized microservice code to determine that the modern microservice code satisfies one or more predetermined standards.

Clause 108. A system according to Clause 107, wherein the one or more predetermined standards include at least: one or more modernization best practices; one or more security standards; or one or more functional requirements for the modernized microservice code.

Clause 109. The system according to any one of Clause 107-108, wherein an at least one LLM code generator of a code generator agent is configured at least to: analyze, for one or more portions of the modern microservice code which fail to satisfy the one or more predetermined standards, context information indicating details of the failure to satisfy the one or more predetermined standards; and generate, based on the analysis, one or more respective updated portions of the modernized microservice code.

Clause 110. A system according to Clause 109, wherein the at least one LLM code generator is further configured at least to iterate, at least by executing the one or more generative AI models and until the one or more predetermined standards have been satisfied, at least: the analyzing or the generating a plurality of times until the one or more predetermined standards are satisfied.

Clause 111. A system according to any one of Clauses 107-110, wherein the at least one code validator agent is configured to analyze the modern microservice code by running one or more unit tests and one or more integration tests on the modern microservice code.

Clause 112. A system according to Clause 111, wherein the one or more unit tests and the one or more integration tests are generated by an API tests agent based on features extracted from the monolithic legacy code.

Clause 113. A system according to Clause 112, wherein the at least one code validator agent is further configured at least to: perform testing on a plurality of edge cases designed to identify potential vulnerabilities; implement one or more mandatory validation protocols; implement one or more optional validation protocols; or implement one or more user-selectable validation protocols.

Clause 114. A system according to Clause 113, wherein the at least one code validator agent is further configured at least to determine, based on analyzing one or more services of the modern microservice code, whether any of the one or more services are interfering with any other services of the one or more services.

Clause 115. A system according to Clause 114, wherein the at least one code validator agent is further configured at least to iterate, at least by executing the one or more generative AI models, any one or more code validation operations until a predetermined amount of the one or more validation protocols have been satisfied, the one or more validation protocols including the one or more predetermined standards.

Clause 116. A UI modernization system, the system comprising at least one non-transitory computer-readable medium comprising computer program instructions that, when executed by at least one processor, cause the system to: generate legacy graphical user interface (GUI) visual context data objects comprising screenshots of a legacy graphical user interface and operational context data indicating at least flow relationships between two or more of the screenshots and functionality associated with one or more components captured in each screenshot of the screenshots; receive UI context data comprising at least one or more modern UI templates; generate modern UI screens based on the legacy GUI visual context data objects and the UI context data; and integrate the modern UI screens with one or more microservices to generate a modernized software program product.

Clause 117. A system according to Clause 116, wherein generating the legacy GUI visual context data objects comprises capturing the screenshots and applying at least one vision based generative AI model to the screenshots to analyze the screenshots to determine at least a portion of the operational context data.

Clause 118. A system according to Clause 117, further comprising a screen information aggregator agent, wherein generating the legacy graphical user interface (GUI) visual context data objects further comprises aggregating, via the screen information aggregator agent, the operational context data, the operational context data comprising the portion of the operational context data.

Clause 119. A system according to and one of Clauses 117-118, wherein the one or more components comprise two or more components, wherein the functionality associated with the one or more components of the operational context data comprises a mapping of at least one dependency functionality between the two or more components.

Clause 120. A system according to and one of Clauses 117-119, wherein the computer program instructions are further configured to, when executed by at least one processor, cause the system to apply the at least one vision based generative AI model to the modernized software program product to validate the modern UI screens.

Clause 121. A system according to Clause 120, wherein the at least one vision based generative AI model is configured to manipulate the modern UI screens autonomously to test the modernized software program product.

Clause 122. A system according to and one of Clauses 116-121, further comprising a UI test generator agent, the UI test generator agent configured to generate one or more test cases based on the legacy graphical user interface (GUI) visual context data objects and/or UI context data to validate the modern UI screens.

Clause 123. A system according to Clause 122, wherein the one or more test cases are configured to validate one or more requirements associated with the modern UI screens.

Clause 124. A system according to and one of Clauses 116-124, further comprising a UI screen generator agent, the UI screen generator agent configured to generate the modern UI screens using the legacy GUI visual context data objects and the UI context data.

Clause 125. A system according to and one of Clauses 116-124, wherein the UI context data further comprises configuration data and legacy application background data.

Clause 126. A system according to and one of Clauses 116-125, further comprising a UI screen integrator agent, wherein integrating the modern UI screens with the one or more microservices associated with the modernized software program product comprises applying the UI screen integrator agent to the one or more microservices and the modern UI screens.

Clause 127. A system according to and one of Clauses 116-124, wherein the modern UI screens comprise one or more modern components corresponding to the one or more components.

Clause 128. A system comprising at least one non-transitory computer-readable medium comprising computer program instructions that, when executed by at least one processor, cause the system to: access legacy software; and generate a modernized version of the legacy software using one or more generative artificial intelligence models with or without manual input.

The foregoing Clauses describing one or more of systems, apparatuses, non-transitory computer readable media, and/or methods may be used together or in isolation. In various embodiments, a Clause reciting one category (e.g., at least one of systems, apparatuses, non-transitory computer readable media, and/or methods) may be used as another category (e.g., a different one of systems, apparatuses, non-transitory computer readable media, and/or methods).

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An agentic artificial intelligence (AI) based software modernization system, the system comprising at least one non-transitory computer-readable medium comprising computer program instructions that, when executed by at least one processor, cause the system to:

receive one or more portions of monolithic legacy code of a legacy software program product, the monolithic legacy code comprising a plurality of code segments;

group the monolithic legacy code by functionally related code segments of the plurality of code segments to define a plurality of groups;

generate, by at least one agent executing at least one generative AI model, an application programming interface (API) for each identified group;

generate, by the at least one agent executing the at least one generative AI model, modern microservice code for each identified group to define a modernized software program product;

generate legacy graphical user interface (GUI) visual context data objects comprising screenshots of a legacy graphical user interface and operational context data indicating at least flow relationships between two or more of the screenshots and functionality associated with one or more components captured in each screenshot of the screenshots;

receive UI context data comprising at least one or more modern UI templates;

generate modern UI screens based on the legacy GUI visual context data objects and the UI context data;

integrate the modern UI screens with the modernized software program product; and validate the modernized software program product.

2. The system of claim 1, the computer program instructions being further configured to, when executed by at least one processor, cause the system to:

receive one or more context data sets comprising application context associated with at least the legacy software program product;

generate, by at least applying the one or more context data sets and the monolithic legacy code to a code context agent, an enriched code context data set;

generate, by at least applying the enriched code context data set to a vectorize code agent, a vectorized code context data set;

retrieve one or more code generation work prompt sets for generating the modernized software program product; and modify the vectorized code context data set using at least the one or more code generation work prompt sets to create the modernized software program product.

3. The system of claim 2, wherein the code context agent comprises an AI model comprising a large language model.

4. The system of claim 3, wherein generating the enriched code context data set comprises at least:

generating metadata for at least one portion of at least one of the one or more context data sets.

5. The system of claim 1, wherein the at least one agent comprises at least an API creation agent and at least one code generator agent, and wherein the API creation agent is configured to generate the APIs for each identified group and the at least one code generation agent is configured to generate the modern microservice code for each identified group.

6. The system of claim 1, wherein grouping the monolithic legacy code by the functionally related code segments of the plurality of code segments to define the plurality of groups comprises:

identifying, by at least one service grouper agent executing at least one additional generative AI model, the functionally related code segments of the plurality of code segments;

defining, by the at least one service grouper agent executing the at least one additional generative AI model, one or more microservices; and generating, by the at least one service grouper agent executing the at least one additional generative AI model, the plurality of groups by combining the functionally related code segments with boundaries defined by the one or more microservices.

7. The system of claim 1, further comprising at least one service context extractor agent, wherein the at least one service context extractor agent is configured to:

extract one or more group context data sets from each group of the plurality of groups.

8. The system of claim 1, further comprising at least one change isolation agent, wherein the at least one change isolation agent is configured at least to:

analyze a vectorized code context data set based on the monolithic legacy code to identify at least one section of the one or more portions of the monolithic legacy code to be modified to generate the modern microservice code.

9. The system of claim 8, further comprising at least one feature extractor agent, wherein the at least one feature extractor agent is configured to:

receive the one or more portions of the monolithic legacy code to be modified to generate the modern microservice code; and analyze the one or more portions of the monolithic legacy code to identify at least one feature associated with each of the one or more portions to be modified.

10. The system of claim 1, wherein the at least one agent executing the at least one generative AI model comprises at least one API creation agent, wherein the at least one API creation agent is configured to:

generate the API for each identified group.

11. The system of claim 1, wherein the at least one agent executing the at least one generative AI model comprises at least one code generator agent, wherein the at least one code generator agent is configured at least to:

generate the modern microservice code for each identified group.

12. The system of claim 11, wherein the at least one generative AI model associated with the at least one code generator agent comprises at least one generative pre-trained transformer model.

13. The system of claim 11, wherein the at least one code generator agent is configured to generate the modern microservice code by:

generating, via at least one LLM context extractor, extracted code context data for each identified group; and generating, via the at least one LLM context extractor, modern microservice code for each identified group based at least in part on the extracted code context data.

14. The system of claim 13, wherein the at least one LLM context extractor is further configured to enrich the extracted code context data using vectorized legacy code context data and vectorized modern code context data to generate enriched extracted code context data.

15. The system of claim 11, wherein generating the modern microservice code for each identified group comprises generating initial modern microservice code for each identified group, analyzing one or more compilation errors in at least one of the initial modern microservice code, and generating corrected modern microservice code for each compilation error.

16. The system of claim 15, wherein generating the modern microservice code for each identified group further comprises:

iterating multiple cycles of analyzing compilation errors, including the one or more compilation errors, and generating iterative corrected modern microservice code, including the corrected modern microservice code, wherein the modern microservice code comprises a final corrected modern microservice code that successfully compiles.

17. The system of claim 1, further comprising at least one code validator agent, wherein the at least one code validator agent is configured to validate the modernized software program product by:

analyzing the modernized microservice code to determine that the modern microservice code satisfies one or more predetermined standards.

18. A method comprising:

receiving one or more portions of monolithic legacy code of a legacy software program product, the monolithic legacy code comprising a plurality of code segments;

grouping the monolithic legacy code by functionally related code segments of the plurality of code segments to define a plurality of groups;

generating, by at least one agent executing at least one generative artificial intelligence (AI) model, an application programming interface (API) for each identified group;

generating, by the at least one agent executing the at least one generative AI model, modern microservice code for each identified group to define a modernized software program product;

generating legacy graphical user interface (GUI) visual context data objects comprising screenshots of a legacy graphical user interface and operational context data indicating at least flow relationships between two or more of the screenshots and functionality associated with one or more components captured in each screenshot of the screenshots;

receiving UI context data comprising at least one or more modern UI templates;

generating modern UI screens based on the legacy GUI visual context data objects and the UI context data;

integrating the modern UI screens with the modernized software program product; and validating the modernized software program product.

19. A system comprising at least one non-transitory computer-readable medium comprising computer program instructions that, when executed by at least one processor, cause the system to:

access legacy software;

generate a modernized version of the legacy software using one or more generative artificial intelligence models with or without manual input;

generate legacy graphical user interface (GUI) visual context data objects comprising screenshots of a legacy graphical user interface and operational context data indicating at least flow relationships between two or more of the screenshots and functionality associated with one or more components captured in each screenshot of the screenshots;

receive UI context data comprising at least one or more modern UI templates;

generate modern UI screens based on the legacy GUI visual context data objects and the UI context data; and integrate the modern UI screens with the modernized version of the legacy software.

* * * * *